US008213633B2

(12) United States Patent
Kobayashi et al.

(10) Patent No.: US 8,213,633 B2
(45) Date of Patent: Jul. 3, 2012

(54) SOUND SOURCE SEPARATION SYSTEM, SOUND SOURCE SEPARATION METHOD, AND ACOUSTIC SIGNAL ACQUISITION DEVICE

(75) Inventors: Tetsunori Kobayashi, Tokyo (JP); Kenzo Akagiri, Kanagawa (JP); Satoshi Kanba, Tokushima (JP)

(73) Assignee: Waseda University, Tokyo (JP)

( * ) Notice: Subject to any disclaimer, the term of this patent is extended or adjusted under 35 U.S.C. 154(b) by 1286 days.

(21) Appl. No.: 11/721,953

(22) PCT Filed: Dec. 7, 2005

(86) PCT No.: PCT/JP2005/022466

§ 371 (c)(1), (2), (4) Date: Jun. 15, 2007

(87) PCT Pub. No.: WO2006/064699

PCT Pub. Date: Jun. 22, 2006

(65) Prior Publication Data

US 2009/0323977 A1 Dec. 31, 2009

(30) Foreign Application Priority Data

Dec. 17, 2004 (JP) ................................ 2004-366202
Sep. 16, 2005 (JP) ................................ 2005-270931

(51) Int. Cl.
*H04B 1/02* (2006.01)
*H04B 1/00* (2006.01)
*H04B 7/00* (2006.01)

(52) U.S. Cl. ........................................ 381/92; 381/71.8

(58) Field of Classification Search ................ 381/71.8, 381/94.1, 94.3, 92, 98, 99, 71.14, 94.2
See application file for complete search history.

(56) References Cited

U.S. PATENT DOCUMENTS 6,130,949 A * 10/2000 Aoki et al. .................. 381/94.3
7,478,041 B2 * 1/2009 Ichikawa et al. ............. 704/233
7,567,678 B2 * 7/2009 Kong et al. .................... 381/92
2003/0185410 A1 * 10/2003 June et al. ................... 381/94.1
2008/0089531 A1 * 4/2008 Koga et al. ...................... 381/92
2008/0267423 A1 * 10/2008 Hiekata et al. ................. 381/92
2008/0317259 A1 * 12/2008 Zhang et al. ................... 381/92
(Continued)

FOREIGN PATENT DOCUMENTS

JP 10-126876 5/1998
(Continued)

*Primary Examiner* — Hai Phan

(74) *Attorney, Agent, or Firm* — McDermott Will & Emery LLP; Louis J. DelJuidice, Esq.; Hiroyuki Yasuda

(57) ABSTRACT

The invention provides a sound source separation system, a sound source separation method, and an acoustic signal acquisition device which can precisely separate a target sound and a disturbance sound coming from an arbitrary direction, and which ensures miniaturization of a device. A sound source separation system 10 comprises two microphones 21, 22 disposed side by side in a direction in which a target sound comes from, a target sound superior signal generator 30 which performs a linear combination process for emphasizing the target sound, using the received sound signals of the microphones to generate a target sound superior signal, a target sound inferior signal generator 40 which performs a linear combination process for suppressing the target sound, using the received sound signals of the microphones 21, 22, to generate a target sound inferior signal, and a separation unit 60 which separates the target sound and a disturbance sound, using a target sound superior signal spectrum and a target sound inferior signal spectrum.

1 Claim, 49 Drawing Sheets

U.S. PATENT DOCUMENTS

| | | | | |
|---|---|---|---|---|
| 2009/0055170 | A1* | 2/2009 | Nagahama | 704/226 |
| 2010/0217586 | A1* | 8/2010 | Shimada et al. | 704/226 |
| 2011/0142252 | A1* | 6/2011 | Morito et al. | 381/92 |
| 2011/0158426 | A1* | 6/2011 | Matsuo | 381/92 |

FOREIGN PATENT DOCUMENTS

| | | | |
|---|---|---|---|
| JP | 10-313497 | | 11/1998 |
| JP | 2000-004495 | | 1/2000 |
| JP | 2001-204092 | A | 7/2001 |
| JP | 2001-309483 | | 11/2001 |
| JP | 2002-062895 | | 2/2002 |
| JP | 2002-132289 | | 5/2002 |
| JP | 2002-223493 | | 8/2002 |
| JP | 2002-271885 | | 9/2002 |
| JP | 3355598 | | 10/2002 |
| JP | 2003-087891 | | 3/2003 |
| JP | 2003-270034 | | 9/2003 |
| JP | 2004-064697 | | 2/2004 |
| JP | 2004-078021 | | 3/2004 |
| WO | 99/50825 | A1 | 10/1999 |
| WO | 2004/034734 | A1 | 4/2004 |

* cited by examiner

SOUND SOURCE SEPARATION SYSTEM, SOUND SOURCE SEPARATION METHOD, AND ACOUSTIC SIGNAL ACQUISITION DEVICE

CROSS-REFERENCE TO PRIOR APPLICATION

This is the U.S. National Phase Application under 35 U.S.C. §371 of International Patent Application No. PCT/JP2005/022466 filed Dec. 7, 2005, which claims the benefit of Japanese Patent Application No. 2004-366202 filed Dec. 17, 2004, and Japanese Patent Application No. 2005-270931 filed Sep. 16, 2005. The International Application was published in Japanese on Jun. 22, 2006 as WO 2006/064699 A1 under PCT Article 21(2).

TECHNICAL FIELD

The present invention relates to a sound source separation system, a sound source separation method and an acoustic signal acquisition device which separate a target sound and a disturbance sound coming from an arbitrary direction other than a direction from which the target sound comes, and is available for a case where a desired speech is acquired through a portable device like a cellular phone, and an in-vehicle device like a car navigation system.

BACKGROUND ART

In normal voice recognition, a speech uttered from a mouth is recorded through a close-talking type microphone, and is subjected to a recognition process. On the other hand, there are lots of applications, such as interaction with a robot, operation of an in-vehicle device like a car navigation system through a speech, and creation of conference minutes, where enforcing a user to use a close-talking type microphone is unnatural. In such applications, it is desirable that a speech should be recorded through a microphone provided at a system side and should be subjected to a recognition process. In a case where speech recording and voice recognition are performed through a microphone provided away from an utterer, however, an S/N ratio is deteriorated, it is difficult to hear, and the accuracy of voice recognition is extremely reduced.

In response to such problems, there is an attempt that a desired speech is selectively recorded by controlling the directivity using a microphone array. As such devices which control the directivity using a few microphones, there are an ultra directional microphone using two single-directional microphone units (see, patent literature 1) and a recording device for multi-channel stereo using four non-directional microphones (see, patent literature 2). Further, there is a microphone device having three pairs of microphones disposed around a base microphone (see, patent literature 3).

Moreover, there is proposed a scheme called SAFIA which separates a sound by utilizing a difference between sound pressures, reaching individual microphones and caused due to differences in positional relationships between the individual microphones and a sound source (see, patent literature 4). The scheme called SAFIA is a sound separation technique which causes output signals of a plurality of fixed microphones to undergo narrow-band spectrum analysis, and for a microphone that gives the largest power for each frequency band, performs band selection of assigning a sound of that frequency band to that microphone (see FIG. 8 to be discussed later).

Patent Literature 1: Japanese Unexamined Patent Publication No. H10-126876 (claim 1, FIGS. 1 and 2, and abstract)

Patent Literature 2: Japanese Unexamined Patent Publication No. 2002-223493 (claim 1, FIGS. 1 and 3, and abstract)

Patent Literature 3: Japanese Unexamined Patent Publication No. 2002-271885 (claim 1, FIGS. 1 and 11, and abstract)

Patent Literature 4: Japanese Patent Publication No. 3355598 (paragraphs 0006, 0007, FIG. 1 and abstract)

DISCLOSURE OF THE INVENTION

Problems to be Solved by the Invention

It is, however, difficult to sufficiently separate a desired speech from background noises by merely controlling the directivity through a microphone array, and to miniaturize the device. According to the ultra directional microphone disclosed in patent literature 1 and the recording device for multi-channel stereo disclosed in patent literature 2, controlling of the directivity is realized by a few microphones, miniaturization of the device may be possible, but a performance of separating a desired sound is not good enough. Further, the microphone device disclosed in patent literature 3 uses a total of seven microphones, so that it has the same problems as those of the microphone array.

According to the foregoing SAFIA disclosed in patent literature 4, band selection is performed by utilizing a difference between sound pressure levels of signals between microphones originating from positional relationships of a plurality of fixed microphones, but in performing band selection, unlike the present invention to be discussed later, directivity control appropriate for separation of a desired speech and noises is not performed, so that the separation performance thereof is not good enough. Note that only a separation process (see FIG. 8 to be discussed later) through band selection not including a generation process of a spectrum of a target subject to a separation process through band selection in the scheme called SAFIA will be hereinafter described as maximum level band selection (BS-MAX). According to the maximum level band selection (BS-MAX) performed in the SAFIA, powers of the same frequency band are compared for each frequency band between spectra subject to comparison, and band selection of assigning the largest power at individual frequency bands to a spectrum obtained by separation is performed, but according to the invention, in addition to performing such a maximum level band selection (BS-MAX), powers at the same frequency band are compared for each frequency band between spectra subject to comparison, and band selection of assigning the smallest powers at individual frequency bands to a spectrum obtained by separation is also performed, and this will be described as minimum level band selection (BS-MIN). Further, according to the present invention, not only it is determined whether or not one condition such as selecting the maximum or the minimum power is satisfied, but also it is determined whether or not a plurality of conditions are satisfied simultaneously, and this will be described as a multidimensional band selection (BS-multiD), and the case of two conditions will be described as a two-dimensional band selection (BS-2D), and the case of three conditions will be described as a three-dimensional band selection (BS-3D).

It is an object of the invention to provide a sound source separation system, a sound source separation method and an acoustic signal acquisition device which can accurately separate a target sound and a disturbance sound coming from an arbitrary direction, and enables miniaturization of a device.

Means for Solving the Problems

<<Invention of a Sound Source Separation System>>

<Two microphones type invention> invention of a type that two microphones are used According to the invention, a sound source separation system that separates a target sound and a disturbance sound coming from an arbitrary direction other than a direction from which the target sound comes and comprises: two microphones disposed in such a manner as to be spaced away from each other; a target sound superior signal generator which performs a linear combination process for emphasizing the target sound using received sound signals of the two microphones on a time domain or a frequency domain to generate at least one target sound superior signal; a target sound inferior signal generator which performs a linear combination process for suppressing the target sound using the received sound signals of the two microphones on a time domain or a frequency domain to generate at least one target sound inferior signal to be paired with the target sound superior signal; and a separator which separates the target sound and the disturbance sound from each other using a spectrum of the target sound superior signal generated by the target sound superior signal generator or obtained by a subsequent frequency analysis and a spectrum of the target sound inferior signal generated by the target sound inferior signal generator or obtained by a subsequent frequency analysis.

"A sound source separation system that separates a target sound and a disturbance sound coming from an arbitrary direction other than a direction from which the target sound comes" means a system that can perform sound source separation in a case where a direction in which the disturbance sound comes from is not specified, other than a case where both directions in which the target sound and the disturbance sound come from are already known, like a case where sound source separation is performed through independent component analysis (ICA). Moreover, "a disturbance sound coming from an arbitrary direction other than a direction from which the target sound comes" does not always mean all directions in 360 degrees other than the direction from which the target sound comes, but may be an arbitrary direction in a range other than the direction from which the target sound comes and the adjacent directions, and for example, when $\theta=0$ degree is the direction from which the target sound comes, only a range of $\theta=-90$ to 90 degrees may be a separation target range, and in short, the disturbance sound comes from an unspecified direction. The same is true on other inventions.

"Performing a linear combination process for emphasizing the target sound using received sound signals of the two microphones on a time domain or a frequency domain" and "performing a linear combination process for suppressing the target sound using the received sound signals of the two microphones on a time domain or a frequency domain" include (1) performing linear combination processes for emphasizing and suppressing the target sound using the received sound signals of the two microphones as signals on a time domain, and generating a target sound superior signal and a target sound inferior signal as signals on a time domain, and (2) performing frequency analysis on the received sound signals (signals on a time domain) of the two microphones to make signals on a frequency domain (spectra), performing linear combination processes for emphasizing and suppressing the target sound, and generating a target sound superior signal and a target sound inferior signal as signals (spectra) on a frequency domain. The same is true on other inventions.

Further, when the target sound superior signal generated by the target sound superior signal generator is a signal on a frequency domain, "a spectrum of the target sound superior signal generated by the target sound superior signal generator or obtained by a subsequent frequency analysis" is that signal itself and is a signal on a frequency domain obtained by frequency analysis of that signal when the target sound superior signal obtained by the target sound superior signal generator is a signal on a frequency domain. The same is true on "a spectrum of the target sound inferior signal generated by the target sound inferior signal generator or obtained by a subsequent frequency analysis". The same is true on other inventions.

The "linear combination process" includes a process of acquiring a sum or a difference, and a process of multiplying a coefficient. The same is true on other inventions.

"Separating the target sound and the disturbance sound" using "the spectrum of the target sound superior signal" and "the spectrum of the target sound inferior signal" includes, for example, a process for each frequency band, i.e., a process of using both powers of the spectrum of the target sound superior signal and the spectrum of the target sound inferior signal at the same frequency band. The same is true on other inventions. The same process can be performed when amplitude values at the same frequency band are used, so that a process using powers represents both processes in the specification.

"The target sound" and "the disturbance sound" are mainly speeches of a human, but include, for example, a music, an animal call, natural sounds, such as a thunder, a ripping wave, and a murmur, various sound effects, such as a buzzer, an alarm sound, a honker, and an alarm whistle, and various mechanical sounds, such as a sound from a road, running sound of a vehicle, a takeoff sound of an airplane, and an operational sound of a machine. The same is true on other inventions.

According to the sound source separation system of such an invention, linear combination processes of emphasizing the target sound and suppressing the target sound are performed on a time domain or a frequency domain using the received sound signals of the two microphones to generate the target sound superior signal and the target sound inferior signal, so that controlling of the directivity appropriate for separation of the target sound and the disturbance sound becomes possible.

Because a separation process is performed using the spectrum of the target sound superior signal and the spectrum of the target sound inferior signal both generated by controlling the directivity, the target sound and the disturbance sound are precisely separated from each other. Accordingly, in comparison with the case of patent literature 4 where band selection is performed utilizing a sound-pressure difference of signals between the microphones originating from the positional relationships of the plurality of microphones, the separation performance can be improved.

The directivity is controlled by performing linear combination processes of emphasizing and suppressing the target sound, so that a sound coming from an unspecific direction can be separated unlike the case of a separation process utilizing independent component analysis (ICA) which separates only a sound coming from a specific direction.

The number of microphones to be used is two, and sound source separation can be realized by a few microphones, so that miniaturization of a device becomes possible, thereby achieving the foregoing object.

<Invention of a type that two microphones are disposed in parallel with a direction from which the target sound comes> Invention of a type that two microphones are disposed in the direction from which the target sound comes or in an approximately same direction as that direction To be more precise, it is possible to employ the following structure. That is, in the foregoing sound source separation system, the two microphones may be disposed side by side in the direction from which the target sound comes or an approximately same direction as that direction, the target sound superior signal generator may acquire a difference between a received sound signal of one microphone disposed near a sound source of the target sound in the two microphones and a received sound signal of an other microphone disposed away from the sound source of the target sound on a time domain or a frequency domain, and the target sound inferior signal generator may acquire a difference between the received sound signal of the one microphone undergone a delayed process and the received sound signal of the other microphone on a time domain or a frequency domain (e.g., the case shown in FIG. 1 to be discussed later).

"Acquiring a difference between the received sound signal of the one microphone undergone a delayed process and the received sound signal of the other microphone on a time domain or a frequency domain" includes (1) after performing a delayed process on the received sound signal (signal on a time domain) of the one microphone on a time domain, acquiring a difference between the signal (signal on a time domain) undergone a delayed process and the received sound signal (signal on time domain) of the other microphone, and generating a signal on a time domain, (2) performing frequency analysis on both received sound signals (signals on a time domain) of the one and other microphones to generate signals (spectra) on a frequency domain, after performing a delayed process on the spectrum of the received sound signal of the one microphone on a frequency domain, acquiring a difference between the spectrum undergone the delayed process and the spectrum of the received sound signal of the other microphone, and generating a signal on a frequency domain, and (3) performing a delayed process on a received sound signal (signal on a time domain) of the one microphone on a time domain, performing frequency analysis on the signal undergone a delayed process (signal on a time domain) to generate a signal on a frequency domain (spectrum), and after performing frequency analysis on the received sound signal (signal on a time domain) of the other microphone to generate a signal on a frequency domain (spectrum), acquiring a difference between the spectrum of the received sound signal of the one microphone undergone a delayed process and the spectrum of the received sound signal of the other microphone, and generating a signal on a frequency domain. The same is true on other inventions.

In a case where the two microphones are disposed side by side in the direction from which the target sound comes or in an approximately same direction as that direction, the separator may compare powers at a same frequency band between the spectrum of the target sound superior signal and the spectrum of the target sound inferior signal for each frequency band, and perform band selection (maximum level band selection: BS-MAX) of assigning larger powers at the individual frequency bands to a spectrum obtained by separation.

"Assigning power to a spectrum obtained by separation" means that when the power of the spectrum of the target sound superior signal is large, for the frequency band thereof, the larger power is assigned to the spectrum of the target sound, and when the power of the spectrum of the target sound inferior signal is large, for the frequency band thereof, the larger power is assigned to the spectrum of the disturbance sound (see FIG. 8 to be discussed later). The same is true on other inventions.

In a case where the two microphones are disposed side by side in the direction from which the target sound comes or in an approximately same direction as that direction, the separator may perform spectral subtraction of subtracting a value, obtained by multiplying power of the spectrum of the target sound inferior signal by a coefficient, from power of the spectrum of the target sound superior signal at a same frequency band.

The "coefficient" is a coefficient depending on, for example, the largeness of a difference between the power of the target sound superior signal and the power of the target sound inferior signal. The same is true on other inventions when spectral subtraction is performed.

In a case where the two microphones are disposed side by side in the direction from which the target sound comes or in an approximately same direction as that direction, it is preferable that a target sound to be separated should be changed over to a target sound in a normal mode and a target sound in a changeover mode coming from a direction opposite to the normal mode target sound, the one microphone should be disposed near a sound source of the normal mode target sound and the other microphone should be disposed away from the sound source of the normal mode target sound in the normal mode, the other microphone should be disposed near a sound source of the changeover mode target sound and the one microphone should be disposed away from the sound source of the changeover mode target sound in the changeover mode, and the target sound inferior signal generator should comprise: a first target sound inferior signal generation unit which acquires a difference between the received sound signal of the one microphone undergone a delayed process and the received sound signal of the other microphone on a time domain or a frequency domain; a second target sound inferior signal generation unit which acquires a difference between the received sound signal of the other microphone undergone a delayed process and the received sound signal of the one microphone on a time domain or a frequency domain; and a changeover unit which changes over a first target sound inferior signal for the normal mode generated by the first target sound inferior signal generation unit and a second target sound inferior signal for the changeover mode generated by the second target sound inferior signal generation unit as the target sound inferior signal to be processed by the separator.

In a case where changeover of a mode between the normal mode and the changeover mode is possible, it is possible to change over the direction of the target sound to be acquired without changing the position of the two microphones, thereby improving the usability of the system.

In a case where the two microphones are disposed side by side in the direction from which the target sound comes or in an approximately same direction as that direction, the target sound inferior signal generator may apply a time delay which is a same as or an approximately same as a sound wave propagation time between the two microphones to the received sound of the microphone subject to the delayed process on a time domain or a frequency domain (see, FIGS. 4 and 7).

In a case where it is structured in such a way that a time delay which is the same as or an approximately same as the sound wave propagation time between the two microphones is applied, a directivity such that the amplitude value of the target sound inferior signal becomes zero can be created in the direction from which the target sound comes (in the case of FIG. 7, for example, $\theta=0$ degree for the target sound in the normal mode, and θ=180 degree (−180 degree) for the target sound in the changeover mode), a difference of an amplitude value with the directivity (directivity originating from the target sound superior signal) directed toward the target sound can be large.

In a case where the two microphones are disposed side by side in the direction from which the target sound comes or in an approximately same direction as that direction, the target sound inferior signal generator may apply a time delay which is shorter than a sound wave propagation time between the two microphones to the received sound of the microphone subject to the delayed process on a time domain or a frequency domain (see, FIG. 30).

In a case where it is structured in such a way that a time delay which is shorter than the sound wave propagation time between the two microphones is applied, a directivity that expands a range where the amplitude value of the target sound inferior signal is suppressed can be created in the vicinity of the direction from which the target sound comes (in the case of FIG. 30, for example, θ=0 degree for the target sound in the normal mode, and θ=180 degree (−180 degree) for the target sound in the changeover mode), so that it becomes possible to expand a range where a difference of an amplitude value with the directivity (directivity of the target sound superior signal) directed toward the target sound.

In a case where the two microphones are disposed side by side in the direction from which the target sound comes or in an approximately same direction as that direction, it is possible to employ a structure such that the two microphones are respectively provided at a corresponding portion of a front face of a portable device at which an operation unit and/or a screen display unit is provided and a corresponding portion of a rear face opposite thereto.

The "portable device" includes, for example, a cellular phone (including a PHS), or a portable information terminal (PDA).

A "corresponding portion" means a directly opposite portion as viewed from each other.

In a case where the two microphones are respectively provided at the front and rear face of the portable device, the portable device may be a foldable cellular phone which is folded and closed when not in use and opened when in use, and it is possible to employ a structure such that a clearance between the two disposed microphones changes in accordance with an opening/closing operation of the cellular phone, and a clearance when the cellular phone is opened is larger than a clearance when the cellular phone is closed.

"Changing in accordance with an opening/closing operation" includes, for example, causing the microphone provided at the front face side to be retained when the portable device is closed, and causing the microphone to automatically protrude outwardly when opened, or causing the microphone provided at the rear face side to be retained when closed, and causing that microphone to automatically protrude outwardly when opened, and the combination thereof. For example, the microphone provided at the front face side of a cellular phone is urged outwardly by an elastic member, such as a spring or a rubber, and when the cellular phone is folded and closed, the microphone is pressed by an opposing surface (a surface constituting a face and becoming an opposing surface when folded) of the cellular phone, the elastic member is compressed and the microphone is retained, and when the cellular phone is opened, the microphone is caused to protrude outwardly by force of the elastic member returning to an original state, and such an operation may be realized by various mechanisms using a gear, cam, a belt, and a linkage, a mechanism using an air pressure or an oil pressure, and an electrical mechanism using a motor or the like. The same is true on other inventions that the microphones are disposed on both front and rear faces.

In a case where the two microphones are respectively provided at the front and rear face of the portable device, it is possible to employ a structure such that the two microphones are provided at end portions of both sides of a rotation support member attached in such a manner as to be rotatable around an axis parallel to the front/rear face of the cellular phone, and the rotation support member is retained in a state parallel to or approximately parallel to the front/rear surface of the cellular phone when not in use, and becomes orthogonal or approximately orthogonal to the front/rear face of the cellular phone when in use (e.g., the case shown in FIG. 29 to be discussed later).

As mentioned above, a mode can be changed over to the normal mode and the changeover mode when the target sound inferior signal generator is structured in such a manner as to include the first target sound inferior signal generator and the second target sound inferior signal generator and a changeover unit (e.g., the case shown in FIG. 1 to be discussed later), a process corresponding to a process executed by the first target sound inferior signal generator may be a process executed by the target sound inferior signal generator, and a process corresponding to a process executed by the second target sound inferior signal generator may be a process executed by the target sound superior signal generator. In this case, however, it is preferable that adjustment of multiplying the value of a signal obtained by at least one process by a coefficient should be performed. That is, the target sound superior signal generator may acquire a difference between the received sound signal of the other microphone undergone a delayed process and the received sound signal of the one microphone on a time domain or a frequency domain, (executing a process corresponding to a process executed by the second target sound inferior signal generator), and the target sound inferior signal generator may acquire a difference between the received sound signal of the one microphone undergone a delayed process and the received sound signal of the other microphone on a time domain or a frequency domain (executing a process corresponding to a process executed by the first target sound superior signal generator), and in this case, it is preferable that at least one difference in the difference obtained by the target sound superior signal generator and the difference obtained by the target sound inferior signal generator should be multiplied by a coefficient, and the difference obtained by the target sound superior signal generator should be set relatively smaller than the difference obtained by the target sound inferior signal generator (e.g., the case shown in FIG. 27).

When the foregoing structure is taken as the normal mode, the changeover mode can be structured as follows. That is, the target sound superior signal generator may acquire a difference between the received sound signal of the one microphone undergone a delayed process and the received sound signal of the other microphone on a time domain or a frequency domain (executing a process corresponding to a process executed by the first target sound inferior signal generator), and the target sound inferior signal generator may acquire a difference between the received sound signal of the other microphone undergone a delayed process and the received sound signal of the one microphone on a time domain or a frequency domain (executing a process corresponding to a process executed by the second target sound inferior signal generator), and in this case, it is preferable that at least one difference in the difference obtained by the target sound superior signal generator and the difference obtained by the target sound inferior signal generator should be multiplied by a coefficient, and the difference obtained by the target sound superior signal generator should be set relatively smaller than the difference obtained by the target sound inferior signal generator (e.g., the case shown in FIG. 28).

<Invention of a type that the two microphones are disposed in a direction orthogonal to the direction from which the target sound comes and sum/difference are both acquired> Invention of a type that the two microphones are disposed side by side in a direction orthogonal to or approximately orthogonal to the direction from which the target sound comes, and a sum and difference of received sound signals are used In addition to the structure that the two microphones are disposed side by side in the direction from which the target sound comes or in an approximately same direction, the following structure can be employed. That is, in the foregoing sound source separation system, the two microphones are disposed side by side in a direction orthogonal to or approximately orthogonal to the direction from which the target sound comes, the target sound superior signal generator acquires a sum of the received sound signals of the two microphones on a time domain or a frequency domain, and the target sound inferior signal generator acquires a difference between the received sound signals of the two microphones on a time domain or a frequency domain (e.g., the case shown in FIG. 9 to be discussed later).

In a case where the two microphones are disposed side by side in a direction orthogonal to or approximately orthogonal to the direction from which the target sound comes, and a sum of the received sound signals of the two microphones are acquired to generate the target sound superior signal, the separator may multiply at least one spectrum in the spectrum of the target sound superior signal and the spectrum of the target sound inferior signal by a coefficient depending on a frequency, compare powers of the spectra at a same frequency band, and perform band selection of assigning larger powers at the individual frequency bands to a spectrum obtained by separation (maximum level band selection: BS-MAX).

In a case where the two microphones are disposed side by side in a direction orthogonal to or approximately orthogonal to the direction from which the target sound comes, and a sum of the received sound signals of the two microphones are acquired to generate the target sound superior signal, the separator may perform spectral subtraction of subtracting a value, obtained by multiplying power of the spectrum of the target sound inferior signal by a coefficient, from power of the spectrum of the target sound superior signal at a same frequency band.

<Invention of a type that two microphones are disposed in a direction orthogonal to the direction from which the target sound comes and a difference is acquired> Invention of a type that the two microphones are disposed side by side in a direction orthogonal to or Approximately orthogonal to the direction from which the target sound comes and a difference between the received sound signals is used but a sum thereof is not used In addition to a structure that the two microphones are disposed side by side in a direction orthogonal to or approximately orthogonal to the direction from which the target sound comes, and a sum of the received sound signals of the two microphones are acquired to generate the target sound superior signal, the following structure can be employed. That is, in the foregoing sound source separation system, the two microphones may be disposed side by side in a direction orthogonal to or approximately orthogonal to the direction from which the target sound comes, the target sound superior signal generator may comprise: a first target sound superior signal generation unit which acquires a difference between the received sound signal of the one microphone in the two microphones and the received signal of the other microphone undergone a delayed process on a time domain or a frequency domain to generate a first target sound superior signal; and a second target sound superior signal generation unit which acquires a difference between the received sound signal of the other microphone and the received sound signal of the one microphone undergone a delayed process on a time domain or a frequency domain to generate a second target sound superior signal, and the target sound inferior signal generator acquires a difference between the received sound signals of the two microphones on a time domain or a frequency domain (e.g., the case shown in FIG. 12 to be discussed later).

In a case where the two microphones are disposed side by side in a direction orthogonal to or approximately orthogonal to the direction from which the target sound comes, and the two first and second target sound superior signals are generated, the separator may comprise: a first separation unit which compares powers at a same frequency band between the spectrum of the first target sound superior signal and the spectrum of the target sound inferior signal for each frequency band, and performs band selection (maximum level band selection: BS-MAX) of assigning larger powers at the individual frequency bands to a spectrum obtained by separation; a second separation unit which compares powers at a same frequency band between the spectrum of the second target sound superior signal and the spectrum of the target sound inferior signal for each frequency band, and performs band selection (maximum level band selection: BS-MAX) of assigning larger powers at the individual frequency bands to a spectrum obtained by separation; and an integration unit which performs a spectrum integration process of adding those powers of the spectra for each frequency band or comparing the powers for each frequency band and assigning inferior power to a spectrum of the target sound, using a spectrum of one sound including the target sound separated by the first separation unit and a spectrum of an other sound including the target sound separated by the second separation unit.

In a case where the two microphones are disposed side by side in a direction orthogonal to or approximately orthogonal to the direction from which the target sound comes, and the two first and second target sound superior signals are generated, the separator may comprise: a first separation unit that performs spectral subtraction of subtracting a value, obtained by multiplying power of the spectrum of the target sound inferior signal by a coefficient, from power of the spectrum of the first target sound superior signal at a same frequency band; a second separation unit that performs spectral subtraction of subtracting a value, obtained by multiplying power of the spectrum of the target sound inferior signal by a coefficient, from power of the spectrum of the second target sound superior signal of the same frequency band; and an integration unit which performs a spectrum integration process of adding those powers of the spectra for each frequency band or comparing the powers for each frequency band and assigning inferior power to a spectrum of the target sound, using a spectrum of one sound including the target sound separated by the first separation unit and a spectrum of an other sound including the target sound separated by the second separation unit.

<Invention of three microphones/two combinations type> Invention of a type that two combinations of microphones are made using three microphones According to the invention, there is provided a sound source separation system that separates a target sound and a disturbance sound coming from an arbitrary direction other than a direction from which the target sound comes and comprises: a total of three first, second and third microphones disposed at respective vertices of a triangle; a target sound superior signal generator which performs a linear combination process for emphasizing the target sound on a time domain or a frequency domain, using received sound signals of the two first and second microphones to generate at least one target sound superior signal; a target sound inferior signal generator which performs a linear combination process for suppressing the target sound on a time domain or a frequency domain, using received sound signals of the two first and third microphones to generate at least a target sound inferior signal to be paired with the target sound superior signal; and a separator that separates the target sound and the disturbance sound from each other using a spectrum of the target sound superior signal generated by the target sound superior signal generator or obtained by a subsequent frequency analysis and a spectrum of the target sound inferior signal generated by the target sound inferior signal generator or obtained by a subsequent frequency analysis.

It is preferable that the "triangle" should be a right-angle isosceles triangle, an approximately right-angle isosceles triangle, or a right-angle triangle or approximately right-angle triangle other than an isosceles triangle, but may be a triangle other than a right-angle triangle, approximately right-angle triangle.

According to such a sound source separation system of the invention (e.g., the case shown in FIG. 15 to be discussed later), the target sound superior signal and the target sound inferior signal are generated by performing the linear combination processes of emphasizing and suppressing the target sound on a time domain or a frequency domain using the received sound signals of the three microphones, thereby enabling directivity control which is appropriate for separation of the target sound and the disturbance sound.

A separation process is performed using the spectrum of the target sound superior signal and the spectrum of the target sound inferior signal both generated through directivity control in this manner, this enables precise separation of the target sound and the disturbance sound. Accordingly, in comparison with a case of patent literature 4 where band selection is performed using a sound pressure difference of signals between the microphones originating from the fixed positional relationships of the plurality of microphones, the separation performance can be improved.

Because the directivity is controlled by performing the linear combination processes for emphasizing and suppressing the target sound, unlike the case of the separation process using independent component analysis (ICA), not only a sound coming from a specified direction but also a sound coming from an unspecified direction are separated.

Further, the number of microphones to be used is three, and sound source separation is realized with the few microphones, so that miniaturization of the device is enabled, thereby achieving the foregoing object.

In the foregoing sound source separation system, it is desirable that the first and second microphones should be disposed side by side in a direction from which the target sound comes or in an approximately same direction as that direction, the first and third microphones should be disposed side by side in a direction orthogonal to or approximately orthogonal to the direction from which the target sound comes, the target sound superior signal generator should acquire a difference between the received sound signal of the first microphone and the received sound signal of the second microphone on a time domain or a frequency domain, and the target sound inferior signal generator should acquire a difference between the received sound signal of the first microphone and the received sound signal of the third microphone on a time domain or a frequency domain.

In the foregoing sound source separation system, the separator may compare powers at a same frequency band between the spectrum of the target sound superior signal and the spectrum of the target sound inferior signal for each frequency band, and perform band selection (maximum level band selection: BS-MAX) of assigning larger powers at the individual frequency bands to a spectrum obtained by separation.

Further, in the foregoing sound source separation system, the separator may perform spectral subtraction of subtracting a value, obtained by multiplying power of the spectrum of the target sound inferior signal by a coefficient, from power of the spectrum of the target sound superior signal at a same frequency band.

<Invention of four microphones/two combinations type> invention of a type that two combinations of microphones are made using four microphones According to the invention, there is provided a sound source separation system that separates a target sound and a disturbance sound coming from an arbitrary direction other than a direction from which the target sound comes and comprises: a total of four microphones, respective two microphones being disposed side by side as to be spaced away in a first direction and a second direction intersecting with each other; a target sound superior signal generator which performs a linear combination process for emphasizing the target sound on a time domain or a frequency domain using received sound signals of the two microphones disposed side by side in the first direction in the four microphones to generate at least one target sound superior signal; a target sound inferior signal generator which performs a linear combination process for suppressing the target sound on a time domain or a frequency domain using received sound signals of the two microphones disposed side by side in the second direction in the four microphones to generate at least one target sound inferior signal to be paired with the target sound superior signal; and a separator which separates the target sound and the disturbance sound from each other using a spectrum of the target sound superior signal generated by the target sound superior signal generator or obtained by a subsequent frequency analysis and a spectrum of the target sound inferior signal generated by the target sound inferior signal generator or obtained by a subsequent frequency analysis.

A case where "the first and second directions intersecting with each other" includes not only a case where the first and second directions intersect with each other at a right angle, but also a case where those directions intersect with each other at an angle other than 90 degree.

In such a sound source separation system of the invention (e.g., the case shown in FIG. 18 to be discussed later), the target sound superior signal and the target sound inferior signal are generated by performing linear combination processes of emphasizing and suppressing the target sound on a time domain or a frequency domain using the received sound signals of the four microphones, thereby enabling directivity control appropriate for separation of the target sound and the disturbance sound.

A separation process is performed using the spectrum of the target sound superior signal and the spectrum of the target sound inferior signal both generated through directivity control in this manner, this enables precise separation of the target sound and the disturbance sound. Accordingly, in comparison with a case of patent literature 4 where band selection is performed using a sound pressure difference of signals between the microphones originating from the fixed positional relationships of the plurality of microphones, the separation performance can be improved.

Because the directivity is controlled by performing the linear combination processes for emphasizing and suppressing the target sound, unlike the case of the separation process using independent component analysis (ICA), not only a sound coming from a specified direction but also a sound coming from an unspecified direction are separated.

Further, the number of microphones to be used is four, and sound source separation is realized with the few microphones, so that miniaturization of the device is enabled, thereby achieving the foregoing object.

In the foregoing sound source separation system, it is desirable that the first direction should be the direction from which the target sound comes or an approximately same direction as that direction, the second direction should be orthogonal to or approximately orthogonal to the direction from which the target sound comes, the target sound superior signal generator should acquire a difference between the received sound signals of the two microphones disposed side by side in the first direction on a time domain or a frequency domain, and the target sound inferior signal generator should acquire a difference between the received sound signals of the two microphones disposed side by side in the second direction on a time domain or a frequency domain.

In the foregoing sound source separation system, the separator may compare powers at a same frequency band between the spectrum of the target sound superior signal and the spectrum of the target sound inferior signal for each frequency band, and perform band selection (maximum level band selection: BS-MAX) of assigning larger powers at the individual frequency bands to a spectrum obtained by separation.

In the foregoing sound source separation system, the separator may perform spectral subtraction of subtracting a value, obtained by multiplying power of the spectrum of the target sound inferior signal by a coefficient, from power of the spectrum of the target sound superior signal at a same frequency band.

<Invention of four microphones/three combinations type> Invention of a type that three combinations of microphones are made using four microphones According to the invention, there is provided a sound source separation system that separates a target sound and a disturbance sound coming from an arbitrary direction other than a direction from which the target sound comes and comprises: a total of four first, second, third and fourth microphones disposed at respective vertices of a rectangle; a target sound superior signal generator which performs a linear combination process for emphasizing the target sound on a time domain or a frequency domain using received sound signals of the two first and second microphones to generate a target sound superior signal; a first target sound inferior signal generator which performs a linear combination process for suppressing the target sound on a time domain or a frequency domain using received sound signals of the two first and third microphones to generate a first target sound inferior signal to be paired with the target sound superior signal; a second target sound inferior signal generator which performs a linear combination process for suppressing the target sound on a time domain or a frequency domain using received sound signals of the two first and fourth microphones to generate a second target sound inferior signal to be paired with the target sound superior signal; a first separator which separates one sound including the target sound, using a spectrum of the target sound superior signal generated by the target sound superior signal generator or obtained by a subsequent frequency analysis, and a spectrum of the first target sound inferior signal generated by the first target sound inferior signal generator or obtained by a subsequent frequency analysis; a second separator which separates an other sound including the target sound, using the spectrum of the target sound superior signal generated by the target sound superior signal generator or obtained by a subsequent frequency analysis, and a spectrum of the second target sound inferior signal generated by the second target sound inferior signal generator or obtained by a subsequent frequency analysis; and an integration unit which performs a spectrum integration process of adding those powers of the spectra for each frequency band or comparing the powers for each frequency band and assigning inferior power to a spectrum of the target sound, using a spectrum of the one sound including the target sound separated by the first separation unit and a spectrum of the other sound including the target sound separated by the second separation unit.

It is preferable that the "rectangle" should be a rhomboid, an approximately rhomboid, a square, an approximately square, or a rectangle other than those and formed in a line-symmetric shape around a diagonal line, but may be a rectangle not formed in a line-symmetric shape around a diagonal line.

In such a sound source separation system of the invention (e.g., the case shown in FIG. 21 to be discussed later), the target sound superior signal and the first and second target sound inferior signals are generated by performing linear combination processes of emphasizing and suppressing the target sound on a time domain or a frequency domain using the received sound signals of the four microphones, thereby enabling directivity control appropriate for separation of the target sound and the disturbance sound.

A separation process is performed using the spectrum of the target sound superior signal and the spectra of the first and second target sound inferior signals all generated through directivity control in this manner, this enables precise separation of the target sound and the disturbance sound. Accordingly, in comparison with a case of patent literature 4 where band selection is performed using a sound pressure difference of signals between the microphones originating from the fixed positional relationships of the plurality of microphones, the separation performance can be improved.

Because the directivity is controlled by performing the linear combination processes for emphasizing and suppressing the target sound, unlike the case of the separation process using independent component analysis (ICA), not only a sound coming from a specified direction but also a sound coming from an unspecified direction are separated.

Further, the number of microphones to be used is four, and sound source separation is realized with the few microphones, so that miniaturization of the device is enabled, thereby achieving the foregoing object.

In the foregoing sound source separation system, it is desirable that the first and second microphones should be disposed side by side in a direction from which the target sound comes or in an approximately same direction as that direction, the third microphone should be disposed at one end of a line interconnecting the first microphone and the second microphone, the fourth microphone should be disposed at an other end of the line interconnecting the first microphone and the second microphone, the target sound superior signal generator should acquire a difference between received sound signals of the first and second microphones on a time domain or a frequency domain, the first target sound inferior signal generator should acquire a difference between received sound signals of the first and third microphones on a time domain or a frequency domain, and the second target sound inferior signal generator should acquire a difference between received sound signals of the first and fourth microphones on a time domain or a frequency domain.

In the foregoing sound source separation system, the first separator may compare powers at a same frequency band between the spectrum of the target sound superior signal and the spectrum of the first target sound inferior signal for each frequency band, and perform band selection (maximum level band selection: BS-MAX) of assigning larger powers at the individual frequency bands to a spectrum obtained by separation, and the second separator may compare powers at a same frequency band between the spectrum of the target sound superior signal and the spectrum of the second target sound inferior signal for each frequency band, and perform band selection (maximum level band selection: BS-MAX) of assigning larger powers at the individual frequency bands to a spectrum obtained by separation.

Further, in the foregoing sound source separation system, the first separator may perform spectral subtraction of subtracting a value, obtained by multiplying power of the spectrum of the first target sound inferior signal by a coefficient, from power of the spectrum of the target sound superior signal at a same frequency band, and the second separator may perform spectral subtraction of subtracting a value, obtained by multiplying power of the spectrum of the second target sound inferior signal by a coefficient, from power of the spectrum of the target sound superior signal at a same frequency band.

<Invention of three microphones/three combinations type> Invention of a type that three combinations of microphones are made using three microphones According to the invention, there is provided a sound source separation system that separates a target sound and a disturbance sound coming from an arbitrary direction other than a direction from which the target sound comes and comprises: a total of three first, second and third microphones disposed at respective vertices of a triangle; a target sound superior signal generator which performs a linear combination process for emphasizing the target sound on a time domain or a frequency domain, using received sound signals of the three microphones to generate a target sound superior signal; a first target sound inferior signal generator which performs a linear combination process for suppressing the target sound on a time domain or a frequency domain, using received sound signals of the two first and second microphones to generate a first target sound inferior signal to be paired with the target sound superior signal; a second target sound inferior signal generator which performs a linear combination process for suppressing the target sound on a time domain or a frequency domain, using received sound signals of the two first and third microphones to generate a second target sound inferior signal to be paired with the target sound superior signal; a first separator which separates one sound including the target sound, using a spectrum of the target sound superior signal generated by the target sound superior signal generator or obtained by a subsequent frequency analysis, and a spectrum of the first target sound inferior signal generated by the first target sound inferior signal generator or obtained by a subsequent frequency analysis; a second separator which separates an other sound including the target sound, using the spectrum of the target sound superior signal generated by the target sound superior signal generator or obtained by a subsequent frequency analysis, and a spectrum of the second target sound inferior signal generated by the second target sound inferior signal generator or obtained by a subsequent frequency analysis; and an integration unit which performs a spectrum integration process of adding those powers of the spectra for each frequency band or comparing the powers for each frequency band and assigning inferior power to a spectrum of the target sound, using a spectrum of the one sound including the target sound separated by the first separation unit and a spectrum of the other sound including the target sound separated by the second separation unit.

It is preferable that the "triangle" should be a right-angle isosceles triangle, an approximately right-angle isosceles triangle, or an isosceles triangle, an approximately isosceles triangle other than those triangles, but may be a triangle other than an isosceles triangle, an approximately isosceles triangle.

In such a sound source separation system of the invention (e.g., the case shown in FIG. 24 to be discussed later), the target sound superior signal and the first and second target sound inferior signals are generated by performing linear combination processes of emphasizing and suppressing the target sound on a time domain or a frequency domain using the received sound signals of the three microphones, thereby enabling directivity control appropriate for separation of the target sound and the disturbance sound.

A separation process is performed using the spectrum of the target sound superior signal and the spectra of the first and second target sound inferior signals all generated through directivity control in this manner, this enables precise separation of the target sound and the disturbance sound. Accordingly, in comparison with a case of patent literature 4 where band selection is performed using a sound pressure difference of signals between the microphones originating from the fixed positional relationships of the plurality of microphones, the separation performance can be improved.

Because the directivity is controlled by performing the linear combination processes for emphasizing and suppressing the target sound, unlike the case of the separation process using independent component analysis (ICA), not only a sound coming from a specified direction but also a sound coming from an unspecified direction are separated.

Further, the number of microphones to be used is three, and sound source separation is realized with the few microphones, so that miniaturization of the device is enabled, thereby achieving the foregoing object.

In the foregoing sound source separation system, it is desirable that the first and second microphones should be disposed side by side in a direction inclined with respect to a direction from which the target sound comes, the first and third microphones should be disposed side by side in a direction inclined in a opposite direction to the inclined direction of the first and second microphones with respect to a direction from which the target sound comes, the target sound superior signal generator should acquire a difference between the received sound signal of the first microphone and a sum, obtained by multiplying received sound signals of the second and third microphones by a same or different proportionality coefficients, on a time domain or a frequency domain, the first target sound inferior signal generator should acquire a difference between the received sound signals of the first and second microphones on a time domain or a frequency domain, and the second target sound inferior signal generator should acquire a difference between the received sound signals of the first and third microphones on a time domain or a frequency domain.

The "sum obtained by multiplying received sound signals of the second and third microphones by a same or different proportionality coefficients on a time domain or a frequency domain" is a sum obtained by multiplying the received sound signals of the second and third microphones by the same proportionality coefficient when the disposed positions of the three microphones form an isosceles triangle with the position of the first microphone serving as a vertex, or a sum obtained by multiplying the received sound signals of the second and third microphones by different coefficients, respectively, when the disposed positions of the microphones do not form an isosceles triangle.

In the foregoing sound source separation system, the first separator may compare powers at a same frequency band between the spectrum of the target sound superior signal and the spectrum of the first target sound inferior signal for each frequency band, and perform band selection (maximum level band selection: BS-MAX) of assigning larger powers at the individual frequency bands to a spectrum obtained by separation, and the second separator may compare powers at a same frequency band between the spectrum of the target sound superior signal and the spectrum of the second target sound inferior signal for each frequency band, and perform band selection (maximum level band selection: BS-MAX) of assigning larger powers at the individual frequency bands to a spectrum obtained by separation.

Further, in the foregoing sound source separation system, the first separator may perform spectral subtraction of subtracting a value, obtained by multiplying power of the spectrum of the first target sound inferior signal by a coefficient, from power of the spectrum of the target sound superior signal at a same frequency band, and the second separator may perform spectral subtraction of subtracting a value, obtained by multiplying power of the spectrum of the second target sound inferior signal by a coefficient, from power of the spectrum of the target sound superior signal at a same frequency band.

<Invention of two sensitive regions integration type that three microphones are disposed on a plane orthogonal to the direction from which the target sound comes> Invention of a type that three microphones are disposed on a plane orthogonal to or approximately orthogonal to the direction from which the target sound comes, and two sensitive regions are integrated According to the invention, there is provided a sound source separation system that separates a target sound and a disturbance sound coming from an arbitrary direction other than a direction from which the target sound comes and comprises: a total of three first, second and third microphones disposed at respective vertices of a triangle on a plane orthogonal to or approximately orthogonal to a direction from which the target sound comes; a first sensitive region formation signal generator that uses received sound signals of the two first and second microphones to generate a spectrum of a first sensitive region formation signal which forms a first sensitive region along a plane orthogonal to a line interconnecting those microphones; a second sensitive region formation signal generator that uses received sound signals of the two second and third microphones to generate a spectrum of a second sensitive region formation signal which forms a second sensitive region along a plane orthogonal to a line interconnecting those microphones; and a sensitive region integration unit that forms a sensitive region for separating the target sound at a common part of the first sensitive region and the second sensitive region using the spectrum of the first sensitive region formation signal generated by the first sensitive region formation signal generator and the spectrum of the second sensitive region formation signal generated by the second sensitive region formation signal generator.

According to such a sound source separation system of the invention (e.g., the case shown in FIGS. 31 and 35 to be discussed later), the first sensitive region is formed using the received sound signals of the two first and second microphones, the second sensitive region is formed using the received sound signals of the two second and third microphones, and a sensitive region for separating the target sound is formed at a common part of those regions, thereby separating the target sound and the disturbance sound precisely.

The number of microphones to be used is three, and sound source separation is realized with the few microphones, so that miniaturization of the device is enabled, thereby achieving the foregoing object.

<Invention of two sensitive regions integration type that three microphones are disposed on a plane orthogonal to the direction from which the target sound comes, and a process including the process of the invention of the type that two microphones are disposed in a direction orthogonal to the direction from which the target sound comes and a difference is acquired is performed>

In the foregoing sound source separation system (invention of the two sensitive regions integration type that the three microphones are disposed on a plane orthogonal to the direction from which the target sound comes), the first sensitive region formation signal generator may perform a same process as that of the sound source separation system (invention of the type that the two microphones are disposed in a direction orthogonal to the direction from which the target sound comes), using the received sound signals of the two first and second microphones, and generate a same spectrum as the spectrum of the target sound obtained through separation by the sound source separation system (invention of the type that the two microphones are disposed in a direction orthogonal to the direction from which the target sound comes), as the spectrum of the first sensitive region formation signal, the second sensitive region formation signal generator may perform a same process as that of the sound source separation system (invention of the type that the two microphones are disposed in a direction orthogonal to the direction from which the target sound comes), using the received sound signals of the two second and third microphones, and generate a same spectrum as the spectrum of the target sound obtained through separation by the sound source separation system (invention of the type that the two microphones are disposed in a direction orthogonal to the direction from which the target sound comes), as the spectrum of the second sensitive region formation signal, and the sensitive region integration unit may perform a spectrum integration process of comparing the powers of the spectra for each frequency band and assigning inferior power to a spectrum of the target sound, using the spectrum of the first sensitive region formation signal generated by the first sensitive region formation signal generator and the spectrum of the second sensitive region formation signal generated by the second sensitive region formation signal generator (the case shown in FIG. 31 to be discussed later).

In the foregoing sound source separation system (invention of the two sensitive regions integration type that the three microphones are disposed on a plane orthogonal to the direction from which the target sound comes), the first sensitive region formation signal generator may perform a same process as that of the sound source separation system (invention of the type that the two microphones are disposed in a direction orthogonal to the direction from which the target sound comes), using the received sound signals of the two first and second microphones, and generate a same spectrum as the spectrum of the target sound obtained through separation by the sound source separation system (invention of the type that the two microphones are disposed in a direction orthogonal to the direction from which the target sound comes), as the spectrum of the first sensitive region formation signal, the second sensitive region formation signal generator may perform same processes as those of the sound source separation system (invention of the type that the two microphones are disposed in a direction orthogonal to the direction from which the target sound comes) other than a process of the integration unit of the separator, using the received sound signals of the two second and third microphones, and have a sensitive region limitation unit which limits the second sensitive region to either of a region at the second microphone side and a region at the third microphone side, instead of the integration unit of the separator which constitutes the sound source separation system (invention of the type that the two microphones are disposed in a direction orthogonal to the direction from which the target sound comes), when the first target sound superior signal generator performs a delayed process on the received sound signal of the second microphone and the second target sound superior signal generator performs a delayed process on the received sound signal of the third microphone, the first target sound superior signal generator and the second target sound superior signal generator constituting the sound source separation system (invention of the type that the two microphones are disposed in a direction orthogonal to the direction from which the target sound comes), the sensitive region limitation unit may compare powers at a same frequency band between the spectrum of one sound including the target sound separated by the first separation unit and the spectrum of an other sound including the target sound separated by the second separation unit for each frequency band, perform band selection (minimum level band selection: BS-MIN) of assigning smaller power to a spectrum of one sound including the target sound separated by the first separation unit for a frequency band where power of the spectrum of the one sound including the target sound separated by the first separation unit is smaller than power of a spectrum of an other sound including the target sound separated by the second separation unit to generate the spectrum of the second sensitive region formation signal which forms the second sensitive region limited to the region at the second microphone side, or perform band selection (minimum level band selection: BS-MIN) of assigning smaller power to the spectrum of the other sound including the target sound separated by the second separation unit for a frequency band where power of the spectrum of the other sound including the target sound separated by the second separation unit is smaller than power of the spectrum of the one sound including the target sound separated by the first separation unit to generate a spectrum of the second sensitive region formation signal which forms the second sensitive region limited to the region at the third microphone side, and the sensitive region integration unit may perform a spectrum integration process of comparing the powers of the spectra for each frequency band, using the spectrum of the first sensitive region formation signal generated by the first sensitive region formation signal generator and the spectrum of the second sensitive region formation signal generated by the second sensitive region formation signal generator, and assigning inferior power to a spectrum of the target sound (the case shown in FIG. 35 to be discussed later).

The foregoing sensitive region limitation unit may be able to change over limitation of the second sensitive region to either of the region at the second microphone side and the region at the third microphone side (see, FIG. 38 to be discussed later).

<Invention of three sensitive regions integration type that three microphones are disposed on a plane orthogonal to the direction from which the target sound comes> Invention of a type that three microphones are disposed on a plane orthogonal to or approximately orthogonal to the direction from which the target sound comes and three sensitive regions are integrated Moreover, according to the invention, there is provided a sound source separation system that separates a target sound and a disturbance sound coming from an arbitrary direction other than a direction from which the target sound comes and comprises: a total of three first, second and third microphones disposed at respective vertices of a triangle perpendicular to or approximately perpendicular to a direction from which the target sound comes; a first sensitive region formation signal generator that generates a spectrum of a first sensitive region formation signal which forms a first sensitive region along a plane orthogonal to a line interconnecting the first and second microphones, using received sound signals of those two microphones; a second sensitive region formation signal generator that generates a spectrum of a second sensitive region formation signal which forms a second sensitive region along a plane orthogonal to a line interconnecting the second and third microphones, using received sound signals of those two microphones; a third sensitive region formation signal generator that generates a spectrum of a third sensitive region formation signal which forms a third sensitive region along a plane orthogonal to a line interconnecting the first and third microphones, using received sound signals of those two microphones; and a sensitive region integration unit that forms a sensitive region for separating the target sound at a common part of the first sensitive region, the second sensitive region and the third sensitive region, using the spectrum of the first sensitive region formation signal generated by the first sensitive region formation signal generator, the spectrum of the second sensitive region formation signal generated by the second sensitive region formation signal generator, and the spectrum of the third sensitive region formation signal generated by the third sensitive region formation signal generator.

According to such a sound source separation system of the invention (e.g., the case shown in FIG. 40 to be discussed later), the first sensitive region is formed using the received sound signals of the two first and second microphones, the second sensitive region is formed using the received sound signals of the two second and third microphones, the third sensitive region is formed using the received sound signals of the two first and third microphones, and the sensitive region for separating the target sound is formed at a common part of those regions, thereby enabling precise separation of the target sound and the disturbance sound.

The number of microphones to be used is three, and sound source separation is realized with the few microphones, so that miniaturization of the device is enabled, thereby achieving the foregoing object.

<Invention of three sensitive regions integration type that three microphones are disposed on a plane orthogonal to the direction from which the target sound comes, and a process including the process of the invention of the type that two microphones are disposed in a direction orthogonal to the direction from which the target sound comes and a difference is acquired is performed>

In the foregoing sound source separation system (invention of three sensitive regions integration type that three microphones are disposed on a plane orthogonal to the direction from which the target sound comes), the first sensitive region formation signal generator may perform a same process as that of the sound source separation system (invention of the type that two microphones are disposed in a direction orthogonal to the direction from which the target sound comes and a difference is acquired), using the received sound signals of the two first and second microphones, and generate a same spectrum as the spectrum of the target sound obtained through separation by the sound source separation system (invention of the type that two microphones are disposed in a direction orthogonal to the direction from which the target sound comes and a difference is acquired), as the spectrum of the first sensitive region formation signal, the second sensitive region formation signal generator may perform a same process as that of the sound source separation system (invention of the type that two microphones are disposed in a direction orthogonal to the direction from which the target sound comes and a difference is acquired), using the received sound signals of the two second and third microphones, and generate a same spectrum as the spectrum of the target sound obtained through separation by the sound source separation system (invention of the type that two microphones are disposed in a direction orthogonal to the direction from which the target sound comes and a difference is acquired), as the spectrum of the second sensitive region formation signal, the third sensitive region formation signal generator may perform a same process as that of the sound source separation system (invention of the type that two microphones are disposed in a direction orthogonal to the direction from which the target sound comes and a difference is acquired), using the received sound signals of the two first and third microphones, and generate a same spectrum as the spectrum of the target sound obtained through separation by the sound source separation system (invention of the type that two microphones are disposed in a direction orthogonal to the direction from which the target sound comes and a difference is acquired), as the spectrum of the third sensitive region formation signal, and the sensitive region integration unit may perform a spectrum integration process of comparing the powers of the spectra for each frequency band and assigning most inferior power to a spectrum of the target sound, using the spectrum of the first sensitive region formation signal generated by the first sensitive region formation signal generator, the spectrum of the second sensitive region formation signal generated by the second sensitive region formation signal generator and the spectrum of the third sensitive region formation signal generated by the third sensitive region formation signal generator.

In the foregoing sound source separation system (invention of three sensitive regions integration type that three microphones are disposed on a plane orthogonal to the direction from which the target sound comes), the first sensitive region formation signal generator may perform a same process as that of the sound source separation system (invention of the type that two microphones are disposed in a direction orthogonal to the direction from which the target sound comes and a difference is acquired), using the received sound signals of the two first and second microphones, and generate a same spectrum as the spectrum of the target sound obtained through separation by the sound source separation system (invention of the type that two microphones are disposed in a direction orthogonal to the direction from which the target sound comes and a difference is acquired), as the spectrum of the first sensitive region formation signal, the second sensitive region formation signal generator may perform same processes as those of the sound source separation system (invention of the type that two microphones are disposed in a direction orthogonal to the direction from which the target sound comes and a difference is acquired) other than a process of the integration unit of the separator, using the received sound signals of the two second and third microphones, and have a sensitive region limitation unit which limits the second sensitive region to either of a region at the second microphone side and a region at the third microphone side, instead of the integration unit of the separator which constitutes the sound source separation system (invention of the type that two microphones are disposed in a direction orthogonal to the direction from which the target sound comes and a difference is acquired), when the first target sound superior signal generator performs a delayed process on the received sound signal of the second microphone and the second target sound superior signal generator performs a delayed process on the received sound signal of the third microphone, the first target sound superior signal generator and the second target sound superior signal generator constituting the sound source separation system (invention of the type that two microphones are disposed in a direction orthogonal to the direction from which the target sound comes and a difference is acquired), the sensitive region limitation unit of the second sensitive region formation signal generator may compare powers at a same frequency band between the spectrum of one sound including the target sound separated by the first separation unit and the spectrum of an other sound including the target sound separated by the second separation unit for each frequency band, perform band selection (minimum level band selection: BS-MIN) of assigning smaller power to a spectrum of one sound including the target sound separated by the first separation unit for a frequency band where power of the spectrum of the one sound including the target sound separated by the first separation unit is smaller than power of a spectrum of an other sound including the target sound separated by the second separation unit to generate the spectrum of the second sensitive region formation signal which forms the second sensitive region limited to the region at the second microphone side, or perform band selection (minimum level band selection: BS-MIN) of assigning smaller power to the spectrum of the other sound including the target sound separated by the second separation unit for a frequency band where power of the spectrum of the other sound including the target sound separated by the second separation unit is smaller than power of the spectrum of the one sound including the target sound separated by the first separation unit to generate a spectrum of the second sensitive region formation signal which forms the second sensitive region limited to the region at the third microphone side, the third sensitive region formation signal generator may perform same processes as those of the sound source separation system (invention of the type that two microphones are disposed in a direction orthogonal to the direction from which the target sound comes and a difference is acquired) other than a process of the integration unit of the separator, using the received sound signals of the two first and third microphones, and have a sensitive region limitation unit which limits the third sensitive region to either of a region at the first microphone side and a region at the third microphone side, instead of the integration unit of the separator which constitutes the sound source separation system (invention of the type that two microphones are disposed in a direction orthogonal to the direction from which the target sound comes and a difference is acquired), when the first target sound superior signal generator performs a delayed process on the received sound signal of the first microphone and the second target sound superior signal generator performs a delayed process on the received sound signal of the third microphone, the first target sound superior signal generator and the second target sound superior signal generator constituting the sound source separation system (invention of the type that two microphones are disposed in a direction orthogonal to the direction from which the target sound comes and a difference is acquired), the sensitive region limitation unit of the third sensitive region formation signal generator may compare powers at a same frequency band between the spectrum of one sound including the target sound separated by the first separation unit and the spectrum of an other sound including the target sound separated by the second separation unit for each frequency band, perform band selection (minimum level band selection: BS-MIN) of assigning smaller power to a spectrum of one sound including the target sound separated by the first separation unit for a frequency band where power of the spectrum of the one sound including the target sound separated by the first separation unit is smaller than power of a spectrum of an other sound including the target sound separated by the second separation unit to generate the spectrum of the third sensitive region formation signal which forms the third sensitive region limited to the region at the first microphone side, or perform band selection (minimum level band selection: BS-MIN) of assigning smaller power to the spectrum of the other sound including the target sound separated by the second separation unit for a frequency band where power of the spectrum of the other sound including the target sound separated by the second separation unit is smaller than power of the spectrum of the one sound including the target sound separated by the first separation unit to generate a spectrum of the third sensitive region formation signal which forms the third sensitive region limited to the region at the third microphone side, and the sensitive region integration unit may perform a spectrum integration process of comparing the powers of the spectra for each frequency band and assigning most inferior power to a spectrum of the target sound, using the spectrum of the first sensitive region formation signal generated by the first sensitive region formation signal generator, the spectrum of the second sensitive region formation signal generated by the second sensitive region formation signal generator and the spectrum of the third sensitive region formation signal generated by the third sensitive region formation signal generator (e.g., the case shown in FIG. 40 to be discussed later).

<Invention of three microphones type that a control signal is generated using two signals, an opposite disturbance sound is suppressed, and a process including the process of the invention of the type that two microphones are disposed in a direction orthogonal to the direction from which the target sound comes and a difference is acquired is performed>

According to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the two first and second microphones; an opposite-disturbance-sound-suppressing-control-signal generator that generates a control signal for suppressing an opposite disturbance sound coming from a direction opposite to the direction from which the target sound comes, using received sound signals of the two second and third microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of the type that two microphones are disposed in a direction orthogonal to the direction from which the target sound comes and a difference is acquired) using received sound signals of the two first and second microphones, and generates a same spectrum as a spectrum of the target sound obtained through separation by the sound source separation system (invention of the type that two microphones are disposed in a direction orthogonal to the direction from which the target sound comes and a difference is acquired), as the spectrum of the orthogonal-disturbance-sound suppressing signal, and the opposite-disturbance-sound-suppressing-control-signal generator has a control target sound superior signal generator which acquires a difference between the received sound signal of the third microphone undergone a delayed process and the received sound signal of the second microphone on a time domain or a frequency domain.

In such a sound source separation system of the invention (e.g., the case shown in FIG. 42 to be discussed later), an orthogonal-disturbance-sound suppressing signal is generated using the received sound signals of the two first and second microphones, the opposite-disturbance-sound suppressing control signal is generated using the received sound signals of the two second and third microphones, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is three, and sound source separation is realized with the few microphones, so that miniaturization of the device is enabled, thereby achieving the foregoing object.

<Invention of three microphones type that a control signal is generated using three signals, an opposite disturbance sound is suppressed, and a process including the process of the invention of the type that two microphones are disposed in a direction orthogonal to the direction from which the target sound comes and a difference is acquired is performed>

According to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the two first and second microphones; an opposite-disturbance-sound-suppressing-control-signal generator that generates a control signal for suppressing an opposite disturbance sound coming from a direction opposite to the direction from which the target sound comes, using received sound signals of the three first, second and third microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of the type that two microphones are disposed in a direction orthogonal to the direction from which the target sound comes and a difference is acquired) using received sound signals of the two first and second microphones, and generates a same spectrum as a spectrum of the target sound obtained through separation by the sound source separation system (invention of the type that two microphones are disposed in a direction orthogonal to the direction from which the target sound comes and a difference is acquired), as the spectrum of the orthogonal-disturbance-sound suppressing signal, and the opposite-disturbance-sound-suppressing-control-signal generator has: a first control target-sound-superior-signal generator which acquires a difference between the received sound signal of the third microphone undergone a delayed process and the received sound signal of the second microphone on a time domain or a frequency domain; a second control target-sound-superior-signal generator which acquires a difference between the received sound signal of the third microphone undergone a delayed process and the received sound signal of the first microphone on a time domain or a frequency domain; and a control signal integration unit that performs a spectrum integration process of comparing powers for each frequency band, using a spectrum of a first control target sound superior signal generated by the first control target-sound-superior-signal generator or obtained by a subsequent frequency analysis, and a spectrum of a second control target sound superior signal generated by the second control target-sound-superior-signal generator or obtained by a subsequent frequency analysis, and of assigning inferior power to a spectrum of a control target sound superior signal.

According to such a sound source separation system of the invention (e.g., the case shown in FIG. 44 to be discussed later), the orthogonal-disturbance-sound suppressing signal is generated using the received sound signals of the two first and second microphones, the opposite-disturbance-sound suppressing control signal is generated using the received sound signals of the three first, second and third microphones, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is three, and sound source separation is realized with the few microphones, so that miniaturization of the device is enabled, thereby achieving the foregoing object.

<Invention of three microphones/opposite disturbance sound suppressing type that a process including the process of the invention of a type that two microphones are disposed in a direction orthogonal to the direction from which the target sound comes and sum/difference are both acquired is performed>

According to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the two first and second microphones; an opposite-disturbance-sound-suppressing-control-signal generator that generates a control signal for suppressing an opposite disturbance sound coming from a direction opposite to the direction from which the target sound comes, using received sound signals of the two second and third microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of a type that the two microphones are disposed in a direction orthogonal to the direction from which the target sound comes and sum/difference are both acquired) using received sound signals of the two first and second microphones, and generates a same spectrum as a spectrum of the target sound obtained through separation by the sound source separation system (invention of a type that the two microphones are disposed in a direction orthogonal to the direction from which the target sound comes and sum/difference are both acquired), as the spectrum of the orthogonal-disturbance-sound suppressing signal, and the opposite-disturbance-sound-suppressing-control-signal generator has a control target sound superior signal generator which acquires a difference between the received sound signal of the third microphone undergone a delayed process and the received sound signal of the second microphone on a time domain or a frequency domain.

According to such a sound source separation system of the invention (e.g., the case shown in FIG. 46 to be discussed later), the orthogonal-disturbance-sound suppressing signal is generated using the received sound signals of the two first and second microphones, the opposite-disturbance-sound suppressing control signal is generated using the received sound signals of the two second and third microphones, and the spectrum of the opposite disturbance sound included in the orthogonal-disturbance-sound suppressing signal is suppressed using the control signal, thereby enabling precise separation of the target sound and the disturbance sound.

The number of microphones to be used is three, and sound source separation is realized with the few microphones, so that miniaturization of the device is enabled, thereby achieving the foregoing object.

<Invention of three microphones/opposite disturbance sound suppressing type that a process including the process of the invention of three microphone/two combinations type is performed>

According to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the three first, second and third microphones; an opposite-disturbance-sound-suppressing-control-signal generator that generates a control signal for suppressing an opposite disturbance sound coming from a direction opposite to the direction from which the target sound comes, using received sound signals of the two first and second microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of three microphone/two combinations type) using received sound signals of the three first, second and third microphones, and generates a same spectrum as a spectrum of the target sound obtained through separation by the sound source separation system (invention of three microphone/two combinations type), as the spectrum of the orthogonal-disturbance-sound suppressing signal, and the opposite-disturbance-sound-suppressing-control-signal generator has a control target sound superior signal generator which acquires a difference between the received sound signal of the second microphone undergone a delayed process and the received sound signal of the first microphone on a time domain or a frequency domain.

According to such a sound source separation system of the invention (e.g., the case shown in FIG. 48 to be discussed later), the orthogonal-disturbance-sound suppressing signal is generated using the received sound signals of the three first, second and third microphones, the opposite-disturbance-sound suppressing control signal is generated using the received sound signals of the two first and second microphones, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is three, and sound source separation is realized with the few microphones, so that miniaturization of the device is enabled, thereby achieving the foregoing object.

<Invention of four microphones/opposite disturbance sound suppressing type that a process including the process of the invention of four microphones/two combinations type is performed>

According to the invention, there is provided a sound source separation system that separates a target sound and a disturbance sound coming from an arbitrary direction other than a direction from which the target sound comes and comprises: a total of four microphones, respective two of which are disposed side by side in such a manner as to be spaced away from each other in a first direction and a second direction orthogonal to each other; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the four microphones; an opposite-disturbance-sound-suppressing-control-signal generator that generates a control signal for suppressing an opposite disturbance sound coming from a direction opposite to the direction from which the target sound comes, using received sound signals of the two microphones disposed side by side in the first direction in the four microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of four microphones/two combinations type) using received sound signals of the four microphones, and generates a same spectrum as a spectrum of the target sound obtained through separation by the sound source separation system (invention of four microphones/two combinations type), as the spectrum of the orthogonal-disturbance-sound suppressing signal, and the opposite-disturbance-sound-suppressing-control-signal generator has a control target sound superior signal generator which acquires a difference between the received sound signal of the microphone at the opposite disturbance sound side undergone a delayed process in the two microphones disposed side by side in the first direction and the received sound signal of the microphone at the target sound side on a time domain or a frequency domain.

According to such a sound source separation system of the invention (e.g., the case shown in FIG. 50 to be discussed later), the orthogonal-disturbance-sound suppressing signal is generated using the received sound signals of the four microphones, the opposite-disturbance-sound suppressing control signal is generated using the received sound signals of the two microphones both disposed side by side in the first direction, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is four, and sound source separation is realized with the few microphones, so that miniaturization of the device is enabled, thereby achieving the foregoing object.

<Invention of four microphones/opposite disturbance sound suppressing type that a process including the process of the invention of four microphones/three combinations type is performed>

According to the invention, there is provided a sound source separation system that separates a target sound and a disturbance sound coming from an arbitrary direction other than a direction from which the target sound comes and comprises: a total of four first, second, third and fourth microphones disposed at respective vertices of a rectangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the four microphones; an opposite-disturbance-sound-suppressing-control-signal generator that generates a control signal for suppressing an opposite disturbance sound coming from a direction opposite to the direction from which the target sound comes, using received sound signals of the two first and second microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of four microphones/three combinations type) using received sound signals of the four microphones, and generates a same spectrum as a spectrum of the target sound obtained through separation by the sound source separation system (invention of four microphones/three combinations type), as the spectrum of the orthogonal-disturbance-sound suppressing signal, and the opposite-disturbance-sound-suppressing-control-signal generator has a control target sound superior signal generator which acquires a difference between a received sound signal of the second microphone undergone a delayed process and the received sound signal of the first microphone on a time domain or a frequency domain.

According to such a sound source separation system of the invention (e.g., the case shown in FIG. 52 to be discussed later), the orthogonal-disturbance-sound suppressing signal is generated using the received sound signals of the four microphones, the opposite-disturbance-sound suppressing control signal is generated using the received sound signals of the two first and second microphones, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is four, and sound source separation is realized with the few microphones, so that miniaturization of the device is enabled, thereby achieving the foregoing object.

<Invention of three microphones/opposite disturbance sound suppressing type that a process including the process of the invention of three microphones/three combinations type is performed>

According to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the three first, second and third microphones; an opposite-disturbance-sound-suppressing-control-signal generator that generates a control signal for suppressing an opposite disturbance sound coming from a direction opposite to the direction from which the target sound comes, using received sound signals of the three first, second and third microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of three microphones/three combinations type) using received sound signals of the three first, second and third microphones, and generates a same spectrum as a spectrum of the target sound obtained through separation by the sound source separation system (invention of three microphones/three combinations type), as the spectrum of the orthogonal-disturbance-sound suppressing signal, and the opposite-disturbance-sound-suppressing-control-signal generator has: a first control target-sound-superior-signal generator which acquires a difference between the received sound signal of the second microphone undergone a delayed process and the received sound signal of the first microphone on a time domain or a frequency domain; a second control target-sound-superior-signal generator which acquires a difference between the received sound signal of the third microphone undergone a delayed process and the received sound signal of the first microphone on a time domain or a frequency domain; and a control signal integration unit that performs a spectrum integration process of comparing powers for each frequency band, using a spectrum of a first control target sound superior signal generated by the first control target-sound-superior-signal generator or obtained by a subsequent frequency analysis, and a spectrum of a second control target sound superior signal generated by the second control target-sound-superior-signal generator or obtained by a subsequent frequency analysis, and of assigning inferior power to a spectrum of a control target sound superior signal.

According to such a sound source separation system of the invention (e.g., the case shown in FIG. 54 to be discussed later), the orthogonal-disturbance-sound suppressing signal is generated using the received sound signals of the three microphones, the opposite-disturbance-sound suppressing control signal is generated using the received sound signals of the three microphones, and the spectrum of the opposite disturbance sound included in the spectrum of the orthogonal-disturbance-sound suppressing signal is suppressed using the control signal, thereby enabling precise separation of the target sound and the disturbance sound.

The number of microphones to be used is three, and sound source separation is realized with the few microphones, so that miniaturization of the device is enabled, thereby achieving the foregoing object.

Further, the following structure (e.g., the case shown in FIG. 56 to be discussed later) may be employed. That is, according to the invention, there is provided a sound source separation system that separates a target sound and a disturbance sound coming from an arbitrary direction other than a direction from which the target sound comes and comprises: a total of three first, second and third microphones disposed at respective vertices of a triangle; an orthogonal-disturbance-sound-suppressing-signal generator that generates an orthogonal-disturbance-sound suppressing signal which suppresses an orthogonal disturbance sound coming from a direction orthogonal to the direction from which the target sound comes, using received sound signals of the three first, second and third microphones; an opposite-disturbance-sound-suppressing-control-signal generator that generates a control signal for suppressing an opposite disturbance sound coming from a direction opposite to the direction from which the target sound comes, using received sound signals of the three first, second and third microphones; and an opposite-disturbance-sound suppressing unit that compares powers at a same frequency band between a spectrum of the orthogonal-disturbance-sound suppressing signal generated by the orthogonal-disturbance-sound-suppressing-signal generator and a spectrum of the control signal generated by the opposite-disturbance-sound-suppressing-control-signal generator for each frequency band, and for a frequency band where power of the spectrum of the orthogonal-disturbance-sound suppressing signal is smaller than power of the control signal, performs band selection (minimum level band selection: BS-MIN) of assigning smaller power to a spectrum of the target sound to be separated, thereby suppressing a spectrum of the opposite disturbance sound included in the spectrum of the orthogonal-disturbance-sound suppressing signal, and wherein the orthogonal-disturbance-sound-suppressing-signal generator performs a same process as that of the sound source separation system (invention of three microphones/three combinations type) using received sound signals of the three first, second and third microphones, and generates a same spectrum as a spectrum of the target sound obtained through separation by the sound source separation system (invention of three microphones/three combinations type), as the spectrum of the orthogonal-disturbance-sound suppressing signal, and the orthogonal-disturbance-sound-suppressing-control-signal generator has a control target-sound-superior-signal generator which acquires a difference between a sum signal, obtained by multiplying received signals of the second and third microphones by a same or different proportionality coefficients, undergone a delayed process and the received sound signal of the first microphone on a time domain or a frequency domain.

<Invention of performing multidimensional band selection>

According to the invention, there is provided a sound source separation system that separates a target sound and a disturbance sound coming from an arbitrary direction other than a direction from which the target sound comes and comprises: a plurality of different-directional-signal-group generators each generating more than or equal to two combinations of spectra of a plurality of signals each of which has a different directivity, using received sound signals of a plurality of microphones; and a sensitive region formation unit which determines whether or not a relationship between powers of the spectra in a combination simultaneously satisfies a plurality of conditions each defined for a combination, for each frequency band, using more than or equal to two combinations of the spectra of the plurality of signals generated by the respective different-directional-signal-group generators, and performs multidimensional band selection (BS-MultiD) of assigning power of a spectraelected beforehand to a spectrum of the target sound to be separated, for a frequency band where the plurality of conditions are simultaneously satisfied.

According to such a sound source separation system of the invention (e.g., the case shown in FIGS. 58 and 59 to be discussed later), performing multidimensional band selection (BS-MultiD) enables precise separation of the target sound and the disturbance sound.

Sound source separation is realized with a few microphones, so that miniaturization of the device is enabled, thereby achieving the foregoing object.

In the foregoing sound source separation system (invention of performing multidimensional band selection), each different-directional-signal-group generator may generate a spectrum of a target sound superior signal and a spectrum of a target sound inferior signal using the received sound signals of the plurality of microphones, and the sensitive region formation unit may set a condition for each combination as a condition that power of the spectrum of the target sound superior signal is larger than power of the spectrum of the target sound inferior signal, and determine whether or not those conditions are simultaneously satisfied for each frequency band.

<Invention of performing two-dimensional band selection>

More specifically, as the invention of performing two-dimensional band selection, there may be provided the sound source separation system having a total of three first, second and third microphones disposed at respective vertices of a triangle, and wherein a first different-directional-signal-group generator comprises: a first target sound superior signal generator which acquires a difference between a received sound signal of the first microphone and a received sound signal of the second microphone undergone a delayed process on a time domain or a frequency domain and generates a first target sound superior signal; a second target sound superior signal generator which acquires a difference between a received sound signal of the second microphone and a received sound signal of the first microphone undergone a delayed process on a time domain or a frequency domain, and generates a second target sound superior signal; a target sound inferior signal generator which acquires a difference between received sound signals of the first and second microphones on a time domain or a frequency domain; and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, a second different-directional-signal-group generator comprises: a first target sound superior signal generator which acquires a difference between a received sound signal of the third microphone and a received sound signal of the second microphone undergone a delayed process on a time domain or a frequency domain and generates a first target sound superior signal; a second target sound superior signal generator which acquires a difference between a received sound signal of the second microphone and a received sound signal of the third microphone undergone a delayed process on a time domain or a frequency domain, and generates a second target sound superior signal; a target sound inferior signal generator which acquires a difference between received sound signals of the second and third microphones on a time domain or a frequency domain; and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, and the sensitive region formation unit performs two-dimensional-band selection of assigning power of a spectrum of a target sound superior signal generated by either one of the first and second different-directional-signal-group generators to a spectrum of the target sound to be separated (e.g., the case shown in FIG. 58 to be discussed later).

<Invention of performing three-dimensional band selection>

As the invention of performing three-dimensional band selection, there may be provided the sound source separation system having a total of three first, second and third microphones disposed at respective vertices of a triangle, and wherein a first different-directional-signal-group generator comprises: a first target sound superior signal generator which acquires a difference between a received sound signal of the first microphone and a received sound signal of the second microphone undergone a delayed process on a time domain or a frequency domain and generates a first target sound superior signal; a second target sound superior signal generator which acquires a difference between a received sound signal of the second microphone and a received sound signal of the first microphone undergone a delayed process on a time domain or a frequency domain, and generates a second target sound superior signal; a target sound inferior signal generator which acquires a difference between received sound signals of the first and second microphones on a time domain or a frequency domain; and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, a second different-directional-signal-group generator comprises: a first target sound superior signal generator which acquires a difference between a received sound signal of the third microphone and a received sound signal of the second microphone undergone a delayed process on a time domain or a frequency domain and generates a first target sound superior signal; a second target sound superior signal generator which acquires a difference between a received sound signal of the second microphone and a received sound signal of the third microphone undergone a delayed process on a time domain or a frequency domain, and generates a second target sound superior signal; a target sound inferior signal generator which acquires a difference between received sound signals of the second and third microphones on a time domain or a frequency domain; and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, and a third different-directional-signal-group generator comprises: a first target sound superior signal generator which acquires a difference between a received sound signal of the third microphone and a received sound signal of the first microphone undergone a delayed process on a time domain or a frequency domain and generates a first target sound superior signal; a second target sound superior signal generator which acquires a difference between a received sound signal of the first microphone and a received sound signal of the third microphone undergone a delayed process on a time domain or a frequency domain, and generates a second target sound superior signal; a target sound inferior signal generator which acquires a difference between received sound signals of the first and third microphones on a time domain or a frequency domain; and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, and the sensitive region formation unit performs three-dimensional-band selection of assigning power of a spectrum of a target sound superior signal generated by either one of the first, second and third different-directional-signal-group generators to a spectrum of the target sound to be separated (e.g., the case shown in FIG. 59 to be discussed later).

<Invention of applying a delay which is an integral multiplication of a sampling period>

According to the foregoing sound source separation system, it is desirable that the delayed process should be a process of applying a delay which is an integral multiplication of a sampling period on a time domain or a frequency domain when a process of acquiring a difference between one signal undergone a delayed process in a pair of two signals and an other signal is performed.

In a case where a structure such that the delay which is an integral multiplication of the sampling period is applied is employed, delay operation through a digital filter having a large operand becomes unnecessary, and a process of giving a large delay to both two signals to be paired with each other becomes unnecessary.

<Common Feature>

According to the foregoing sound source separation system, the microphone may be a non-directional or an approximately non-directional microphone.

<<Invention of Sound Source Separation Method>>

As a sound source separation method which realizes the foregoing sound source separation system of the invention, there is provided the following sound source separation methods of the invention.

<Invention of two microphones type> invention of a type that two microphones are used That is, according to the invention, there is provided a sound source separation method of separating a target sound and a disturbance sound coming from an arbitrary direction other than a direction from which the target sound comes, comprising: disposing two microphones in such a manner as to be spaced away from each other; performing a linear combination process for emphasizing the target sound using received sound signals of the two microphones on a time domain or a frequency domain to generate at least one target sound superior signal; performing a linear combination process for suppressing the target sound using the received sound signals of the two microphones on a time domain or a frequency domain to generate at least one target sound inferior signal to be paired with the target sound superior signal; and separating the target sound and the disturbance sound from each other using a spectrum of the target sound superior signal and a spectrum of the target sound inferior signal.

According to such a sound source separation method of the invention, the working and effectiveness of the foregoing sound source separation system of the invention can be directly obtained, thus achieving the foregoing object.

<Invention of a type that two microphones are disposed in parallel with a direction from which the target sound comes> Invention of a type that two microphones are disposed in the direction from which the target sound comes or in an approximately same direction as that direction Specifically, the foregoing sound source separation method may further comprise disposing the two microphones side by side in the direction from which the target sound comes or an approximately same direction as that direction, acquiring a difference between a received sound signal of one microphone disposed near a sound source of the target sound in the two microphones and a received sound signal of an other microphone disposed away from the sound source of the target sound on a time domain or a frequency domain when generating the target sound superior signal; and acquiring a difference between the received sound signal of the one microphone undergone a delayed process and the received sound signal of the other microphone on a time domain or a frequency domain when generating the target sound inferior signal.

In a case where the two microphones are disposed in the direction from which the target sound comes or in an approximately same direction as that direction, when the target sound and the disturbance sound are separated from each other, powers at a same frequency band between the spectrum of the target sound superior signal and the spectrum of the target sound inferior signal may be compared for each frequency band, and band selection of assigning larger powers at the individual frequency bands to a spectrum obtained by separation may be performed.

In a case where the two microphones are disposed in the direction from which the target sound comes or in an approximately same direction as that direction, when the target sound and the disturbance sound are separated from each other, spectral subtraction of subtracting a value, obtained by multiplying power of the spectrum of the target sound inferior signal by a coefficient, from power of the spectrum of the target sound superior signal at a same frequency band may be performed.

In a case where the two microphones are disposed in the direction from which the target sound comes or in an approximately same direction as that direction, to change over a target sound to be separated to a target sound in a normal mode and a target sound in a changeover mode coming from a direction opposite to the normal mode target sound, it is desirable that the one microphone should be disposed near a sound source of the normal mode target sound and the other microphone should be disposed away from the sound source of the normal mode target sound in the normal mode, the other microphone should be disposed near a sound source of the changeover mode target sound and the one microphone should be disposed away from the sound source of the changeover mode target sound in the changeover mode, when the target sound inferior signal is generated, a difference between the received sound signal of the one microphone undergone a delayed process and the received sound signal of the other microphone should be acquired on a time domain or a frequency domain to generate a first target sound inferior signal in the normal mode, a difference between the received sound signal of the other microphone undergone a delayed process and the received sound signal of the one microphone should be acquired on a time domain or a frequency domain to generate a second target sound inferior signal in the changeover mode, and when the target sound and the disturbance sound are separated from each other, as the target sound inferior signal, the first target sound inferior signal should be used in the normal mode and the second target sound inferior signal should be used in the changeover mode.

In a case where the two microphones are disposed in the direction from which the target sound comes or in an approximately same direction as that direction, when the target sound inferior signal is generated, a time delay which is a same as or an approximately same as a sound wave propagation time between the two microphones may be performed on the received sound of the microphone subject to the delayed process on a time domain or a frequency domain.

In a case where the two microphones are disposed in the direction from which the target sound comes or in an approximately same direction as that direction, when the target sound inferior signal is generated, a time delay which is shorter than a sound wave propagation time between the two microphones may be performed on the received sound of the microphone subject to the delayed process on a time domain or a frequency domain.

Further, in a case where the two microphones are disposed in the direction from which the target sound comes or in an approximately same direction as that direction, the two microphones may be respectively provided at a corresponding portion of a front face of a portable device at which an operation unit and/or a screen display unit is provided and a corresponding portion of a rear face opposite thereto.

In a case where the two microphones are provided at the front and rear of the portable device one by one, the portable device may be a foldable cellular phone which is folded and closed when not in use and opened when in use, and a clearance between the two disposed microphones may change in accordance with an opening/closing operation of the cellular phone, and a clearance when the cellular phone is opened may be larger than a clearance when the cellular phone is closed.

Further, in a case where the two microphones are provided at the front and rear of the portable device one by one, the two microphones may be provided at end portions of both sides of a rotation support member attached in such a manner as to be rotatable around an axis parallel to the front/rear face of the cellular phone, and the rotation support member may be retained in a state parallel to or approximately parallel to the front/rear surface of the cellular phone when not in use, and may become orthogonal or approximately orthogonal to the front/rear face of the cellular phone when in use.

<Invention of a type that the two microphones are disposed in a direction orthogonal to the direction from which the target sound comes and sum/difference are both acquired> Invention of a type that the two microphones are disposed side by side in a direction orthogonal to or approximately orthogonal to the direction from which the target sound comes, and a sum and difference of received sound signals are used In addition to disposing the two microphones side by side in the direction from which the target sound comes or in an approximately same direction as that direction, the following structure may be employed. That is, in the foregoing sound source separation method, the two microphones may be disposed side by side in a direction orthogonal to or approximately orthogonal to the direction from which the target sound comes, when the target sound superior signal is generated, a sum of the received sound signals of the two microphones may be acquired on a time domain or a frequency domain, and when the target sound inferior signal is generated, a difference between the received sound signals of the two microphones may be acquired on a time domain or a frequency domain.

In a case where the two microphones are disposed side by side in the direction orthogonal to or approximately orthogonal to the direction from which the target sound comes and a sum of the received sound signals of the two microphones are acquired to generate the target sound superior signal, when the target sound and the disturbance sound are separated from each other, at least one spectrum in the spectrum of the target sound superior signal and the spectrum of the target sound inferior signal may be multiplied by a coefficient depending on a frequency, powers of the spectra may be compared at a same frequency band, and band selection of assigning larger powers at the individual frequency bands to a spectrum obtained by separation may be performed.

In a case where the two microphones are disposed side by side in the direction orthogonal to or approximately orthogonal to the direction from which the target sound comes and a sum of the received sound signals of the two microphones are acquired to generate the target sound superior signal, when the target sound and the disturbance sound are separated from each other, spectral subtraction of subtracting a value, obtained by multiplying power of the spectrum of the target sound inferior signal by a coefficient, from power of the spectrum of the target sound superior signal may be performed at a same frequency band.

<Invention of a type that two microphones are disposed in a direction orthogonal to the direction from which the target sound comes and a difference is acquired> Invention of a type that the two microphones are disposed side by side in a direction orthogonal to or approximately orthogonal to the direction from which the target sound comes and a difference between the received sound signals is used but a sum thereof is not used In addition to disposing the two microphones side by side in the direction orthogonal to or approximately orthogonal to the direction from which the target sound comes and acquiring a sum of the received sound signals of the two microphones to generate the target sound superior signal, the following structure may be employed. That is, in the following sound source separation method, the two microphones may be disposed side by side in a direction orthogonal to or approximately orthogonal to the direction from which the target sound comes, when the target sound superior signal is generated, a difference between the received sound signal of the one microphone in the two microphones and the received signal of the other microphone undergone a delayed process may be acquired on a time domain or a frequency domain to generate a first target sound superior signal, and a difference between the received sound signal of the other microphone and the received sound signal of the one microphone undergone a delayed process may be acquired on a time domain or a frequency domain to generate a second target sound superior signal, and when the target sound inferior signal is generated, a difference between the received sound signals of the two microphones may be acquired on a time domain or a frequency domain.

In a case where the two microphones are disposed side by side in the direction orthogonal to or approximately orthogonal to the direction from which the target sound comes and the two first and second target sound superior signals are generated, when the target sound and the disturbance sound are separated from each other, powers at a same frequency band between the spectrum of the first target sound superior signal and the spectrum of the target sound inferior signal may be compared for each frequency band, and band selection of assigning larger powers at the individual frequency bands to a spectrum obtained by separation may be performed to separate one sound including the target sound, powers at a same frequency band between the spectrum of the second target sound superior signal and the spectrum of the target sound inferior signal may be compared for each frequency band, and band selection of assigning larger powers at the individual frequency bands to a spectrum obtained by separation may be performed to separate an other sound including the target sound, and a spectrum integration process of adding those powers of the spectra for each frequency band or comparing the powers for each frequency band and assigning inferior power to a spectrum of the target sound may be performed, using a spectrum of one sound including the target sound and a spectrum of an other sound including the target sound.

In a case where the two microphones are disposed side by side in the direction orthogonal to or approximately orthogonal to the direction from which the target sound comes and the two first and second target sound superior signals are generated, when the target sound and the disturbance sound are separated from each other, spectral subtraction of subtracting a value, obtained by multiplying power of the spectrum of the target sound inferior signal by a coefficient, from power of the spectrum of the first target sound superior signal may be performed at a same frequency band to separate one sound including the target sound, spectral subtraction of subtracting a value, obtained by multiplying power of the spectrum of the target sound inferior signal by a coefficient, from power of the spectrum of the second target sound superior signal of the same frequency band may be performed to separate an other sound including the target sound, and a spectrum integration process of adding those powers of the spectra for each frequency band or comparing the powers for each frequency band and assigning inferior power to a spectrum of the target sound may be performed, using a spectrum of one sound including the target sound and a spectrum of an other sound including the target sound.

<Invention of three microphones/two combinations type> invention of a type that two combinations of microphones are made using three microphones According to the invention, there is provided a sound source separation method of separating a target sound and a disturbance sound coming from an arbitrary direction other than a direction from which the target sound comes, comprising: disposing a total of three first, second and third microphones at respective vertices of a triangle; performing a linear combination process for emphasizing the target sound on a time domain or a frequency domain, using received sound signals of the two first and second microphones to generate at least one target sound superior signal; performing a linear combination process for suppressing the target sound on a time domain or a frequency domain, using received sound signals of the two first and third microphones to generate at least a target sound inferior signal to be paired with the target sound superior signal; and separating the target sound and the disturbance sound from each other using a spectrum of the target sound superior signal and a spectrum of the target sound inferior signal.

According to such a sound source separation method of the invention, the working and effectiveness of the foregoing sound source separation system of the invention can be directly obtained, thus achieving the foregoing object.

In the foregoing sound source separation method, it is desirable that the first and second microphones should be disposed side by side in a direction from which the target sound comes or in an approximately same direction as that direction, the first and third microphones should be disposed side by side in a direction orthogonal to or approximately orthogonal to the direction from which the target sound comes, when the target sound superior signal is generated, a difference between the received sound signal of the first microphone and the received sound signal of the second microphone should be acquired on a time domain or a frequency domain, and when the target sound inferior signal is generated, a difference between the received sound signal of the first microphone and the received sound signal of the third microphone should be acquired on a time domain or a frequency domain.

According to the foregoing sound source separation method, when the target sound and the disturbance sound are separated from each other, powers at a same frequency band between the spectrum of the target sound superior signal and the spectrum of the target sound inferior signal may be compared for each frequency band, and band selection of assigning larger powers at the individual frequency bands to a spectrum obtained by separation may be performed.

Further, according to the foregoing sound source separation method, when the target sound and the disturbance sound are separated from each other, spectral subtraction of subtracting a value, obtained by multiplying power of the spectrum of the target sound inferior signal by a coefficient, from power of the spectrum of the target sound superior signal may be performed at a same frequency band.

<Invention of four microphones/two combinations type> Invention of a type that two combinations of microphones are made using four microphones According to the invention, there is provided a sound source separation method of separating a target sound and a disturbance sound coming from an arbitrary direction other than a direction from which the target sound comes, comprising: disposing a total of four microphones, respective two microphones being disposed side by side as to be spaced away in a first direction and a second direction intersecting with each other; performing a linear combination process for emphasizing the target sound on a time domain or a frequency domain using received sound signals of the two microphones disposed side by side in the first direction in the four microphones to generate at least one target sound superior signal; performing a linear combination process for suppressing the target sound on a time domain or a frequency domain using received sound signals of the two microphones disposed side by side in the second direction in the four microphones to generate at least one target sound inferior signal to be paired with the target sound superior signal; and separating the target sound and the disturbance sound from each other using a spectrum of the target sound superior signal and a spectrum of the target sound inferior signal.

According to such a sound source separation method of the invention, the working and effectiveness of the foregoing sound source separation system of the invention can be directly obtained, thus achieving the foregoing object.

In the foregoing sound source separation method, it is desirable that the first direction should be the direction from which the target sound comes or an approximately same direction as that direction, the second direction should be orthogonal to or approximately orthogonal to the direction from which the target sound comes, when the target sound superior signal is generated, a difference between the received sound signals of the two microphones disposed side by side in the first direction should be acquired on a time domain or a frequency domain, and when the target sound inferior signal is generated, a difference between the received sound signals of the two microphones disposed side by side in the second direction should be acquired on a time domain or a frequency domain.

According to the foregoing sound source separation method, when the target sound and the disturbance sound are separated from each other, powers at a same frequency band between the spectrum of the target sound superior signal and the spectrum of the target sound inferior signal may be compared for each frequency band, and band selection of assigning larger powers at the individual frequency bands to a spectrum obtained by separation may be performed.

Further, according to the foregoing sound source separation method, when the target sound and the disturbance sound are separated from each other, spectral subtraction of subtracting a value, obtained by multiplying power of the spectrum of the target sound inferior signal by a coefficient, from power of the spectrum of the target sound superior signal may be performed at a same frequency band.

<Invention of four microphones/three combinations type> Invention of a type that three combinations of microphones are made using four microphones According to the invention, there is provided a sound source separation method of separating a target sound and a disturbance sound coming from an arbitrary direction other than a direction from which the target sound comes, comprising: disposing a total of four first, second, third and fourth microphones at respective vertices of a rectangle; performing a linear combination process for emphasizing the target sound on a time domain or a frequency domain using received sound signals of the two first and second microphones to generate a target sound superior signal; performing a linear combination process for suppressing the target sound on a time domain or a frequency domain using received sound signals of the two first and third microphones to generate a first target sound inferior signal to be paired with the target sound superior signal; performing a linear combination process for suppressing the target sound on a time domain or a frequency domain using received sound signals of the two first and fourth microphones to generate a second target sound inferior signal to be paired with the target sound superior signal; separating one sound including the target sound, using a spectrum of the target sound superior signal and a spectrum of the first target sound inferior signal; separating an other sound including the target sound, using the spectrum of the target sound superior signal and a spectrum of the second target sound inferior signal; and performing a spectrum integration process of adding those powers of the spectra for each frequency band or comparing the powers for each frequency band and assigning inferior power to a spectrum of the target sound, using a spectrum of the one sound including the target sound and a spectrum of the other sound including the target sound.

According to such a sound source separation method of the invention, the working and effectiveness of the foregoing sound source separation system of the invention can be directly obtained, thus achieving the foregoing object.

In the foregoing sound source separation method, it is desirable that the first and second microphones should be disposed side by side in a direction from which the target sound comes or in an approximately same direction as that direction, the third microphone should be disposed at one end of a line interconnecting the first microphone and the second microphone, the fourth microphone should be disposed at an other end of the line interconnecting the first microphone and the second microphone, when the target sound superior signal is generated, a difference between received sound signals of the first and second microphones should be acquired on a time domain or a frequency domain, when the first target sound inferior signal is generated, a difference between received sound signals of the first and third microphones should be acquired on a time domain or a frequency domain, and when the second target sound inferior signal is generated, a difference between received sound signals of the first and fourth microphones should be acquired on a time domain or a frequency domain.

According to the foregoing sound source separation method, when the one sound including the target sound is separated, powers at a same frequency band between the spectrum of the target sound superior signal and the spectrum of the first target sound inferior signal may be compared for each frequency band, and band selection of assigning larger powers at the individual frequency bands to a spectrum obtained by separation may be performed, and when the other sound including the target sound is separated, powers at a same frequency band between the spectrum of the target sound superior signal and the spectrum of the second target sound inferior signal may be compared for each frequency band, and band selection of assigning larger powers at the individual frequency bands to a spectrum obtained by separation may be performed.

In the foregoing sound source separation method, when the one sound including the target sound is separated, spectral subtraction of subtracting a value, obtained by multiplying power of the spectrum of the first target sound inferior signal by a coefficient, from power of the spectrum of the target sound superior signal may be performed at a same frequency band, and when the other sound including the target sound is separated, spectral subtraction of subtracting a value, obtained by multiplying power of the spectrum of the second target sound inferior signal by a coefficient, from power of the spectrum of the target sound superior signal may be performed at a same frequency band.

<Invention of three microphones/three combinations type> Invention of a type that three combinations of microphones are made using three microphones According to the invention, there is provided a sound source separation method of separating a target sound and a disturbance sound coming from an arbitrary direction other than a direction from which the target sound comes, comprising: disposing a total of three first, second and third microphones at respective vertices of a triangle; performing a linear combination process for emphasizing the target sound on a time domain or a frequency domain, using received sound signals of the three microphones to generate a target sound superior signal; performing a linear combination process for suppressing the target sound on a time domain or a frequency domain, using received sound signals of the two first and second microphones to generate a first target sound inferior signal to be paired with the target sound superior signal; performing a linear combination process for suppressing the target sound on a time domain or a frequency domain, using received sound signals of the two first and third microphones to generate a second target sound inferior signal to be paired with the target sound superior signal; separating one sound including the target sound, using a spectrum of the target sound superior signal and a spectrum of the first target sound inferior signal; separating an other sound including the target sound, using the spectrum of the target sound superior signal and a spectrum of the second target sound inferior signal; and performing a spectrum integration process of adding those powers of the spectra for each frequency band or comparing the powers for each frequency band and assigning inferior power to a spectrum of the target sound, using a spectrum of the one sound including the target sound and a spectrum of the other sound including the target sound.

According to such a sound source separation method of the invention, the working and effectiveness of the foregoing sound source separation system of the invention can be directly obtained, thus achieving the foregoing object.

According to the foregoing sound source separation method, it is desirable that the first and second microphones should be disposed side by side in a direction inclined with respect to a direction from which the target sound comes, the first and third microphones should be disposed side by side in a direction inclined in a opposite direction to the inclined direction of the first and second microphones with respect to a direction from which the target sound comes, when the target sound superior signal is generated, a difference between the received sound signal of the first microphone and a sum, obtained by multiplying received sound signals of the second and third microphones by a same or different proportionality coefficients, should be acquired on a time domain or a frequency domain, when the first target sound inferior signal is generated, a difference between the received sound signals of the first and second microphones should be acquired on a time domain or a frequency domain, and when the second target sound inferior signal is generated, a difference between the received sound signals of the first and third microphones should be acquired on a time domain or a frequency domain.

In the foregoing sound source separation method, when the one sound including the target sound is separated, powers at a same frequency band between the spectrum of the target sound superior signal and the spectrum of the first target sound inferior signal may be compared for each frequency band, and band selection of assigning larger powers at the individual frequency bands to a spectrum obtained by separation may be performed, and when the other sound including the target sound is separated, powers at a same frequency band between the spectrum of the target sound superior signal and the spectrum of the second target sound inferior signal may be compared for each frequency band, and band selection of assigning larger powers at the individual frequency bands to a spectrum obtained by separation may be performed.

Further, according to the foregoing sound source separation method, when the one sound including the target sound is separated, spectral subtraction of subtracting a value, obtained by multiplying power of the spectrum of the first target sound inferior signal by a coefficient, from power of the spectrum of the target sound superior signal may be performed at a same frequency band, and when the other sound including the target sound is separated, spectral subtraction of subtracting a value, obtained by multiplying power of the spectrum of the second target sound inferior signal by a coefficient, from power of the spectrum of the target sound superior signal may be performed at a same frequency band.

<Invention of two sensitive regions integration type that three microphones are disposed on a plane orthogonal to the direction from which the target sound comes> Invention of a type that three microphones are disposed on a plane orthogonal to or approximately orthogonal to the direction from which the target sound comes, and two sensitive regions are integrated According to the invention, there is provided a sound source separation method of separating a target sound and a disturbance sound coming from an arbitrary direction other than a direction from which the target sound comes, comprising: disposing a total of three first, second and third microphones at respective vertices of a triangle on a plane orthogonal to or approximately orthogonal to a direction from which the target sound comes; generating a spectrum of a first sensitive region formation signal which forms a first sensitive region along a plane orthogonal to a line interconnecting those microphones, using received sound signals of the two first and second microphones; generating a spectrum of a second sensitive region formation signal which forms a second sensitive region along a plane orthogonal to a line interconnecting those microphones, using received sound signals of the two second and third microphones; and forming a sensitive region for separating the target sound at a common part of the first sensitive region and the second sensitive region, using the spectrum of the first sensitive region formation signal and the spectrum of the second sensitive region formation signal.

According to such a sound source separation method of the invention, the working and effectiveness of the foregoing sound source separation system of the invention can be directly obtained, thus achieving the foregoing object.

<Invention of two sensitive regions integration type that three microphones are disposed on a plane orthogonal to the direction from which the target sound comes, and a process including the process of the invention of the type that two microphones are disposed in a direction orthogonal to the direction from which the target sound comes and a difference is acquired is performed>

According to the foregoing sound source separation method, when the first sensitive region formation signal is generated, a same process as that of the sound source separation method (invention of the type that two microphones are disposed in a direction orthogonal to the direction from which the target sound comes and a difference is acquired) may be performed, using the received sound signals of the two first and second microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the first sensitive region formation signal, when the second sensitive region formation signal is generated, a same process as that of the sound source separation method (invention of the type that two microphones are disposed in a direction orthogonal to the direction from which the target sound comes and a difference is acquired) may be performed, using the received sound signals of the two second and third microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the second sensitive region formation signal, and when the sensitive region to separate the target sound is formed at the common part of the first sensitive region and the second sensitive region, a spectrum integration process of comparing the powers of the spectra for each frequency band and assigning inferior power to a spectrum of the target sound may be performed, using the spectrum of the first sensitive region formation signal and the spectrum of the second sensitive region formation signal.

Moreover, according to the sound source separation method, when the first sensitive region formation signal is generated, a same process as that of the sound source separation method (invention of the type that two microphones are disposed in a direction orthogonal to the direction from which the target sound comes and a difference is acquired) may be performed, using the received sound signals of the two first and second microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the first sensitive region formation signal, when the second sensitive region formation signal is generated, same processes as those of the sound source separation method (invention of the type that two microphones are disposed in a direction orthogonal to the direction from which the target sound comes and a difference is acquired) other than a process of the spectrum integration process in the separation process may be performed, using the received sound signals of the two second and third microphones, and a sensitive region limitation process of limiting the second sensitive region to either of a region at the second microphone side and a region at the third microphone side may be performed, instead of the spectrum integration process of the sound source separation method (invention of the type that two microphones are disposed in a direction orthogonal to the direction from which the target sound comes and a difference is acquired), in performing the sensitive region limitation process, when a delayed process is performed on the received sound signal of the second microphone in a first target sound superior signal generation process and a delayed process is performed on the received sound signal of the third microphone, the first target sound superior signal generation process and the second target sound superior signal generation process constituting the sound source separation method (invention of the type that two microphones are disposed in a direction orthogonal to the direction from which the target sound comes and a difference is acquired), powers at a same frequency band between the spectrum of one sound including the target sound separated by a first separation process and the spectrum of an other sound including the target sound separated by a second separation process may be compared for each frequency band, band selection of assigning smaller power to a spectrum of one sound including the target sound separated by the first separation process may be performed for a frequency band where power of the spectrum of the one sound including the target sound separated by the first separation process is smaller than power of a spectrum of an other sound including the target sound separated by the second separation process to generate the spectrum of the second sensitive region formation signal which forms the second sensitive region limited to the region at the second microphone side, or band selection of assigning smaller power to the spectrum of the other sound including the target sound separated by the second separation process may be performed for a frequency band where power of the spectrum of the other sound including the target sound separated by the second separation process is smaller than power of the spectrum of the one sound including the target sound separated by the first separation process to generate a spectrum of the second sensitive region formation signal which forms the second sensitive region limited to the region at the third microphone side, and when the sensitive region to separate the target sound is formed at the common part of the first sensitive region and the second sensitive region, a spectrum integration process of comparing the powers of the spectra for each frequency band, using the spectrum of the first sensitive region formation signal and the spectrum of the second sensitive region formation signal, and assigning inferior power to a spectrum of the target sound may be performed.

Further, according to the foregoing case, when the sensitive region limitation process is performed, limitation of the second sensitive region to either of the region at the second microphone side and the region at the third microphone side can be changed over.

<Invention of three sensitive regions integration type that three microphones are disposed on a plane orthogonal to the direction from which the target sound comes> Invention of a type that three microphones are disposed on a plane orthogonal to or approximately orthogonal to the direction from which the target sound comes and three sensitive regions are integrated According to the invention, there is provided a sound source separation method of separating a target sound and a disturbance sound coming from an arbitrary direction other than a direction from which the target sound comes, comprising: disposing a total of three first, second and third microphones at respective vertices of a triangle perpendicular to or approximately perpendicular to a direction from which the target sound comes; generating a spectrum of a first sensitive region formation signal which forms a first sensitive region along a plane orthogonal to a line interconnecting the first and second microphones, using received sound signals of those two microphones; generating a spectrum of a second sensitive region formation signal which forms a second sensitive region along a plane orthogonal to a line interconnecting the second and third microphones, using received sound signals of those two microphones; generating a spectrum of a third sensitive region formation signal which forms a third sensitive region along a plane orthogonal to a line interconnecting the first and third microphones, using received sound signals of those two microphones; and forming a sensitive region for separating the target sound at a common part of the first sensitive region, the second sensitive region and the third sensitive region, using the spectrum of the first sensitive region formation signal, the spectrum of the second sensitive region formation signal, and the spectrum of the third sensitive region formation signal.

According to such a sound source separation method of the invention, the working and effectiveness of the foregoing sound source separation system of the invention can be directly obtained, thus achieving the foregoing object.

<Invention of three sensitive regions integration type that three microphones are disposed on a plane orthogonal to the direction from which the target sound comes, and a process including the process of the invention of the type that two microphones are disposed in a direction orthogonal to the direction from which the target sound comes and a difference is acquired is performed>

According to the foregoing sound source separation method, when the first sensitive region formation signal is generated, a same process as that of the sound source separation method (invention of the type that two microphones are disposed in a direction orthogonal to the direction from which the target sound comes and a difference is acquired) may be performed, using the received sound signals of the two first and second microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the first sensitive region formation signal, when the second sensitive region formation signal is generated, a same process as that of the sound source separation method (invention of the type that two microphones are disposed in a direction orthogonal to the direction from which the target sound comes and a difference is acquired) may be performed, using the received sound signals of the two second and third microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the second sensitive region formation signal, when the third sensitive region formation signal is generated, a same process as that of the sound source separation system (invention of the type that two microphones are disposed in a direction orthogonal to the direction from which the target sound comes and a difference is acquired) may be performed, using the received sound signals of the two first and third microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the third sensitive region formation signal, and when the sensitive region to separate the target sound is formed at the common part of the first sensitive region, the second sensitive region, and the third sensitive region, a spectrum integration process of comparing the powers of the spectra for each frequency band and assigning most inferior power to a spectrum of the target sound may be performed, using the spectrum of the first sensitive region formation signal, the spectrum of the second sensitive region formation signal and the spectrum of the third sensitive region formation signal.

Further, according to the foregoing sound source separation method, when the first sensitive region formation signal is generated, a same process as that of the sound source separation method (invention of the type that two microphones are disposed in a direction orthogonal to the direction from which the target sound comes and a difference is acquired) may be performed, using the received sound signals of the two first and second microphones, and a same spectrum as the spectrum of the target sound obtained through separation by the sound source separation method (invention of the type that two microphones are disposed in a direction orthogonal to the direction from which the target sound comes and a difference is acquired) may be generated, as the spectrum of the first sensitive region formation signal, when the second sensitive region formation signal is generated, same processes as those of the sound source separation method (invention of the type that two microphones are disposed in a direction orthogonal to the direction from which the target sound comes and a difference is acquired) other than a spectrum integration process in a separation process may be performed, using the received sound signals of the two second and third microphones, and a sensitive region limitation process of limiting the second sensitive region to either of a region at the second microphone side and a region at the third microphone side may be performed, instead of the spectrum integration process of the sound source separation method (invention of the type that two microphones are disposed in a direction orthogonal to the direction from which the target sound comes and a difference is acquired), in performing the sensitive region limitation process when the second sensitive region formation signal is generated, when a delayed process is performed on the received sound signal of the second microphone in a first target sound superior signal generation process and a delayed process is performed on the received sound signal of the third microphone in a second target sound superior signal generation process, the first target sound superior signal generation process and the second target sound superior signal generation process constituting the sound source separation method (invention of the type that two microphones are disposed in a direction orthogonal to the direction from which the target sound comes and a difference is acquired), powers at a same frequency band between the spectrum of one sound including the target sound separated by a first separation process and the spectrum of an other sound including the target sound separated by a second separation process may be compared for each frequency band, band selection of assigning smaller power to a spectrum of one sound including the target sound separated by the first separation process may be performed for a frequency band where power of the spectrum of the one sound including the target sound separated by the first separation process is smaller than power of a spectrum of an other sound including the target sound separated by the second separation process to generate the spectrum of the second sensitive region formation signal which forms the second sensitive region limited to the region at the second microphone side, or band selection of assigning smaller power to the spectrum of the other sound including the target sound separated by the second separation process may be performed for a frequency band where power of the spectrum of the other sound including the target sound separated by the second separation process is smaller than power of the spectrum of the one sound including the target sound separated by the first separation process to generate a spectrum of the second sensitive region formation signal which forms the second sensitive region limited to the region at the third microphone side, when the third sensitive region formation signal is generated, same processes as those of the sound source separation method (invention of the type that two microphones are disposed in a direction orthogonal to the direction from which the target sound comes and a difference is acquired) may be performed other than the spectrum integration process in the separation process, using the received sound signals of the two first and third microphones, and a sensitive region limitation process of limiting the third sensitive region to either of a region at the first microphone side and a region at the third microphone side may be performed, instead of the spectrum integration process of the sound source separation method (invention of the type that two microphones are disposed in a direction orthogonal to the direction from which the target sound comes and a difference is acquired), in performing the sensitive region limitation process when the third sensitive region formation signal is generated, when a delayed process is performed on the received sound signal of the first microphone in a first target sound superior signal generation process and a delayed process is performed on the received sound signal of the third microphone in a second target sound superior signal generation process, the first target sound superior signal generation process and the second target sound superior signal generation process constituting the sound source separation method (invention of the type that two microphones are disposed in a direction orthogonal to the direction from which the target sound comes and a difference is acquired), powers at a same frequency band between the spectrum of one sound including the target sound separated by the first separation process and the spectrum of an other sound including the target sound separated by the second separation process may be compared for each frequency band, band selection of assigning smaller power to a spectrum of one sound including the target sound separated by the first separation process may be performed for a frequency band where power of the spectrum of the one sound including the target sound separated by the first separation process is smaller than power of a spectrum of an other sound including the target sound separated by the second separation process to generate the spectrum of the third sensitive region formation signal which forms the third sensitive region limited to the region at the first microphone side, or band selection of assigning smaller power to the spectrum of the other sound including the target sound separated by the second separation process may be performed for a frequency band where power of the spectrum of the other sound including the target sound separated by the second separation process is smaller than power of the spectrum of the one sound including the target sound separated by the first separation process to generate a spectrum of the third sensitive region formation signal which forms the third sensitive region limited to the region at the third microphone side, and when the sensitive region to separate the target sound is formed at the common part of the first sensitive region, the second sensitive region, and the third sensitive region is formed, a spectrum integration process of comparing the powers of the spectra for each frequency band and assigning most inferior power to a spectrum of the target sound may be performed, using the spectrum of the first sensitive region formation signal, the spectrum of the second sensitive region formation signal and the spectrum of the third sensitive region formation signal.

<Invention of three microphones type that a control signal is generated using two signals, an opposite disturbance sound is suppressed, and a process including the process of the invention of the type that two microphones are disposed in a direction orthogonal to the direction from which the target sound comes and a difference is acquired is performed>

According to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the two first and second microphones; generating a control signal for suppressing an opposite disturbance sound coming from a direction opposite to the direction from which the target sound comes, using received sound signals of the two second and third microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal, a same process as that of the sound source separation system (invention of the type that two microphones are disposed in a direction orthogonal to the direction from which the target sound comes and a difference is acquired) is performed using received sound signals of the two first and second microphones, and a same spectrum as a spectrum of the target sound obtained through separation by the sound source separation method (invention of the type that two microphones are disposed in a direction orthogonal to the direction from which the target sound comes and a difference is acquired) is generated, as the spectrum of the orthogonal-disturbance-sound suppressing signal, and when the control signal is generated, a difference between the received sound signal of the third microphone undergone a delayed process and the received sound signal of the second microphone is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of three microphones type that a control signal is generated using three signals, an opposite disturbance sound is suppressed, and a process including the process of the invention of the type that two microphones are disposed in a direction orthogonal to the direction from which the target sound comes and a difference is acquired is performed>

According to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the two first and second microphones; generating a control signal for suppressing an opposite disturbance sound coming from a direction opposite to the direction from which the target sound comes, using received sound signals of the three first, second and third microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of the type that two microphones are disposed in a direction orthogonal to the direction from which the target sound comes and a difference is acquired) is performed using received sound signals of the two first and second microphones, and a same spectrum as a spectrum of the target sound obtained through separation by the sound source separation method (invention of the type that two microphones are disposed in a direction orthogonal to the direction from which the target sound comes and a difference is acquired) is generated, as the spectrum of the orthogonal-disturbance-sound suppressing signal, and when the control signal is generated, a difference between the received sound signal of the third microphone undergone a delayed process and the received sound signal of the second microphone is acquired on a time domain or a frequency domain to generate a first control target sound superior signal, a difference between the received sound signal of the third microphone undergone a delayed process and the received sound signal of the first microphone is acquired on a time domain or a frequency domain to generate a second control target sound superior signal, and a spectrum integration process of comparing powers for each frequency band, using a spectrum of the first control target sound superior signal, and a spectrum of the second control target sound superior signal, and of assigning inferior power to a spectrum of a control target sound superior signal is performed.

According to such a sound source separation method of the invention, the working and effectiveness of the foregoing sound source separation system of the invention can be directly obtained, thus achieving the foregoing object.

<Invention of three microphones/opposite disturbance sound suppressing type that a process including the process of the invention of a type that two microphones are disposed in a direction orthogonal to the direction from which the target sound comes and sum/difference are both acquired is performed>

According to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the two first and second microphones; generating a control signal for suppressing an opposite disturbance sound coming from a direction opposite to the direction from which the target sound comes, using received sound signals of the two second and third microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of a type that two microphones are disposed in a direction orthogonal to the direction from which the target sound comes and sum/difference are both acquired) is performed using received sound signals of the two first and second microphones, and a same spectrum as a spectrum of the target sound obtained through separation by the sound source separation method (invention of a type that two microphones are disposed in a direction orthogonal to the direction from which the target sound comes and sum/difference are both acquired)

is generated, as the spectrum of the orthogonal-disturbance-sound suppressing signal, and when the control signal is generated, a difference between the received sound signal of the third microphone undergone a delayed process and the received sound signal of the second microphone is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of three microphones/opposite disturbance sound suppressing type that a process including the process of the invention of three microphone/two combinations type is performed>

According to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the three first, second and third microphones; generating a control signal for suppressing an opposite disturbance sound coming from a direction opposite to the direction from which the target sound comes, using received sound signals of the two first and second microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of three microphone/two combinations type) is performed using received sound signals of the three first, second and third microphones, and a same spectrum as a spectrum of the target sound obtained through separation by the sound source separation method (invention of three microphone/two combinations type) is generated, as the spectrum of the orthogonal-disturbance-sound suppressing signal, and when the control signal is generated, a difference between the received sound signal of the second microphone undergone a delayed process and the received sound signal of the first microphone is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of four microphones/opposite disturbance sound suppressing type that a process including the process of the invention of four microphones/two combinations type is performed>

According to the invention, there is provided a sound source separation method of separating a target sound and a disturbance sound coming from an arbitrary direction other than a direction from which the target sound comes, comprising: disposing a total of four microphones, respective two of which are disposed side by side in such a manner as to be spaced away from each other in a first direction and a second direction orthogonal to each other; generating an orthogonal-disturbance-sound suppressing signal which suppresses an orthogonal disturbance sound coming from a direction orthogonal to the direction from which the target sound comes, using received sound signals of the four microphones; generating a control signal for suppressing an opposite disturbance sound coming from a direction opposite to the direction from which the target sound comes, using received sound signals of the two microphones disposed side by side in the first direction in the four microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of four microphones/two combinations type) is performed using received sound signals of the four microphones, and a same spectrum as a spectrum of the target sound obtained through separation by the sound source separation method (invention of four microphones/two combinations type) is generated, as the spectrum of the orthogonal-disturbance-sound suppressing signal, and when the control signal is generated, a difference between the received sound signal of the microphone at the opposite disturbance sound side undergone a delayed process in the two microphones disposed side by side in the first direction and the received sound signal of the microphone at the target sound side is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of four microphones/opposite disturbance sound suppressing type that a process including the process of the invention of four microphones/three combinations type is performed>

According to the invention, there is provided a sound source separation method of separating a target sound and a disturbance sound coming from an arbitrary direction other than a direction from which the target sound comes, comprising: disposing a total of four first, second, third and fourth microphones at respective vertices of a rectangle; generating an orthogonal-disturbance-sound suppressing signal which suppresses an orthogonal disturbance sound coming from a direction orthogonal to the direction from which the target sound comes, using received sound signals of the four microphones; generating a control signal for suppressing an opposite disturbance sound coming from a direction opposite to the direction from which the target sound comes, using received sound signals of the two first and second microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal, a same process as that of the sound source separation method (invention of four microphones/three combinations type) is performed using received sound signals of the four microphones, and a same spectrum as a spectrum of the target sound obtained through separation by the sound source separation method (invention of four microphones/three combinations type) is generated, as the spectrum of the orthogonal-disturbance-sound suppressing signal, and when the control signal is generated, a difference between a received sound signal of the second microphone undergone a delayed process and the received sound signal of the first microphone is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of three microphones/opposite disturbance sound suppressing type that a process including the process of the invention of three microphones/three combinations type is performed>

According to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the three first, second and third microphones; generating a control signal for suppressing an opposite disturbance sound coming from a direction opposite to the direction from which the target sound comes, using received sound signals of the three first, second and third microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of three microphones/three combinations type) is performed using received sound signals of the three first, second and third microphones, and a same spectrum as a spectrum of the target sound obtained through separation by the sound source separation method (invention of three microphones/three combinations type) is generated, as the spectrum of the orthogonal-disturbance-sound suppressing signal, and when the control signal is generated, a difference between the received sound signal of the second microphone undergone a delayed process and the received sound signal of the first microphone is acquired on a time domain or a frequency domain to generate a first control target sound superior signal, a difference between the received sound signal of the third microphone undergone a delayed process and the received sound signal of the first microphone is acquired on a time domain or a frequency domain to generate a second target sound superior signal, and a spectrum integration process of comparing powers for each frequency band, using a spectrum of the first control target sound superior signal and a spectrum of the second control target sound superior signal, and of assigning inferior power to a spectrum of a control target sound superior signal is performed.

According to such a sound source separation method of the invention, the working and effectiveness of the foregoing sound source separation system of the invention can be directly obtained, thus achieving the foregoing object.

Further, according to the invention, there is provided a sound source separation method of separating a target sound and a disturbance sound coming from an arbitrary direction other than a direction from which the target sound comes, comprising: disposing a total of three first, second and third microphones at respective vertices of a triangle; generating an orthogonal-disturbance-sound suppressing signal which suppresses an orthogonal disturbance sound coming from a direction orthogonal to the direction from which the target sound comes, using received sound signals of the three first, second and third microphones; generating a control signal for suppressing an opposite disturbance sound coming from a direction opposite to the direction from which the target sound comes, using received sound signals of the three first, second and third microphones; and comparing powers at a same frequency band between a spectrum of the orthogonal-disturbance-sound suppressing signal and a spectrum of the control signal for each frequency band, and for a frequency band where power of the spectrum of the orthogonal-disturbance-sound suppressing signal is smaller than power of the control signal, performing band selection of assigning smaller power to a spectrum of the target sound to be separated, thereby suppressing a spectrum of the opposite disturbance sound included in the spectrum of the orthogonal-disturbance-sound suppressing signal, and wherein when the orthogonal-disturbance-sound suppressing signal is generated, a same process as that of the sound source separation method (invention of three microphones/three combinations type) is performed using received sound signals of the three first, second and third microphones, and a same spectrum as a spectrum of the target sound obtained through separation by the sound source separation method (invention of three microphones/three combinations type) is generated, as the spectrum of the orthogonal-disturbance-sound suppressing signal, and when the control signal is generated, a difference between a sum signal, obtained by multiplying received signals of the second and third microphones by a same or different proportionality coefficients, undergone a delayed process and the received sound signal of the first microphone is acquired on a time domain or a frequency domain to generate a control target sound superior signal.

According to such a sound source separation method of the invention, the working and effectiveness of the foregoing sound source separation system of the invention can be directly obtained, thus achieving the foregoing object.

<Invention of performing multidimensional band selection>

According to the invention, there is provided a sound source separation method of separating a target sound and a disturbance sound coming from an arbitrary direction other than a direction from which the target sound comes, comprising: performing a plurality of different-directional-signal-group generation processes, each generating more than or equal to two combinations of spectra of a plurality of signals each of which has a different directivity, using received sound signals of a plurality of microphones; and determining whether or not a relationship between powers of the spectra in a combination simultaneously satisfies a plurality of conditions each defined for a combination, for each frequency band, using more than or equal to two combinations of the spectra of the plurality of signals generated by the respective different-directional-signal-group generators, and performing multidimensional band selection of assigning power of a spectraelected beforehand to a spectrum of the target sound to be separated, for a frequency band where the plurality of conditions are simultaneously satisfied to form a sensitive region.

According to such a sound source separation method of the invention, the working and effectiveness of the foregoing sound source separation system of the invention can be directly obtained, thus achieving the foregoing object.

Further, in the foregoing sound source separation method, when each different-directional-signal-group generation process is performed, a spectrum of a target sound superior signal and a spectrum of a target sound inferior signal may be generated using the received sound signals of the plurality of microphones, and when the sensitive region is formed, a condition for each combination may be set as a condition that power of the spectrum of the target sound superior signal is larger than power of the spectrum of the target sound inferior signal, and it may be determined for each frequency band whether or not those conditions are simultaneously satisfied.

<Invention of performing two-dimensional band selection>

Specifically, in the foregoing sound source separation method, a total of three first, second and third microphones may be disposed at respective vertices of a triangle, when a first different-directional-signal-group generation process, a difference between a received sound signal of the first microphone and a received sound signal of the second microphone undergone a delayed process may be acquired on a time domain or a frequency domain to generate a first target sound superior signal, a difference between a received sound signal of the second microphone and a received sound signal of the first microphone undergone a delayed process may be acquired on a time domain or a frequency domain to generate a second target sound superior signal, a difference between received sound signals of the first and second microphones may be acquired on a time domain or a frequency domain to generate a target sound inferior signal, and powers for each frequency band may be compared using a spectrum of the first target sound superior signal and a spectrum of the second target sound superior signal, and a spectrum integration process of assigning inferior power to a spectrum of a target sound superior signal may be performed, when a second different-directional-signal-group generation process is performed, a difference between a received sound signal of the third microphone and a received sound signal of the second microphone undergone a delayed process may be acquired on a time domain or a frequency domain to generate a first target sound superior signal, a difference between a received sound signal of the second microphone and a received sound signal of the third microphone undergone a delayed process may be acquired on a time domain or a frequency domain to generate a second target sound superior signal, a difference between received sound signals of the second and third microphones may be acquired on a time domain or a frequency domain to generate a target sound inferior signal, and powers for each frequency band may be compared using a spectrum of the first target sound superior signal and a spectrum of the second target sound superior signal, and a spectrum integration process of assigning inferior power to a spectrum of a target sound superior signal may be performed, and when the sensitive region is formed, two-dimensional-band selection of assigning power of a spectrum of a target sound superior signal generated by either one of the first and second different-directional-signal-group generation processes to a spectrum of the target sound to be separated may be performed.

<Invention of performing three-dimensional band selection>

Moreover, in the foregoing sound source separation method, a total of three first, second and third microphones may be disposed at respective vertices of a triangle, when a first different-directional-signal-group generation process is performed, a difference between a received sound signal of the first microphone and a received sound signal of the second microphone undergone a delayed process may be acquired on a time domain or a frequency domain to generate a first target sound superior signal, a difference between a received sound signal of the second microphone and a received sound signal of the first microphone undergone a delayed process may be acquired on a time domain or a frequency domain to generate a second target sound superior signal, a difference between received sound signals of the first and second microphones may be acquired on a time domain or a frequency domain to generate a target sound inferior signal, and powers for each frequency band may be compared using a spectrum of the first target sound superior signal and a spectrum of the second target sound superior signal, and a spectrum integration process of assigning inferior power to a spectrum of a target sound superior signal may be performed, when a second different-directional-signal-group generation process is performed, a difference between a received sound signal of the third microphone and a received sound signal of the second microphone undergone a delayed process may be acquired on a time domain or a frequency domain to generate a first target sound superior signal, a difference between a received sound signal of the second microphone and a received sound signal of the third microphone undergone a delayed process may be acquired on a time domain or a frequency domain to generate a second target sound superior signal, a difference between received sound signals of the second and third microphones may be acquired on a time domain or a frequency domain to generate a target sound inferior signal, and powers for each frequency band may be compared using a spectrum of the first target sound superior signal and a spectrum of the second target sound superior signal, and a spectrum integration process of assigning inferior power to a spectrum of a target sound superior signal may be performed, and when a third different-directional-signal-group generation process is performed, a difference between a received sound signal of the third microphone and a received sound signal of the first microphone undergone a delayed process may be acquired on a time domain or a frequency domain to generate a first target sound superior signal, a difference between a received sound signal of the first microphone and a received sound signal of the third microphone undergone a delayed process may be acquired on a time domain or a frequency domain to generate a second target sound superior signal, a difference between received sound signals of the first and third microphones may be acquired on a time domain or a frequency domain to generate a target sound inferior signal, and powers for each frequency band may be compared using a spectrum of the first target sound superior signal and a spectrum of the second target sound superior signal, and a spectrum integration process of assigning inferior power to a spectrum of a target sound superior signal may be performed, and when the sensitive region is formed, three-dimensional-band selection of assigning power of a spectrum of a target sound superior signal generated by either one of the first, second and third different-directional-signal-group generation processes to a spectrum of the target sound to be separated may be performed.

<Invention of applying a delay which is an integral multiplication of a sampling period>

In the foregoing sound source separation method, it is desirable that when a process of acquiring a difference between one signal undergone a delayed process in a pair of two signals and an other signal is performed, the delayed process should be a process of applying a delay which is an integral multiplication of a sampling period on a time domain or a frequency domain.

<Common Feature>

In the foregoing sound source separation method, the microphone may be a non-directional or an approximately non-directional microphone.

<<Invention of an Acoustic Signal Acquisition Device>>

As an acoustic signal acquisition device which is a structural component of the foregoing sound source separation system of the invention, the following acoustic signal acquisition device can be used.

That is, according to the invention, there is provided an acoustic signal acquisition device that acquires a target sound under a circumstance where a disturbance sound coming from an arbitrary direction other than a direction from which the target sound comes is present, comprising: two microphones respectively provided at a corresponding portion of a front face of a portable device at which an operation unit and/or a screen display unit is provided, and a corresponding portion of a rear face opposite thereto; a target sound superior signal generator which performs a linear combination process for emphasizing the target sound, using received sound signals of the two microphones to generate at least one target sound superior signal; and a target sound inferior signal generator which performs a linear combination process for suppressing the target sound, using the received sound signals of the two microphones to generate at least one target sound inferior signal to be paired with the target sound superior signal.

Moreover, according to the invention, there is provided an acoustic signal acquisition device that acquires a target sound under a circumstance where a disturbance sound coming from an arbitrary direction other than a direction from which the target sound comes is present, comprising: two microphones provided in such a manner as to be spaced away from each other at a front face of a portable device at which an operation unit and/or a screen display unit is provided; a target sound superior signal generator which performs a linear combination process for emphasizing the target sound, using received sound signals of the two microphones to generate at least one target sound superior signal; and a target sound inferior signal generator which performs a linear combination process for suppressing the target sound, using the received sound signals of the two microphones to generate at least one target sound inferior signal to be paired with the target sound superior signal.

Further, according to the invention, there is provided an acoustic signal acquisition device that acquires a target sound under a circumstance where a disturbance sound coming from an arbitrary direction other than a direction from which the target sound comes is present, comprising: first and second microphones respectively provided at a corresponding portion of a front face of a portable device at which an operation unit and/or a screen display unit is provided, and a corresponding portion of a rear face opposite thereto; a third microphone provided at the front face in such a manner as to be spaced away from the first microphone; a target sound superior signal generator which performs a linear combination process for emphasizing the target sound, using received sound signals of the two first and second microphones to generate at least one target sound superior signal; and a target sound inferior signal generator which performs a linear combination process for suppressing the target sound, using the received sound signals of the two first and third microphones to generate at least one target sound inferior signal to be paired with the target sound superior signal.

Still further, according to the invention, an acoustic signal acquisition device that acquires a target sound under a circumstance where a disturbance sound coming from an arbitrary direction other than a direction from which the target sound comes is present, comprising: a first microphone provided at a front face of a portable device at which an operation unit and/or a screen display unit is provided; second and third microphones provided at a rear face opposite to the front face where the first microphone is provided in such a manner as to be displaced from a position corresponding to that position where the first microphone is provided; a target sound superior signal generator which performs a linear combination process for emphasizing the target sound, using received sound signals of the three first, second and third microphones to generate a target sound superior signal; a first target sound inferior signal generator which performs a linear combination process for suppressing the target sound, using the received sound signals of the two first and second microphones to generate a first target sound inferior signal to be paired with the target sound superior signal; and a second target sound inferior signal generator which performs a linear combination process for suppressing the target sound, using the received sound signals of the two first and third microphones to generate a second target sound inferior signal to be paired with the target sound superior signal.

The acoustic signal acquisition device of the invention can be used as the structural component of the sound source separation system of the invention, and can be used as, for example, a sound-source-location determination device which determines a direction in which a sound source is present. In using such a device as the sound-source-location determination device, for example, respective energies (sum of powers at individual frequency bands) of the spectra of the target sound superior signal and the spectrum of the target sound inferior signal are calculated and compared, and when the energy of the spectrum of the target sound superior signal is large, it is possible to determine that a sound source is present in the set direction of the target sound, and when the energy of the spectrum of the target sound inferior signal is large, it is possible to determine that no sound source is present in the set direction of the target sound.

Effect of the Invention

As explained above, according to the invention, linear combination processes of emphasizing and suppressing the target sound are performed using a few microphones to generate the target sound superior signal and the target sound inferior signal, so that directivity control appropriate for separation of the target sound and the disturbance sound is enabled. A separation process is performed using the spectrum of the target sound superior signal and the spectrum of the target sound inferior signal both generated through the directivity control performed in this manner, thus enabling precise separation of the target sound and the disturbance sound and realizing sound source separation with a few microphones, resulting in an effect such that the device can be miniaturized.

BEST MODE FOR CARRYING OUT THE INVENTION

Hereinafter, embodiments of the invention will be explained with reference to the accompanying drawings.

First Embodiment

FIG. 1 illustrates the general structure of a sound source separation system 10 according to the first embodiment of the invention. FIG. 2 illustrates the structure of a cellular phone 80 equipped with the sound source separation system 10. FIG. 3 illustrates the structure of a part of the sound source separation system 10 that performs directivity control. FIG. 4 is an explanatory diagram for a portion that generates a first target sound inferior signal in the part that performs directivity control in FIG. 3. FIG. 5 illustrates the directional characteristics of a target sound superior signal and the first target sound inferior signal used in a normal mode, FIG. 6 illustrates the directional characteristics of the target sound superior signal and second target sound inferior signal used in a changeover mode, and FIG. 7 illustrates directional characteristics with FIGS. 5 and 6 spread out to take a horizontal axis as a direction (angle) θ. FIG. 8 is an explanatory diagram for band selection. The sound source separation system 10 of the first embodiment is a system relating to <an invention of a type that two microphones are disposed in parallel with a direction from which the target sound comes>.

With reference to FIG. 1, the sound source separation system 10 has two microphones 21, 22 disposed in such a manner as to be spaced away from each other, a target sound superior signal generator 30 that performs a linear combination process for emphasizing a target sound on a time domain using the received sound signals of the two microphones 21, 22 to generate a target sound superior signal, a target sound inferior signal generator 40 that performs a linear combination process for suppressing the target sound on a time domain using the received sound signals of the two microphones 21, 22 to generate first and second target sound inferior signals to be paired with the target sound superior signal, a frequency analyzer 50 that performs frequency analysis on the signals on a time domain generated by the target sound superior signal generator 30 and the target sound inferior signal generator 40, and a separation unit 60 that separates the target sound and a disturbance sound from each other using the spectrum of the target sound superior signal and the spectrum of the target sound inferior signal both obtained by the frequency analyzer 50.

The two microphones 21, 22 are both non-directional or approximately non-directional microphones in the embodiment, and as shown in FIG. 2, in the foldable cellular phone 80 that is a portable device, the one microphone 21 is provided at a front face 82 side where an operation unit 81 comprised of various keys is provided, and the other microphone 22 is provided at a corresponding position (opposite position) in a rear face 83. Accordingly, the two microphones 21, 22 are disposed side by side in a direction from which the target sound comes or in an approximately same direction as that direction (see, FIG. 1). As shown in FIG. 2, in the embodiment, the two microphones 21, 22 are provided at the front face 82 side where the operation unit 81 is provided and at the rear face 83 side, but may be provided at a front face 85 side where a screen display unit 84 is provided and at a rear face 86 side thereof. Accordingly, not only positions P2, P18 in FIG. 60, but also, for example, positions P1, P17, positions P3, P19, positions P6, P23, positions P7, P24, positions P8, P25, positions P8, P25, positions P10, P27 or positions P15, P33 the microphones may be provided, and in short, the microphone may be provided at any one of positions P1 to P34 as long as correlation between the direction from which the target sound comes and the position of the microphone satisfies a relationship shown in FIG. 1. In a case where the cellular phone is used in a folded state, as shown in FIG. 60, the target sound comes from a direction of an arrow A along the surface of the cellular phone or from a direction near that direction, the microphones may be provided at, for example, positions P2, P7.

The clearance between the two microphones 21, 22 may change in accordance with an opening/closing operation of the cellular phone 80, and the clearance when the cellular phone is opened may be larger than the clearance when the cellular phone is closed. For example, the one microphone 21 may be always biased outwardly by an elastic member like a spring, pressed by a front face 85 with which the screen display unit 84 is provided, retained when the cellular phone 80 is closed, and caused to protrude outwardly when the cellular phone 80 is opened.

The sound source separation system 10 can change over its mode between a normal mode that the target sound coming from the front face 82 side of the cellular phone 80 is acquired (e.g., a conversation mode that the speech of a user who holds the cellular phone 80 by hands to use is acquired), and a changeover mode that the target sound coming from the rear face 83 side is acquired (e.g., a motion picture shooting mode that a motion picture is shot by a camera provided at the rear of the screen display unit 84 of the cellular phone 80 and a speech is also acquired).

As shown in FIGS. 1 and 3, the target sound superior signal generator 30 performs a process of acquiring a difference between the received sound signal of the one microphone 21 disposed near the sound source of the target sound in the normal mode (disposed away from the sound source of the target sound in the changeover mode) and the received sound signal of the other microphone 22 disposed away from the sound source of the target sound in the normal mode (disposed near the sound source of the target sound in the changeover mode) on a time domain. This process may be a digital process or an analog process, and is executed on a time domain in the embodiment, but may be executed on a frequency domain.

In FIG. 1, the target sound inferior signal generator 40 comprises a first target sound inferior signal generator 41, a second target sound inferior signal generator 42, and a changeover unit 43. The process of the target sound inferior signal generator 40 may be a digital process or an analog process, and is executed on a time domain in the embodiment but may be executed on a frequency domain.

As shown in FIGS. 1, 3 and 4, the first target sound inferior signal generator 41 performs a process of acquiring a difference between the received sound signal of the one microphone 21 undergone a delayed process and the received sound signal of the other microphone 22, and generating a first target sound inferior signal to be used in the normal mode on a time domain. At this time, a delay time given to the received sound signal of the one microphone 21 is the same as or an approximately same as the sound wave propagation time between the two microphones 21, 22 in the embodiment.

As shown in FIGS. 1 and 3, the second target sound inferior signal generator 42 performs a process of acquiring a difference between the received sound signal of the other microphone 22 undergone a delayed process and the received sound signal of the one microphone 21, and generating a second target sound inferior signal to be used in a changeover mode on a time domain. At this time, a delay time given to the received sound signal of the other microphone 22 is the same as or an approximately same as the sound wave propagation time between the two microphones 21, 22 in the embodiment.

The changeover unit 43 is a switch that changes the first target sound inferior signal for the normal mode generated by the first target sound inferior signal generator 41 and the second target sound inferior signal for the changeover mode generated by the second target sound inferior signal generator 42, as a target sound inferior signal to be subjected to the process of the separation unit 60, and specifically, the changeover unit 43 may be realized by a key constituting the operation unit 81 of the cellular phone 80, or a switch provided separately from the operation unit 81 generally provided.

The frequency analyzer 50 performs frequency analysis on the target sound superior signal on a time domain generated by the target sound superior signal generator 30, and the target sound inferior signal on a time domain generated by the target sound inferior signal generator 40 (the first target sound inferior signal in the normal mode, and the second target sound inferior signal in the changeover mode). As the frequency analysis, for example, First Fourier Transform (FFT), Generalized Harmonic Analysis (GHA) can be adopted, but from the standpoint of calculating a more accurate frequency characteristic or analyzing a more fine frequency component without the effect of a window function, the GHA is desirable. The same is true on other embodiments. If the target sound superior signal generator 30 and the target sound inferior signal generator 40 generate signals on a frequency domain, the frequency analyzer 50 may be omitted.

The separation unit 60 performs maximum level band selection (BS-MAX) or Spectral Subtraction (SS) using the spectrum of the target sound superior signal and the spectrum of the target sound inferior signal (the first target sound inferior signal in the normal mode and the second target sound inferior signal in the changeover mode), and separates the target sound and the disturbance sound from each other.

In a case where maximum level band selection is performed, individual powers at the same frequency band are compared between the spectrum of the target sound superior signal and the spectrum of the target sound inferior signal (first target sound inferior signal in the normal mode, and second target sound inferior signal in the changeover mode) for each frequency band, and larger powers at the individual frequency bands are assigned to the spectrum of a sound to be obtained by separation.

In a case where spectral subtraction is performed, a value, obtained by multiplying the power of the spectrum of the target sound inferior signal (first target sound inferior signal in the normal mode, and second target sound inferior signal in the changeover mode) by a coefficient is subtracted for each frequency band from the power of the spectrum of the target sound superior signal at the same frequency band.

According to such a first embodiment, the sound source separation system 10 performs a separation process for the target sound and the disturbance sound as follows.

First, a user of the cellular phone 70 performs mode selection through the changeover unit 43 between the normal mode and the changeover mode in accordance with the sound source position of a target sound that the user wants to obtain. For example, when the user obtains his/her speech while seeing the screen display unit 84, the normal mode is selected.

Next, the target sound superior signal generator 30 generates a target sound superior signal (signal on a time domain) and the target sound inferior signal generator 40 generates a target sound inferior signal (signal on a time domain), using the received sound signals (signals on a time domain) of the two microphones 21, 22. Subsequently, the frequency analyzer performs frequency analysis on the obtained target sound superior signal and target sound inferior signal (first target sound inferior signal in the normal mode, and second target sound inferior signal in the changeover mode), thereby acquiring the spectrum of the target sound superior signal and the spectrum of the target sound inferior signal.

At this time, let the received sound signal of the one microphone 21 be $X_1(t)$, and the received sound signal of the other microphone 22 be $X_2(t)$, then a difference $X_1(t)-X_2(t)$ between those signals is acquired by the target sound superior signal generator 30, and this difference becomes the target sound superior signal (see, FIGS. 1 and 3).

Let the received sound signal $X_1(t)$ of the one microphone be represented by a following equation (1) and the received sound signal $X_2(t)$ of the other microphone 22 be represented by a following equation (2), then the difference $X_1(t)-X_2(t)$ can be represented by a following equation (3), and a signal $|F<X_1(t)-X_2(t)>|$ is represented by a following equation (4), so that directional characteristic of the target sound superior signal can be represented by solid lines in FIGS. 5 and 7. In FIG. 5, the directional characteristic is represented by a two dimensional polar coordinate, a radial direction represents an amplitude, and a circumferential direction represents a direction (angle) θ in which a sound comes from. In FIG. 7, a vertical axis represents an amplitude, and a horizontal axis represents a direction (angle) θ in which a sound comes from. L is a distance (m) between the microphones 21, 22, and $V_0$ is a sound speed 340 (m/sec).

[Equation 1]

$$X_i(t) = X_0 e^{j\omega t} \tag{1}$$

[Equation 2]

$$X_2(t) = X_0 e^{j\omega\left(t - \frac{L\cos\theta}{V_0}\right)} \tag{2}$$

[Equation 3]

$$\begin{aligned} X_1(t) - X_2(t) &= X_0 e^{j\omega t} - X_0 e^{j\omega\left(t - \frac{L\cos\theta}{V_0}\right)} \\ &= X_0 e^{j\omega t}\left(1 - e^{-j\omega\frac{L\cos\theta}{V_0}}\right) \end{aligned} \tag{3}$$

[Equation 4]

$$|F < X_1(t) - X_2(t) >| = |X_0|\left\{\left[1 - \cos\left(\omega\frac{-L\cos\theta}{V_0}\right)\right]^2 + \left[\sin\left(\omega\frac{-L\cos\theta}{V_0}\right)\right]^2\right\}^{\frac{1}{2}}. \tag{4}$$

In contrast, let the received sound signal $X_1(t)$ of the one microphone 21 undergone a delayed process be $D(X_1(t))$, and the received sound signal of the other microphone 22 be $X_2(t)$, then a difference $D(X_1(t))-X_2(t)$ between those signals is acquired by the first target sound inferior signal generator 41 in the normal mode, and the difference becomes a first target sound inferior signal (see, FIGS. 1, 3 and 4).

Further, let the signal $D(X_1(t))$ of the received sound signal $X_1(t)$ of the one microphone 21 undergone a delayed process be expressed by a following equation (5), and the received sound signal $X_2(t)$ of the other microphone 22 be expressed by the foregoing equation (2), then a difference $D(X_1(t))-X_2(t)$ of those signals is expressed by a following equation (6), and a signal $|F<D(X_1(t))-X_2(t)>|$ can be represented by a following equation (7), so that the directional characteristic of the first target sound inferior signal can be represented by dot lines in FIG. 5.

[Equation 5]

$$D(X_1(t)) = X_0 e^{j\omega\left(t-\frac{L}{V_0}\right)} \tag{5}$$

[Equation 6]

$$\begin{aligned} D(X_1(t)) - X_2(t) &= X_0 e^{j\omega\left(t-\frac{L}{V_0}\right)} - X_0 e^{j\omega\left(t-\frac{L\cos\theta}{V_0}\right)} \\ &= X_0 e^{j\omega t}\left(e^{j\omega\left(-\frac{L}{V_0}\right)} - e^{j\omega\left(\frac{L\cos\theta}{V_0}\right)}\right) \\ &= X_0 e^{j\omega\left(t-\frac{L}{V_0}\right)}\left(1 - e^{j\omega\frac{L}{V_0}(1-\cos\theta)}\right) \end{aligned} \tag{6}$$

[Equation 7]

$$|F < D(X_1(t)) - X_2(t) >| = |X_0|\left\{\left[1 - \cos\left(\omega\frac{L(1-\cos\theta)}{V_0}\right)\right]^2 + \left[\sin\left(\omega\frac{L(1-\cos\theta)}{V_0}\right)\right]^2\right\}^{\frac{1}{2}}. \tag{7}$$

A delay time is $L/V_0$ (sec), and is equal or approximately equal to the sound wave propagation time of the distance L between the two microphones 21, 22. Therefore, as shown in FIG. 4, in a case where a delay process is performed on the received sound signal $X_1(t)$ of the one microphone 21, the one microphone 21 is to be substantially located on a circle indicated by a dashed line in the figure. For example, regarding a sound coming from a direction of a sound source position of a target sound in the normal mode (θ=0 degree), the one microphone 21 is to be substantially located at the same position as that of the other microphone 22, and a difference between signals becomes zero, so that a sound coming from this direction (θ=0 degree) is to be suppressed. Regarding a sound (disturbance sound) coming from a direction opposite to the sound source position of the target sound in the normal mode (θ=180 degree), the one microphone 21 is to be substantially located at a position P1 in the figure, and a distance from the other microphone 22 substantially becomes large, so that a difference between signals becomes large, and that sound is to be emphasized.

The same is true on the case of the changeover mode, and let the received sound signal $X_2(t)$ of the other microphone 22 undergone a delayed process be $D(X_2(t))$, and the received sound signal of the one microphone 21 be $X_1(t)$, then a difference $D(X_2(t))-X_1(t)$ is acquired by the second target sound inferior signal generator 42, and the difference becomes a second target sound inferior signal (see, FIGS. 1 and 3). The directional characteristic of the second target sound inferior signal is obtained as indicated by dashed lines in FIGS. 6 and 7 in illustrating a signal $|F<D(X_2(t))-X_1(t)|$ obtained by performing frequency analysis on the second target sound inferior signal $D(X_2(t))-X_1(t)$.

Thereafter, the separation unit 60 performs maximum level band selection (BS-MAX) or spectral subtraction (SS), using the spectrum of the target sound superior signal and the spectrum of the target sound inferior signal (first target sound inferior signal in the normal mode, and second target sound inferior signal in the changeover mode), thereby separating the target sound and the disturbance sound from each other.

With reference to FIG. 8, in a case where the separation unit 60 performs maximum level band selection, the procedure thereof is as follows. Let power (amplitude) of a spectrum in a frequency band $f_1$ in spectra of the target sound superior signal generated by the target sound superior signal generator 30 and obtained through the process of the frequency analyzer 50 be oil, and power in a frequency band $f_2$ be $\alpha_2$. On the other hand, let power of a spectrum in a frequency band $f_1$ in spectra of the target sound inferior signal (first target sound inferior signal in the normal mode, and second target sound inferior signal in the changeover mode) generated by the target sound inferior signal generator 40 and obtained through the process of the frequency analyzer 50 be $\beta_1$, and power in a frequency band $f_2$ be $\beta_2$.

At this time, the power $\alpha_1$ in the frequency band $f_1$ and the power $\beta_1$ in the same frequency band $f_1$ are compared. When $\alpha_1>\beta_1$ as illustrated in the figure, the larger power $\alpha_1$ is selected and is assigned to the spectrum of the target sound. Note that the smaller power $\beta_1$ is not used for a process, that is, not assigned to the spectrum after separation and is abandoned.

Moreover, the power $\alpha_2$ in the frequency band $f_2$ and the power $\beta_2$ in the same frequency band $f_2$ are compared. When $\beta_2>\alpha_2$ as illustrated in the figure, the larger power $\beta_2$ is selected and assigned to the disturbance sound. Note that the smaller power $\alpha_2$ is not used for a process, that is, not assigned to the spectrum after separation and is abandoned.

On the other hand, in a case where the separation unit 60 performs spectral subtraction, the procedure thereof is as follows. A value, obtained by multiplying power δ of a spectrum of the target sound inferior signal (first target sound inferior signal in the normal mode, and second target sound inferior signal in the changeover mode) generated by the target sound inferior signal generator 40 and obtained through the process of the frequency analyzer 50 by a coefficient K, (K×δ) is subtracted from power γ of a spectrum of the target sound superior signal generated by the target sound superior signal generator 30 and obtained through the process of the frequency analyzer 50 for each frequency band. That is, a calculated value of γ−K×δ becomes power of a spectrum of the target sound obtained after separation in each frequency band. The coefficient K is, for example, a coefficient or the like depending on the largeness of a difference between the power γ for the target sound superior signal and the power δ for the target sound inferior signal. Note that at a frequency band where the power γ of the spectrum of the target sound superior signal becomes smaller than the value (K×δ) obtained by multiplying the power δ of the spectrum of the target sound inferior signal by the coefficient K, for example, a minimum value defined by a certain rule (may be a certain value for each frequency band, or a value proportional to power at each frequency band of the spectrum of the target sound superior signal) may be a calculated value, or the calculated value may be caused to be zero.

After the separation unit 60 separates the target sound, voice recognition using an acoustic model obtained by performing an adaptation process or a learning process beforehand can be performed. At this time, a synthesis process of converting the target sound, which is a signal on a frequency domain obtained through the process of the separation unit 60, into a sound wave, which is a signal on a time domain, may be performed, a noise may be added, frequency analysis may be performed, and then voice recognition may be performed. Addition of a noise may be performed on a frequency domain, not on a time domain.

According to such a first embodiment, the following effectiveness can be obtained. That is, because the sound source separation system 10 has the target sound superior signal generator 30 and the target sound inferior signal generator 40, it is possible to generate the target sound superior signal and the target sound inferior signal using the received sound signals of the two microphones 21, 22. This enables directivity control appropriate for separating the target sound and the disturbance sound from each other.

Because the sound source separation system 10 has the separation unit 60, the target sound and the disturbance sound can be precisely separated, using the spectrum of the target sound superior signal and the spectrum of the target sound inferior signal both generated by performing directivity control. Therefore, in comparison with the case like the patent literature 4 where band selection is performed using a sound-source-level difference of signals between the microphones originating from the fixed positional relationships of the plurality of microphones, a separation performance is improved.

The sound source separation system 10 has two microphones to be used, and sound source separation is realized with the few microphones, resulting in miniaturization of a device.

Further, because the target sound inferior signal generator 40 has the first target sound inferior signal generator 41 and the second target sound inferior signal generator 42 and the changeover unit 43, a user can change over a mode between the normal mode and the changeover mode. Accordingly, the direction of the target sound to be obtained can be changed over without changing the positions of the two microphones 21, 22, so that a user-friendly system for a user can be realized.

Still further, because the first target sound inferior signal generator 41 and the second target sound inferior signal generator 42 perform processes of applying a delay which is equal to or approximately equal to the sound wave propagation time of the distance between the two microphones 21, 22, it is possible to create a directional characteristic that the amplitude of the target sound inferior signal becomes zero in a direction from which the target sound comes (as shown in FIG. 7, θ=zero degree for the target sound in the normal mode, and θ=180 degree for the target sound in the changeover mode). Accordingly, a difference between the amplitude and the directional characteristic (directional characteristic of the target sound superior signal) directed to the target sound can be large, thereby improving the separation performance.

Second Embodiment

FIG. 9 illustrates the general structure of a sound source separation system 200 according to the second embodiment of the invention. FIG. 10 illustrates directional characteristics of a target sound superior signal and target sound inferior signal, and FIG. 11 illustrates directional characteristics with FIG. 10 spread out to take a horizontal axis as a direction (angle) θ. The sound source separation system 200 of the second embodiment is a system relating to <an invention of a type that the two microphones are disposed in a direction orthogonal to the direction from which the target sound comes and sum/difference are both acquired>.

With reference to FIG. 9, the sound source separation system 200 comprises two microphones 221, 222, disposed in such a manner as to be spaced away, a target sound superior signal generator 230 which generates a target sound superior signal by performing a linear combination process for emphasizing a target sound on a time domain using the received sound signals of the two microphones 221, 222, a target sound inferior signal generator 240 which generates a target sound inferior signal to be paired with the target sound superior signal by performing a linear combination process for suppressing the target sound on a time domain using the received sound signals of the two microphones 221, 222, a frequency analyzer 250 which performs frequency analysis on the signals generated by the target sound superior signal generator 230 and the target sound inferior signal generator 240, and a separation unit 260 which separates the target sound and the disturbance sound using the spectrum of the target sound superior signal and the spectrum of the target sound inferior signal obtained by the frequency analyzer 250.

The two microphones 221, 222 are both non-directional or approximately non-directional microphones in the embodiment. As indicated by a dashed line in FIG. 9, in a cellular phone 280 that is a portable device, the two microphones 221, 222 are both provided at a front face 281 side where an operation unit comprised of various keys and/or a screen display unit is provided, and no microphone is provided at a rear face 282 side. Therefore, the two microphones 221, 222 are disposed side by side in a direction orthogonal to or approximately orthogonal to a direction from which the target sound comes. This is the different point from the first embodiment. As shown in FIG. 60, for example, the microphones may be provided at positions P1, P3, positions P4, P5, positions P6, P8, or positions P9, P11, and in a word, the microphones may be provided any positions P1 to P34 as long as the correlation between the direction from which the target sound comes and the disposed positions of the microphones satisfies a relationship shown in FIG. 9.

The target sound superior signal generator 230 performs a process of acquiring a sum of the received sound signal of the one microphone 221 and the received sound signal of the other microphone 222 on a time domain. This process may be a digital process or an analog process, and the process is executed on a time domain in the embodiment, but may be executed on a frequency domain.

The target sound inferior signal generator 240 performs a process of acquiring a difference between the received sound signal of the one microphone 221 and the received sound signal of the other microphone 222 on a time domain. This process may be a digital process or an analog process, and the process is executed on a time domain in the embodiment, but may be executed on a frequency domain.

The frequency analyzer 250 performs frequency analysis on both target sound superior signal on a time domain generated by the target sound superior signal generator 230 and target sound inferior signal on a time domain generated by the target sound inferior signal generator 240. Like the first embodiment, First Fourier Transform (FFT) and Generalized Harmonic Analysis (GHA) can be adopted as frequency analysis. Note that in a case where the target sound superior signal generator 230 and the target sound inferior signal generator 240 generate signals on a frequency domain, the frequency analyzer 250 may be omitted.

The separation unit 260 performs maximum level band selection (BS-MAX) or spectral subtraction (SS) using the spectrum of the target sound superior signal and the spectrum of the target sound inferior signal, and separates the target sound and a disturbance sound from each other. The schemes of band selection and spectral subtraction are the same as those of the first embodiment, thus omitting the detailed explanations.

In the embodiment, however, the target sound superior signal generator 230 performs a process of acquiring a sum of the received sound signals of the two microphones 221, 222, the amplitude largeness relationship in each direction (angle θ) between the directional characteristic of the target sound superior signal and the directional characteristic of the target sound inferior signal changes frequency by frequency, and is not stable, so that when the separation unit 260 performs a process, the spectrum of the target sound superior signal is multiplied by a coefficient A(ω), the spectrum of the target sound inferior signal is multiplied by a coefficient B(ω), and then band selection or spectral subtraction is performed. Either A(ω) or B(ω) may be multiplied as long as the relative largeness relationship is adjusted according to a frequency.

According to such a second embodiment, the sound source separation system 200 performs a separation process for the target sound and the disturbance sound as follows.

First, the target sound superior signal generator 230 generates the target sound superior signal (signal on a time domain) and the target sound inferior signal generator 240 generates the target sound inferior signal (signal on a time domain), using the received sound signals (signals on a time domain) of the two microphones 221, 222. Next, the frequency analyzer 250 performs frequency analysis on both obtained target sound superior signal and target sound inferior signal, thereby acquiring the spectrum of the target sound superior signal and the spectrum of the target sound inferior signal.

At this time, let the received sound signal of the one microphone 221 be $X_1(t)$, and the received sound signal of the other microphone 222 be $X_2(t)$, then the target sound superior signal generator 230 acquires the sum $X_1(t)+X_2(t)$ of those signals, and this sum becomes the target sound superior signal. The directional characteristic of the target sound superior signal obtained by multiplying a signal $|F<X_1(t)+X_2(t)>|$, obtained by performing frequency analysis on the sum $X_1(t)+X_2(t)$ of the signals, by the coefficient A(ω) is as shown in FIGS. 10 and 11 indicated by solid lines.

On the other hand, the target sound inferior signal generator 240 acquires a difference $X_1(t)-X_2(t)$ between the received sound signal $X_1(t)$ of the one microphone 221 and the received sound signal $X_2(t)$ of the other microphone 222, and this difference becomes the target sound inferior signal. The directional characteristic of the target sound inferior signal obtained by multiplying a signal $|F<X_1(t)-X_2(t)>|$, obtained by performing frequency analysis on the difference $X_1(t)-X_2(t)$ between those signals, by a coefficient B(ω) is as shown in FIGS. 10 and 11 indicated by dotted lines.

Thereafter, the separation unit 260 performs maximum level band selection (BS-MAX) or spectral subtraction (SS) using the spectrum of the target sound superior signal and the spectrum of the target sound inferior signal, thereby separating the target sound and the disturbance sound.

After the target sound is separated by the separation unit 260, like the first embodiment, voice recognition using an acoustic model obtained by performing an adaptation process or a learning process beforehand can be performed.

According to such a second embodiment, the following effectiveness can be obtained. That is, because the sound source separation system 200 has the target sound superior signal generator 230 and the target sound inferior signal generator 240, it is possible to generate the target sound superior signal and the target sound inferior signal using the received sound signals of the two microphones 221, 222. This enables directivity control appropriate for separation of the target sound and the disturbance sound from each other.

Because the sound source separation system 200 has the separation unit 260, it is possible to separate the target sound and the disturbance sound precisely, using the spectrum of the target sound superior signal and the spectrum of the target sound inferior signal generated by performing directivity control. Therefore, in comparison with the case like the patent literature 4 where band selection is performed using a sound-pressure-level difference of signals between microphones originating from the fixed positional relationships of the plurality of microphones, a separation performance can be improved.

Further, according to the sound source separation system 200, the number of the microphones to be used is two, and sound source separation can be realized with the few microphones, resulting in miniaturization of a device.

Third Embodiment

FIG. 12 illustrates the general structure of a sound source separation system 300 according to the third embodiment of the invention. FIG. 13 illustrates the respective directional characteristics of first and second target sound superior signals and target sound inferior signal, and FIG. 14 illustrates directional characteristics with FIG. 13 spread out to take a horizontal axis as a direction (angle) θ. The sound source separation system 300 of the third embodiment is a system relating to <an invention of a type that two microphones are disposed in a direction orthogonal to the direction from which the target sound comes and a difference is acquired>.

With reference to FIG. 12, the sound source separation system 300 comprises two microphones 321, 322 disposed as to be spaced away from each other, a target sound superior signal generator 330 that generates first and second target sound superior signals by performing a linear combination process for emphasizing a target sound on a time domain using the received sound signals of the two microphones 321, 322, a target sound inferior signal generator 340 that generates a target sound inferior signal to be paired with a target sound superior signal by performing a linear combination process for suppressing a target sound on a time domain using the received sound signals of the two microphones 321, 322, a frequency analyzer 350 that performs frequency analysis on both signals on a time domain generated by the target sound superior signal generator 330 and the target sound inferior signal generator 340, and a separation unit 360 that separates a target sound and a disturbance sound from each other using the spectrum of the target sound superior signal and the spectrum of the target sound inferior signal obtained by the frequency analyzer 350.

The two microphones 321, 322 are both non-directional or approximately non-directional microphones in the embodiment. As indicated by a dashed line in FIG. 12, the two microphones 321, 322 are both provided at a front face 381 side where an operation unit comprised of various keys and/or a screen display unit is provided in a cellular phone 380 that is a portable device, and no microphone is provided at a rear face 382 side. Therefore, the two microphones 321, 322 are disposed side by side in a direction orthogonal to or approximately orthogonal to a direction from which the target sound comes. This is a different point from the first embodiment, like the second embodiment. As shown in FIG. 60, for example, the microphones may be provided at positions P1, P3, positions P4, P5, positions P6, P8, or positions P9, P11, and in a word, the microphones may be provided any positions P1 to P34 as long as the correlation between the direction from which the target sound comes and the disposed positions of the microphones satisfies a relationship shown in FIG. 12.

The target sound superior signal generator 330 comprises a first target sound superior signal generator 331 and a second target sound superior signal generator 332.

The first target sound superior signal generator 331 performs a process of acquiring a difference between the received sound signal of the one microphone 321 and the received sound signal of the other microphone 332 undergone a delayed process, and generating a first target sound superior signal on a time domain. The first target sound superior signal is a signal that emphasizes a sound including a target sound which comes from a space (left side space in FIG. 12) where the one microphone 321 is provided. This process may be a digital process or an analog process, and the process is executed on a time domain in the embodiment, but may be executed on a frequency domain.

The second target sound superior signal generator 332 performs a process of acquiring a difference between the received sound signal of the other microphone 322 and the received sound signal of the one microphone 321 undergone a delayed process, and generating a second target sound superior signal on a time domain. The second target sound superior signal is a signal that emphasizes a sound including the target sound which comes from a space (right space in FIG. 12) where the other microphone is provided. This process may be a digital process or an analog process, and the process is executed on a time domain in the embodiment, but may be executed on a frequency domain.

The target sound inferior signal generator 340 performs a process of acquiring a difference between the received sound signal of the one microphone 321 and the received sound signal of the other microphone 322, and generating a target sound inferior signal on a time domain. This process may be a digital process or an analog process, and the process is executed on a time domain in the embodiment, but may be executed on a frequency domain.

The frequency analyzer 350 performs frequency analysis on the first and second target sound superior signals on a time domain generated by the target sound superior signal generator 330 and the target sound inferior signal on a time domain generated by the target sound inferior signal generator 340. Like the first embodiment and the second embodiment, First Fourier Transform (FFT) and Generalized Harmonic Analysis (GHA) can be adopted as frequency analysis. Note that in a case where the target sound superior signal generator 330 and the target sound inferior signal generator 340 generate signals on a frequency domain, the frequency analyzer 350 may be omitted.

The separation unit 360 comprises a first separation unit 361, a second separation unit 362, and an integration unit 363.

The first separation unit 361 performs maximum level band selection (BS-MAX) or spectral subtraction (SS) using the spectrum of the first target sound superior signal and the spectrum of the target sound inferior signal, and separates a sound including the target sound which comes from that space (left space in FIG. 12) where the one microphone 321 is provided. In performing band selection, powers at the same frequency band between the spectrum of the first target sound superior signal and the spectrum of the target sound inferior signal are compared for each frequency band, and larger powers at individual frequency bands are assigned to the spectrum of a sound obtained by separation. In performing spectral subtraction, a value, obtained by multiplying power of the spectrum of the target sound inferior signal by a coefficient, is subtracted for each frequency band from power of the spectrum of the first target sound superior signal at the same frequency band.

The second separation unit 362 performs maximum level band selection (BS-MAX) or spectral subtraction (SS) using the spectrum of the second target sound superior signal and the spectrum of the target sound inferior signal, and separates a sound including the target sound which comes from that space (right space in FIG. 12) where the other microphone 322 is provided. In performing band selection, powers at the same frequency band between the spectrum of the second target sound superior signal and the spectrum of the target sound inferior signal are compared for each frequency band, and larger powers at individual frequency bands are assigned to the spectrum of a sound obtained by separation. In performing spectral subtraction, a value, obtained by multiplying power of the spectrum of the target sound inferior signal by a coefficient, is subtracted for each frequency band from power of the spectrum of the second target sound superior signal at the same frequency band.

The integration unit 363 adds powers of the spectra for each frequency band (addition) or compares powers for each frequency band and assigns inferior powers to the spectrum of the target sound (minimization), using the spectrum of a sound including the target sound which is separated by the first separation unit 361 and comes from that space (left space in FIG. 12) where the one microphone 321 is provided and the spectrum of a sound including the target sound which is separated by the second separation unit 362 and comes from that space (right space in FIG. 12) where the other microphone 322 is provided, thereby performing a spectrum integration process to separate the target sound. The detail of the spectrum integration process through minimization will be discussed later with reference to FIG. 34.

According to such a third embodiment, the sound source separation system 300 performs a separation process for the target sound and the disturbance sound as follows.

First, the first target sound superior signal generator 331 and the second target sound superior signal generator 332 generates first and second target sound superior signals (signals on a time domain), using the received sound signals (signals on a time domain) of the two microphones 321, 322, and the target sound inferior signal generator 340 generates a target sound inferior signal (signal on a time domain). Next, the frequency analyzer 350 performs frequency analysis on the obtained first and second target sound superior signals and target sound inferior signal, thereby acquiring the spectra of the first and second target sound superior signals and the spectrum of the target sound inferior signal.

At this time, let the received sound of the one microphone 321 be $X_1(t)$, and the received sound of the other microphone 322 be $X_2(t)$, then the first target sound superior signal 331 acquires a difference $X_1(t)-D(X_2(t))$ that is a difference between the received sound signal $X_1(t)$ of the one microphone 321 and a signal $D(X_2(t))$ which is the received sound signal $X_2(t)$ undergone a delayed process, and this difference becomes the first target sound superior signal. In illustrating a signal $|F<X_1(t)-D(X_2(t))>|$ that is obtained by performing frequency analysis on the first target sound superior signal $X_1(t)-D(X_2(t))$, the directional characteristic of the first target sound superior signal as shown in FIGS. 13 and 14 indicated by solid lines can be obtained.

Further, the second target sound superior signal acquires a difference $X_2(t)-D(X_1(t))$ that is a difference between the received sound signal $X_2(t)$ of the other microphone 322 and a signal $D(X_1(t))$ which is the received sound signal $X_1(t)$ of the one microphone 321 undergone a delayed process, and this difference becomes the second target sound superior signal. In illustrating a signal $|F<X_2(t)-D(X_1(t))>|$ obtained by performing frequency analysis on the second target sound superior signal $X_2(t)-D(X_1(t))$, the directional characteristic of the second target sound superior signal as shown in FIGS. 13 and 14 indicated by dashed lines can be obtained.

On the other hand, the target sound inferior signal generator 340 acquires a difference $X_1(t)-X_2(t)$ between the received sound signal $X_1(t)$ of the one microphone 321 and the received sound signal $X_2(t)$ of the other microphone 322, and this difference becomes the target sound inferior signal.

In illustrating a signal $|F<X_1(t)-X_2(t)>|$ obtained by performing frequency analysis on the difference $X_1(t)-X_2(t)$ of those signals, the directional characteristic of the target sound inferior signal as shown in FIGS. 13 and 14 by dotted lines can be obtained.

Thereafter, the first separation unit 361 performs maximum level band selection (BS-MAX) or spectral subtraction (SS) using the spectrum of the first target sound superior signal and the spectrum of the target sound inferior signal, and performs a process of separating a sound including the target sound which comes from that space (left space in FIG. 12) where the one microphone 321 is provided, and the second separation unit 362 performs maximum level band selection (BS-MAX) or spectral subtraction (SS) using the spectrum of the second target sound superior signal and the spectrum of the target sound inferior signal, and performs a process of separating a sound including the target sound which comes from that space (right space in FIG. 12) where the other microphone 322 is provided. Note that when the first separation unit 361 performs band selection, the second separation unit 362 also performs band selection, and when the first separation unit 361 performs spectral subtraction, the second separation unit 362 also performs spectral subtraction.

Thereafter, the integration unit 363 performs a spectrum integration process by addition or minimization, using the spectrum of the sound including the target sound separated by the first separation unit 361 and comes from that space (left space in FIG. 12) where the one microphone 321 is provided, and the spectrum of the sound including the target sound separated by the second separation unit 362 and comes from that space (right space in FIG. 12) where the other microphone 322 is provided, thereby separating the target sound.

After the target sound is separated by the separation unit 360, like the first and second embodiments, voice recognition using an acoustic model obtained by performing an adaptation process or a learning process beforehand can be performed.

According to such a third embodiment, the following effectiveness can be obtained. That is, because the sound source separation system 300 has the target sound superior signal generator 330 and the target sound inferior signal generator 340, it is possible to generate the target sound superior signal and the target sound inferior signal using the received sound signals of the two microphones 321, 322. This enables directivity control appropriate for separation of the target sound and the disturbance sound from each other.

Because the sound source separation system 300 has the separation unit 360, the target sound and the disturbance sound can be separated precisely, using the spectrum of the target sound superior signal and the spectrum of the target sound inferior signal generated undergone directivity control. Therefore, in comparison with the case like the patent literature 4 where band selection is performed using a difference in sound pressure levels of signals between the microphones originating from the fixed positional relationships of the plural microphones, a separation performance can be improved.

Further, according to the sound source separation system 300, the number of the microphones to be used is two, and sound source separation can be realized with the few microphones, resulting in miniaturization of a device.

Fourth Embodiment

FIG. 15 illustrates the general structure of a sound source separation system 400 according to the fourth embodiment of the invention. FIG. 16 illustrates directional characteristics of a target sound superior signal and target sound inferior signal, and FIG. 17 illustrates directional characteristics with FIG. 16 spread out to take a horizontal axis as a direction (angle) θ. The sound source separation system 400 of the fourth embodiment is a system relating to <an invention of three microphones/two combinations type>.

With reference to FIG. 15, the sound source separation system 400 comprises a total of three first, second and third microphones 421, 422, 423 disposed at respective vertices of a triangle (in the embodiment, right angle triangle or approximately right angle triangle as an example), the target sound superior signal generator 430 that generates a target sound superior signal by performing a linear combination process for emphasizing a target sound on a time domain, using the received sound signals of the two first and second microphones 421, 422, a target sound inferior signal generator 440 that generates a target sound inferior signal to be paired with the target sound superior signal by performing a liner combination process for suppressing the target sound on a time domain, using the received sound signals of the two first and third microphones 421, 423, a frequency analyzer 450 that performs frequency analysis on the signals on a time domain generated by the target sound superior signal generator 430 and the target sound inferior signal generator 440, and a separation unit 460 that separates the target sound and the disturbance sound from each other, using the spectrum of the target sound superior signal and the spectrum of the target sound inferior signal obtained by the frequency analyzer 450.

The three microphones 421, 422, 423 are all non-directional or approximately non-directional microphones in the embodiment. As shown in FIG. 15 by a dashed line, the first microphone 421 is provided at a front face 481 side where an operation unit comprised of keys and/or a screen display unit is provided, the second microphone 422 is provided at a corresponding portion (just opposite position of the position of the first microphone 421) in a rear face 482 side, and the third microphone 423 is provided at the front face 481 side as to be spaced away from the first microphone 421 in a cellular phone 480 that is a portable device. Therefore, the first and second microphones 421, 422 are disposed side by side in a direction from which the target sound comes or in an approximately same direction as that direction, and the first and third microphones 421, 423 are disposed side by side in a direction orthogonal to or approximately orthogonal to the direction from which the target sound comes. This is a difference from the first to third embodiments. In a case where the cellular phone is used in a folded state, as shown in FIG. 60, the target sound comes from a direction of an arrow A along the surface or from a direction near that direction, so that the microphones may be provided at positions P1, P3, P8, positions P1, P3, P5, positions P1, P3, P6, or positions P1, P3, P4, and in a word, the microphones may be provided at any positions P1 to P34 as long as the correlation between the direction from which the target sound comes and the disposed positions of the microphones satisfies the relationship shown in FIG. 15.

The target sound superior signal generator 430 performs a process of acquiring a difference between the received sound signal of the first microphone 421 and the received sound signal of the second microphone 422 on a time domain. This process may be a digital process or an analog process, and the process is executed on a time domain in the embodiment, but may be executed on a frequency domain.

The target sound inferior signal generator 440 performs a process of acquiring a difference between the received sound signal of the first microphone 421 and the received sound signal of the third microphone 423 on a time domain. This process may be a digital process or an analog process, and the process is executed on a time domain in the embodiment, but may be executed on a frequency domain.

The frequency analyzer 450 performs frequency analysis on the target sound superior signal on a time domain generated by the target sound superior signal generator 430 and the target sound inferior signal on a time domain generated by the target sound inferior signal generator 440. Like the first to third embodiment, First Fourier Transform (FFT), Generalized Harmonic Analysis (GHA) or the like can be adopted as frequency analysis. Note that in a case where the target sound superior signal generator 430 and the target sound inferior signal generator 440 generate signals on a frequency domain, the frequency analyzer 450 can be omitted.

The separation unit 460 performs maximum level band selection (BS-MAX) or spectral subtraction (SS) using the spectrum of the target sound superior signal and the spectrum of the target sound inferior signal, and performs a process of separating the target sound and the disturbance sound from each other. The schemes of band selection and spectral subtraction are the same as those of the first embodiment, thus omitting the detailed explanations.

According to the fourth embodiment, the sound source separation system 400 performs a separation process for the target sound and the disturbance sound as follows.

First, the target sound superior signal generator 430 generates a target sound superior signal (signal on a time domain) using the received sound signals (signals on a time domain) of the first and second microphones 421, 422, and the target sound inferior signal generator 440 generates a target sound inferior signal (signal on a time domain) using the received sound signals (signals on a time domain) of the first and third microphones 421, 423. Subsequently, the frequency analyzer 450 performs frequency analysis on both obtained target sound superior signal and target sound inferior signal, thereby acquiring the spectrum of the target sound superior signal and the spectrum of the target sound inferior signal.

At this time, let the received sound signal of the first microphone 421 be $X_1(t)$, and the received sound signal of the second microphone 422 be $X_2(t)$, then the target sound superior signal generator 430 acquires a difference $X_1(t)-X_2(t)$ between those signals, and this difference becomes the target sound superior signal. In illustrating a signal $|F<X_1(t)-X_2(t)>|$ obtained by performing frequency analysis on the difference $X_1(t)-X_2(t)$ between those signals, the directional characteristic of the target sound superior signal indicated by solid lines in FIGS. 16, 17 can be obtained.

Let the received sound signal of the first microphone 421 be $X_1(t)$, and the received sound signal of the third microphone 423 be $X_3(t)$, then the target sound inferior signal generator 440, a difference $X_1(t)-X_3(t)$ between those signals, and this difference becomes the target sound inferior signal. In illustrating a signal $|F<X_1(t)-X_3(t)>|$ obtained by performing frequency analysis on the difference $X_1(t)-X_3(t)$ between those signals, the directional characteristic of the target sound inferior signal indicated by dotted lines in FIGS. 16 and 17 can be obtained.

Thereafter, the separation unit 460 performs maximum level band selection (BS-MAX) or spectral subtraction (SS) using the spectrum of the target sound superior signal and the spectrum of the target sound inferior signal, thereby separating the target sound and the disturbance sound from each other.

After the target sound is separated by the separation unit 460, like the first to third embodiments, voice recognition using an acoustic model obtained by performing an adaptation process or a learning process beforehand can be performed.

According to such a fourth embodiment, the following effectiveness can be obtained. That is, because the sound source separation system 400 has the target sound superior signal generator 430 and the target sound inferior signal generator 440, it is possible to generate the target sound superior signal and the target sound inferior signal using the received sound signals of the three microphones 421, 422, and 423. This enables directivity control appropriate for separation of the target sound and the disturbance sound from each other.

Because the sound source separation system 400 has the separation unit 460, the target sound and the disturbance sound are separated precisely using the spectrum of the target sound superior signal and the spectrum of the target sound inferior signal generated undergone directivity control. Therefore, in comparison with the case like the patent literature 4 where band selection is performed using a difference in sound pressure levels of signals between microphones originating from the fixed positional relationship of the plural microphones, a separation performance can be improved.

Further, according to the sound source separation system 400, the number of microphones to be used is three, and sound source separation is realized with the few microphones, resulting in miniaturization of a device.

Fifth Embodiment

FIG. 18 illustrates the general structure of a sound source separation system 500 according to the fifth embodiment of the invention. FIG. 19 illustrates the directional characteristics of a target sound superior signal and target sound inferior signal, and FIG. 20 illustrates the directional characteristics with FIG. 19 spread out to take a horizontal axis as a direction (angle) θ. The sound source separation system 500 of the fifth embodiment is a system relating to <an invention of four microphones/two combinations type>.

With reference to FIG. 18, the sound source separation system 500 comprises a total of four microphones 521, 522, 523, 524 disposed side by side and two by two in a first direction and a second direction intersecting with each other, a target sound superior signal generator 530 that generates a target sound superior signal by performing a linear combination process for emphasizing a target sound on a time domain, using the received sound signals of the two microphones 521, 522 disposed side by side in the first direction, a target sound inferior signal generator 540 that generates a target sound inferior signal to be paired with the target sound superior signal by performing a linear combination process for suppressing the target sound, using the received sound signals of the two microphones 523, 524 disposed side by side in the second direction, a frequency analyzer 550 that performs frequency analysis on the signals on a time domain generated by the target sound superior signal generator 530 and the target sound inferior signal generator 540, and a separation unit 560 that separates the target sound and a disturbance sound from each other using the spectrum of the target sound superior signal and the spectrum of the target sound inferior signal both obtained by the frequency analyzer 550.

The first to fourth microphones 521 to 524 are all non-directional or approximately non-directional microphones in the embodiment. The first and second microphones 521, 522 are disposed side by side in the direction from which the target sound comes or in an approximately same direction as that direction, and this direction is set as the first direction in the embodiment. The third and fourth microphones 523, 524 are disposed side by side in a direction orthogonal to or approximately orthogonal to the direction from which the target sound comes, and this direction is set as the second direction in the embodiment. In a case where those four microphones 521 to 524 are provided on a cellular phone that is a portable device, for example, the first microphone 521 is provided at a front face side, the second microphone 522 is provided at a rear face side, and the third and fourth microphones are provided at right and left side portions. In a case where the cellular phone is used in a folded state, as shown in FIG. 60, the target sound comes from a direction of an arrow A or a direction near that direction, the microphones may be provided at, for example, positions P2, P7, P4, P5, and in a word, the microphones may be provided at any positions P1 to P34 as long as the correlation between the direction from which the target sound comes and the disposed positions of the microphones satisfies the relationship in FIG. 18.

According to the fifth embodiment, the function of the first microphone 421 in the fourth embodiment (see, FIG. 15) is shared by the first and third microphones 521, 523, and in other words, in the fourth embodiment, the functions of the first and third microphones 521, 523 in the fifth embodiment are acquired by the first microphone 421. Therefore, the directional characteristic in the fourth embodiment (FIGS. 16, 17) and the directional characteristic in the fifth embodiment (FIGS. 19, 20) are same.

According to the embodiment, the four microphones 521 to 524 are disposed in such a way that a line connecting the first microphone 521 and the second microphone 522 (not including an extended portion) and a line connecting the third microphone 523 and the fourth microphone 524 (not including an extended portion) intersect with each other, i.e., form a cross, but may not intersect with each other, and in a word, those microphones may be disposed in such a manner as to form the first direction and the second direction intersecting (intersecting at a right angle or approximately right angle in the embodiment) with each other.

The target sound superior signal generator 530 performs a process of acquiring a difference between the received sound signal of the first microphone 521 and the received sound signal of the second microphone 522 on a time domain. This process may be a digital process or an analog process, and the process is executed on a time domain in the embodiment, but may be executed on a frequency domain.

The target sound inferior signal generator 540 performs a process of acquiring a difference between the received sound signal of the third microphone 523 and the received sound signal of the fourth microphone 524 on a time domain. This process may be a digital process or an analog process, and the process is executed on a time domain in the embodiment, but may be executed on a frequency domain.

The frequency analyzer 550 performs frequency analysis on the target sound superior signal on a time domain generated by the target sound superior signal generator 530 and the target sound inferior signal on a time domain generated by the target sound inferior signal generator 540. Like the first to fourth embodiments, First Fourier Transform (FFT), Generalized Harmonic Analysis (GHA) or the like can be adopted as frequency analysis. Note that in a case where the target sound superior signal generator 530 and the target sound inferior signal generator 540 generate signals on a frequency domain, the frequency analyzer 550 may be omitted.

The separation unit 560 performs maximum level band selection (BS-MAX) or spectral subtraction (SS) using the spectrum of the target sound superior signal and the spectrum of the target sound inferior signal, thereby separating the target sound and the disturbance sound from each other. The schemes of band selection and spectral subtraction are the same as those of the first embodiment, thus omitting the detailed explanations.

According to such a fifth embodiment, the sound source separation system 500 performs a separation process for the target sound and the disturbance sound as follows.

First, the target sound superior signal generator 530 generates a target sound superior signal (signal on a time domain) using the received sound signals (signals on a time domain) of the first and second microphones 521, 522, and the target sound inferior signal generator 540 generates a target sound inferior signal (signal on a time domain) using the received sound signals (signals on a time domain) of the third and fourth microphones 523, 524. Subsequently, the frequency analyzer 550 performs frequency analysis on the obtained target sound superior signal and target sound inferior signal, thereby acquiring the spectrum of the target sound superior signal and the spectrum of the target sound inferior signal.

At this time, let the received sound signal of the first microphone 521 be $X_1(t)$, and the received sound signal of the second microphone 522 be $X_2(t)$, then the target sound superior signal generator 530 acquires a difference $X_1(t)-X_2(t)$ between those signals, and this difference becomes the target sound superior signal. In illustrating a signal $|F<X_1(t)-X_2(t)>|$ obtained by performing frequency analysis on the difference $X_1(t)-X_2(t)$ between those signals, the directional characteristic of the target sound superior signal indicated by solid lines in FIGS. 19 and 20 can be obtained.

On the other hand, let the received sound signal of the third microphone 523 be $X_3(t)$, and the received sound signal of the fourth microphone 524 be $X_4(t)$, then the target sound inferior signal generator 540 acquires a difference $X_3(t)-X_4(t)$, and this difference becomes the target sound inferior signal. In illustrating a signal $|F<X_3(t)-X_4(t)>|$ obtained by performing frequency analysis on the difference $X_3(t)-X_4(t)$ between those signals, the directional characteristic of the target sound inferior signal indicated by dotted lines in FIGS. 19 and 20 can be obtained.

Thereafter, the separation unit 560 performs maximum level band selection (BS-MAX) or spectral subtraction (SS) using the spectrum of the target sound superior signal and the spectrum of the target sound inferior signal, thereby separating the target sound and the disturbance sound from each other.

After the target sound is separated by the separation unit 560, like the first to fourth embodiments, voice recognition using an acoustic model obtained by performing an adaptation process or a learning process beforehand can be performed.

According to such a fifth embodiment, the following effectiveness can be obtained. That is, because the sound source separation system 500 has the target sound superior signal generator 530 and the target sound inferior signal generator 540, it is possible to generate the target sound superior signal and the target sound inferior signal using the received sound signals of the four microphones 521 to 524. This enables directivity control appropriate for separation of the target sound and the disturbance sound from each other.

Because the sound source separation system 500 has the separation unit 560, the target sound and the disturbance sound can be separated precisely using the spectrum of the target sound superior signal and the spectrum of the target sound inferior signal generated undergone a delayed process. Accordingly, in comparison with the case like the patent literature 4 where band selection is performed using a difference of sound pressure levels of signals between microphones originating from the fixed positional relationships between the plural microphones, a separation performance can be improved.

The number of the microphones used is four according to the sound source separation system 500, and sound source separation can be realized with the few microphones, resulting in miniaturization of a device.

Sixth Embodiment

FIG. 21 illustrates the general structure of a sound source separation system 600 according to a sixth embodiment of the invention. FIG. 22 illustrates directional characteristics of a target sound superior signal and first and second target sound inferior signals. FIG. 23 illustrates the directional characteristics with FIG. 23 spread out to take a horizontal axis as a direction (angle) θ. The sound source separation system 600 of the sixth embodiment is a system relating to <an invention of four microphones/three combinations type>.

With reference to FIG. 21, the sound source separation system 600 comprises a total of four first, second, third and fourth microphones 621, 622, 623, 624 disposed at each of vertices of a quadrangle (in the embodiment, a lozenge or an approximate lozenge, a square or an approximate square, or quadrangles other than the forging figures and have axisymmetric figures with each diagonal defined as a center), a target sound superior signal generator 630 which performs a linear combination process for emphasizing a target sound on a time domain by using received sound signals of the two first and second microphones 621, 622 to generate a target sound superior signal, a target sound inferior signal generator 640 which performs a linear combination process for suppressing the target sound on a time domain by using received sound signals of the three first, third and fourth microphones 621, 623, 624 to generate first and second target sound inferior signals to be paired with the target sound superior signal, a frequency analyzer 650 which performs a frequency analysis on the signals, on a time domain, generated by the target sound superior signal generator 630 and the target sound inferior signal generator 640, and a separation unit 660 which separates the target sound and a disturbance sound by using the spectrum of a target sound inferior signal and the spectrums of first and second target sound superior signal all obtained by the frequency analyzer 650

All of the first to fourth microphones 621 to 624 are non-directional or approximate non-directional microphones in the embodiment. The first and second microphones 621, 622 are disposed side by side in a direction from which the target sound comes or in the direction approximate to the same, while the third microphone 623 is disposed on one side (left side in FIG. 21) of a line connecting the first and second microphones 621, 622 and the fourth microphone 624 is disposed on the other side (right side in FIG. 21) of the line connecting the first and second microphones 621, 622. In a case where these four microphones 621 to 624 are mounted on a cellular phone that is a portable device, the first and second microphones 621, 622, e.g., can be mounted on the front and rear faces thereof, respectively, while the third and fourth microphones 623, 624 can be mounted on the left and right lateral sides thereof, respectively. In addition, in the present embodiment, the line connecting the first and second microphones 621, 622, a line connecting the first and the third microphones 621, 623, and a line connecting the first and the fourth microphones 621, 624 are disposed in such a manner as to form an arrow, but positions of those microphones are not limited to this case, and the third and fourth microphones 623, 624 may be shifted so as to form a Y-like figure in such a direction as to come close to a sound source of the target sound. Further, in using the cellular phone in a folded state, as shown in FIG. 60, the target sound comes from a direction indicated by an arrow A along a surface of the cellular phone or from the direction near that direction, so that the microphones can be provided at, for example, positions P2, P7, P4, P5, and in a word, the microphones may be provided at any positions P1 to P34 as log as the correlation between the direction from which the target sound comes and the microphone arrangement positions satisfies the relationship (an arrow figure or a Y-like figure made by modifying the arrow figure) shown in FIG. 21.

The target sound signal superior generator 630 performs a process of acquiring a difference between the received signals of the first and second microphones 621, 622. This process may be a digital process or an analog process, and the process is executed on a time domain in the embodiment, but may be executed on a frequency domain.

The target sound inferior signal generator 640 comprises a first target sound inferior signal generator 641 and a second target sound inferior signal generator 642.

The first target sound inferior signal generator 641 performs a process of acquiring a difference between the received sound signals of the first and third microphones 621, 623 on a time domain and generating a first target sound inferior signal. The first target sound inferior signal is a signal that suppresses a sound coming from a space at one side of the direction from which the target sound comes, i.e., the space (left space in FIG. 21) where the third microphone 623 is provided. This process may be a digital process or an analog process, and the process is executed on a time domain in the embodiment, but may be executed on a frequency domain.

The second target sound inferior signal generator 642 performs a process of acquiring a difference between the received signals of the first and fourth microphones 621, 624 on a time domain and generating a second target sound inferior signal. The second target sound inferior signal is a signal that suppresses a sound coming from the other side of the target sound signal coming direction, i.e., from a space where the fourth microphone 624 is provided (right space in FIG. 21). This process may be a digital process or an analog process, and the process is executed on a time domain in the embodiment, but may be executed on a frequency domain.

The frequency analyzer 650 performs frequency analyses on the target sound superior signal on a time domain generated by the target sound superior signal generator 630 and the first and second target sound inferior signals on a time domain generated by the target sound inferior signal generator 640. Like the first to fifth embodiments, Fast Fourier Transform (FFT), Generalized Harmonic Analysis (GHA) or the like can be adopted as frequency analyses. Note that in a case where signals on a frequency domain are generated by the target sound superior signal generator 630 and the target sound inferior signal generator 640, the frequency analyzer 650 can be omitted.

The separation unit 660 comprises a first separation unit 661, a second separation unit 662, and an integration unit 663.

The first separation unit 661 performs maximum level band selection (BS-MAX) or spectral subtraction (SS) by using the target sound superior signal spectrum and the first target sound inferior signal spectrum to perform a separation process for the sound including the target sound coming from the one side, i.e., from the space (left space in FIG. 21) where the third microphone 623 is provided. In performing band selection, powers at the same frequency band are compared for each frequency band between the target sound superior signal spectrum and the first target sound inferior signal spectrum to assign the larger power in each frequency band to a spectrum of a sound obtained by separation. Further, in performing spectral subtraction, a value, obtained by multiplying power of each frequency band of the first target sound inferior signal spectrum by a coefficient, is subtracted from power of each frequency band of the target sound superior signal spectrum at the same frequency band.

The second separation unit 662 performs maximum level band selection (BS-MAX) or spectral subtraction (SS) by using the target sound superior signal spectrum and the second target sound inferior signal spectrum to perform a separation process for a sound including the target sound coming from the other side, i.e., from the space (right space in FIG. 21) where the fourth microphone 624 is provided. When performing band selection, powers at the same frequency band are compared for each frequency band between the target sound superior signal spectrum and the second target sound inferior signal spectrum to assign the larger power at each frequency band to a spectrum of a sound obtained by separation. Further, when performing spectral subtraction, a value, obtained by multiplying power of the second target sound inferior signal spectrum by a coefficient, is subtracted from power at the same frequency band in the second target sound superior signal spectrum, for each frequency band.

Using the spectrum of the sound including the target sound separated by the first separation unit 661 and coming from the one side, i.e., from the space (left space in FIG. 21) where the third microphone 623 is provided and a spectrum of the sound including the target sound separated by the second separation unit 662 and coming from the other side, i.e., from the space (right space in FIG. 21) where the fourth microphone 624 is provided, an integration unit 663 (763) performs a spectrum integration process of adding those powers of the spectrums for each frequency band (addition) or comparing the powers for each frequency band and assigning inferior power to a spectrum of the target sound (minimization), thus separating the target sound.

According to such a sixth embodiment, the sound source separation system 600 performs separation process for the target sound and the disturbance sound.

First, using the received sound signals (signals on a time domain) of the first and second microphones 621, 622, the target sound superior signal (a signal on a time domain) is generated by the target sound superior signal generator 630, while using the received sound signals (signals on a time domain) of the first, third and fourth microphones 621, 623, 624, the first and second target sound inferior signals (signals on a time domain) are generated by the target sound inferior signal generator 640. Subsequently, the frequency analyzer 650 performs frequency analyses on the obtained target sound superior signal and first and second target sound inferior signals, thereby acquiring the spectrum of the target sound superior signal and the spectra of the first and second target sound inferior signals.

Let the received signal of the first microphone 621 be $X_1(t)$, and the received sound signal of the second microphone 622 be $X_2(t)$, then a difference $X_1(t)-X_2(t)$ between these signals is acquired by the target sound superior signal generator 630, and the difference becomes the target sound superior signal. In illustrating a signal $|F<X_1(t)-X_2(t)>|$ obtained by performing frequency analysis on the difference $X_1(t)-X_2(t)$ between these signals, the directional characteristics of the target sound superior signal indicated by solid lines in FIGS. 22 and 23 can be obtained.

On the other hand, let the received signal of the first microphone 621 be $X_1(t)$, and the received sound signal of the third microphone 623 be $X_3(t)$, then a difference $X_1(t)-X_3(t)$ between these signals is acquired by the first target sound inferior signal generator 641, and the difference becomes the first target sound inferior signal. In illustrating a signal $|F<X_1(t)-X_3(t)>|$ obtained by performing frequency analysis on the difference $X_1(t)-X_3(t)$ between these signals, the directional characteristics of the target sound inferior signal indicated by dotted lines in FIGS. 22 and 23 can be obtained.

Further, let the received signal of the first microphone 621 be $X_1(t)$, and the received signal of the fourth microphone 624 be $X_4(t)$, then a difference $X_1(t)-X_4(t)$ between these signals is acquired by the second target sound inferior signal generator 642, and the difference becomes the second target sound inferior signal. In illustrating a signal $|F<X_1(t)-X_4(t)>|$ obtained by performing frequency analysis on the difference $X_1(t)-X_4(t)$ between these signals, the directional characteristics of the second target sound inferior signal indicated by dashed lines in FIGS. 22 and 23 can be obtained.

Thereafter, the first separation unit 661 performs maximum level band selection (BS-MAX) or spectral subtraction (SS) by using the target sound superior signal spectrum and the first target sound inferior signal spectrum, and performs a process of separating the sound including the target sound coming from the one side, i.e., from the space (left space in FIG. 21) where the third microphone 623 is provided. Besides, the second separation unit 662 performs maximum level band selection (BS-MAX) or spectral subtraction (SS) by using the target sound superior signal spectrum and the second target sound inferior signal spectrum, and performs a process of separating the sound including the target sound coming from the other side, i.e., from the space (right space in FIG. 21) where the fourth microphone 624 is provided. In a case where the first separation unit 661 has performed band selection, the second separation unit 662 also performs band selection, and in a case where the first separation unit 661 has performed spectral subtraction, the second separation unit 662 also performs spectral subtraction.

Using the spectrum of the sound including the target sound separated by the first separation unit 661 and coming from the one side, i.e., from the space (left space in FIG. 21) where the third microphone 623 is provided and the spectrum of the sound including the target sound separated by the second separation unit 662 and coming from the other side, i.e., from the space (right space in FIG. 21) where the fourth microphone 624 is provided, the integration unit 663 performs a spectrum integration process by addition or minimization to separate the target sound.

After the separation unit 660 has separated the target sound, like the first to fifth embodiments, voice recognition can be performed, using an acoustic model obtained by performing an adaptation process or a learning process beforehand.

According to such a sixth embodiment, the following effectiveness can be obtained. Namely, because the sound source separation system 600 has the target sound superior signal generator 630 and the target sound inferior signal generator 640, the target sound superior signal and the first and second target sound inferior signals can be generated using the received sound signals of four microphones 621 to 624. This enables directivity control appropriate for separating the target sound and the disturbance sound.

Further, because the sound source separation system 600 has the separation unit 660, the target sound and the disturbance sound can be separated precisely, using the spectrum of the target sound superior signal and the spectra of the first and second target sound inferior signals generated undergone directivity control. Consequently, a separation performance can be improved as compared to the case like the patent literature 4 where band selection is performed by using a difference of sound pressure levels of signals between microphones originating from a relationship between fixed positions of a plurality of microphones.

Furthermore, the number of the microphones used in the sound source separation system 600 is four, and sound source separation is realized with the few microphones, resulting in miniaturization of a device.

Seventh Embodiment

FIG. 24 illustrates the general structure of a sound source separation system 700 according to the seventh embodiment of the present invention. FIG. 25 illustrates directional characteristics of a target sound superior signal and first and second target sound inferior signals. FIG. 26 illustrates the directional characteristics with FIG. 25 spread out to take a horizontal axis as a direction (angle) θ. The sound source separation system 700 of the seventh embodiment is a system relating to <an invention of three microphones/three combinations type>.

With reference to FIG. 24, the sound source separation system 700 comprises a total of three first, second and third microphones 721, 722, 723 disposed at each of vertices of a triangle (an isosceles triangle or an approximately isosceles triangle in the embodiment), a target sound superior signal generator 730 which performs a linear combination process for emphasizing a target sound on a time domain by using received sound signals of these three microphones 721, 722, 723 to generate a target sound superior signal, a target sound inferior signal generator 740 which performs a linear combination process for suppressing the target sound on a time domain by using the received sound signals of the three microphones 721, 722, 724 to generate first and second target sound inferior signals to be paired with the target sound superior signal, a frequency analyzer 750 which performs frequency analysis on each of signals on a time domain generated by the target sound superior signal generator 730 and the target sound inferior signal generator 740, and a separation unit 760 which separates a target sound and a disturbance sound by using a target sound superior signal spectrum and first and second target sound inferior signal spectra obtained by the frequency analyzer 750.

All of the first to third microphones 721 to 723 are non-directional or approximately non-directional microphones in the embodiment. The first and second microphones 721, 722 are disposed side by side in an inclined direction (a diagonally-right-up direction in FIG. 24) with respect to a direction from which the target sound comes, and the first and third microphones 721, 723 are disposed side by side in an inclined direction (a diagonally-left-up direction in FIG. 24) opposite to the inclined direction of the first and second microphones 721, 722. As shown by a dashed line in FIG. 24, in a cellular phone 780 that is a portable device, the first microphone 721 is provided at a front face 781 side where an operation unit comprising various keys and/or a screen display unit is provided, while the second and third microphones 722, 723 are so provided at a rear face 782 side as to be spaced away from each other. Further, if the cellular phone is used in a folded state, as shown in FIG. 60, the target sound comes from a direction indicated by an arrow A along the front face of the cellular phone or from a direction near that direction, the microphones can be provided at, for example, positions P2, P6, P8. In a word, if the correlation between the direction from which the target sound comes and the microphone-disposed positions satisfies a relationship shown in FIG. 24, the microphones may be provided at any positions P1 to P34.

The target sound superior signal generator 730 performs a process of acquiring a difference between the received sound signal of the first microphones 721 and a value, obtained by multiplying the sum of the received sound signals of the second and third microphones 722, 723 by a proportional coefficient k, on a time domain. This process may be a digital process or an analog process. The process is executed on a time domain in the embodiment, but may be executed on a frequency domain. In addition, in a case where the three microphones 721, 722, 723 are disposed at vertices of a triangle not an isosceles triangle, in acquiring a difference between the received sound signal of the first microphone 721 and that value, a sum of a value obtained by multiplying the received sound signal of the second microphone 722 by a proportional coefficient $k_1$, and a value obtained by multiplying the received sound signal of the third microphone 723 by a proportional coefficient $k_2$ is used instead of a value obtained by multiplying the sum of the received sound signals of the second and third microphones 722, 723 by the proportional coefficient k.

The target sound inferior signal generator 740 comprises a first target sound inferior signal generator 741 and a second target sound inferior signal generator 742.

The first target sound inferior signal generator 741 performs a process of acquiring a difference between the received sound signals of the first and second microphones 721, 722 on a time domain, and of generating a first target sound inferior signal. The first target sound inferior signal is a signal that suppresses a sound coming from one side of the direction from which the target sound comes, i.e., from the space (left space in FIG. 24) where the second microphone 722 is provided. This process may be a digital process or an analog process. The process is executed on a time domain in the embodiment, but may be executed on a frequency domain.

The second target sound inferior signal generator 742 performs a process of acquiring a difference between the received sound signals of the first and third microphones 721, 723 on a time domain and of generating a second target sound inferior signal. The second target sound inferior signal is a signal that suppresses a sound coming from the other side of the target sound signal coming direction, i.e., from the space (right space in FIG. 24) where the third microphone 723 is provided. This process may be a digital process or an analog process. The process is executed on a time domain in the embodiment, but may be executed on a frequency domain.

The frequency analyzer 750 performs frequency analysis on the target sound superior signal on a time domain generated by the target sound superior signal generator 730 and first and second target sound inferior signals on a time domain generated by the target sound inferior signal generator 740. Like the first to sixth embodiments, Fast Fourier Transform (FFT), Generalization Harmonic Analysis (GHA) or the like can be adopted as frequency analyses. When signals on a frequency domain are generated by the target sound superior signal generator 730 and the target sound inferior signal generator 740, the frequency analyzer 750 can be omitted.

The separation unit 760 comprises a first separation unit 761, a second separation unit 762, and an integration unit 763.

The first separation unit 761 performs maximum level band selection (BS-MAX) or spectral subtraction (SS) by using the target sound superior signal spectrum and a first target sound inferior signal spectrum and performs a process of separating the sound including the target sound coming from one side, i.e., from the space (left space in FIG. 24) where the second microphone 722 is provided. In performing band selection, powers at the same frequency band are compared between the target sound superior signal spectrum and the first target sound inferior signal spectrum for each frequency band, and the largest power in each frequency band is assigned to a spectrum of the sound obtained by separation. Further, in performing spectral subtraction, a value, obtained by multiplying power of a first target sound inferior signal spectrum by a coefficient, is subtracted from power at the same frequency band of the target sound superior signal spectrum for each frequency band.

The second separation unit 762 performs maximum level band selection (BS-MAX) or spectral subtraction (SS) by using the spectra of the target sound superior signal and second target sound inferior signal, and performs a process of separating the sound including the target sound coming from the other side, i.e., from the space (right space in FIG. 24) where the third microphone 723 is provided. In performing band selection, power at the same frequency band are compared between the spectra of the target sound superior signal and second target sound inferior signal for each frequency band, and the larger powers in the individual frequency band are assigned to a spectrum of the sound obtained by separation. Further, in performing spectral subtraction, a value, obtained by multiplying power of the second target sound inferior signal spectrum by a coefficient, is subtracted from power at the same frequency band of the target sound superior signal spectrum for each frequency band.

Using the spectrum of the sound including the target sound separated by the first separation unit 761 and coming from one side, i.e., from the space (left space in FIG. 24) where the second microphone 722 is provided and the spectrum of the sound including the target sound separated by the second separation unit 762 and coming from the other side, i.e., from the space (right space in FIG. 21) where the third microphone 723 is provided, the integration unit 763 adds the powers of these spectra for each frequency band (addition) or compares powers for each frequency band and assigns the inferior power to a spectrum of the target sound (minimization) to perform a spectrum integration process, thus separating the target sound.

According to the seventh embodiment, the sound source separation system 700 separates the target sound and a disturbance sound in the following manner.

First, using the received sound signals (signals on a time domain) of the first, second and third microphones 721, 722, 733, the target sound superior signal (signal on a time domain) is generated by the target sound superior signal generator 730, while using the received sound signals (signals on a time domain) of the first, second and third microphones 721, 722, 733, the first and second target sound inferior signals (signals on a time domain) are generated by the target sound inferior signal generator 740. Subsequently, the frequency analyzer 650 performs frequency analysis on the obtained target sound superior signal and first and second target sound inferior signals, thereby acquiring the target sound superior signal spectrum and the first and second target sound inferior signal spectra.

At this time, let the received sound signals of the first, second and third microphones 721, 722, 723 be $X_1(t)$, $X_2(t)$, $X_3(t)$, respectively, then $X_1(t)-k(X_2(t)+X_3(t))$ is acquired using these signals by the target sound superior signal generator 730, and this becomes the target sound superior signal. In illustrating a signal $|F<X_1(t)-k(X_2(t)+X_3(t))>|$ obtained by performing frequency analysis on the target sound superior signal $X_1(t)-k(X_2(t)+X_3(t))$, the directional characteristics of the target sound superior signal indicated by solid lines in FIGS. 25 and 26 can be obtained. Note that in a case where the three microphones 721, 722, 723 are disposed at vertices of a triangle not an isosceles triangle, the target sound superior signal becomes $X_1(t)-(k_1X_2(t)+k_2X_3(t))$.

Let the received sound signals of the first and second microphones 721, 722 be $X_1(t)$, $X_2(t)$, respectively, then a difference $X_1(t)-X_2(t)$ between these signals is acquired by the first target sound inferior signal generator 741, and the difference becomes the target sound inferior signal. In illustrating a signal $|F<X_1(t)-X_2(t)>|$ obtained by performing frequency analysis on the difference $X_1(t)-X_2(t)$ between these signals, the directional characteristics of the first target sound inferior signal indicated by dotted lines in FIGS. 25 and 26 can be obtained.

Further, let the received sound signals of the first and third microphones 721, 723 be $X_1(t)$, $X_3(t)$, respectively, then a signal difference $X_1(t)-X_3(t)$ between these signals is acquired by the second target sound inferior signal generator 742, and the difference becomes the second target sound inferior signal. In illustrating a signal $|F<X_1(t)-X_3(t)>|$ obtained by performing frequency analysis on the signal difference $X_1(t)-X_3(t)$ between these signals, directional characteristics of the second target sound inferior signal indicated by dashed lines in FIGS. 25 and 26 can be obtained.

Thereafter, the first separation unit 761 performs maximum level band selection (BS-MAX) or spectral subtraction (SS) by using the target sound superior signal spectrum and the first target sound signal spectrum, and performs a process of separating the sound including the target sound coming from one side, i.e., from the space (left space in FIG. 24) where the second microphone 722 is provided, and the second separation unit 762 performs maximum level band selection (BS-MAX) or spectral subtraction (SS) by using the target sound superior signal spectrum and the second target sound inferior signal spectrum, and performs a process of separating the sound including the target sound coming from the other side, i.e., from the space (right space in FIG. 21) where the third microphone 723 is provided. When the first separation unit 761 has performed band selection, the second separation unit 762 also performs band selection, and when the first separation unit 761 has performed spectral subtraction, the second separation unit 762 also performs spectral subtraction.

Then, using a spectrum of the sound including the target sound separated by the first separation unit 761 and coming from one side, i.e., from the space (left space in FIG. 24) where the second microphone 722 is provided and a spectrum of the sound including the target sound separated by the second separation unit 762 and coming from the other side, i.e., from the space (right space in FIG. 24) where the third microphone 723 is provided, the integration unit 763 performs a spectrum integration process by addition or minimization, thereby separating the target sound.

After the separation unit 760 has separated the target sound, like the first to sixth embodiments, voice recognition using an acoustic model obtained by performing an adaptation process or a learning process can be performed.

According to such a seventh embodiment, the following effectiveness can be achieved. Namely, because the sound source separation system 700 has the target sound superior signal generator 730 and the target sound inferior signal generator 740, the target sound superior signal and the first and second target sound inferior signals can be generated using the received sound signals of the three microphones 721 to 723. This enables directivity control appropriate for separation of the target sound and the disturbance sound.

Further, because the sound source separation system 700 has the separation unit 760, the target sound and the disturbance sound can be separated precisely using the target sound superior signal spectrum and the first and second target sound inferior signal spectra, which are generated undergone directivity control. Consequently, a separation function can be improved as compared to the case like the patent literature 4 where band selection is performed using a difference of sound pressure levels of signals between microphones originating from the fixed positional relationship of a plurality of microphones.

Furthermore, the number of the microphones used in the sound source separation system 700 is three, and sound source separation is realized with the few microphones, resulting in miniaturization of a device.

Eighth Embodiment

FIG. 31 illustrates the general structure of a sound source separation system 1000 according to the eighth embodiment of the present invention. FIG. 32 illustrates a sensitive region formed by the sound source separation system 1000. FIG. 33 illustrates directional characteristics of first and second target sound superior signals and of a target sound inferior signal which are produced by a first sensitive region formation signal generator 1001 and directional characteristics of first and second target sound superior signals and of a target sound inferior signal which are produced by a second sensitive region formation signal generator 1002. FIG. 34 is an explanatory diagram for a spectrum integration process through minimization.

With reference to FIG. 31, the sound source separation system 1000 comprises a total of three first, second and third microphones 1021, 1022, and 1023 disposed at respective vertices of a triangle (as an example, a right triangle or an approximately right triangle in the embodiment). All of the first, second and third microphones 1021 to 1023 are non-directional or approximately non-directional microphones in the embodiment. All of these first, second and third microphones 1021, 1022, 1023 are disposed on a front face orthogonal to or approximately orthogonal to a direction from which the target sound comes. In the example shown in the figure, the target sound is set as to come from a direction of the normal line of a front face 1082 of a cellular phone 1080. Hence, all of the first, second and third microphones 1021, 1022, and 1023 are provided on the front face 1082. Accordingly, both line connecting the first and second microphones 1021, 1022 and line connecting the second and third microphones 1022, 1023 are orthogonal to or approximately orthogonal to the direction from which the target sound comes. Consequently, in considering only the first and second microphones 1021, 1022, the relationship between the direction from which the target sound comes and the microphone arrangement positions in the embodiment is the same as that in the third embodiment (see, FIG. 12) and the same is true in considering only the second and third microphones 1022, 1023. Note that if the correlation between the direction from which the target sound comes and the microphone arrangement positions satisfies the relationship shown in FIG. 31, the directional characteristics to be formed remains unchanged. Hence, the microphones may be disposed at any positions P1 to P34 shown in FIG. 60.

The sound source separation system 1000 also comprises a first sensitive region formation signal generator 1001 which generates a first sensitive region formation signal spectrum for forming, by using received sound signals of the two first and second microphones 1021, 1022, a first sensitive region along a surface C1 (see, FIG. 32) orthogonal to a line connecting the microphones 1021, 1022, a second sensitive region formation signal generator 1002 which generates a second sensitive region formation signal spectrum for forming, by using received sound signals of the two second and third microphones 1022, 1023, a second sensitive region along a surface C2 (see, FIG. 32) orthogonal to a line connecting the microphones 1022, 1023, and a sensitive region integration unit 1003 which forms a sensitive region for separating the target sound at a common part (an intersecting part) of the first and second sensitive regions by using the sensitive region formation signal spectrum generated by the first sensitive region formation signal generator 1001 and the second sensitive region formation signal spectrum generated by the second sensitive region formation signal generator 1002.

The first sensitive region formation signal generator 1001 performs the same processes as that of the sound source separation system 300 (see, FIG. 12) in the third embodiment, using the received sound signals of the two first and second microphones 1021, 1022 to generate, as the first sensitive region formation signal spectrum $S_1$, the same spectrum as that of the target sound obtained by separation performed by the sound source separation system 300 in the third embodiment. Namely, the same processes as those in the third embodiment are performed with the two first and second microphones 1021, 1022 being caused to correspond to each of the microphones 321, 322 of the sound source separation system 300 in the third embodiment. Consequently, in FIG. 31, portions where the same processes as those of the sound source separation system 300 (see FIG. 12) in the third embodiment are performed are denoted by the same names and the same reference numerals, and detailed descriptions thereof will be omitted.

The second sensitive region formation signal generator 1002 performs the same processes as those of the sound source separation system 300 (see FIG. 12) in the third embodiment by using the received sound signals of the two second and third microphones 1022, 1023 to generate, as the second sensitive region formation signal spectrum $S_2$, the same spectrum as that of the target sound obtained by separation performed by the sound source separation system 300. Namely, the same processes as those in the third embodiment are performed with the two second and third microphones 1022, 1023 being caused to correspond to the microphones 321, 322 of the sound source separation system 300 in the third embodiment. Consequently, in FIG. 31, portions where the same processes as those of the sound source separation system 300 (see FIG. 12) in the third embodiment are performed are denoted by the same names and the same reference numerals (note that, however, a reference symbol A is suffixed to each reference numeral symbol in order to distinguish the components from those of the first sensitive region formation signal generator 1001) and detailed explanations thereof will be omitted.

The sensitive region integration unit 1003 (1103) performs a spectrum integration process (minimization) of comparing the powers of the spectrums for each frequency band, using the spectrum $S_1$ of the first sensitive region formation signal generated by the first sensitive region formation signal generator 1001 (1101) and the spectrum $S_2$ of the second sensitive region formation signal generated by the second sensitive region formation signal generator 1002 (1102), and assigning inferior power to a spectrum $S_3$ of the target sound. Specifically, as shown in FIG. 34, in the spectrum integration process through minimization, for example, let largeness of powers of the individual frequency bands in the first sensitive region formation signal spectrum $S_1$ be $S_1(\mathbf{1})$, $S_1(\mathbf{2})$, $S_1(\mathbf{3})$, $S_1(\mathbf{4})$, $S_1(\mathbf{5})$ . . . and largeness of powers of the individual frequency bands in the second sensitive region formation signal spectrum $S_2$ be $S_2(\mathbf{1})$, $S_2(\mathbf{2})$, $S_2(\mathbf{3})$, $S_2(\mathbf{4})$, $S_2(\mathbf{5})$ . . . , then powers at the same frequency band are compared with each other. Namely, $S_1(\mathbf{1})$ and $S_2(\mathbf{1})$ are compared and $S_1(\mathbf{2})$ and $S_2(\mathbf{2})$ are compared. The same is true for the other frequency bands. Then, if $S_1(1)<S_2(1)$, $S_1(2)>S_2(2)$, $S_1(3)<S_2(3)$, $S_1(4)<S_2(4)$ and $S_1(5)>S_2(5)$, $S_1(1)$ $S_2(2)$ $S_1(3)$ $S_1(4)$, $S_2(5)$ that are the inferior powers in the individual frequency bands are selected and assigned to the spectrum $S_3$ of the target sound, thereby separating the target sound. Note that the spectrum integration process through the minimization puts off no inferior powers for each frequency band and assigns these powers to the spectrum $S_3$ of the target sound, and therefore is a different process from the minimum level band selection (BS-MIN) to be discussed later in FIG. 37.

According to such an eighth embodiment, the sound source separation system 1000 performs a process of separating the target sound and a disturbance sound in the following manner.

First, using the received sound signals (signals on a time domain) of the two first and second microphones 1021, 1022, the first and second target signal superior signals (signals on a time domain) are generated by the first and second target sound superior signal generator 331, 332 of the first sensitive region formation signal generator 1001, and the target sound inferior signal (signal on a rime domain) is generated by the target sound inferior signal generator 340 of the first sensitive region formation signal generator 1001. Subsequently, the frequency analyzer 350 performs frequency analysis on the obtained first and second target sound superior signals and target sound inferior signal, to acquire first and second target sound superior signal spectra and a target sound inferior signal spectrum.

On this occasion, let the received signals of the first and second microphones 1021, 1022 be $X_1(t)$, $X_2(t)$, respectively, then a difference $X_1(t)-D(X_2(t))$ between the received sound signal $X_1(t)$ of the first microphone 1021 and a signal $D(X_2(t))$ generated by performing a delayed process on the received sound signal $X_2(t)$ of the second microphone 1022 is acquired by the first target sound superior signal generator 331, and this difference becomes the first target sound superior signal. In illustrating a signal $|F<X_1(t)-D(X_2(t))>|$ obtained by performing frequency analysis on the first target signal superior signal $X_1(t)-D(X_2(t))$, the directional characteristic of the first target sound superior signal indicated by a solid (heavy) line in FIG. 33 can be obtained likewise the case shown in FIG. 13 (as in the third embodiment). The directional characteristic shown by a cardioid (a heart-shaped curve) can be three-dimensionally obtained by rotation with an X-axis (an axis parallel to a line connecting the first and second microphones 1021, 1022) defined as a center.

Further, a difference $X_2(t)-D(X_1(t))$ between the received sound signal $X_2(t)$ of the second microphone 1022 and a signal $D(X_1(t))$ generated by performing a delayed process on the received sound signal $X_1(t)$ of the first microphone 1021 is acquired by the second target sound superior signal generator 332, and this difference becomes a second target sound superior signal. In illustrating a signal $|F<X_2-D(X_1(t))>|$ obtained by performing frequency analysis on the second target sound superior signal $X_2(t)-D(X_1(t))$, the directional characteristic of the second target sound superior signal indicated by a dashed (heavy) line in FIG. 33 can be obtained likewise the case shown in FIG. 13 (in the third embodiment). The directional characteristic shown by a cardioid (a heart-shaped curve) can be also obtained three-dimensionally by rotation with the X-axis defined as a center.

A difference $X_1(t)-X_2(t)$ between the received signals $X_1(t)$, $X_2(t)$ of the first and second microphones 1021, 1022 is acquired by the target sound inferior signal generator 340, and this difference becomes the target sound inferior signal. In illustrating a signal $|F<X_1(t)-X_2(t)>|$ obtained by performing frequency analysis on the difference $X_1(t)-X_2(t)$ between these signals, likewise the case shown in FIG. 13 (in the third embodiment), the directional characteristics of the target sound inferior signal indicated by dotted (heavy) lines in FIG. 33 can be obtained. The directional characteristic shown by an 8-shaped curve is obtained three-dimensionally by rotation with the X-axis defined as a center.

Thereafter, the first separation unit 761 of the first sensitive region formation signal generator 1001 performs maximum level band selection (BS-MAX) or spectral subtraction (SS) by using the spectra of the first target sound superior signal and target sound superior signal, and performs a separation process for a sound including the target sound coming from the space (left space in FIG. 33) where a first microphone 1021 is provided. Besides, using the spectra of the second target sound superior signal and target sound inferior signal, the second separation unit 762 of the first sensitive region formation signal generator 1001 performs maximum level band selection (BS-MAX) or spectral subtraction (SS) and performs a process of separating a sound including the target sound coming from the space (right space in FIG. 33) where a second microphone 1022 is provided.

Then, using the spectra of the sound including the target sound separated by the first separation unit 361 and coming from the space (left space in FIG. 33) where the first microphone 1021 is provided and sound including the target sound separated by the second separation unit 362 and coming from the space (left space in FIG. 33) where the second microphone 1022 is provided, the integration unit 363 of the first sensitive region formation signal generator 1001 performs a spectrum integration process through addition or minimization to thereby generate a spectrum $S_1$ of the first sensitive region formation signal. At this time, the directional characteristic (indicated by heavy lines) of each signal generated by the first sensitive region formation signal generator 1001 becomes one shown in FIG. 33, by performing rotation with the X-axis defined as a center. Hence, as shown in FIG. 32, a plane C1 of the center of the first sensitive region is formed along the YZ plane.

In parallel with the foregoing process by the first sensitive region formation signal generator 1001, a process by the second sensitive region formation signal generator 1002 is performed by the same procedure as that of the first sensitive region formation signal generator 1001 to generate a spectrum $S_2$ of the second sensitive region formation signal. At this time, the directional characteristic of each signal generated by the second sensitive region formation signal generator 1002 becomes one shown in FIG. 33, obtained by performing rotation with the Y-axis (an axis parallel to a line connecting the second and third microphones 1022, 1023) defined as a center. Hence, as shown in FIG. 32, a plane C2 of the center of the second sensitive region is formed along the XZ plane.

Thereafter, the sensitive region integration unit 1003 (1103) performs a spectrum integration process (minimization) of comparing the powers of the spectrums for each frequency band, using the spectrum S1 of the first sensitive region formation signal generated by the first sensitive region formation signal generator 1001 (1101) and the spectrum S2 of the second sensitive region formation signal generated by the second sensitive region formation signal generator 1002 (1102), and assigning inferior power to a spectrum S3 of the target sound. At this time, in performing the spectrum integration process through minimization, at the common part (intersecting part) of the first sensitive region formed along the plane C1 of the center of the first sensitive region and second sensitive region formed along the plane C2 of the center of the second sensitive region, a sensitive region subsequent to spectrum integration is formed. Namely, as shown in FIG. 32, the sensitive region subsequent to spectrum integration is formed in the direction of a normal line k of the front face 1082 of the cellular phone 1080, and the target sound coming from the direction can be separated.

After the sensitive region integration unit 1003 has separated the target sound, like the first to seventh embodiments, voice recognition can be performed using an acoustic model obtained by performing an adaptation process or a learning process beforehand.

According to such an eighth embodiment, the following effectiveness can be achieved. Namely, because the sound source separation system 1000 has the first sensitive region formation signal generator 1001, the second sensitive region formation signal generator 1002 and the sensitive region integration unit 1003, the sensitive region can be formed by performing directivity control appropriate for separation of the target sound and the disturbance sound using the received sound signals of the three microphones 1021, 1022, 1023. This results in precise separation of the target sound and the disturbance sound.

Furthermore, the number of the microphones to be used in the sound source separation system 1000 is three, and sound source separation is realized with the few microphones, resulting in miniaturization of a device.

Ninth Embodiment

FIG. 35 illustrates the general structure of a sound source separation system 1100 according to the ninth embodiment of the invention. FIG. 36 illustrates a sensitive region formed by the sound source separation system 1100. FIG. 37 is an explanatory diagram for a sensitive region limiting process performed through minimum level band selection in a conversation mode. FIG. 38 is an explanatory diagram for mode change performed by a sensitive region limitation unit 1104. FIG. 39 is an explanatory diagram for the sensitive region limiting process through minimum level band selection in a motion picture shooting mode.

With reference to FIG. 35, the sound source separation system 1100 comprises a total of three first, second and third microphones 1121, 1122, and 1123 disposed at respective vertices of a triangle (as an example, a right triangle or an approximately right triangle in the embodiment). All of the first, second and third microphones 1121 to 1123 are non-directional or approximately non-directional microphones in the embodiment. Arrangements of these first, second and third microphones 1121, 1122, and 1123 are the same as those in the eighth embodiment (see, FIG. 31).

The sound source separation system 1100 also comprises a first sensitive region formation signal generator 1101 which generates a first sensitive region formation signal spectrum forming, by using received sound signals of the two first and second microphones 1121, 1122, a first sensitive region along a surface C1 (the same as in FIG. 32) orthogonal to a line connecting these microphones 1121, 1122, a second sensitive region formation signal generator 1102 which generates a second sensitive region formation signal spectrum forming, by using received sound signals of the two second and third microphones 1122, 1123, a second sensitive region along a surface C2 (same as the case in FIG. 32) orthogonal to a line connecting microphones 1122, 1123, and a sensitive region integration unit 1103 which forms a sensitive region for separating a target sound at a common part (intersecting part) of the first and second sensitive regions (the second sensitive region is limited more than that in the eighth embodiment) by using the first sensitive region formation signal spectrum generated by the first sensitive region formation signal generator 1101 and the second sensitive region formation signal spectrum generated by the second sensitive region formation signal generator 1102.

Like the first sensitive region formation signal generator 1001 in the eighth embodiment, the first sensitive region formation signal generator 1101 performs the same processes as those of the sound source separation system 300 (see, FIG. 12) in the third embodiment, using the received sound signals of the two first and second microphones 1121, 1122, and generates, as the first sensitive region formation signal spectrum $S_1$, the same spectrum as that of the target sound obtained by the separation practiced by the sound source separation system 300 in the third embodiment. Namely, the same processes as those in the third embodiment are performed with the two first and second microphones 1121, 1122 caused to correspond to the respective microphones 321, 322 of the sound source separation system 300 in the third embodiment.

Although the second sensitive region formation signal generator 1102 has approximately the same configuration as that of the second sensitive region formation signal generator 1002 in the eighth embodiment, the second sensitive region formation signal generator 1102 has a partially different configuration. Namely, the separation unit 360A of the second sensitive region formation signal generator 1002 in the eighth embodiment has the integration unit 363A which performs the spectrum integration process, but the separation unit 360B of the second sensitive region formation signal generator 1102 in the embodiment has a sensitive region limitation unit 1104, instead of the integration unit 363A. The other configurations are the same as those of the second sensitive region formation signal generator 1002 in the eighth embodiment, the same processes other than the spectrum integration process as those of the sound source separation system 300 (see, FIG. 12) in the third embodiment are performed, using the received sound signals of the two second and third microphones 1122, 1123, and a spectrum $S_2$ of the second sensitive region formation signal is generated. Namely, the same processes as those other than the spectrum integration process in the third embodiment are performed with the two third and second microphones 1123, 1122 being caused to correspond to the respective microphones 321, 322 in the sound source separation system 300 in the third embodiment, and then a process by the sensitive region limitation unit 1104 is performed. Consequently, in FIG. 35, portions where the same processes as those of the sound source separation system 300 (see, FIG. 12) in the third embodiment are performed are denoted by the same names and the same reference numerals (note that, however, a reference symbol B is suffixed to each reference numeral symbol in order to distinguish the components from those of the first sensitive region formation signal generator 1101) and detailed explanations thereof are omitted.

The sensitive region limitation unit 1104 performs the sensitive region limitation process of limiting the second sensitive region to either of a region on a second microphone 1122 side or a region on a third microphone 1123 side. Namely, the sensitive region limitation unit 1104 limits the second sensitive region to either one of the regions with the surface C2 (see FIG. 32) of the center of the second sensitive region formed by the second sensitive region formation signal generator 1002 in the eighth embodiment taken as a boundary.

More specifically, when limiting the second sensitive region to the second microphone 1122 side, the sensitive region limitation unit 1104 performs the following process. Namely, the sensitive region limitation unit 1104 compares powers at the same frequency band for each frequency band between a spectrum $S_A$ of a sound on one side (third microphone 1123 side) including the target sound separated by the first separation unit 361B of the second sensitive region formation signal generator 1102 and a spectrum $S_B$ of a sound on the other side (second microphone 1122 side) including the target sound separated by the second separation unit 362B of the second sensitive region formation signal generator 1002. With respect to a frequency band where power of the spectrum $S_A$ of the sound on one side (the third microphone 1123 side) including the target sound separated by the first separation unit 361B is smaller than power of the spectrum $S_B$ of the sound on the other side (the third microphone 1122 side) including the target sound separated by the second separation unit 362B, the sensitive region limitation unit 1104 performs minimum level band selection (BS-MIN) of assigning the smaller power to the spectrum $S_A$, and causes the obtained spectrum (part of the spectrum $S_A$ before the process) to serve as the spectrum $S_2$ of the second sensitive region formation signal.

As shown in, for example, FIG. 37, let largeness of powers of the individual frequency bands of the spectrum $S_A$ of the sound on one side (the third microphone 1123 side) including the target sound separated by the first separation unit 361B be $S_A(\mathbf{1})$, $S_A(\mathbf{2})$, $S_A(\mathbf{3})$, $S_A(\mathbf{4})$, $S_A(\mathbf{5})$, . . . and largeness of powers of the individual frequency bands of the spectrum $S_B$ of the sound on the other side (the second microphone 1122 side) be $S_B(\mathbf{1})$, $S_B(\mathbf{2})$, $S_B(\mathbf{3})$, $S_B(\mathbf{4})$, $S_B(\mathbf{5})$, . . . then powers at the same frequency band are compared with each other. That is, $S_A(\mathbf{1})$ and $S_B(\mathbf{1})$ are compared and $S_A(\mathbf{2})$ and $S_B(\mathbf{2})$ are compared. The same is true on other frequency bands. Then, if $S_A(\mathbf{1})<S_B(\mathbf{1})$, $S_A(\mathbf{2})>S_B(\mathbf{2})$, $S_A(\mathbf{3})<S_B(\mathbf{3})$, $S_A(\mathbf{4})<S_B(\mathbf{4})$ and $S_A(\mathbf{5})>S_B(\mathbf{5})$ . . . , the spectrum $S_A$ of the sound on one side (the third microphone 1123 side) including the target sound separated by the first separation unit 361B is focused on, only when the power of $S_A$ is smaller than the power of $S_B$ in each frequency band, $S_A(\mathbf{1})$, $S_A(\mathbf{3})$, $S_A(\mathbf{4})$ . . . that are the powers at the same the frequency bands are assigned to the spectrum $S_A$ and the powers of the other frequency bands (frequency band where the power of $S_A$ is lager than the power of $S_B$) are caused to be zero, and the spectrum thus obtained is defined as the spectrum $S_2$ of the second sensitive region formation signal. In this case, the spectrum $S_B$ of the sound on the other side (the second microphone 1122 side) including the target sound separated by the second separation unit 362B is not utilized and abandoned.

In focusing the spectrum $S_A$ of the sound on the one side (third microphone 1123 side) including the target sound separated by the first separation unit 361B, performing minimum level band selection (BS-MIN), and causing the spectrum (part of the spectrum $S_A$ before the processing) thus obtained to serve as the spectrum $S_2$ of the second sensitive region formation signal, a sound in the part H in FIG. 33 can be captured, and a sensitive region can be formed in the direction H, thus limiting the second sensitive region to the region on the second microphone 1122 side. In other word, the region on the third microphone 1123 side can be eliminated from the second sensitive region. The part H in FIG. 33 represents directional characteristic of a cardioid (a heart-shaped curve) formed by performing a delayed process on the received sound signal of the second microphone 1122 by the first target sound superior signal generator 331B of the second sensitive region formation signal generator 1102, and eventually, the second sensitive region can be limited to a region on a microphone side subjected to the delayed process for generating the target sound superior signal.

On the contrary, when limiting the second sensitive region to a region where the third microphone 1123 is provided, the sensitive region limitation unit 1104 performs the following processes. Namely, between the spectrum $S_A$ of the sound on one side (third microphone 1123 side) including the target sound separated by the first separation unit 361B of the second sensitive region formation signal generator 1102 and the spectrum $S_B$ of the sound on the other side (second microphone 1122 side) including the target sound separated by the second separation unit 362B of the second sensitive region formation signal generator 1102, powers at the same frequency band are compared with each other for each frequency band, and with respect to the frequency band where the power of the spectrum $S_B$ of the sound on the other side (the second microphone 1122 side) including the target sound separated by the second separation unit 362B is smaller than that of the spectrum $S_A$ of the sound on the one side (the third microphone 1123 side) including the target sound separated by the first separation unit 361B, minimum level band selection (BS-MIN) of assigning the smaller power to the spectrum $S_B$ is performed, thus causing the obtained spectrum (part of the spectrum $S_B$ before processing) to serve as the spectrum $S_2$ of the second sensitive region forming signal.

As shown in FIG. 39, e.g., powers at the same frequency band are compared with each other between the spectrum $S_A$ and the spectrum $S_B$ like the case shown in FIG. 37. That is, $S_A(\mathbf{1})$ and $S_B(\mathbf{1})$ are compared and $S_A(\mathbf{2})$ and $S_B(\mathbf{2})$ are compared. The same is true on the other frequency bands. Then, when $S_A(\mathbf{1})<S_B(\mathbf{1})$, $S_A(\mathbf{2})>S_B(\mathbf{2})$, $S_A(\mathbf{3})<S_B(\mathbf{3})$, $S_A(\mathbf{4})<S_B(\mathbf{4})$, $S_A(\mathbf{5})>S_B(\mathbf{5})$ . . . , the spectrum $S_B$ of the sound on the other side (the second microphone 1122 side) including the target sound separated by the second separation unit 362B is focused, only when the power of $S_B$ is smaller than that of $S_A$ at each frequency band, $S_B(\mathbf{2})$, $S_B(\mathbf{5})$ . . . that are the powers at those frequency bands are assigned to the spectrum $S_B$, while powers at the other frequency bands (frequency band where the power of $S_B$ is lager than that of $S_A$) are caused to be zero. A spectrum thus obtained is caused to serve as the spectrum $S_2$ of the second sensitive region formation signal. Note that in this case, the spectrum $S_A$ of the sound on the one side (third microphone 1123 side) including the target sound separated by the first separation unit 361B is not utilized and abandoned.

In a case where the spectrum $S_B$ of the sound on the other side (second microphone 1122 side) including the target sound separated by the second separation unit 362B is focused, minimum level band selection (BS-MIN) is performed, and the obtained spectrum (part of the spectrum $S_B$ before processing) is caused to serve as the spectrum $S_2$ of the second sensitive region formation signal, a sound in the G parts in FIG. 33 can be captured to form a sensitive region in this direction, thus limiting the second sensitive region to the region on the third microphone 1123 side. In other word, a region where the second microphone 1122 is provided can be eliminated from the second sensitive region. The parts G in FIG. 33 represents a directional characteristic with a cardioid (a heart-shaped curve) formed by performing the delayed process on the received sound signal of the third microphone 1123 by the second target sound superior signal generator 332B of the second sensitive region formation signal generator 1102. Eventually, the second sensitive region can be limited to a region of a microphone side subjected to the delayed process for generating the target sound superior signal.

Further, the sensitive region limitation unit 1104 may be capable of changing over limitation of the second sensitive region to either of the region on the second microphone 1122 side and the region on the third microphone 1123 side. For example, as shown in FIG. 38, in the conversation mode, the second sensitive region is limited to the second microphone

1122 side and the second sensitive region is formed in a direction at an angle ϕ nearer to the opposite side of a screen display unit 1184 than a normal line k of the front face 1182 of a cellular phone 1180. The second sensitive region limited to the direction of the angle ϕ is also formed at the rear face 1183 side of the cellular phone 1180. On the contrary, in the motion picture shooting mode, the second sensitive region is limited to the third microphone 1123 side, and the second sensitive region is formed in the direction at the angle ϕ nearer to the side of the screen display unit 1184 than the normal line K of the front face 1182 of the cellular phone 1180. In addition, the second sensitive region limited to the direction at the angle ϕ is also formed at the rear face 1183 side of the cellular phone 1180. This allows a user who holds the cellular phone 1180 by hands to capture sounds uttered by the user while viewing the screen display unit 1184, precisely in the conversation mode. On the other hand, in the motion picture shooting mode, the user holding the cellular phone 1180 by hands can capture sounds coming from a direction of a photographic subject while shooting the photographic subject by a camera 1187 provided at the rear face the screen display unit 1184, precisely.

Like the case of the sensitive region integration unit 1003 in the eighth embodiment, the sensitive region integration unit 1003 (1103) performs a spectrum integration process (minimization) of comparing the powers of the spectrums for each frequency band, using the spectrum S1 of the first sensitive region formation signal generated by the first sensitive region formation signal generator 1001 (1101) and the spectrum S2 of the second sensitive region formation signal generated by the second sensitive region formation signal generator 1002 (1102), and assigning inferior power to a spectrum S3 of the target sound (see, FIG. 34).

According to such a ninth embodiment, the target sound separation system 1100 performs the separation process of the target sound and a disturbance sound in the following manner.

First, the first sensitive region formation signal generator 1101 generates the spectrum $S_1$ of the first sensitive region formation signal. In parallel with this, the second sensitive region formation signal generator 1102 generates the spectrum $S_2$ of the second sensitive region formation signal. At this time, the second sensitive region is limited to the region on the second microphone 1122 side or to the region on the third microphone 1123 side by the sensitive region formation signal generator 1104.

Thereafter, the sensitive region integration unit 1003 (1103) performs a spectrum integration process (minimization) of comparing the powers of the spectrums for each frequency band, using the spectrum S1 of the first sensitive region formation signal generated by the first sensitive region formation signal generator 1001 (1101) and the spectrum S2 of the second sensitive region formation signal generated by the second sensitive region formation signal generator 1002 (1102), and assigning inferior power to a spectrum S3 of the target sound. As a result, for example, when the second sensitive region has been limited to a region of the second microphone 1122 side by the sensitive region limitation unit 1104, in the common part (the intersecting part) of the first sensitive region formed along the plane C1 (see FIG. 32) of the center of the first sensitive region and second sensitive region formed along the center of the plane C2 of the center of the second sensitive region and is limited nearer to the region of the second microphone 1122 side than the plane C2 of this center, a sensitive region subsequent to spectrum integration is formed as shown by solid lines in FIG. 36. On the contrary, when the second sensitive region has been limited to a region on the third microphone 1123 side by the sensitive region limitation unit 1104, a sensitive region subsequent to spectrum integration is formed as shown by a chain double-dashed line in FIG. 36.

After the sensitive region integration unit 1103 has separated the target sound, like the first to eighth embodiments, voice recognition using an acoustic model obtained by performing an adaptation process or a learning process beforehand can be performed.

According to the ninth embodiment described above, the following effectiveness can be achieved. Namely, because the sound source separation system 1100 has the first sensitive region formation signal generator 1101, the second sensitive region formation signal generator 1102 and the sensitive region integration unit 1103, a sensitive region can be formed by performing directivity control appropriate for separation of the target sound and the disturbance sound, using the received sound signals of the three microphones 1121, 1122, 1123. This results in precise separation of the target sound and the disturbance sound.

Further, the number of the microphones used in the sound source separation system 1100 is three, and sound source separation is realized with the few microphones, resulting in miniaturization of a device.

Tenth Embodiment

FIG. 40 illustrates the general structure of a sound source separation system 1200 according to the tenth embodiment of the invention. FIG. 41 illustrates a sensitive region formed by the sound source separation system 1200.

With reference to FIG. 40, the sound source separation system 1200 comprises a total of three first, second and third microphones 1221, 1222, and 1223 disposed at respective vertices of a triangle (as an example, an isosceles triangle or an approximately isosceles triangle in the embodiment). All of the first, second and third microphones 1221 to 1223 are non-directional or approximately non-directional microphones in the embodiment. All of the first, second and third microphones 1221 to 1223 are disposed on a surface orthogonal to or approximately orthogonal to a direction from which the target sound comes. In the example shown in the figure, the target sound is set as to come from a direction of a normal line of a front face 1282 of a cellular phone 1280, so that all of the first, second and third microphones 1221, 1222, 1223 are provided on the front face 1282. Accordingly, a line connecting the first and second microphones 1221, 1222 is orthogonal to or approximately orthogonal to the direction from which the target sound comes, and a line connecting the second and third microphones 1222, 1223 and a line connecting the first and third microphones 1221, 1223 are also orthogonal to or approximately orthogonal to the direction from which the target sound comes. Consequently, in considering only the first and second microphones 1221, 1222, the relationship between the direction from which the target sound comes and the microphone arrangement positions in the embodiment is the same as that in the third embodiment (see, FIG. 12) and also the same is true for the second and third microphones 1222, 1223 only and further for the first and third microphones 1221, 1223 only. If the correlation between the direction from which the target sound comes and the microphone arrangement positions satisfies the relationship shown in FIG. 40, the directional characteristics to be formed remain unchanged. Hence, the microphones may be disposed at any positions P1 to P34 shown in FIG. 60.

The sound source separation system 1200 further comprises a first sensitive region formation signal generator 1201 which generates a first sensitive region formation signal spectrum for forming, by using received sound signals of the two first and second microphones 1221, 1222, a first sensitive region along a plain C1 (see FIG. 41) orthogonal to the line connecting the microphones 1221, 1222, a second sensitive region formation signal generator 1202 which generates a second sensitive region formation signal spectrum for forming, by using received sound signals of the two second and third microphones 1222, 1223, a second sensitive region along a plane C2 (see FIG. 41) orthogonal to the line connecting the microphones 1222, 1223, a third sensitive region formation signal generator 1203 which generates a third sensitive region formation signal spectrum for forming, by using received sound signals of the two first and third microphones 1221, 1223, a third sensitive region along a plane C3 (see FIG. 41) orthogonal to the line connecting the microphones 1221, 1223, and a sensitive region integration unit 1204 which forms a sensitive region for separating the target sound at a common part (an intersecting part) of the first, second and third sensitive regions by using the first, second and third sensitive region formation signal spectra generated by the first, second and third sensitive region formation signal generators 1201, 1202, 1203, respectively.

Like the first sensitive region formation signal generator 1001 in the eighth embodiment, the first sensitive region formation signal generator 1201 performs the same processes as those of the sound source separation system 300 (see FIG. 12) in the third embodiment, using the received sound signals of the two first and second microphones 1221, 1222 to generate, as a spectrum $S_1$ of the first sensitive region formation signal, the same spectrum as that of the target sound obtained through separation by the sound source separation system 300 in the third embodiment. Namely, the same processes as in the third embodiment are performed with the two first and second microphones 1221, 1222 caused to correspond to the respective microphones 321, 322 of the sound source separation system 300 in the third embodiment.

The second sensitive region formation signal generator 1202 employs the same structure as that of the second sensitive region formation signal generator 1102 (see, FIG. 35) in the ninth embodiment. Accordingly, the second sensitive region formation signal generator 1202 basically has the same structure as that of the second sensitive region formation signal generator 1002 in the eighth embodiment but has a partially different structure. Namely, the separation unit 360A of the second sensitive region formation signal generator 1002 in the eighth embodiment has the integration unit 363A which performs a spectrum integration process, but the separation unit 360C of the second sensitive region formation signal generator 1202 in the embodiment has a sensitive region limitation unit 1205 instead of the integration unit 363A. The other structures are the same as those of the second sensitive region formation signal generator 1002 in the eighth embodiment. Thus, using the received sound signals of the two second and third microphones 1222, 1223, the same processes as those of the sound source separation system 300 (see FIG. 12) in the third embodiment other than the spectrum integration process are performed to generate a spectrum $S_2$ of the second sensitive region formation signal. Namely, other than the spectrum integration process, the same processes as those in the third embodiment are performed with the two third and second microphones 1223, 1222 caused to correspond to each of the microphones 321, 322 of the sound source separation system 300 in the third embodiment, and then a process is executed by the sensitive region limitation unit 1205. Consequently, in FIG. 40, portions where the same processes as those of the sound source separation system 300 (see, FIG. 12) in the third embodiment are performed are labeled and denoted by the same names and the same reference numerals (note that, however, a reference symbol C is suffixed to each reference numeral in order to distinguish the components from those of the first sensitive region formation signal generator 1201) and detailed explanations thereof are omitted.

The sensitive region limitation unit 1205 has the same structure as that of the sensitive region limitation unit 1104 in the ninth embodiment, and performs a sensitive region limitation process of limiting the second sensitive region to any one of a region on the second microphone 1222 side and region on the third microphone 1223 side by performing minimum level band selection (BS-MIN). Namely, the sensitive region limitation unit 1205 limits the second sensitive region to either one of the regions with the plane C2 (see FIG. 41), caused to function as a boundary, of the center of the second sensitive region formed by the second sensitive region formation signal generator 1202.

The third sensitive region formation signal generator 1203 has the same structure as that of the second sensitive region formation signal generator 1102 (see, FIG. 35) in the ninth embodiment like the second sensitive region formation signal generator 1202. Accordingly, the second sensitive region formation signal generator 1203 basically has the same structure as that of the second sensitive region formation signal generator 1002 in the eighth embodiment, but has a partially different structure. Namely, the separation unit 360A of the second sensitive region formation signal generator 1002 in the eighth embodiment has the integration unit 363A which performs the spectrum integration process, but the separation unit 360D of the third sensitive region formation signal generator 1203 in the embodiment has a sensitive region limitation unit 1206 instead of the integration unit 363A. The other structures are the same as those of the second sensitive region formation signal generator 1002 in the eighth embodiment. So, using the received sound signals of the two first and third microphones 1221, 1223, the same processes as those of the sound source separation system 300 (see, FIG. 12) in the third embodiment are performed other than the spectrum integration process, to generate a spectrum $S_3$ of the third sensitive region formation signal. Namely, the same processes as those of the third embodiment are performed other than the spectrum integration process with the two third and first microphones 1123, 1121 being caused to correspond to the respective microphones 321, 322 of the sound source separation system 300 in the third embodiment. Thereafter, a process by the sensitive region limitation unit 1206 is executed. Consequently, in FIG. 40, portions where the same processes as those of the sound source separation system 300 (see FIG. 12) in the third embodiment are performed are labeled and denoted by the same names and the same reference numerals (note that, however, a reference symbol D is suffixed to each reference numeral symbol in order to distinguish the components from those of the first and second sensitive region formation signal generators 1201, 1202) and detailed explanations thereof are omitted.

Like the sensitive region limitation unit 1205, the sensitive region limitation unit 1206 has the same structure as that of the sensitive region limitation unit 1104 in the ninth embodiment, and performs the sensitive region limiting process of limiting the third sensitive region to either one of a region on the first microphone 1221 side and region on the third microphone 1223 side by performing minimum level band selection (BS-MIN). Namely, the sensitive region limitation unit 1206 limits the third sensitive region to either one of the regions with the plane C3 (see FIG. 41), caused to serve as a boundary, of the center of the third sensitive region formed by the third sensitive region formation signal generator 1203.

Like the sensitive region limitation unit 1104 in the ninth embodiment, the sensitive region limitation units 1205, 1206 may be capable of changing limitation of the second sensitive region to either one of the regions on the second microphone 1222 side and on the third microphone 1223 side or may capable of changing limitation of the third sensitive region to either one of the regions on the first microphone 1221 side and on the third microphone 1223 side. Such structures enables mode change between the conversation mode and the motion picture shooting mode like the ninth embodiment.

Instead of the sensitive region limitation units 1205, 1206, like the eighth embodiment (see, FIG. 31), an integration unit which performs the spectrum integration process through addition or minimization may be provided. This enables the second and third sensitive regions which are not limited and the first sensitive region to be integrated together like the eighth embodiment.

Like the sensitive region integration unit 1003 (see, FIG. 31) in the eighth embodiment, using the first sensitive region formation signal spectrum $S_1$ generated by the first sensitive region formation signal generator 1201, the second sensitive region formation signal spectrum $S_2$ generated by the second sensitive region formation signal generator 1202, and the third sensitive region formation signal spectrum $S_3$ generated by the third sensitive region formation signal generator 1203, the sensitive region integration unit 1204 performs the spectrum integration process (minimization) of comparing powers for each frequency band and of assigning the inferior power to the spectrum $S_4$ of the target sound (see, FIG. 34).

According to such a tenth embodiment, the sound source separation system 1200 performs the separation process of the target sound and a disturbance sound in the following manner.

First, the first sensitive region formation signal generator 1201 generates the spectrum $S_1$ of the first sensitive region formation signal. In parallel with this, the second sensitive region formation signal generator 1202 generates the spectrum $S_2$ of the second sensitive region formation signal. Further, at the same time, the third sensitive region formation signal generator 1203 generates the spectrum $S_3$ of the third sensitive region formation signal. At this time, by the sensitive region formation signal generators 1205, 1206, the second and third sensitive regions are limited to the region at the second microphone 1222 side or the region at the third microphone 1223 side and are limited to the region at the first microphone 1221 side or the region at the third microphone 1223 side.

Subsequently, using the first sensitive region formation signal spectrum $S_1$ generated by the first sensitive region formation signal generator 1201 and the second sensitive region formation signal spectrum $S_2$ generated by the second sensitive region formation signal generator 1202, and the third sensitive region formation signal spectrum $S_3$ generated by the third sensitive region formation signal generator 1203, the sensitive region integration unit 1204 performs the spectrum integration process (minimization) of comparing powers for each frequency band, and assigning the inferior power to the spectrum $S_4$ of the target sound. As a result, for example, when the second sensitive region has been limited to the region on the second microphone 1222 side and the third sensitive region has been limited to the region on the first microphone 1223 side by the sensitive region limitation unit 1205, at the common part (intersecting part) of the first sensitive region formed along the plane C1 (see FIG. 41) of the center of the first sensitive region, the second sensitive region formed along the plane C2 of the center of the second sensitive region and limited nearer to the region of the second microphone 1222 side than the plane C2 of this center, and the third sensitive region formed along the plane C3 of the center of the third sensitive region and limited nearer to the region of the first microphone 1221 side than the plane C3 of this center, a sensitive region subsequent to spectrum integration is formed as shown by solid lines in FIG. 41. On the contrary, when the second and third sensitive regions has been limited to the opposite region by the sensitive region limitation units 1205, 1206, a sensitive region subsequent to spectrum integration is formed as shown by a chain double-dashed lines in FIG. 41.

After the sensitive region integration unit 1204 has separated the target sound, like the first to ninth embodiments, voice recognition using an acoustic model obtained by performing an adaptation process or a learning process beforehand can be performed.

According to such a tenth embodiment, the following effectiveness can be achieved. Namely, because the sound source separation system 1200 has the first sensitive region formation signal generator 1201, the second sensitive region formation signal generator 1202, the third sensitive region formation signal generator 1203, and the sensitive region integration unit 1204, the sensitive region can be formed by performing directivity control appropriate for separation of the target sound and the disturbance sound, using the received sound signals of the three microphones 1221, 1222, 1223. This results in precise separation of the target sound and the disturbance sound.

Further, the number of the microphones used in the sound source separation system 1200 is three, and sound source separation can be realized with the few microphones, resulting in miniaturization of a device.

Eleventh Embodiment

FIG. 42 illustrates the general structure of a sound source separation system 1300 according to the eleventh embodiment of the present invention. FIG. 43 illustrates directional characteristics of first and second target sound superior signals, target sound inferior signal and control target sound superior signal.

With reference to FIG. 42, the sound source separation system 1300 comprises a total of three first, second and third microphones 1321, 1322, and 1323 disposed at the respective vertices of a triangle (as an example, a right triangle or an approximate right triangle in the embodiment). All of the first, second and third microphones 1321 to 1323 are non-directional or approximately non-directional microphones in the embodiment. In these three microphones 1321, 1322, 1323, the first and second microphones 1321, 1322 are disposed side by side in a direction orthogonal to or approximately orthogonal to a direction from which the target sound comes. The second and third microphones 1322, 1323 are disposed side by side in the direction from which the target sound comes or in the direction approximate to the same. Consequently, in considering only the first and second microphones 1321, 1322, the relationship between the direction from which the target sound comes and the microphone arrangement positions is the same as that of the third embodiment (see, FIG. 12). In the example shown in the figure, the target sound is set as to come in parallel with a front face 1382 of a cellular phone 1380 and from a downside of the cellular phone 1380. Hence, all of the three microphones 1321, 1322, 1323 are provided on the front face 1382. As shown in FIG. 42, the target sound may be set as to come from a normal line direction of a front face 1382A of a cellular phone 1380A, and in this case, the first and second microphones 1321, 1322 may be provided on a front face side, while the third microphone 1323 may be provided on a rear face 1382A. In essence, if the correlation between the direction from which the target sound comes and the microphone arrangement positions satisfies the relationship shown in FIG. 42, the directional characteristics to be formed remain unchanged. Hence, the microphones may be disposed at any positions P1 to P34 shown in FIG. 60.

The sound source separation system 1300 further comprises an orthogonal-disturbance-sound-suppressing-signal generator 1301 that generates an orthogonal-disturbance-sound suppressing signal for suppressing an orthogonal-disturbance sound coming from in a direction orthogonal to the direction from which the target sound comes, using received sound signals of the two first and second microphones 1321, 1322, an opposite-disturbance-sound-suppressing-control-signal generator 1302 that generates a control signal for suppressing the opposite disturbance sound coming from a direction opposite to the direction from which the target sound comes, using received sound signals of the two second and third microphones 1322, 1323, and an opposite-disturbance-sound-suppressing unit 1303 that suppresses an opposite disturbance sound spectrum included in an orthogonal-disturbance-sound-suppressing-signal spectrum, using a spectrum of the orthogonal-disturbance-sound suppressing signal generated by the orthogonal-disturbance-sound-suppressing-signal generator 1301 and a spectrum of a control signal generated by the opposite-disturbance-sound-suppressing-control-signal generator 1302.

Using the received sound signals of the two first and second microphones 1321, 1322, the orthogonal-disturbance-sound-suppressing-signal generator 1301 performs the same processes as those of the sound source separation system 300 (see, FIG. 12) in the third embodiment to generate, as a orthogonal-disturbance-sound-suppressing-signal spectrum $S_1$, the same spectrum as that of the target sound obtained through separation by the sound source separation system 300 in the third embodiment. Namely, the same processes as those of the third embodiment are performed with the two first and second microphones 1321, 1322 being caused to correspond to the respective microphones 321, 322 of the sound source separation system 300 in the third embodiment. Consequently, in FIG. 42, portions where the same processes as those of the sound source separation system 300 (see, FIG. 12) in the third embodiment are performed are labeled and denoted by the same names and the same reference numerals, and detailed explanations thereof are omitted.

The opposite-disturbance-sound-suppressing-control-signal generator 1302 has a control target-sound-superior-signal generator 1304 that generates a control target-sound-superior signal by acquiring a difference between a signal (on a time domain) produced after a delayed process has been applied to the received sound signal (on a time domain) of the third microphone 1323 and the received sound signal (on a time domain) of the second microphone 1322, and a frequency analyzer 1305 that performs frequency analysis on a control target-sound-superior signal, on a time domain, generated by the control target-sound-superior-signal generator 1304.

The control target-sound-superior signal generated by the control target-sound-superior-signal generator 1304 has the directional characteristic of a cardioid (heart-shaped curved line) that expands largely in the direction from which the target sound comes and becomes narrow in an opposite disturbance sound coming direction, as shown by a chain double-dashed line in FIG. 43. Further, the other signals' directional characteristics shown in FIG. 43 are the same as those in the third embodiment (see, FIG. 13). The process performed by the control target-sound-superior-signal generator 1304 may be a digital process or an analog process, and the process is executed on a time domain in the embodiment but may be executed on a frequency domain.

In order to suppress the opposite-disturbance-sound spectrum included in the orthogonal-disturbance-sound-suppressing-signal spectrum $S_1$, the opposite-disturbance-sound-suppressing unit 1303 compares powers at the same frequency band between the orthogonal-disturbance-sound-suppressing signal spectrum $S_1$ generated by the orthogonal-disturbance-sound-suppressing-signal generator 1301 and the control-target-sound-superior-signal spectrum $S_2$ generated by the opposite-disturbance-sound-suppressing-control-signal generator 1302, for each frequency band. With respect to a frequency band where power of the orthogonal-disturbance sound suppressing signal spectrum $S_1$ is smaller than power of the control signal spectrum $S_2$, the opposite-disturbance-sound suppressing unit 1303 performs minimum level band selection (BS-MIN), and causes the obtained spectrum (part of the spectrum $S_1$ before processing) to serve as a separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only as the control signal and therefore is not utilized and abandoned.

According to the eleventh embodiment, the sound source separation system 1300 performs the separation process for the target sound and a disturbance sound in the following manner.

First, the orthogonal-disturbance-sound-suppressing-signal generator generates the orthogonal-disturbance-sound-suppressing-signal spectrum $S_1$. In parallel with this, the opposite-disturbance-sound-suppressing-control-signal generator 1302 generates the control-target-sound-superior-signal spectrum $S_2$.

Subsequently, the opposite-disturbance-sound-suppressing unit 1303 performs minimum level band selection (BS-MIN), using the control-target-sound-superior-signal spectrum $S_2$, to suppress the opposite-disturbance-sound spectrum included in the orthogonal-disturbance-sound-suppressing-signal spectrum $S_1$, thus obtaining the separated target sound spectrum $S_3$.

After the opposite-disturbance-sound-suppressing unit 1303 has separated the target sound, like the first to tenth embodiments, voice recognition using an acoustic model obtained by performing an adaptation process or a learning process beforehand can be performed.

According to such an eleventh embodiment, the following effectiveness can be achieved. Namely, because the sound source separation system 1300 has the orthogonal-disturbance-sound-suppressing-signal generator 1301, the opposite-disturbance-sound-suppressing-control-signal generator 1302, and the opposite-disturbance-sound suppressing unit 1303, the target sound and the disturbance sound can be separated precisely by performing directivity control appropriate for separation of the target sound and the disturbance sound, using the received sound signals of the three microphones 1321, 1322, 1323.

Further, the number of the microphones used in the sound source separation system 1400 is three, and sound source separation can be realized with the few microphones, resulting in miniaturization of a device.

Twelfth Embodiment

FIG. 44 illustrates the general structure of a sound source separation system 1400 according to the twelfth embodiment of the invention. FIG. 45 illustrates directional characteristics of first and second control target sound superior signals and first and second target sound inferior signals.

With reference to FIG. 44, the sound source separation system 1400 comprises a total of three first, second and third microphones 1421, 1422, and 1423 disposed at the respective vertices of a triangle (as an example, an isosceles triangle or an approximately isosceles triangle in the embodiment). All of the first to third microphones 1421 to 1423 are non-directional or approximately non-directional microphones in the embodiment. In these three microphones 1421, 1422, 1423, the first and second microphones 1421, 1422 are disposed side by side in a direction orthogonal to or approximately orthogonal to a direction from which the target sound comes. The second and third microphones 1422, 1423 are disposed side by side in a direction inclined with respect to the direction from which the target sound comes. Further, the first and third microphones 1421, 1423 are disposed side by side in a direction opposite to the inclined direction of the second and third microphones 1422, 1423 with respect to the direction from which the target sound comes. Consequently, in considering only the first and second microphones 1421, 1422, the relationship between the direction from which the target sound comes and the microphone arrangement positions is the same as that of the third embodiment (see, FIG. 12). In the example shown in the figure, the target sound is set as to come in parallel with a front face 1482 of a cellular phone 1480 and from a downside of the cellular phone 1480. Hence, all of the three microphones 1421, 1422, 1423 are provided on the front face 1482. As shown in FIG. 44, the target sound may be set as to come from a normal line direction of a front face 1482A of a cellular phone 1480A, and in this case, the first and second microphones 1421, 1422 may be provided on the front face 1482A, while the third microphone may be provided on a rear face 1483A. In essence, if the correlation between the direction from which the target sound comes and the microphone arrangement positions satisfies the relationship shown in FIG. 44, the directional characteristics formed remain unchanged, so that the microphones may be disposed at any positions P1 to P34 shown in FIG. 60.

The sound source separation system 1400 further comprises an orthogonal-disturbance-sound-suppressing-signal generator 1401 that generates an orthogonal-disturbance-sound suppressing signal for suppressing an orthogonal disturbance sound coming from a direction orthogonal to the direction from which the target sound comes, using received sound signals of the two first and second microphones 1421, 1422, an opposite-disturbance-sound-suppressing-control-signal generator 1402 that generates a control signal for suppressing the opposite disturbance sound coming from a direction opposite to the direction from which the target sound comes, using received sound signals of the three first, second and third microphones 1421, 1422, 1423, and an opposite-disturbance-sound suppressing unit 1403 that suppresses an opposite-disturbance sound spectrum included in an orthogonal-disturbance-sound-suppressing-signal spectrum, using a spectrum of the orthogonal-disturbance-sound suppressing signal generated by the orthogonal-disturbance-sound-suppressing-signal generator 1401 and a spectrum of a control signal generated by the opposite-disturbance-sound-suppressing-control-signal generator 1402.

Using the received sound signals of the two first and second microphones 1421, 1422, like the eleventh embodiment (see, FIG. 42), the orthogonal-disturbance-sound-suppressing-signal generator 1401 performs the same processes as those of the sound source separation system 300 (see, FIG. 12) in the third embodiment to generate, as an orthogonal-disturbance-sound-suppressing-signal spectrum $S_1$, the same spectrum as that of the target sound obtained by the separation performed by the sound source separation system 300 in the third embodiment. Namely, the same processes as those of the third embodiment are performed with the two first and second microphones 1421, 1422 being caused to correspond to the respective microphones 321, 322 of the sound source separation system 300 in the third embodiment. Consequently, in FIG. 44, portions where the same processes as those of the sound source separation system 300 (see, FIG. 12) in the third embodiment are performed are labeled and denoted by the same names and the same reference numerals, and detailed explanations thereof are omitted.

The opposite-disturbance-sound-suppressing-control-signal generator 1402 has a first control target-sound-superior-signal generator 1404 that generates a first control target-sound-superior signal by acquiring a difference between a signal (on a time domain) produced after a delayed process has been applied to the received sound signal (on a time domain) of the third microphone 1423, and the received sound signal of the second microphone 1422, a second control target-sound-superior-signal generator 1405 that generates a second control target-sound-superior signal by acquiring a difference between a signal (on a time domain) produced after a delayed process has been applied to the received sound signal (on a time domain) of the third microphone 1423, and the received sound signal (on a time domain) of the first microphone 1421, a frequency analyzer 1406 that performs frequency analysis on each of the first and second control target-sound-superior signals, on a time domain, generated by the first and second control target-sound-superior-signal generator 1404, 1405, and a control signal integration unit 1407 that performs a spectrum integration process (minimization) of comparing powers for each frequency band, using a spectrum $S_A$ of the first control target sound superior signal generated by the first control target-sound-superior-signal generator 1404 or obtained through frequency analysis by the frequency analyzer 1406, and a spectrum $S_B$ of the second control target sound superior signal generated by the second control target-sound-superior-signal generator 1405 or obtained through frequency analysis by the frequency analyzer 1406, and assigning inferior power to a spectrum of a control target sound superior signal.

Each of the first and second control target-sound-superior signals generated by the first and second control target-sound-superior-signal generators 1404, 1405 have a cardioid (a heart-like shape) directional characteristic that expands largely in the direction from which the target sound comes and becomes narrow in an opposite disturbance sound coming direction, as shown by a chain double-dashed lines in FIG. 45. The cardioid directional characteristic of the first control target-sound-superior signal inclines along a line connecting the two second and third microphones 1422, 1423, while the cardioid directional characteristic of the second control target-sound-superior signal inclines along a line connecting the two first and third microphones 1421, 1423. Further, the other signals' directional characteristics shown in FIG. 45 are the same as those in the third embodiment (see, FIG. 13). The processes executed by the first and second control target-sound-superior-signal generators 1404, 1405 may be a digital process or an analog process, and the process is executed on a time domain in the embodiment, but may be executed on a frequency domain.

In order to suppress the opposite-disturbance-sound spectrum included in the spectrum $S_1$ of the orthogonal-disturbance-sound suppressing signal, the opposite-disturbance-sound suppressing unit 1403 compares powers at the same frequency band between the spectrum $S_1$ of the orthogonal-disturbance-sound-suppressing-signal generated by the orthogonal-disturbance-sound-suppressing-signal generator 1401 and the spectrum $S_2$ of the control target-sound-superior signal generated by the opposite-disturbance-sound-suppressing-control-signal generator 1402, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1403 performs minimum level band selection (BS-MIN) of assigning the smaller power to the spectrum $S_1$, and causes the obtained spectrum (part of the spectrum $S_1$ before processing) to serve as a target sound spectrum $S_3$ separated. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to such a twelfth embodiment, the target sound separation system 1400 performs the separation process for the target sound and a disturbance sound in the following manner.

First, the orthogonal-disturbance-sound-suppressing-signal generator generates the orthogonal-disturbance-sound-suppressing-signal spectrum $S_1$. In parallel with this, the opposite-disturbance-sound-suppressing-control-signal generator 1402 generates the control target-sound-superior-signal spectrum $S_2$.

Subsequently, the opposite-disturbance-sound suppressing unit 1403 performs minimum level band selection (BS-MIN), using the control signal spectrum $S_2$, thereby suppressing the opposite disturbance sound spectrum included in the orthogonal-disturbance-sound-suppressing-signal spectrum $S_1$, and obtaining the separated target sound spectrum $S_3$.

After the opposite-disturbance-sound suppressing unit 1403 has separated the target sound, like the first to eleventh embodiments, voice recognition using an acoustic model obtained by performing an adaptation process or a learning process beforehand can be performed.

According to such a twelfth embodiment, the following effectiveness can be achieved. Namely, because the sound source separation system 1400 has the orthogonal-disturbance-sound-suppressing-signal generator 1401, the opposite-disturbance-sound-suppressing-control-signal generator 1402, and the opposite-disturbance-sound suppressing unit 1403, directivity control appropriate for separation of the target sound and the disturbance sound can be performed using the received sound signals of the three microphones 1421, 1422, 1423, thus separating the target sound and the disturbance sound precisely.

Further, the number of the microphones used in the sound source separation system 1400 is three, and sound source separation can be realized with the few microphones, resulting in miniaturization of a device.

Thirteenth Embodiment

FIG. 46 illustrates the general structure of a sound source separation system 1500 according to the thirteenth embodiment of the present invention. FIG. 47 illustrates directional characteristics of a target sound superior signal, target sound inferior signal and control target-sound-superior signal.

With reference to FIG. 46, the sound source separation system 1500 has a total of three first, second and third microphones 1521, 1522, and 1523 disposed at the respective vertices of a triangle (as an example, a right triangle or an approximately right triangle in the embodiment). All of the first to third microphones 1521 to 1523 are non-directional or approximately non-directional microphones in the embodiment. In these three microphones 1521, 1522, 1523, the first and second microphones 1521, 1522 are disposed side by side in a direction orthogonal to a direction from which the target sound comes or in the direction approximate to the same. The second and third microphones 1522, 1523 are disposed in the direction from which the target sound comes or in the direction approximate to the same. Consequently, in considering only the first and second microphones 1521, 1522, the relationship between the direction from which the target sound comes and the microphone arrangement positions is the same as that of the second embodiment (see, FIG. 9). In the example shown in the figure, the target sound is set as to come in parallel with a front face 1582 of a cellular phone 1580 and from a downside of the cellular phone 1580. Hence, all of the three microphones 1521, 1522, 1523 are provided on the front face 1482. As shown in FIG. 46, the target sound may be set as to come from a normal line direction of a front face 1582A of a cellular phone 1580A. In this case, the first and second microphones 1521, 1522 may be provided on a front face 1582A, while the third microphone 1523 may be provided on a rear face 1583A. In essence, if the correlation between the direction from which the target sound comes and the microphone arrangement positions satisfies the relationship shown in FIG. 46, the directional characteristics to be formed remain unchanged. Hence, the microphones may be disposed at any positions P1 to P34 shown in FIG. 60.

The sound source separation system 1500 further comprises an orthogonal-disturbance-sound-suppressing-signal generator 1501 that generates an orthogonal-disturbance-sound suppressing signal for suppressing an orthogonal disturbance sound coming from a direction orthogonal to the direction from which the target sound comes, using received sound signals of the two first and second microphones 1521, 1522, an opposite-disturbance-sound-suppressing-control-signal generator 1502 that generates a control signal for suppressing the opposite disturbance sound coming from a direction opposite to the direction from which the target sound comes, using received sound signals of the two second and third microphones 1522, 1523, and an opposite-disturbance-sound suppressing unit 1503 that suppresses an opposite-disturbance-sound spectrum included in an orthogonal-disturbance-sound-suppressing-signal spectrum, using an control signal spectrum generated by the orthogonal-disturbance-sound-suppressing-signal generator 1501 and a control signal spectrum generated by the opposite-disturbance-sound-suppressing-control-signal generator 1502.

Using the received sound signals of the two first and second microphones 1521, 1522, the orthogonal-disturbance-sound-suppressing-signal generator 1501 performs the same processes as those of the sound source separation system 200 (see, FIG. 9) in the second embodiment to generate, as a orthogonal-disturbance-sound-suppressing-signal spectrum $S_1$, the same spectrum as that of the target sound obtained through separation by the sound source separation system 200 in the second embodiment. Namely, the same processes as those of the second embodiment are performed with the two first and second microphones 1521, 1522 being caused to correspond to the respective microphones 221, 222 of the sound source separation system 200 in the second embodiment. Consequently, in FIG. 46, portions where the same processes as those of the sound source separation system 200 (see, FIG. 9) in the second embodiment are performed are labeled and denoted by the same names and the same reference numerals, and detailed explanations thereof are omitted.

The opposite-disturbance-sound-suppressing-control-signal generator 1502 has a control target-sound-superior-signal generator 1504 that generates a control target-sound-superior signal by acquiring a difference between a signal (on a time domain) produced after a delayed process has been applied to the received sound signal (on a time domain) of the third microphone 1523 and the received sound signal of the second microphone 1522, and a frequency analyzer 1505 that performs frequency analysis on the control target-sound-superior signal, on a time domain, generated by the control target-sound-superior-signal generator 1504.

The control target-sound-superior signal generated by the control target-sound-superior-signal generators 1504 has a cardioid-shaped (a heart-shaped curve) directional characteristic that expands largely in the direction from which the target sound comes and becomes narrow in an opposite disturbance sound coming direction, as shown by a chain double-dashed line in FIG. 47. The other signals' directional characteristics shown in FIG. 47 are the same as those in the second embodiment (see, FIG. 10). The process performed by the control target-sound-superior-signal generators 1504 may be a digital process or an analog process, and the process is executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 1503 compares powers at the same frequency band between the orthogonal-disturbance-sound-suppressing-signal spectrum $S_1$ generated by the orthogonal-disturbance-sound-suppressing-signal generator 1501 and the control target-sound-superior-signal spectrum $S_2$ generated by the opposite-disturbance-sound-suppressing-control-signal generator 1502, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1503 performs minimum level band selection (BS-MIN) of assigning the smaller power to the spectrum $S_1$ and causes the obtained spectrum (part of the spectrum $S_1$ before processing) to serve as the separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to the thirteenth embodiment, the target sound separation system 1500 performs the separation process for the target sound and a disturbance sound in the following manner.

First, the orthogonal-disturbance-sound-suppressing-signal generator generates the orthogonal-disturbance-sound-suppressing-signal spectrum $S_1$. In parallel with this, the opposite-disturbance-sound-suppressing-control-signal generator 1502 generates the control target-sound-superior-signal spectrum $S_2$.

Thereafter, the opposite-disturbance-sound suppressing unit 1503 performs minimum level band selection (BS-MIN), using the control target-sound-superior-signal spectrum $S_2$, to suppress an opposite-disturbance-sound spectrum included in the orthogonal-disturbance-sound-suppressing-signal spectrum $S_1$, thus obtaining the separated target sound spectrum $S_3$.

After the opposite-disturbance-sound suppressing unit 1503 has separated the target sound, like the first to twelfth embodiments, voice recognition using an acoustic model obtained by performing an adaptation process or a learning process beforehand can be performed.

According to such a thirteenth embodiment, the following effectiveness can be achieved. Namely, because the sound source separation system 1500 has the orthogonal-disturbance-sound-suppressing-signal generator 1501, the opposite-disturbance-sound-suppressing-control-signal generator 1502, and the opposite-disturbance-sound suppressing unit 1503, the target sound and the disturbance sound can be separated precisely by performing directivity control appropriate for separation of the target sound and the disturbance sound, using the received sound signals of the three microphones 1521, 1522, 1523.

Further, the number of the microphones used in the sound source separation system 1500 is three, and sound source separation can be realized with the few microphones, resulting in miniaturization a device.

Fourteenth Embodiment

FIG. 48 illustrates the general structure of a sound source separation system 1600 according to the fourteenth embodiment of the invention. FIG. 49 illustrates directional characteristics of a target sound superior signal, a target sound inferior signal and a control target-sound-superior signal.

With reference to FIG. 48, the sound source separation system 1600 comprises a total of three first, second and third microphones 1621, 1622, and 1623 disposed at the respective vertices of a triangle (as an example, a right triangle or an approximately right triangle in the embodiment). All of the first to third microphones 1621 to 1623 are non-directional or approximately non-directional microphones in the embodiment. In these three microphones 1621, 1622, 1623, the first and second microphones 1621, 1622 are disposed side by side in a direction from which the target sound comes or in the direction approximate to the same. The first and third microphones 1621, 1623 are disposed in a direction orthogonal to or approximately orthogonal to the direction from which the target sound comes. Consequently, the relationship between the direction from which the target sound comes and three microphones arrangement positions is the same as that of the fourth embodiment (see, FIG. 15). In the example shown in the figure, the target sound is set as to come in parallel with a front face 1682 of a cellular phone 1680 and from a downside of the cellular phone 1680. Hence, all of the three microphones 1621, 1622, 1623 are provided on the front face 1682. As shown in FIG. 48, the target sound may be set as to come from a normal line direction of a front face 1682A of a cellular phone 1680A. In this case, the first and third microphones 1621, 1623 may be disposed on a front face 1682A, while the second microphone 1623 may be disposed on a rear face 1683A. In essence, if the correlation between the direction from which the target sound comes and the microphone arrangement positions satisfies the relationship shown in FIG. 48, the directional characteristics formed remain unchanged. Hence, the microphones may be disposed at any positions P1 to P34 shown in FIG. 60.

The sound source separation system 1600 further comprises an orthogonal-disturbance-sound-suppressing-signal generator 1601 that generates an orthogonal-disturbance-sound suppressing signal for suppressing an orthogonal-disturbance sound coming from a direction orthogonal to the direction from which the target sound comes, using received sound signals of the two first and second microphones 1621, 1622, an opposite-disturbance-sound-suppressing-control-signal generator 1602 that generates a control signal for suppressing the opposite disturbance sound coming from the direction opposite to the direction from which the target sound comes, using received sound signals of the two first and second microphones 1621, 1622, and an opposite-disturbance-sound suppressing unit 1603 that suppresses an opposite-disturbance-sound spectrum included in an orthogonal-disturbance-sound-suppressing-signal spectrum, using an orthogonal-disturbance-sound-suppressing-signal spectrum generated by the orthogonal-disturbance-sound-suppressing-signal generator 1601 and a control signal spectrum generated by the opposite-disturbance-sound-suppressing-control-signal generator 1602.

Using the received sound signals of the three first, second and third microphones 1621, 1622, 1623, the orthogonal-disturbance-sound-suppressing-signal generator 1601 performs the same processes those of the sound source separation system 400 in the fourth embodiment (see FIG. 15) to generate, as a orthogonal-disturbance-sound-suppressing-signal spectrum $S_1$, the same spectrum as the target sound spectrum obtained through separation by the sound source separation system 400 in the fourth embodiment. Namely, the same processes as those of the fourth embodiment is performed with the three first, second and third microphones 1621, 1622, 1623 being caused to correspond to the respective microphones 421, 422, 423 of the sound source separation system 400 in the fourth embodiment. Consequently, in FIG. 48, portions where the same processes as those of the sound source separation system 400 (see, FIG. 15) in the fourth embodiment are performed are labeled and denoted by the same names and the same reference numerals, and detailed explanations thereof are omitted.

The opposite-disturbance-sound-suppressing-control-signal generator 1602 has a control target-sound-superior-signal generator 1604 that generates a control target-sound-superior signal by acquiring a difference between a signal (on a time domain) produced after a delayed process has been applied to the received sound signal (on a time domain) of the second microphone 1622 and the received sound signal of the first microphone 1621, and a frequency analyzer 1605 that performs frequency analysis on the control target-sound-superior signal, on a time domain, generated by the control target-sound-superior-signal generator 1604.

The control target-sound-superior signal generated by the control target-sound-superior-signal generators 1604 has a cardioid (a heart-shaped curve) directional characteristic that expands largely in the direction from which the target sound comes and becomes narrow in an opposite disturbance sound coming direction, as shown by a chain double-dashed line in FIG. 49. The other signals' directional characteristics shown in FIG. 49 are the same as those in the fourth embodiment (see, FIG. 16). The process performed by the control target-sound-superior-signal generators 1604 may be a digital process or an analog process, and the process is executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 1603 compares powers at the same frequency band between the orthogonal-disturbance-sound-suppressing-signal spectrum $S_1$ generated by the orthogonal-disturbance-sound-suppressing-signal generator 1601 and the control target-sound-superior-signal spectrum $S_2$ generated by the opposite-disturbance-sound-suppressing-control-signal generator 1602, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1603 performs minimum level band selection (BS-MIN) of assigning the smaller power to the spectrum $S_1$ and causes the obtained spectrum (part of the spectrum $S_1$ before processing) to serve as a separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to such a fourteenth embodiment, the target sound separation system 1600 performs the separation process for the target sound and a disturbance sound in the following manner.

First, the orthogonal-disturbance-sound-suppressing-signal generator generates the orthogonal-disturbance-sound-suppressing-signal spectrum $S_1$. In parallel with this, the opposite-disturbance-sound-suppressing-control-signal generator 1602 generates the control target-sound-superior-signal spectrum $S_2$.

Thereafter, the opposite-disturbance-sound suppressing unit 1603 performs minimum level band selection (BS-MIN), using the control target-sound-superior-signal spectrum $S_2$ to suppress an opposite-disturbance-sound spectrum contained in the orthogonal-disturbance-sound-suppressing-signal spectrum $S_1$, thus obtaining the separated target sound spectrum $S_3$.

After the opposite-disturbance-sound suppressing unit 1603 has separated the target sound, like the first to thirteenth embodiments, voice recognition using an acoustic model obtained by performing an adaptation process or a learning process beforehand can be performed.

According to such a fourteenth embodiment, the following effectiveness can be achieved. Namely, because the sound source separation system 1600 has the orthogonal-disturbance-sound-suppressing-signal generator 1601, the opposite-disturbance-sound-suppressing-control-signal generator 1602, and the opposite-disturbance-sound suppressing unit 1603, using the received sound signals of the three microphones 1621, 1622, 1623, directivity control appropriate for separation of the target sound and the disturbance sound can be performed, thereby separating the target sound and the disturbance sound precisely.

Further, the number of the microphones used in the sound source separation system 1600 is three, and sound source separation can be realized with the few microphones, resulting in miniaturization a device.

Fifteenth Embodiment

FIG. 50 illustrates the general structure of a sound source separation system 1700 according to the fifteenth embodiment of the invention. FIG. 51 illustrates directional characteristics of a target sound superior signal, target sound inferior signal and control target-sound-superior signal.

With reference to FIG. 50, the sound source separation system 1700 comprises a total of four microphones 1721, 1722, 1723, 1724 disposed two by two and side by side in respective first and second directions which intersect with each other. All of the first to fourth microphones 1721 to 1724 are non-directional or approximately non-directional microphones in the embodiment. In these four microphones 1721, 1722, 1723, 1724, the two first and second microphones 1721, 1722 arranged in the first direction are disposed side by side in a direction from which the target sound comes or in the direction approximate to the same. On the contrary, the third and fourth microphones 1723, 1724 arranged in the second direction are disposed in a direction orthogonal to or approximately orthogonal to the direction from which the target sound comes. Consequently, the relationship between the direction from which the target sound comes and four microphones 1721, 1722, 1723, 1724 arrangement positions is the same as that of the fifth embodiment (see, FIG. 18). In the example shown in the figure, the target sound is set as to come in parallel with a front face 1782 of a cellular phone 1780 and from a downside of the cellular phone 1780. Hence, all of the four microphones 1721, 1722, 1723, 1724 are provided on the front face 1782. In essence, if the correlation between the direction from which the target sound comes and the microphone arrangement positions satisfies the relationship shown in FIG. 50, the directional characteristics to be formed remain unchanged. Hence, the microphones may be disposed at any positions P1 to P34 shown in FIG. 60.

The sound source separation system 1700 further comprises an orthogonal-disturbance-sound-suppressing-signal generator 1701 that generates an orthogonal-disturbance-sound suppressing signal for suppressing an orthogonal-disturbance sound coming from a direction orthogonal to the direction from which the target sound comes, using received sound signals of the four first, second, third and fourth microphones 1721, 722, 1723, 1724, an opposite-disturbance-sound-suppressing-control-signal generator 1702 that generates a control signal for suppressing an opposite disturbance sound coming from a direction opposite to the direction from which the target sound comes, using received sound signals of the two first and second microphones 1721, 1722, and an opposite-disturbance-sound suppressing unit 1703 that suppresses an opposite-disturbance sound spectrum included in an orthogonal-disturbance-sound-suppressing-signal spectrum, using a orthogonal-disturbance-sound-suppressing-signal spectrum generated by the orthogonal-disturbance-sound-suppressing-signal generator 1701 and a control signal spectrum generated by the opposite-disturbance-sound-suppressing-control-signal generator 1702.

Using the received sound signals of the four first, second, third and fourth microphones 1721, 1722, 1723, 1724, the orthogonal-disturbance-sound-suppressing-signal generator 1701 performs the same processes as those of the sound source separation system 500 (see, FIG. 18) in the fifth embodiment to generate, as an orthogonal-disturbance-sound-suppressing-signal spectrum $S_1$, the same spectrum as a target sound spectrum obtained through separation by the sound source separation system 500 in the fifth embodiment. Namely, the same processes as those of the fifth embodiment are performed with the four first, second, third and fourth microphones 1721, 1722, 1723, 1724 being caused to correspond to the respective microphones 521, 522, 523, 524 of the sound source separation system 500 in the fourth embodiment. Consequently, in FIG. 50, portions where the same processes as those of the sound source separation system 500 (see, FIG. 18) in the fifth embodiment are performed are labeled and denoted by the same names and the same reference numerals, and detailed explanations thereof are omitted.

The opposite-disturbance-sound-suppressing-control-signal generator 1702 has a control target-sound-superior-signal generator 1704 that generates a control target-sound-superior signal by acquiring a difference between a signal (on a time domain) produced after a delayed process has been applied to the received sound signal (on a time domain) of the second microphone 1722 and a received sound signal of the first microphone 1721, and a frequency analyzer 1705 that performs frequency analysis on the control target-sound-superior signal, on a time domain, generated by the control target-sound-superior-signal generator 1704.

The control target-sound-superior signal generated by the control target-sound-superior-signal generators 1704 has a cardioid (a heart-shaped curve) directional characteristic that expands largely in the direction from which the target sound comes and becomes narrow in an opposite disturbance sound coming direction, as shown by a chain double-dashed line in FIG. 51. The other signals' directional characteristics shown in FIG. 50 are the same as those in the fifth embodiment (see, FIG. 19). The process executed by the control target-sound-superior-signal generators 1704 may be a digital process or an analog process, and the process is executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 1703 compares powers at the same frequency band between the orthogonal-disturbance-sound-suppressing-signal spectrum $S_1$ generated by the orthogonal-disturbance-sound-suppressing-signal generator 1701 and the control target-sound-superior-signal spectrum $S_2$ generated by the opposite-disturbance-sound-suppressing-control-signal generator 1702, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1703 performs minimum level band selection (BS-MIN) of assigning minor power to the spectrum $S_1$ and causes the obtained spectrum (part of the spectrum $S_1$ before processing) to serve as the separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to the fifteenth embodiment, the target sound separation system 1700 performs the separation process for the target sound and a disturbance sound in the following manner.

First, the orthogonal-disturbance-sound-suppressing-signal generator 1701 generates the orthogonal-disturbance-sound-suppressing-signal spectrum $S_1$. In parallel with this, the opposite-disturbance-sound-suppressing-control-signal generator 1702 generates the control target-sound-superior-signal spectrum $S_2$.

Thereafter, the opposite-disturbance-sound suppressing unit 1703 performs minimum level band selection (BS-MIN), using the control target-sound-superior-signal spectrum $S_2$, to suppress an opposite-disturbance-sound spectrum included in the orthogonal-disturbance-sound-suppressing-signal spectrum $S_1$, thus obtaining the separated target sound spectrum $S_3$.

After the opposite-disturbance-sound suppressing unit 1703 has separated the target sound, like the first to fourteenth embodiments, voice recognition using an acoustic model obtained by performing an adaptation process or a learning process beforehand can be performed.

According to such a fifteenth embodiment, the following effectiveness can be achieved. Namely, because the sound source separation system 1700 has the orthogonal-disturbance-sound-suppressing-signal generator 1701, the opposite-disturbance-sound-suppressing-control-signal generator 1702, and the opposite-disturbance-sound suppressing unit 1703, directivity control appropriate for separation of the target sound and the disturbance sound is performed, using the received sound signals of the four microphones 1721, 1722, 1723, 1724, thus separating the target sound and the disturbance sound precisely.

Further, the number of the microphones used in the sound source separation system 1700 is four, and sound source separation can be realized with the few microphones, resulting in miniaturization a device.

Sixteenth Embodiment

FIG. 52 illustrates the general structure of a sound source separation system 1800 according to the sixteenth embodiment of the invention. FIG. 53 illustrates directional characteristics of a target sound superior signal, target sound inferior signal and control target-sound-superior signal.

With reference to FIG. 52, the sound source separation system 1800 comprises a total of four first, second, third and fourth microphones 1821, 1822, 1823, 1824 disposed at respective vertices of a quadrangle (in the embodiment, as an example, a lozenge or an approximate lozenge, a square or an approximate square, or quadrangles other than these figures and axisymmetric figures with each diagonal defined as a center). All of the first to fourth microphones 1821 to 1824 are non-directional or approximately non-directional microphones in the embodiment. In these four microphones 1821, 1822, 1823, 1824, the two first and second microphones 1821, 1822 are disposed side by side in a direction from which the target sound comes or in the direction approximate to the same. On the contrary, the two first and third microphones 1821, 1823 are disposed in a direction inclined with respect to the direction from which the target sound comes. Further, the first and fourth microphones 1821, 1824 are disposed side by side in a direction inclined opposite to the inclined direction of the two first and third microphones 1421, 1423 with respect to the direction from which the target sound comes. Consequently, the relationship between the direction from which the target sound comes and the four microphones 1821, 1822, 1823, 1824 arrangement positions is the same as that of the sixth embodiment (see, FIG. 21). In the example shown in the figure, the target sound is set as to come in parallel with a front face 1882 of a cellular phone 1880 and from a downside of the cellular phone 1880. Hence, all of the four microphones 1821, 1822, 1823, 1824 are provided on the front face 1882. In essence, if the correlation between the direction from which the target sound comes and the microphone arrangement positions satisfies the relationship shown in FIG. 52, the directional characteristics to be formed remain unchanged. Therefore, the microphones may be disposed at any positions P1 to P34 shown in FIG. 60.

The sound source separation system 1800 further comprises an orthogonal-disturbance-sound-suppressing-signal generator 1801 that generates an orthogonal-disturbance-sound suppressing signal for suppressing an orthogonal-disturbance sound coming from a direction orthogonal to the direction from which the target sound comes, using received sound signals of the four first, second, third and fourth microphones 1821, 1822, 1823, 1824, an opposite-disturbance-sound-suppressing-control-signal generator 1802 that generates a control signal for suppressing an opposite disturbance sound coming from the direction from which the target sound comes, using the received sound signals of the two first and second microphones 1821, 1822, and an opposite-disturbance-sound suppressing unit 1803 that suppresses an opposite-disturbance sound spectrum included in an orthogonal-disturbance-sound-suppressing-signal spectrum, using an orthogonal-disturbance-sound-suppressing-signal spectrum generated by the orthogonal-disturbance-sound-suppressing-signal generator 1801 and a control signal spectrum generated by the opposite-disturbance-sound-suppressing-control-signal generator 1802.

Using the received sound signals of the four first, second, third and fourth microphones 1821, 1822, 1823, 1824, the orthogonal-disturbance-sound-suppressing-signal generator 1801 performs the same processes as those of the sound source separation system 600 in the sixth embodiment (see, FIG. 21) to generate, as an orthogonal-disturbance-sound-suppressing-signal spectrum $S_1$, the same spectrum as the target sound spectrum obtained through separation by the sound source separation system 600 in the sixth embodiment. Namely, the same processes as those of the sixth embodiment are performed with the four first, second, third and fourth microphones 1821, 1822, 1823, 1824 being caused to correspond to the respective microphones 621, 622, 623, 624 of the sound source separation system 600 in the sixth embodiment. Consequently, in FIG. 52, portions where the same processes as those of the sound source separation system 600 (see, FIG. 21) in the sixth embodiment are performed are labeled and denoted by the same names and the same reference numerals, and detailed explanations thereof are omitted.

The opposite-disturbance-sound-suppressing-control-signal generator 1802 has a control target-sound-superior-signal generator 1804 that generates a control target-sound-superior signal by acquiring a difference between a signal (on a time domain) produced after a delayed process has been applied to the received sound signal (on a time domain) of the second microphone 1822, and the received sound signal of the first microphone 1821, and a frequency analyzer 1805 that performs frequency analysis on the control target-sound-superior signal, on a time domain, generated by the control target-sound-superior-signal generator 1804.

The control target-sound-superior signal generated by the control target-sound-superior-signal generators 1804 has a cardioid (a heart-shaped curve) directional characteristic that expands largely in the direction from which the target sound comes and becomes narrow in an opposite disturbance sound coming direction, as shown by a chain double-dashed line in FIG. 53. The other signals' directional characteristics shown in FIG. 53 are the same as those in the sixth embodiment (see, FIG. 22). The process executed by the control target-sound-superior-signal generator 1804 may be a digital process or an analog process, and the process is executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 1803 compares powers at the same frequency band between the orthogonal-disturbance-sound-suppressing-signal spectrum $S_1$ generated by the orthogonal-disturbance-sound-suppressing-signal generator 1801 and the control target-sound-superior-signal spectrum $S_2$ generated by the opposite-disturbance-sound-suppressing-control-signal generator 1802, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1803 performs minimum level band selection (BS-MIN) of assigning the smaller power to the spectrum $S_1$, and causes the obtained spectrum (part of the spectrum $S_1$ before processing) to serve as the separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to such a sixteenth embodiment, the target sound separation system 1800 performs the separation process for the target sound and a disturbance sound in the following manner.

First, the orthogonal-disturbance-sound-suppressing-signal generator generates the orthogonal-disturbance-sound-suppressing-signal spectrum $S_1$. In parallel with this, the opposite-disturbance-sound-suppressing-control-signal generator 1802 generates the control target-sound-superior-signal spectrum $S_2$.

Thereafter, the opposite-disturbance-sound suppressing unit 1803 performs minimum level band selection (BS-MIN), using the control target-sound-superior-signal spectrum $S_2$ to suppress an opposite-disturbance-sound spectrum included in the orthogonal-disturbance-sound-suppressing-signal spectrum $S_1$, thus obtaining the separated target sound spectrum $S_3$.

After the opposite-disturbance-sound suppressing unit 1803 has separated the target sound, like the first to fifteenth embodiments, voice recognition using an acoustic model obtained by performing an adaptation process or a learning process beforehand can be performed.

According to such a sixteenth embodiment, the following effectiveness can be achieved. Namely, because the sound source separation system 1800 has the orthogonal-disturbance-sound-suppressing-signal generator 1801, the opposite-disturbance-sound-suppressing-control-signal generator 1802, and the opposite-disturbance-sound suppressing unit 1803, directivity control appropriate for separation of the target sound and the disturbance sound is performed using the received sound signals of the four microphones 1821, 1822, 1823, 1824, thus separating the target sound and the disturbance sound precisely.

Further, the number of the microphones used in the sound source separation system 1800 is four, and sound source separation can be realized with the few microphones, resulting in miniaturization of a device.

Seventeenth Embodiment

FIG. 54 illustrates the general structure of a sound source separation system 1900 according to the seventeenth embodiment of the invention. FIG. 55 illustrates directional characteristics of a target sound superior signal, first and second target-sound-inferior signals and first and second control target-sound-superior signals.

With respect to FIG. 54, the sound source separation system 1900 comprises a total of three first, second and third microphones 1921, 1922, and 1923 disposed at respective vertices of a triangle (as an example, an isosceles triangle or an approximately isosceles triangle in the embodiment). All of the first to third microphones 1921 to 1923 are non-directional or approximately non-directional microphones in the embodiment. In these three microphones 1921, 1922, 1923, the first and second microphones 1921, 1922 are disposed side by side in a direction inclined with respect to a direction from which the target sound comes. On the contrary, the first and third microphones 1921, 1923 are disposed side by side in a direction inclined opposite to the inclined direction of the first and second microphones 1921, 1922 with respect to the direction from which the target sound comes. Consequently, the relationship between the direction from which the target sound comes and the microphone arrangement positions is the same as that in the seventh embodiment (see, FIG. 24). In the example shown in the figure, the target sound is set as to come in parallel with a front face 1982 of a cellular phone 1980 and from a downside of the cellular phone 1980. Hence, all of the three microphones 1921, 1922, 1923 are provided on the front face 1982. As shown in FIG. 54, the target sound may be set as to come from a normal line direction of a front face 1982A of a cellular phone 1980A, and the first microphone 1921 may be provided on a front face 1982A, while the second and third microphones 1922, 1923 may be provided on a rear face 1983A. In essence, if the correlation between the direction from which the target sound comes and the microphone arrangement positions satisfies the relationship shown in FIG. 54, the directional characteristics formed remain unchanged, so that the microphones may be disposed at any positions P1 to P34 shown in FIG. 60.

The sound source separation system 1900 further comprises an orthogonal-disturbance-sound-suppressing-signal generator 1901 that generates an orthogonal-disturbance-sound suppressing signal for suppressing an orthogonal disturbance sound coming from a direction orthogonal to the direction from which the target sound comes, using received sound signals of the three first, second and third microphones 1921, 1922, 1923, an opposite-disturbance-sound-suppressing-control-signal generator 1902 that generates a control signal for suppressing the opposite disturbance sound coming from the direction opposite to the direction from which the target sound comes, using the received sound signals of the three first, second and third microphones 1921, 1922, 1923, and an opposite-disturbance-sound suppressing unit 1903 that suppresses an opposite disturbance sound spectrum included in an orthogonal-disturbance-sound-suppressing-signal spectrum, using an orthogonal-disturbance-sound-suppressing signal spectrum generated by the orthogonal-disturbance-sound-suppressing-signal generator 1901 and a control signal spectrum generated by the opposite-disturbance-sound-suppressing-control-signal generator 1902.

Using the received sound signals of the three first, second and third microphones 1921, 1922, 1923, the orthogonal-disturbance-sound-suppressing-signal generator 1901 performs the same processes as those of the sound source separation system 700 in the seventh embodiment (see, FIG. 24) to generate, as a orthogonal-disturbance-sound-suppressing-signal spectrum $S_1$, the same spectrum as the target sound spectrum obtained through separation by the sound source separation system 700 in the seventh embodiment. Namely, the same processes as those of the seventh embodiment are performed with the three first, second and third microphones 1921, 1922, 1923 being caused to correspond to the respective microphones 721, 722, 723 of the sound source separation system 700 in the seventh the embodiment. Consequently, in FIG. 54, portions where the same processes as those of the sound source separation system 700 (see, FIG. 24) in the seventh embodiment are performed are labeled and denoted by the same names and the same reference numerals, and detailed explanations thereof are omitted.

The opposite-disturbance-sound-suppressing-control-signal generator 1902 has a first control target-sound-superior-signal generator 1904 that generates a first control target-sound-superior signal by acquiring a difference between a signal (on a time domain) produced after a delayed process has been applied to the received sound signal (on a time domain) of the second microphone 1922, and the received sound signal of the first microphone 1621, a second control target-sound-superior-signal generator 1905 that generates a second control target-sound-superior signal by acquiring a difference between a signal (on a time domain) produced after a delayed process has been applied to the received sound signal (on a time domain) of the third microphone 1923, and the received sound signal (on a time domain) of the first microphone 1921, a frequency analyzer 1906 that performs frequency analysis on the first and second control target-sound-superior signals, on a time domain, generated by the first and second control target-sound-superior-signal generators 1904, 1905, and a control signal integration unit 1907 that performs a spectrum integration process (minimization) of comparing powers for each frequency band and assigning inferior powers to the control target sound superior signal spectrum $S_2$, using a spectrum $S_A$ of the first control target-sound-superior signal generated by the first control target-sound-superior-signal generators 1904 and obtained through frequency analysis by the frequency analyzer 1906, and a spectrum $S_B$ of the second control target sound superior signal generated by the second control target-sound-superior-signal generator 1905 and obtained through frequency analysis by the frequency analyzer 1906.

The first and second control target-sound-superior signals generated by the first and second control target-sound-superior-signal generators 1904, 1905 each have a cardioid (a heart-shaped curve) directional characteristic that expands largely in the direction from which the target sound comes and becomes narrow in an opposite disturbance sound coming direction, as shown by a chain double-dashed line in FIG. 55. The cardioid directional characteristic of the first control target-sound-superior signal inclines along a line connecting the two first and second microphones 1921, 1922, while the cardioid directional characteristic of the second control target-sound-superior signal inclines along a line connecting the two first and third microphones 1921, 1923. In performing the spectrum integration process through minimization by the control signal integration unit 1907, the control signal having an overlapped portion of these cardioids as its directional characteristic is generated. The other signals' directional characteristics shown in FIG. 55 are the same as those in the seventh embodiment (see, FIG. 25). The processes executed by the first and second control target-sound-superior-signal generators 1904, 1905 may be digital processes or analog processes, and the processes are executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 1903 compares powers at the same frequency band between the spectrum $S_1$ of the orthogonal-disturbance-sound-suppressing-signal generated by the orthogonal-disturbance-sound-suppressing-signal generator 1901 and the spectrum $S_2$ of the control target-sound-superior-signal generated by the opposite-disturbance-sound-suppressing-control-signal generator 1902, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 1903 performs minimum level band selection (BS-MIN) of assigning the smaller power to the spectrum $S_1$ of the orthogonal disturbance sound, and causes the obtained spectrum (part of the spectrum $S_1$ before processing) to serve as the separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to such a seventeenth embodiment, the target sound separation system 1900 performs the separation process for the target sound and a disturbance sound in the following manner.

First, the orthogonal-disturbance-sound-suppressing-signal generator 1901 generates the orthogonal-disturbance-sound-suppressing-signal spectrum $S_1$. In parallel with this, the opposite-disturbance-sound-suppressing-control-signal generator 1902 generates the control target-sound-superior-signal spectrum $S_2$.

Thereafter, the opposite-disturbance-sound suppressing unit 1903 performs minimum level band selection (BS-MIN), using the control target-sound-superior-signal spectrum $S_2$, to suppress an opposite-disturbance-sound spectrum included in the orthogonal-disturbance-sound-suppressing-signal spectrum $S_1$, thus obtaining the separated target sound spectrum $S_3$.

After the opposite-disturbance-sound suppressing unit 1903 has separated the target sound, like the first to sixteenth embodiments, voice recognition using an acoustic model obtained by performing an adaptation process or a learning process beforehand can be performed.

According to such a seventeenth embodiment, the following effectiveness can be achieved. Namely, because the sound source separation system 1900 has the orthogonal-disturbance-sound-suppressing-signal generator 1901, the opposite-disturbance-sound-suppressing-control-signal generator 1902, and the opposite-disturbance-sound suppressing unit 1903, the target sound and the disturbance sound can be separated precisely by performing directivity control appropriate for separation of the target sound and the disturbance sound, using the received sound signals of the three microphones 1921, 1922, 1923.

Further, the number of the microphones used in the sound source separation system 1900 is three, and sound source separation is realized with the few microphones, resulting in miniaturization of a device.

Eighteenth Embodiment

FIG. 56 illustrates the general structure of a sound source separation system 2000 according to the eighteenth embodiment of the invention. FIG. 57 illustrates directional characteristics of a target sound superior signal, first and second target sound inferior signals and control target-sound-superior signal generated by the sound source separation system 2000.

With reference to FIG. 56, the sound source separation system 2000 comprises a total of three first, second and third microphones 2021, 2022, and 2023 disposed at respective vertices of a triangle (as an example, an isosceles triangle or an approximately isosceles triangle in the embodiment). All of the first to third microphones 2021 to 2023 are non-directional or approximately non-directional microphones in the embodiment. These three microphones 2021, 2022, and 2023 are disposed in the same fashion as the three microphones 1921, 1922, 1923 in the seventeenth embodiment. Consequently, the relationship between the direction from which the target sound comes and three microphones 2021, 2022, 2023 arrangement positions is the same as that in the seventh embodiment (see, FIG. 24). In the example shown in the figure, the target sound is set as to come in parallel with a front face 2082 of a cellular phone 2080 and from a downside of the cellular phone 2080. Hence, all of the three microphones 2021, 2022, 2023 are provided on the front face 2082. As shown in FIG. 56, the target sound may be set as to come from a normal line direction of a front face 2082A of a cellular phone 2080A, and in this case, the first microphone 2021 may be provided on the front face 2082A, while the second and third microphones 2022, 2023 may be disposed on a rear face 2083A. In essence, if the correlation between the direction from which the target sound comes and the microphone arrangement positions satisfies the relationship shown in FIG. 56, the directional characteristics to be formed remain unchanged, so that the microphones may be disposed at any positions P1 to P34 shown in FIG. 60.

The sound source separation system 2000 further comprises an orthogonal-disturbance-sound-suppressing-signal generator 2001 that generates an orthogonal-disturbance-sound suppressing signal for suppressing an orthogonal-disturbance sound coming from in a direction orthogonal to the direction from which the target sound comes, using received sound signals of the three first, second and third microphones 2021, 2022, 2023, an opposite-disturbance-sound-suppressing-control-signal generator 2002 that generates a control signal for suppressing the opposite-disturbance sound coming from a direction opposite to the direction from which the target sound comes, using the received sound signals of the three first, second and third microphones 2021, 2022, 2023, and an opposite-disturbance-sound suppressing unit 2003 that suppresses an opposite-disturbance-sound spectrum included in an orthogonal-disturbance-sound-suppressing-signal spectrum, using a orthogonal-disturbance-sound-suppressing-signal spectrum generated by the orthogonal-disturbance-sound-suppressing-signal generator 2001, and a control signal spectrum generated by the opposite-disturbance-sound-suppressing-control-signal generator 2002.

Using the received sound signals of the three first, second and third microphones 2021, 2022, 2023, the orthogonal-disturbance-sound-suppressing-signal generator 2001 performs, like the seventeenth embodiment (see, FIG. 54), the same processes as those of the sound source separation system 700 (see, FIG. 24) in the seventeenth embodiment to generate, as an orthogonal-disturbance-sound-suppressing-signal spectrum $S_1$, the same spectrum as a target sound spectrum obtained through separation by the sound source separation system 700 in the seventh embodiment. Namely, the same processes as those of the seventh embodiment are performed with the three first, second and third microphones 2021, 2022, 2023 being caused to correspond to the respective microphones 721, 722, 723 of the sound source separation system 700 in the seventh the embodiment. Consequently, in FIG. 56, portions where the same processes as those of the sound source separation system 700 (see, FIG. 24) in the seventh embodiment are performed are labeled and denoted by the same names and the same reference numerals and detailed explanations thereof are omitted.

The opposite-disturbance-sound-suppressing-control-signal generator 2002 has a control target-sound-superior-signal generator 2004 that generates a control target-sound-superior signal by acquiring a difference between a signal (on a time domain) obtained by performing a delayed process on a sum signals, obtained by multiplying the received sound signals (on a time domain) of the second and third microphones 2022, 2023 by the same or different proportional coefficients (in the embodiment, the same proportional coefficient k as an example), and the received sound signal of the first microphone 2021, and a frequency analyzer 2005 that performs frequency analysis on the control target-sound-superior signal, on a time domain, generated by the control target-sound-superior-signal generator 2004.

The control target-sound-superior signal generated by the control target-sound-superior-signal generators 2004 has the cardioid (a heart-shaped curve) directional characteristic that expands largely in the direction from which the target sound comes and becomes narrow in an opposite disturbance sound coming direction, as shown by a chain double-dashed line in FIG. 57. The other signals' directional characteristics shown in FIG. 57 are the same as those in the seventh embodiment (see, FIG. 25). The process executed by the control target-sound-superior-signal generators 2004 may be a digital process or an analog process, and the process is executed on a time domain in the embodiment, but may be executed on a frequency domain.

In order to suppress the opposite-disturbance-sound spectrum included in the orthogonal-disturbance-sound-suppressing-signal spectrum $S_1$, the opposite-disturbance-sound suppressing unit 2003 compares powers at the same frequency band between the orthogonal-disturbance-sound-suppressing-signal spectrum $S_1$ generated by the orthogonal-disturbance-sound-suppressing-signal generator 2001 and the control target-sound-superior-signal spectrum $S_2$ generated by the opposite-disturbance-sound-suppressing-control-signal generator 2002, for each frequency band. With respect to a frequency band where power of the orthogonal-disturbance-sound-suppressing-signal spectrum $S_1$ is smaller than power of the control signal spectrum $S_2$, the opposite-disturbance-sound suppressing unit 2003 performs minimum level band selection (BS-MIN) of assigning the smaller power to the spectrum $S_1$ and causes the obtained spectrum (part of the spectrum $S_1$ before processing) to serve as the separated target sound spectrum $S_3$. At this time, with respect to a frequency band where the power of the spectrum $S_1$ is larger than the power of the control signal spectrum $S_2$, the power of the spectrum $S_1$ is caused to be zero. The spectrum $S_2$ is used only for the control signal and therefore is not utilized and abandoned.

According to such an eighteenth embodiment, the target sound separation system 2000 performs the separation process for the target sound and a disturbance sound in the following manner.

First, the orthogonal-disturbance-sound-suppressing-signal generator 2001 generates the orthogonal-disturbance-sound-suppressing-signal spectrum $S_1$. In parallel with this, the opposite-disturbance-sound-suppressing-control-signal generator 2002 generates the control target-sound-superior-signal spectrum $S_2$.

Thereafter, the opposite-disturbance-sound suppressing unit 2003 performs minimum level band selection (BS-MIN), using the control target-sound-superior-signal spectrum $S_2$ to suppress an opposite-disturbance-sound spectrum included in the orthogonal-disturbance-sound-suppressing-signal spectrum $S_1$, thus obtaining the separated target sound spectrum $S_3$.

After the opposite-disturbance-sound suppressing unit 2003 has separated the target sound, like the first to seventeenth embodiments, voice recognition using an acoustic model obtained by performing an adaptation process or a learning process beforehand can be performed.

According to such an eighteenth embodiment, the following effectiveness can be achieved. Namely, because the sound source separation system 2000 has the orthogonal-disturbance-sound-suppressing-signal generator 2001, the opposite-disturbance-sound-suppressing-control-signal generator 2002, and the opposite-disturbance-sound suppressing unit 2003, directivity control appropriate for separation of the target sound and the disturbance sound is performed to separate the target sound and the disturbance sound precisely, using the received sound signals of the three microphones 2021, 2022, 2023.

Further, the number of the microphones used in the sound source separation system 2000 is three, and sound source separation is realized with the few microphones, thus miniaturizing a device.

Nineteenth Embodiment

FIG. 58 illustrates the general structure of a sound source separation system 2100 according to the nineteenth embodiment of the invention.

With reference to FIG. 58, the sound source separation system 2100 has a total of three first, second and third microphones 2121, 2122, and 2123 disposed at respective vertices of a triangle (as an example, a right triangle or an approximately right triangle in the embodiment). All of the first to third microphones 2121 to 2123 are non-directional or approximately non-directional microphones in the embodiment. All of these three first, second and third microphones 2121, 2122, and 2123 are disposed on a surface orthogonal to or approximately orthogonal to a direction from which the target sound comes. In the example shown in the figure, the target sound is set as to come from a normal line direction of a surface 2182 of a cellular phone 2180. Hence, all of the first, second and third microphones 2121, 2122, and 2123 are disposed on the surface 2182. Accordingly, a line connecting the first and second microphones 2121, 2122 is orthogonal to or approximately orthogonal to the direction from which the target sound comes and a line connecting the second and third microphones 2122, 2123 is also orthogonal to or approximately orthogonal to the direction from which the target sound comes. Consequently, in considering only the first and second microphones 2121, 2122, the relationship between the direction from which the target sound comes and the microphone arrangement positions is the same as that of the third embodiment (see, FIG. 12) and the same is true for the second and third microphones 2122, 2123. If the correlation between the direction from which the target sound comes and the microphone arrangement positions satisfies the relationship shown in FIG. 58, the directional characteristics to be formed remain unchanged, so that the microphones may be disposed at any positions P1 to P34 shown in FIG. 60.

The sound source separation system 2100 further comprises a first different-directional-signal-group generator 2101 that generates a combination of a plurality (two in the embodiment) of signal spectra $S_{1A}$, $S_{1B}$ with different directivities from one another, using received sound signals of the two first and second microphones 2121, 2122, a second different-directional-signal-group generator 2102 that generates a combination of a plurality (two in the embodiment) of signal spectra $S_{2A}$, $S_{2B}$ with different directivities from each other, using received sound signals of the two second and third microphones 2122, 2123, and a sensitive region formation unit 2103 that performs multidimensional band selection (BS-MultiD, two-dimensional band selection: BS-2D in the embodiment), using two-set combinations of a plurality (two) of signal spectra each generated by the first and second different-directional-signal-group generators 2101, 2102.

The first different-directional-signal-group generators 2101 performs partially the same processes as those of the sound source separation system 300 in the third embodiment (see, FIG. 12) to generate a signal spectrum which applies the same directivity. Hence, the same reference numerals are denoted to the same parts and detailed explanations thereof are omitted. Namely, the first different-directional-signal-group generator 2101 does not have the separation unit 360 (see, FIG. 12) included in the sound source separation system 300 in the third embodiment, but has the first target sound superior signal generator 331, the second target sound superior signal generator 332, the target sound inferior signal generator 340 and the frequency analyzer 350. Hence, the first different-directional-signal-group generator 2101 performs the same signal generation processes as those of the third embodiment with the first and second microphones 2121, 2122 being caused to correspond to the microphones 321, 322 of the sound source separation system 300 in the third embodiment. Consequently, respective directivities of the first target sound superior signal generated by the first target sound superior signal generator 331, second target sound superior signal generated by the second target sound superior signal generator 332, and target sound inferior signal generated by the target sound inferior signal generator 340 are the same as those in the source separation system 300 (see, FIG. 12) in the third embodiment, and are as shown in FIG. 13.

The first different-directional-signal-group generators 2101 has an integration unit 2104 that performs a spectrum integration process (minimization) of comparing powers for each frequency band, and assigning the inferior power to a target sound superior signal spectrum, using a first target sound superior signal spectrum generated by the first target sound superior signal generator 331 and obtained through frequency analysis by the frequency analyzer 350 and a second target sound superior signal spectrum generated by the second target sound superior signal generator 332 and obtained through frequency analysis by the frequency analyzer 350. A directional characteristic of the target sound superior signal undergone spectrum integration obtained through minimization by the integration unit 2104 results in an overlapped portion of the cardioid (a heart-shaped curve) directional characteristic, shown by a solid line in FIG. 13, of the first target sound superior signal and cardioid (a heat-shaped curve) directional characteristic, shown by a dashed line in FIG. 13, of the second target sound superior signal.

Accordingly, the first different-directional-signal-group generators 2101 generates a combination of a target sound superior signal spectrum $S_{1A}$ having a directional characteristic configured by two cardioids overlapped portion shown in FIG. 13, and a target sound inferior signal spectrum $S_{1B}$ having the directional characteristic in an 8-like shape shown by the dashed line in FIG. 13

Like the case of the first different-directional-signal-group generators 2101, the second different-directional-signal-group generators 2102 performs partially the same processes as those of the sound source separation system 300 in the third embodiment (see, FIG. 12) to generate a signal spectrum which applies the same directional characteristic. Hence, the same reference numerals are denoted to the same parts (however, that reference symbol B is suffixed to each reference numeral symbol in order to distinguish components from those of the first different-directional-signal-group generator 2101) and detailed explanations thereof are omitted. Namely, the second different-directional-signal-group generator 2102 does not have the separation unit 360 (see, FIG. 12) included in the sound source separation system 300 in the third embodiment, but has the first target sound superior signal generator 331B, the second target sound superior signal generator 332B, the target sound inferior signal generator 340B and the frequency analyzer 350B. Hence, the second different-directional-signal-group generator 2102 performs the same signal generation processes as those of the third embodiment with the third and second microphones 2123, 2122 being caused to correspond to the microphones 321, 322 of the sound source separation system 300 in the third embodiment. Consequently, like the case of the first different-directional-signal-group generators 2101, respective signal directional characteristics obtained by these processes are as shown in FIG. 13. However, with respect to the directional characteristic of first different-directional-signal-group generator 2101, an axis is rotated by 90 degree (see, FIG. 33).

Besides, like the first different-directional-signal-group generators 2101, the second different-directional-signal-group generator 2102 has an integration unit 2105 that performs a spectrum integration process (minimization) of comparing powers for each frequency band and assigning the inferior power to the target sound superior signal spectrum, using the first target sound superior signal spectrum generated by the first target sound superior signal generator 331B and obtained through frequency analysis by the frequency analyzer 350B, and a second target sound superior signal spectrum generated by the second target sound superior signal generator 332B and obtained through frequency analysis by the frequency analyzer 350B.

Accordingly, likewise the first different-directional-signal-group generators 2101, the second different-directional-signal-group generator 2102 generates a combination of a target sound superior signal spectrum $S_{2A}$ having the directional characteristic of two-cardioids-overlapped portion shown in FIG. 13, and target sound inferior signal spectrum $S_{2B}$ having the directional characteristic in an 8 shape shown by the dashed line in FIG. 13

When there are a condition of a largeness relationship of powers between spectra defined within a combination of the target sound superior signal spectrum $S_{1A}$ and the target sound superior signal spectrum $S_{1B}$ generated by the first different-directional-signal-group generator 2101, and a condition of a largeness relationship of powers between spectra defined within a combination of the target sound superior signal spectrum $S_{2A}$ and the target sound inferior signal spectrum $S_{2B}$ generated by the second different-directional-signal-group generators 2102, the sensitive region formation unit 2103 determines whether or not the plurality of (two in the embodiment) conditions are satisfied at the same time, for each frequency band, and performs multidimensional band selection (two-dimensional band selection because the conditions are two) of assigning power of a preliminarily selected spectrum (target sound superior signal spectrum $S_{1A}$ generated by the first different-directional-signal-group generator 2101 in the embodiment) as a target sound spectrum $S_3$ to be separated, for frequency bands where the plurality of conditions are satisfied at the same time.

More specifically, for the spectra $S_{1A}$, $S_{1B}$ of the plurality of (two) signals generated by the first different-directional-signal-group generators 2101, the sensitive region formation unit 2103 sets a condition that power of the target sound superior signal spectrum $S_{1A}$ is larger than power of the target sound inferior signal spectrum $S_{1B}$ ($S_{1A}>S_{1B}$), and for the spectra $S_{2A}$, $S_{2B}$ of the plurality of (two) signals generated by the second different-directional-signal-group generators 2102, the sensitive region formation unit sets a condition that power of the target sound superior signal spectrum $S_{2A}$ is larger than power of the target sound inferior signal spectrum $S_{2B}$ ($S_{2A}>S_{2B}$), and determines whether or not $S_{1A}>S_{1B}$ and $S_{2A}>S_{2B}$ are satisfied for each frequency band. For a frequency band where both conditions are satisfied at the same time, power of the spectrum $S_{1A}$ of that frequency band is assigned as the spectrum $S_3$ of the target sound to be separated, and for other frequency bands, powers are caused to be zero. In the embodiment, the target sound superior signal spectrum $S_{1A}$ generated by the first different-directional-signal-group generators 2101 is focused on, and whether power of the spectrum $S_{1A}$ is assigned to the target sound to be separated or abandoned is determined. However, the same process may be performed with the target sound superior signal spectrum $S_{2A}$ generated by the second different-directional-signal-group generators 2102 being focused on.

According to such a nineteenth embodiment, the target sound separation system 2100 performs the separation process for the target sound and a disturbance sound in the following manner.

First, using the received sound signals of the first and second microphones 2121, 2122, the first different-directional-signal-group generators 2101 generates the combination of the target sound superior signal spectrum $S_{1A}$ and target sound inferior signal spectrum $S_{1B}$. In parallel with this, the second different-directional-signal-group generators 2101 generates the combination of the target sound superior signal spectrum $S_{2A}$ and target sound inferior signal spectrum $S_{2B}$, using the received sound signals of the second and third microphones 2122, 2123.

Next, using the target sound superior signal spectrum $S_{1A}$ and the target sound inferior signal spectrum $S_{1B}$ generated by the first different-directional-signal-group generator 2101, and the target sound superior signal spectrum $S_{2A}$ and the target sound inferior signal spectrum $S_{2B}$ generated by the second different-directional-signal-group generator 2102, i.e., using two sets of the combinations of the two signals, the sensitive region formation unit 2103 performs two-dimensional band selection (BS-2D), thereby obtaining the target sound spectrum $S_3$ to be separated.

After the sensitive region formation unit 2103 has separated the target sound, like the first to eighteenth embodiments, voice recognition using an acoustic model obtained by performing an adaptation process or a learning process beforehand can be performed.

According to such a nineteenth embodiment, the following effectiveness can be achieved. Namely, because the sound source separation system 2100 has the first different-directional-signal-group generators 2101, the second different-directional-signal-group generators 2102 and the sensitive region formation unit 2103, directivity control appropriate for separation of the target sound and the disturbance sound is performed to form a sensitive region, using the received sound signals of the three microphones 2121, 2122, 2123. This results in precise separation of the target sound and the disturbance sound.

Further, the number of the microphones used in the sound source separation system 2100 is three, and sound source separation is realized with the few microphones, thereby miniaturizing a device.

Twentieth Embodiment

FIG. 59 illustrates the general structure of a sound source separation system 2200 according to the twentieth embodiment of the invention.

With reference to FIG. 59, the sound source separation system 2200 comprises a total of three first, second and third microphones 2221, 2222, and 2223 disposed at respective vertices of a triangle (as an example, an isosceles triangle or an approximately isosceles triangle in the embodiment). All of the first to third microphones 2221 to 2223 are non-directional or approximately non-directional microphones in the embodiment. All of these three first, second and third microphones 2221, 2222, and 2223 are disposed on a surface orthogonal to or approximately orthogonal to a direction from which the target sound comes. In the example shown in the figure, the target sound is set as to come from a normal direction of a front face 2282 of a cellular phone 2280, so that all of the first, second and third microphones 2221, 2222, 2223 are disposed on a front face 2282. Accordingly, a line connecting the first and second microphones 2221, 2222, a line connecting the second and third microphones 2222, 2223 and a line connecting the first and third microphones 2221, 2223 are all orthogonal to or approximately orthogonal to the direction from which the target sound comes. Consequently, in considering only the first and second microphones 2221, 2222, the relationship between the direction from which the target sound comes and microphone arrangement positions is the same as that of the third embodiment (see, FIG. 12) and the same is true for the second and third microphones 2222, 2223 and for the first and third microphones 2221, 2223. If the correlation between the direction from which the target sound comes and the microphone arrangement positions satisfies the relationship shown in FIG. 59, directional characteristics to be formed remain unchanged, so that the microphones may be disposed at any positions P1 to P34 shown in FIG. 60.

The sound source separation system 2200 further comprises a first different-directional-signal-group generator 2201 that generates a combination of spectra $S_{1A}$, $S_{1B}$ of a plurality of (two in the embodiment) signals with different directivities (two directivities in the embodiment) from one another, using received sound signals of the two first and second microphones 2221, 2222, a second different-directional-signal-group generator 2202 that generates a combination of spectra $S_{2A}$, $S_{2B}$ of a plurality of signals with different directivities (two directivities in the embodiment) from one another, using received sound signals of the two second and third microphones 2222, 2223, a third different-directional-signal-group generator 2203 that generates a combination of spectra $S_{3A}$, $S_{3B}$ of a plurality of signals with different directivities (two directivities in the embodiment) from one another, using received sound signals of the first and third microphones 2221, 2223, and a sensitive region formation unit 2204 that performs multidimensional band selection (BS-MultiD, in embodiment, three-dimensional band selection: BS-3D), using three sets of combinations of the spectra in a plurality of (two) signals generated by the first, second and third different-directional-signal-group generators 2201, 2202, 2203.

The first different-directional-signal-group generators 2201 performs partially the same processes as those of the sound source separation system 300 (see, FIG. 12) in the third embodiment to generate spectra of signals which apply the same directional characteristics as those in the sound source separation system 300. Hence, the same reference numerals are denoted to the same parts, and detailed explanations thereof are omitted. Namely, the first different-directional-signal-group generator 2201 does not have the separation unit 360 (see, FIG. 12) included in the sound source separation system 300 in the third embodiment, but has the first target sound superior signal generator 331, the second target sound superior signal generator 332, the target sound inferior signal generator 340 and the frequency analyzer 350. Hence, the first different-directional-signal-group generator 2201 performs the same signal generation processes as those of the third embodiment with the first and second microphones 2221, 2222 being caused to correspond to each of the microphones 321, 322 of the sound source separation system 300 in the third embodiment. Consequently, respective directional characteristics of the first target sound superior signal generated by the first target sound superior signal generator 331, second target sound superior signal generated by the second target sound superior signal generator 332, and target sound inferior signal generated by the target sound inferior signal generator 340 are the same as those in the source separation system 300 (see, FIG. 12) in the third embodiment, and are as shown in FIG. 13.

The first different-directional-signal-group generators 2201 has an integration unit 2205 that performs a spectrum integration process (minimization) of comparing powers for each frequency band and assigning the inferior power to a target sound superior signal spectrum, using a first target sound superior signal spectrum generated by the first target sound superior signal generator 331 and obtained through frequency analysis by the frequency analyzer 350, and a second target sound superior signal spectrum generated by the second target sound superior signal generator 332 and obtained through frequency analysis by the frequency analyzer 350. A directional characteristic of the target sound superior signal undergone spectrum integration obtained through minimization by the integration unit 2105 results in an overlapped portion of the cardioid (a heart-shaped curve) directional characteristic, shown by a solid line in FIG. 13, of the first target sound superior signal and a cardioid (a heart-shaped curve) directional characteristic, shown by a dashed line in FIG. 13, of the second target sound superior signal.

Accordingly, the first different-directional-signal-group generators 2201 generates the combination of the target sound superior signal spectrum $S_{1A}$ with two-cardioids-overlapped portion shown in FIG. 13 defined as its directional characteristic, and the target sound inferior signal spectrum $S_{1B}$ with the directional characteristic in an 8-like shape shown by the dashed line in FIG. 13.

Like the first different-directional-signal-group generators 2201, the second different-directional-signal-group generators 2202 performs partially the same processes as those of the sound source separation system 300 (see, FIG. 12) in the third embodiment to generate a signal spectrum which applies the same directional characteristic. The same reference numerals are denoted to the same parts (however, letter C is suffixed to the reference numerals in order to distinguish the components from those of the first different-directional-signal-group generator 2201), and detailed explanations thereof are omitted. Namely, the second different-directional-signal-group generator 2202 does not have the separation unit 360 (see, FIG. 12) included in the sound source separation system 300 in the third embodiment, but has the first target sound superior signal generator 331C, the second target sound superior signal generator 332C, the target sound inferior signal generator 340C and the frequency analyzer 350C. Hence, the second different-directional-signal-group generator 2202 performs the same signal generation processes as those of the third embodiment with the third and second microphones 2223, 2222 being caused to correspond to the microphones 321, 322 of the sound source separation system 300 in the third embodiment. Consequently, like the first different-directional-signal-group generators 2201, a directional characteristic of each signal obtained by these processes are as shown in FIG. 13. However, with respect to the directional characteristics in the case of the first different-directional-signal-group generator 2201, an axis of each directional characteristic is rotated.

Besides, like the first different-directional-signal-group generators 2201, the second different-directional-signal-group generator 2202 has an integration unit 2206 that performs a spectrum integration process (minimization) of comparing powers for each frequency band and assigning the inferior power to target sound superior signal spectrum, using a first target sound superior signal spectrum generated by the first target sound superior signal generator 331C and obtained through frequency analysis by the frequency analyzer 350C, and a second target sound superior signal spectrum generated by the second target sound superior signal generator 332C and obtained through frequency analysis by the frequency analyzer 350C.

Accordingly, like the first different-directional-signal-group generators 2202, the second different-directional-signal-group generator 2201 generates a combination of the target sound superior signal spectrum $S_{2A}$ whose directional characteristic is two-cardioids-overlapped portion shown in FIG. 13 and the target sound inferior signal spectrum $S_{2B}$ with the directional characteristic in an 8-like shape shown by the dotted line in FIG. 13.

Like the first different-directional-signal-group generators 2201, the third different-directional-signal-group generators 2203 performs partially the same processes as those of the sound source separation system 300 (see, FIG. 12) in the third embodiment to generate a signal spectrum which applies the same directional characteristic. Hence, the same reference numerals are denoted to the same parts (however, letter D is suffixed to reference numerals in order to distinguish the components from those of the first and second different-directional-signal-group generators 2201, 2202) and detailed explanations thereof are omitted. Namely, the third different-directional-signal-group generator 2203 does not have the separation unit 360 (see, FIG. 12) included in the sound source separation system 300 in the third embodiment, but has the first target sound superior signal generator 331D, the second target sound superior signal generator 332D, the target sound inferior signal generator 340D and the frequency analyzer 350D. Hence, the third different-directional-signal-group generator 2203 performs the same signal generation processes as those of the third embodiment with the third and first microphones 2223, 2221 being caused to correspond to the microphones 321, 322 of the sound source separation system 300 in the third embodiment. Consequently, like the first different-directional-signal-group generators 2201, each signal directional characteristic obtained by these processes are as shown in FIG. 13. However, with respect to each directional characteristic in the first different-directional-signal-group generator 2201, an axis of each directional characteristic is rotated.

Besides, like the first different-directional-signal-group generators 2201, the third different-directional-signal-group generator 2203 has an integration unit 2207 that performs a spectrum integration process (minimization) of comparing powers for each frequency band and assigning the inferior power to target sound superior signal spectrum, using a first target sound superior signal spectrum generated by the first target sound superior signal generator 331D and obtained through frequency analysis by the frequency analyzer 350D, and a second target sound superior signal spectrum generated by the second target sound superior signal generator 332D and obtained through frequency analysis by the frequency analyzer 350D.

Accordingly, like the first different-directional-signal-group generators 2201, the third different-directional-signal-group generator 2203 generates a combination of the target sound superior signal spectrum $S_{3A}$ with two-cardioids-overlapped portion shown in FIG. 13 defined as its directional characteristic and the target sound inferior signal spectrum $S_{3B}$ with the directional characteristic in an 8-like shape shown by the dotted line in FIG. 13.

When there are a condition of a largeness relationship of powers between spectra defined within a combination of the target sound superior signal spectrum $S_{1A}$ and the target sound inferior signal spectrum $S_{1B}$ generated by the first different-directional-signal-group generators 2201, and a condition of a largeness relationship of powers between spectra defined within a combination of the target sound superior signal spectrum $S_{2A}$ and the target sound inferior signal spectrum $S_{2B}$ generated by the second different-directional-signal-group generators 2202, and a condition of a largeness relationship of powers between spectra defined within a combination of the target sound superior signal spectrum $S_{3A}$ and the target sound inferior signal spectrum $S_{3B}$ generated by the third different-directional-signal-group generators 2203, the sensitive region formation unit 2204 determines whether or not a plurality of (three in the embodiment) those conditions are satisfied at the same time, and for each frequency band, and for a frequency band where the plurality of conditions are satisfied at the same time, performs multidimensional band selection (three-dimensional band selection since the conditions are three in the embodiment) of assigning power of a pre-selected spectrum (in the embodiment, spectrum $S_{1A}$ of the target sound superior signal generated by the first different-directional-signal-group generator 2201) to the spectrum $S_4$ of the target sound to be separated.

More specifically, the sensitive region formation unit 2204 sets a condition that power of the spectrum $S_{1A}$ of the target sound is larger than power of the spectrum $S_{1B}$ of the target sound inferior signal ($S_{1A}>S_{1B}$) for the spectra $S_{1A}$, $S_{1B}$ of a plurality of (two) signals generated by the first different-directional-signal-group generator 2201, for the plurality of (two) signal spectra $S_{2A}$, $S_{2B}$ generated by the second different-directional-signal-group generators 2202, sets a condition that power of the target sound superior signal spectrum $S_{2A}$ is larger than power of the target sound inferior signal spectrum $S_{2B}$ ($S_{2A}>S_{2B}$), and for the plurality of (two) signal spectra $S_{3A}$, $S_{3B}$ generated by the third different-directional-signal-group generators 2203, sets a condition that power of the target sound superior signal spectrum $S_{3A}$ is larger than power of the target sound inferior signal spectrum $S_{3B}$ ($S_{3A}>S_{3B}$), determines whether or not $S_{1A}>S_{1B}$, $S_{2A}>S_{2B}$ and $S_{3A}>S_{3B}$ are satisfied, for each frequency band. Then, for a frequency band where the three conditions are satisfied at the same time, the sensitive region formation unit 2204 assigns the power of the spectrum $S_{1A}$ of that frequency band to the target sound spectrum $S_4$ to be separated, and for other frequency bands, powers are caused to be zero.

According to such a twentieth embodiment, the target sound separation system 2200 performs the separation process for the target sound and a disturbance sound in the following manner.

First, using the received sound signals of the first and second microphones 2221, 2222, the first different-directional-signal-group generators 2201 generates the combination of the target sound superior signal spectrum $S_{1A}$ and target sound inferior signal spectrum $S_{1B}$. In parallel with this, the second different-directional-signal-group generators 2202 generates the combination of the target sound superior signal spectrum $S_{2A}$ and target sound inferior signal spectrum $S_{2B}$ using the received sound signals of the second and third microphones 2222, 2223. In parallel with these, the third different-directional-signal-group generators 2203 generates the combination of the target sound superior signal spectrum $S_{3A}$ and target sound inferior signal spectrum $S_{3B}$ using the received sound signals of the first and third microphones 2221, 2223.

Next, using the target sound superior signal spectrum $S_{1A}$ and the target sound inferior signal spectrum $S_{1B}$ generated by the first different-directional-signal-group generators 2201, the target sound superior signal spectrum $S_{2A}$ and the target sound inferior signal spectrum $S_{2B}$ generated by the second different-directional-signal-group generators 2202, and the target sound superior signal spectrum $S_{3A}$ and the target sound inferior signal spectrum $S_{3B}$ generated by the third different-directional-signal-group generators 2203, i.e., using three sets of combinations of the two signal spectra, sensitive region formation unit 2204 obtains the target sound spectrum $S_4$ to be separated by performing three-dimensional band selection (BS-3D).

After the sensitive region formation unit 2204 has separated the target sound, like the first to nineteenth embodiments, voice recognition using an acoustic model obtained by performing an adaptation process or a learning process beforehand can be performed.

According to such a twentieth embodiment, the following effectiveness can be achieved. Namely, because the sound source separation system 2200 has the first different-directional-signal-group generator 2201, the second different-directional-signal-group generator 2202, the third different-directional-signal-group generator 2203 and the sensitive region formation unit 2204, directivity control appropriate for separation of the target sound and the disturbance sound is performed to form a sensitive region. Accordingly, the target sound and the disturbance sound can be precisely separated.

Further, the number of the microphones used in the sound source separation system 2200 is three, and sound source separation is realized with the few microphones, thus miniaturizing a device.

Modified Embodiments

The invention is not limited to each of the foregoing embodiments, and various modifications or the like within the scope where the object of the invention can be achieved are included in the invention.

Namely, in each of the embodiments, explanations has been given of the case where the sound source separation system of the invention is applied to a portable device like a cellular phone, but the invention is not limited to this case, and can be applied to a case where remote uttering is necessary, such as a in-vehicle device like a car navigation system, and a conference minute drafting device.

In the first embodiment, as shown in FIG. 1, the target sound inferior signal generator 40 comprises the first target signal inferior signal generator 41, the second target signal inferior signal generator 42 and the changeover unit 43 to change over a mode between the normal mode and the changeover mode. However, a process corresponding to that (process for forming the directional characteristic plotted with a dotted line in FIG. 5) performed by the first target sound inferior signal generator 41 may be performed by the target sound inferior signal generator, and a process corresponding to that (process for forming the directional characteristic plotted with a dashed line in FIG. 6) performed by the second target signal inferior signal generator 42 may be performed by the target sound superior signal generator. In other word, as shown in FIG. 27, a difference between a signal produced after applying a delayed process to the received sound signal of the other microphone 822, and the received sound signal of one microphone 821 may be acquired by the target sound superior signal generator, on a time domain or a frequency domain to generate the target sound superior signal and to form the directional characteristic shown by a solid line in FIG. 27. Further, on a time domain or on a frequency domain, a difference between a signal produced after applying the delayed process to the received sound signal of the other microphone 821, and the received sound signal of one microphone 822 is acquired by the target sound inferior signal generator to generate the target sound inferior signal, and to form the directional characteristic shown by a dotted line in FIG. 27. At this time, it is preferable that among the differences acquired by the target signal superior signal generator and the target signal inferior signal generator, a value of at least one difference should be multiplied by a coefficient to cause the difference (directional characteristic shown by a solid line in FIG. 27) obtained by the target sound superior signal generator to be relatively smaller than the difference obtained by the target signal inferior signal generator (directional characteristic shown by a dotted line in FIG. 27).

Further, when the structure in FIG. 27 is for the normal mode, the changeover mode can be configured as one shown in FIG. 28. Namely, on a time domain or on a frequency domain, the target signal superior signal generator acquires a difference between the signal produced after applying the delayed process to the received sound signal of one microphone 821, and the received sound signal of the other microphone 822 to generate a target sound superior signal (a signal a produced by emphasizing a target sound (θ=180 degree) at the changeover mode), thus forming the directional characteristic shown by a solid line in FIG. 28. Moreover, on a time domain or on a frequency domain, the target signal inferior signal generator acquires a difference between the signal produced after applying the delayed process to the received sound signal of the other microphone 822, and the received sound signal of one microphone 821 to generate the target sound inferior signal (a signal produced by emphasizing a target sound (θ=180 degree) at the changeover mode, thus forming the directional characteristic shown by a dotted line in FIG. 28. At this time, it is preferable that among the differences acquired by the target signal superior signal generator and the target sound inferior signal generator, a value of at least one difference should be multiplied by a coefficient to cause the difference (directional characteristic shown by a solid line in FIG. 28) obtained by the target signal superior signal generator to be relatively smaller than the difference (directional characteristic shown by a dotted line in FIG. 28) acquired by the target signal inferior signal generator.

In the first embodiment, as shown in FIG. 2, the two microphones 21, 22 provided on the cellular phone 80 employs a structure such that no direction connecting these microphones 21, 22 changes when in use and when not in use (however, the distance between the microphones 21, 22 may change). However, as shown in FIG. 29, the direction may changes when in use and when not in use. In FIG. 29, a rotation support member 920 freely rotatable around an axis parallel to a front face 902 where an operation unit 901 comprised of various keys, and/or a screen display unit are provided, and a rear face 903 opposite to that face is provided on a downside side face of a cellular phone 900. At both ends of the rotation support member 920, microphones 921, 922 are provided. The processes performed using the received sound signals of these microphones 921, 922 are the same as the process performed using the receiving sound signal of the microphones 21, 22 in the first embodiment. The rotation support member 920 is housed in a state parallel to or approximately parallel to the front face 902 and the rear face 903 of the cellular phone 900 when the microphones 921, 922 are not in use, and as shown by dashed lines in FIG. 29, when the microphones 921, 922 are in use, the rotation support member 920 is caused to be orthogonal to or approximately orthogonal to the front face 902 and the rear face 903 of the cellular phone 900. As a result, in using the microphones 921, 922, a necessary distance (a distance required for processing with respect to a direction from which the target sound comes) between the microphones 921, 922 can be easily ensured.

In the first embodiment, the target sound inferior signal generator 40 applies a time delay, equal to or approximately equal to a sound wave propagation time between the two microphones 21, 22, to the received sound signal of the microphone subject to a delayed process (the directional characteristic shown by a chain doubled-line in FIG. 30 is obtained). However, a time delay shorter than the sound wave propagation time between the two microphones may be applied. In a case where a time delay shorter than the sound wave propagation time between the two microphones is applied, as shown by a dotted line in FIG. 30, in the vicinity of the direction from which the target sound comes (θ=0 degree for the target sound in the normal mode, and θ=180 degree (−180 degree) for the target sound in the changeover mode), a directional characteristic having an extended range (range of θ) in which an amplitude of the target sound inferior signal is reduced can be created. Hence, a range (range of θ) in which a difference between amplitude values of the target sound superior signal whose directional characteristic is directed to the target sound and target sound inferior signal is large can be extended.

The process of applying a delay to one signal in the two signals to be paired with each other has been performed in order to obtain the cardioid (a heat-shaped curve) directional characteristic in each of the embodiments. This doesn't necessarily means a process of applying a delay to only one signal, and a process of applying a delay to both signals to be paired with each other, and causing a delay amount of the one signal to be relatively large with respect to other signal is included. It is not particularly mentioned in each embodiment, but the foregoing delayed process may be a process of applying a delay, which is an integral multiplication of a sampling period, on a time domain or a frequency domain in the foregoing embodiments. In this manner, as the delay which is the integral multiplication of the sampling period is applied, delay calculation by a digital filter having a large operand becomes unnecessary, and a process of applying a large delay to both signals to be paired with each other becomes unnecessary.

The first and second different-directional-signal-group generator 2101, 2102 (see, FIG. 58) in the nineteenth embodiment and the first, second and third different-directional-signal-group generators 2201, 2202, 2203 in the twentieth embodiment perform partially the same processes as those of the sound source separation system 300 (see, FIG. 12) in the third embodiment, but the invention is not limited to this case when multidimensional band selection is performed, and in essence, two or more sets of combinations of spectra of a plurality of signals with different directivities are generated, and in each combination, a condition based on the largeness relationship of powers between the spectra at the same frequency band is set.

For example, the same microphone arrangement as those of the microphones 2121, 2122, 2123 (see FIG. 58) in the nineteenth embodiment is employed, using received sound signals of two microphones located at the positions of the first and second microphones 2121, 2122, the first different-directional-signal-group generator performs partially the same processes (except the processes of the separation unit 260) as those of the sound source separation system 200 (see, FIG. 9) in the second embodiment to generate a combination of the target sound superior signal spectrum and the target sound inferior signal spectrum (see, FIG. 10). Using received sound signals of two microphones located at the positions of the third and second microphones 2123, 2122, the second different-directional-signal-group generator performs partially the same processes (except the processes of the separation unit 260) as those of the sound source separation system 200 (see, FIG. 9) in the second embodiment to generate a combination of the target sound superior signal spectrum and the target sound inferior signal spectrum (see, FIG. 10). The sensitive region formation unit sets a condition that power of the target sound superior signal spectrum is larger than that of the target sound inferior signal spectrum, within each of the two combinations, determines whether or not these two conditions are satisfied at the same time for each frequency band. For a frequency band where the two conditions are satisfied, two-dimensional band selection (BS-2D) of assigning the power of the target sound superior signal spectrum generated by the first different-directional-signal-group generator (may be the target sound superior signal spectrum generated by the second different-directional-signal-group generator) to the target sound spectrum to be separated is performed.

Further, the same microphone arrangement as that of the microphones 2221, 2222, 2223 (see FIG. 59) in the twentieth embodiment is employed, and using received sound signals of two microphones located at the positions of the first and second microphones 2221, 2222, the first different-directional-signal-group generator performs partially the same processes (except the processes of the separation unit 260) as those of the sound source separation system 200 (see, FIG. 9) in the second embodiment to generate a combination of the target sound superior signal spectrum and the target sound inferior signal spectrum. Using received sound signals of two microphones located at the position of the third and second microphones 2223, 2222, the second different-directional-signal-group generator performs partially the same processes (except the process of the separation unit 260) as those of the sound source separation system 200 (see, FIG. 9) in the second embodiment to generate a combination of the target sound superior signal spectrum and the target sound inferior signal spectrum (see, FIG. 10). Using received sound signals of two microphones located at the position of the third and first microphones 2223, 2221, the third different-directional-signal-group generator performs partially the same processes (except the process of the separation unit 260) as those of the sound source separation system 200 (see, FIG. 9) in the second embodiment to generate a combination of the target sound superior signal spectrum and the target sound inferior signal spectrum (see, FIG. 10). The sensitive region formation unit sets a condition that power of the target sound superior signal spectrum is larger than that of the target sound inferior signal spectrum within each of the three combinations, and determines whether or not these three conditions are satisfied at the same time, for each frequency band. For a frequency band where the three conditions are satisfied, three-dimensional band selection (BS-#D) of assigning the power of the target sound superior signal spectrum generated by the first different-directional-signal-group generator (may be the target sound superior signal spectrum generated by the second or third different-directional-signal-group generator) to the target sound spectrum to be separated.

The first and second sensitive region formation signal generators 1001, 1002 (see, FIG. 31) in the eighth embodiment and the first, second and third sensitive region formation signal generators 1201, 1202, 1203 (see, FIG. 40) in the tenth embodiment perform the same or approximately the same processes as those of the sound source separation system 300 (see, FIG. 12) in the third embodiment. However, in a case where a sensitive region for separating the target sound at a common part (overlapped part) of the individual sensitive regions is formed by integrating spectra for forming a plurality of respective sensitive region, the invention is not limited to the foregoing structure as long as, in a word, a sensitive region after integration is formed at a common part (overlapped part) by forming a plurality of sensitive regions and performing spectrum integration.

For example, the same microphone arrangement as that of the microphones 1021, 1022, 1023 (see, FIG. 31) in the eighth embodiment is employed, the first sensitive region formation signal generator performs the same processes as those of the sound source separation system 200 (see, FIG. 9) in the second embodiment using received sound signals of the two microphones located at the position of the first and second microphones 1021, 1022, to generate a first sensitive region formation signal spectrum, and the second sensitive region formation signal generator performs the same processes as those of the sound source separation system (see, FIG. 9) in the second embodiment using received sound signals of the two microphones located at the position of the third and second microphones 1023, 1022 to generate a second sensitive region formation signal spectrum, and the sensitive region integration unit performs spectrum integration on those two spectra by minimization.

Further, the same microphone arrangement as that of the microphones 1221, 1222, 1223 (see, FIG. 40) in the tenth embodiment is employed, and the first sensitive region formation signal generator performs the same processes as those of the sound source separation system 200 (see, FIG. 9) in the second embodiment using received sound signals of two microphones located at the position of the first and the second microphones 1221, 1222, to generate a first sensitive region formation signal spectrum, and the second sensitive region formation signal generator performs the same processes as those of the sound source separation system 200 (see, FIG. 9) in the second embodiment using received sound signals of two microphones located at the position of the third and the second microphones 1223, 1222 to generate a second sensitive region formation signal spectrum, and the third sensitive region formation signal generator performs the same processes as those of the sound source separation system 200 (see, FIG. 9) in the second embodiment using received sound signals of two microphones located at the position of the third and the first microphones 1223, 1221 to generate a third sensitive region formation signal spectrum, and the sensitive region integration unit performs spectrum integration on those three spectra by minimization.

INDUSTRIAL APPLICABILITY

As described above, the sound source separation system, the sound source separation method and the acoustic signal acquisition device of the invention are appropriate for a case where a desired speech is acquired through, for example, a portable device like a cellular phone, an in-vehicle device like a car navigation system, and a conference minute drafting device.

DESCRIPTION OF REFERENCE NUMERALS

Figure 1:
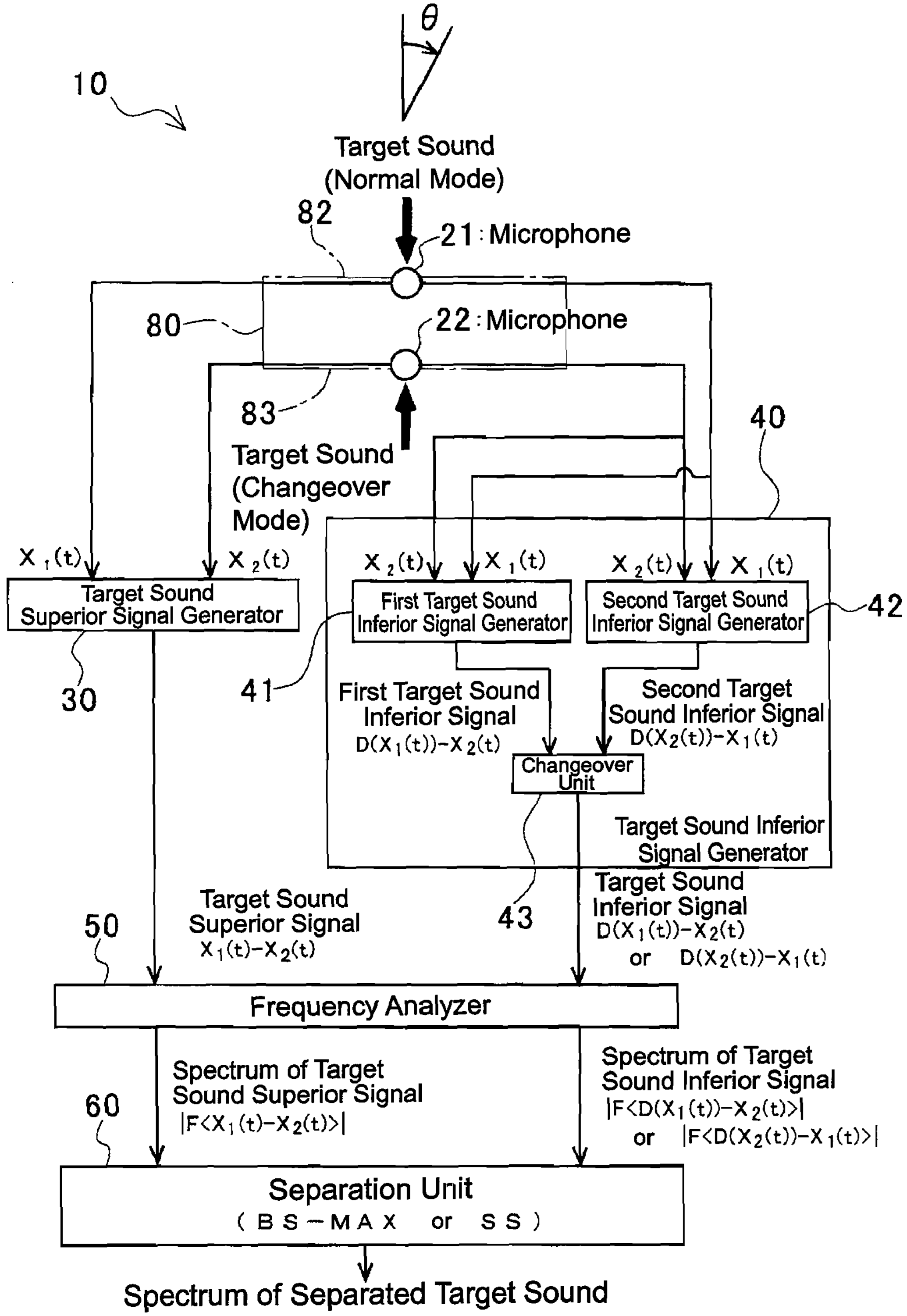
FIG. 1 is a diagram illustrating the general structure of a sound source separation system according to the first embodiment of the invention.
Figure 2:
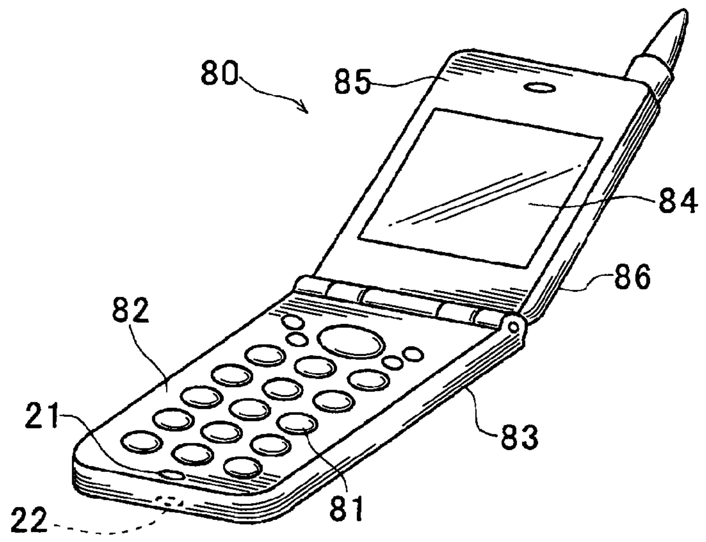
FIG. 2 is a perspective view illustrating a cellular phone provided with the sound source separation system of the first embodiment.
Figure 3:
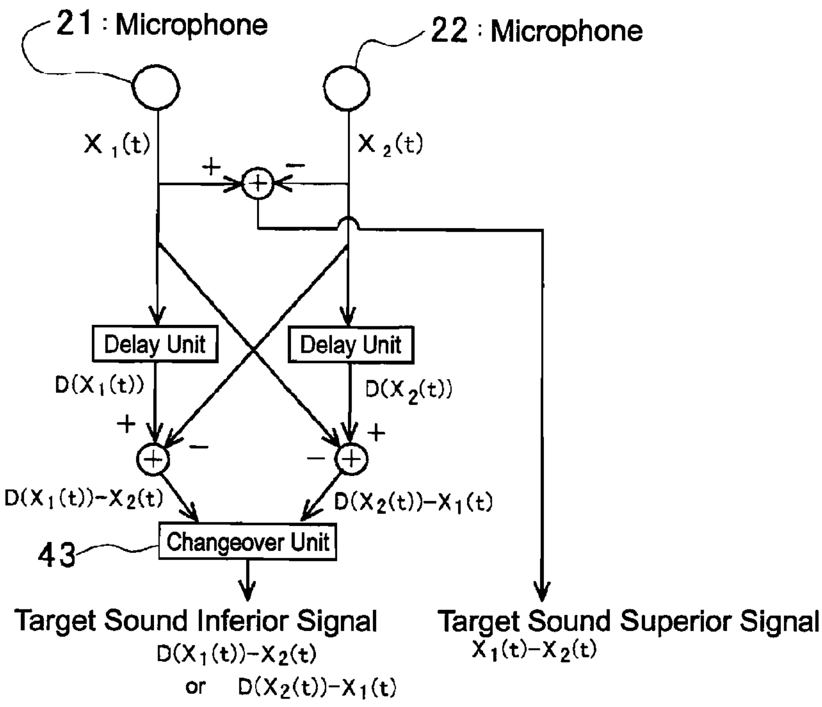
FIG. 3 is a structural diagram illustrating a part, which performs directivity control, in the sound source separation system of the first embodiment.
Figure 4:
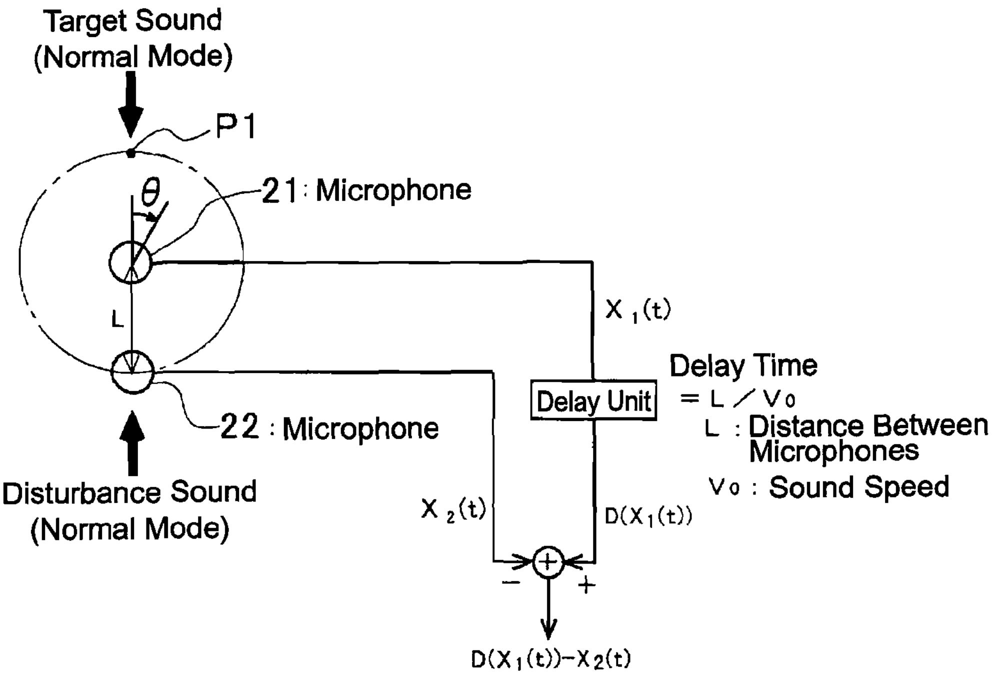
FIG. 4 is an explanatory diagram for a portion, which generates a first target sound inferior signal, in the part that performs directivity control in FIG. 3 according to the first embodiment.
Figure 5:
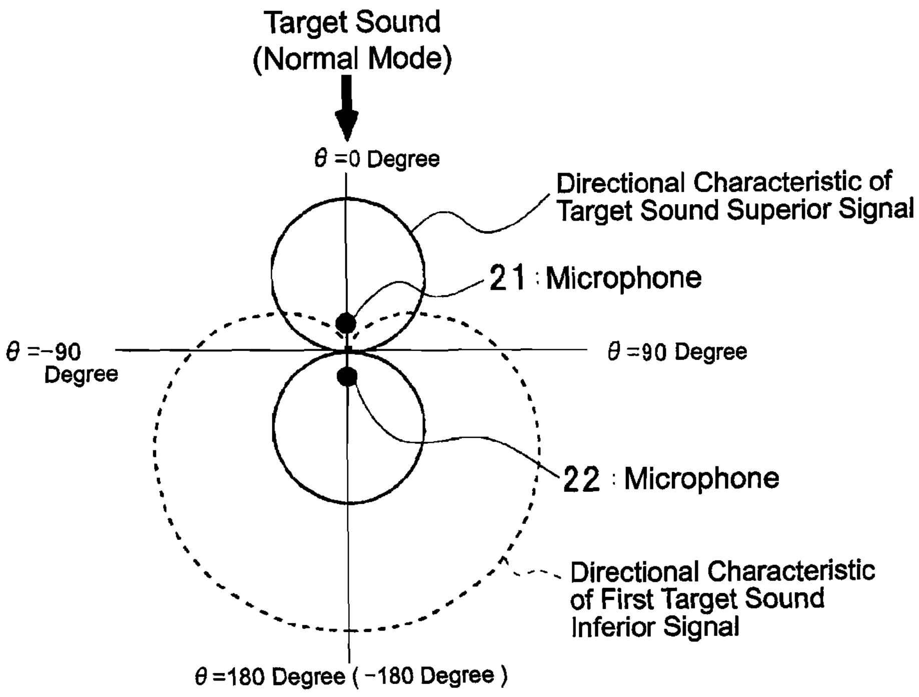
FIG. 5 is a diagram illustrating the directional characteristics of a target sound superior signal and first target sound inferior signal used in a normal mode according to the first embodiment.
Figure 6:
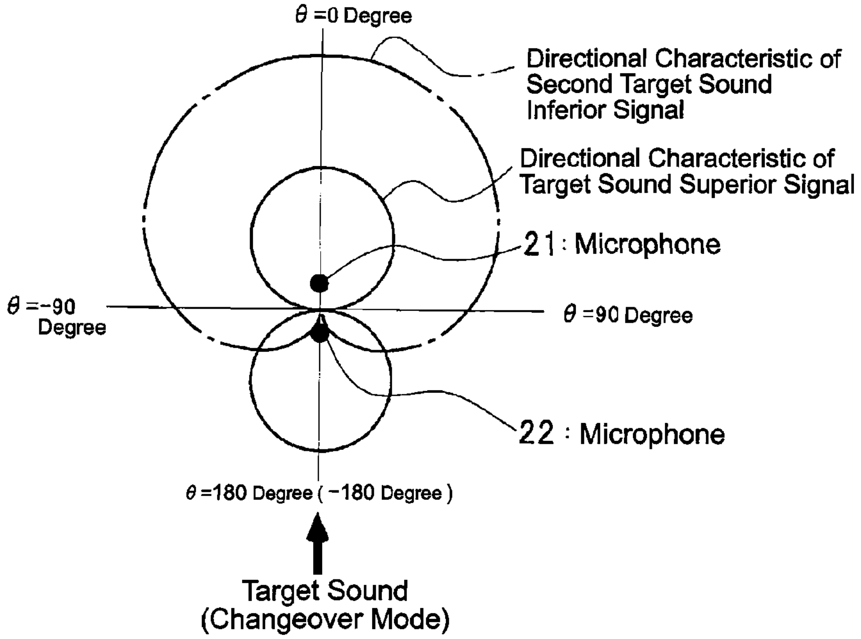
FIG. 6 is a diagram illustrating the directional characteristics of the target sound superior signal and second target sound inferior signal used in a changeover mode according to the first embodiment.
Figure 7:
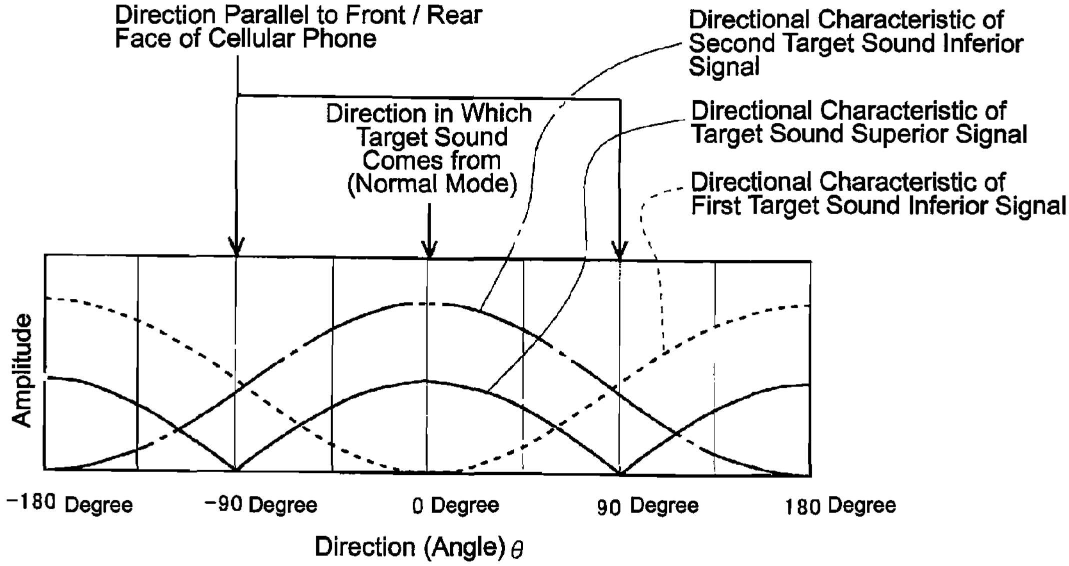
FIG. 7 is a diagram illustrating the directional characteristics with FIGS. 5, 6 spread out to take a horizontal axis as a direction (angle) θ according to the first embodiment.
Figure 8:
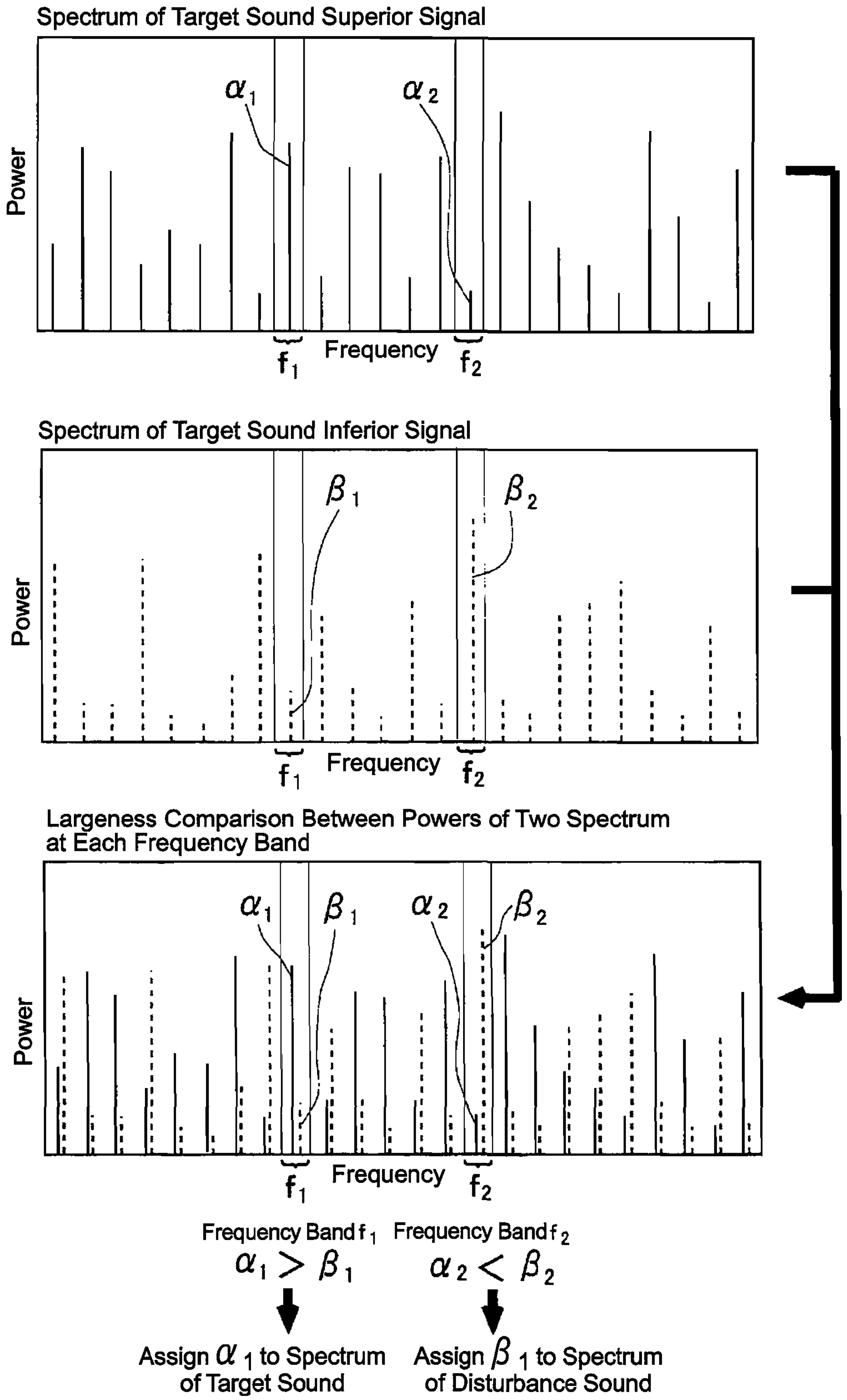
FIG. 8 is an explanatory diagram for band selection according to the first embodiment.
Figure 9:
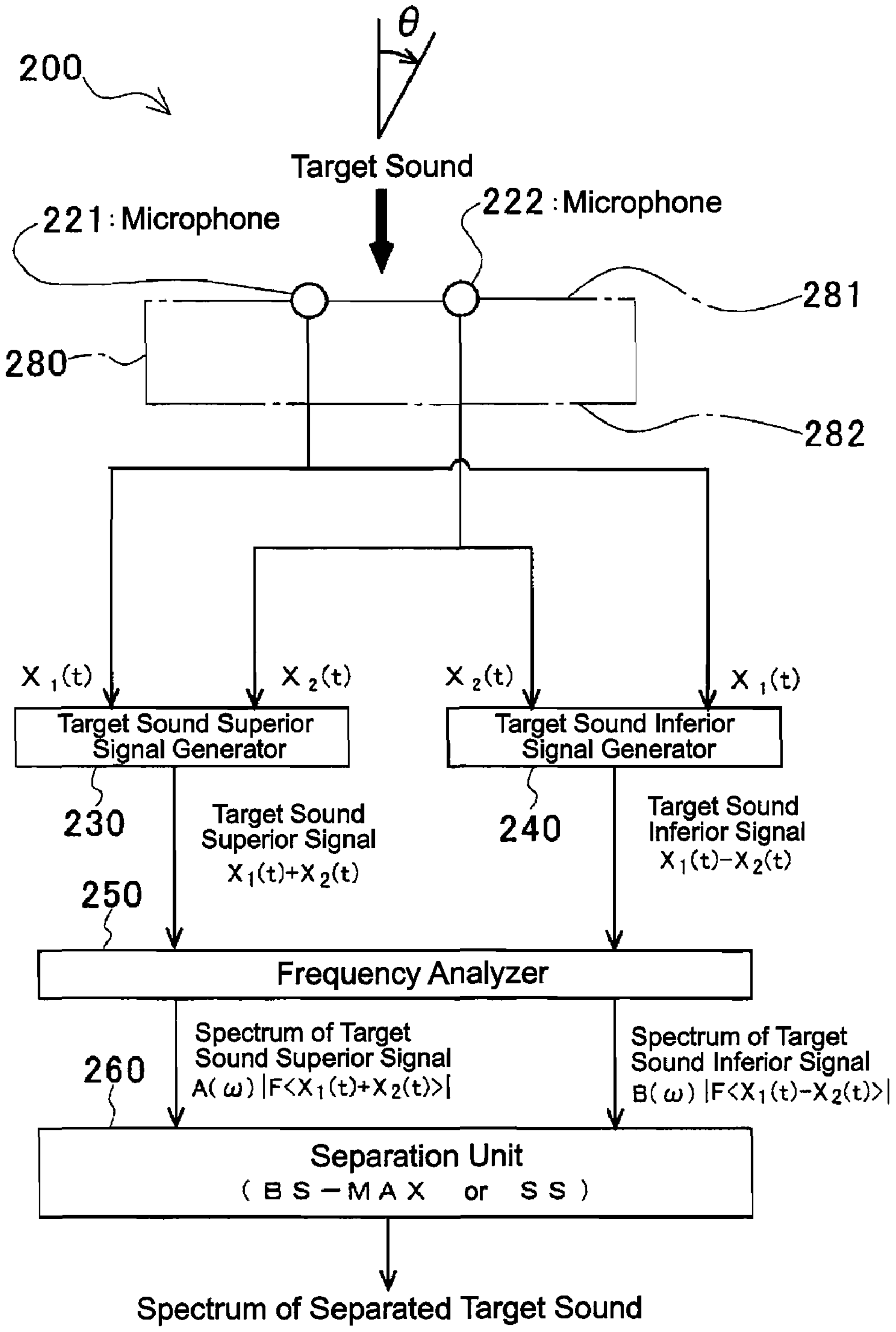
FIG. 9 is a diagram illustrating the general structure of a sound source separation system according to the second embodiment of the invention.
Figure 10:
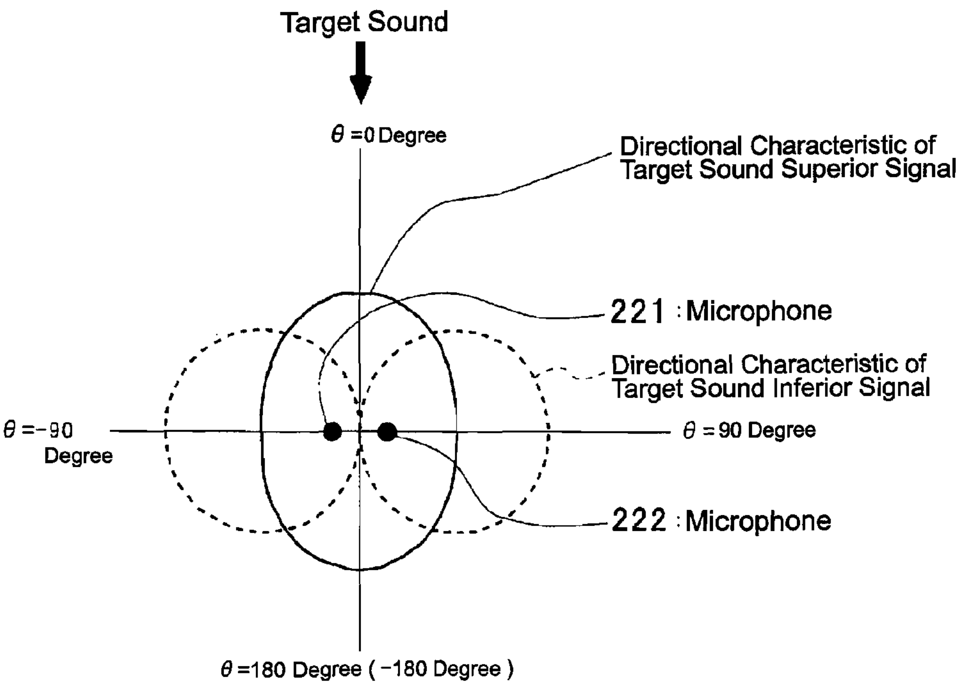
FIG. 10 is a diagram illustrating the directional characteristics of a target sound superior signal and target sound inferior signal according to the second embodiment.
Figure 11:
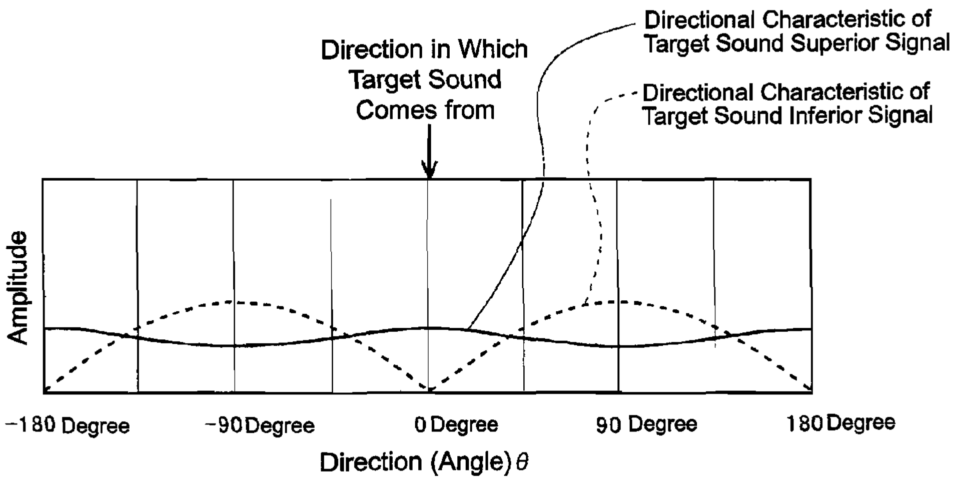
FIG. 11 is a diagram illustrating the directional characteristics with FIG. 10 spread out to take a horizontal axis as a direction (angle) θ according to the second embodiment.
Figure 12:
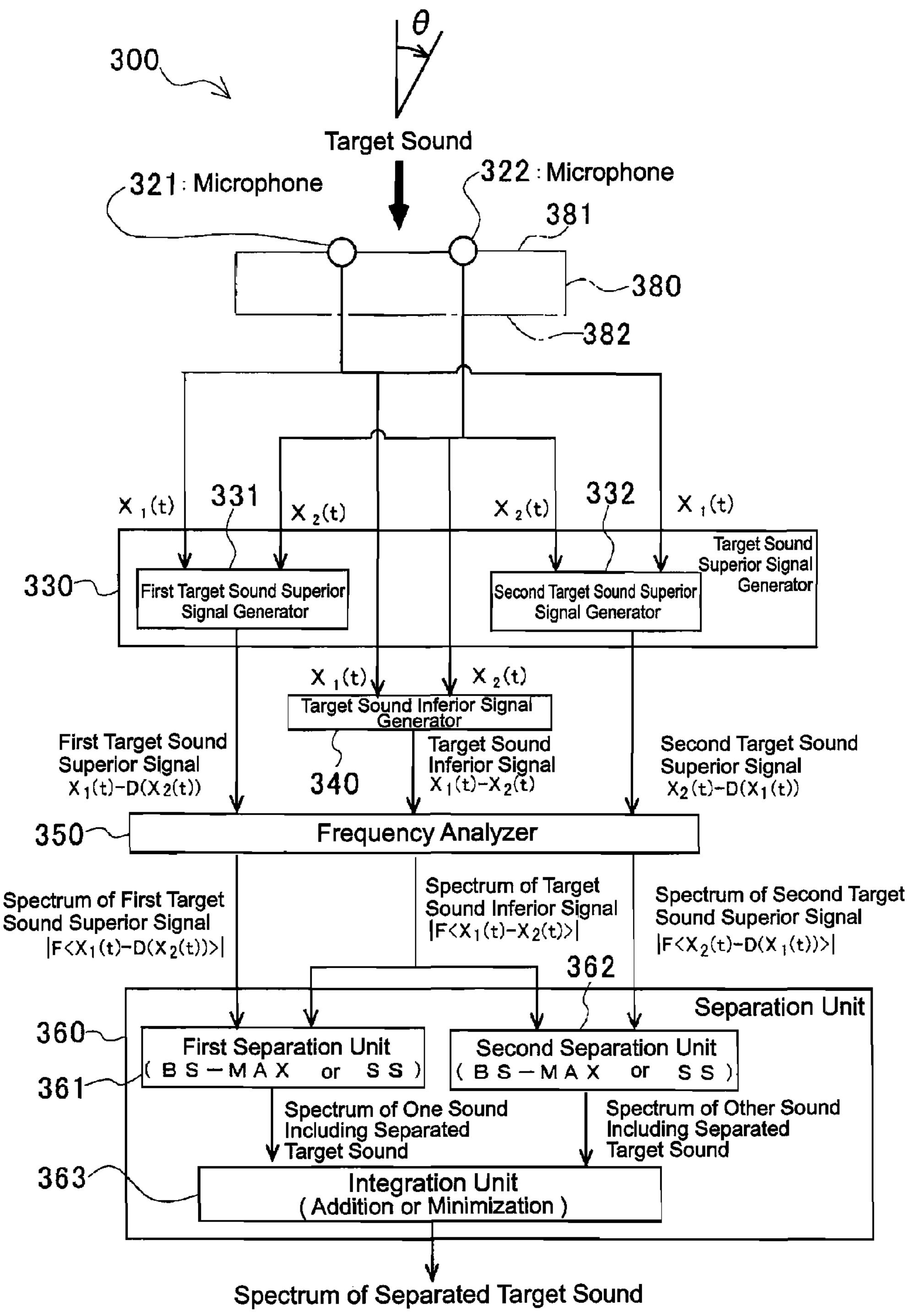
FIG. 12 is a diagram illustrating the general structure of a sound source separation system according to the third embodiment of the invention.
Figure 13:
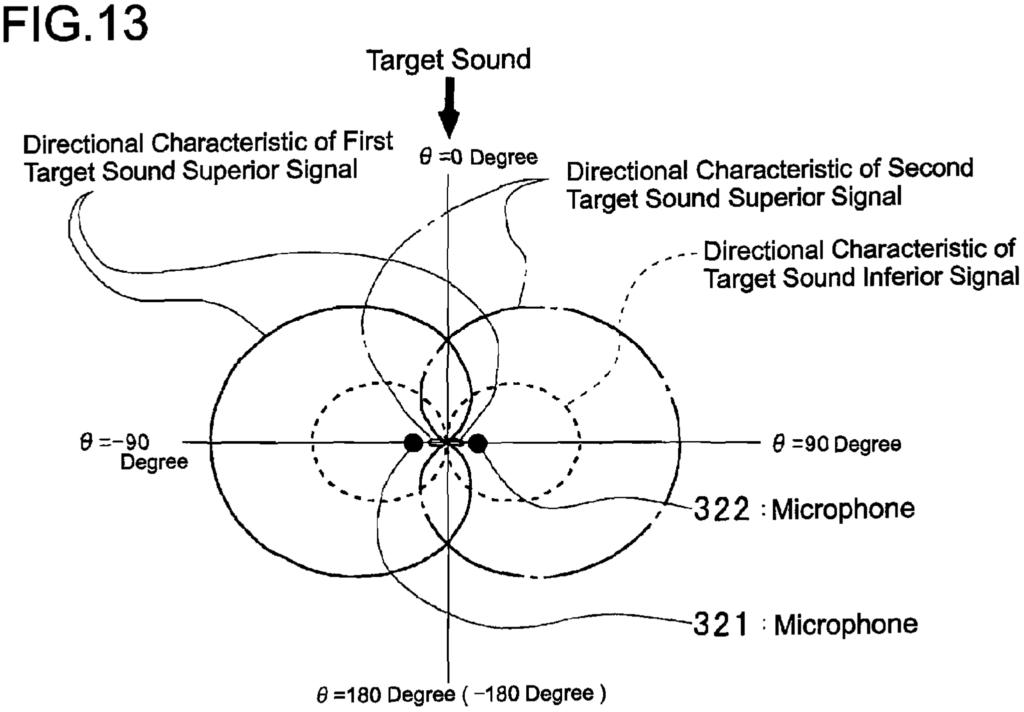
FIG. 13 is a diagram illustrating the directional characteristics of first and second target sound superior signals, and target sound inferior signal according to the third embodiment.
Figure 14:
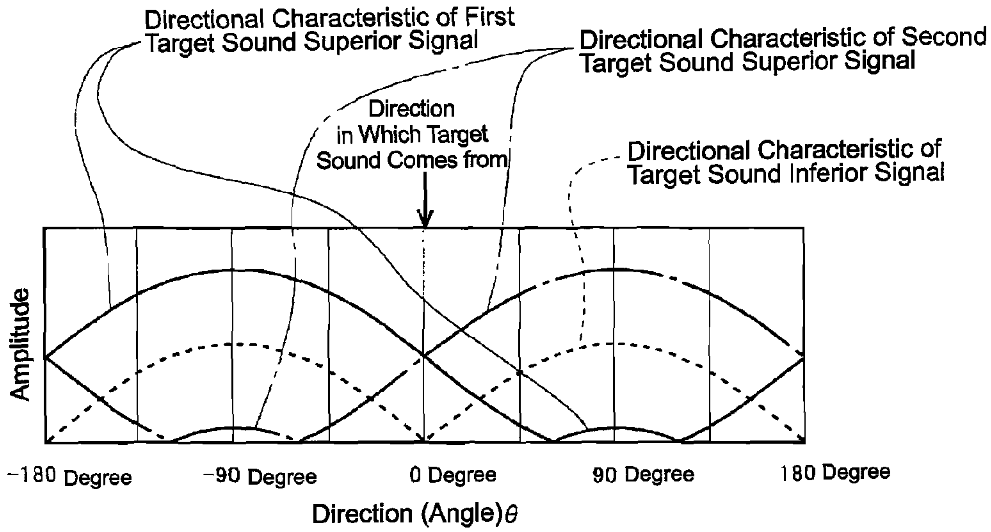
FIG. 14 is a diagram illustrating the directional characteristics with FIG. 13 spread out to take a horizontal axis as a direction (angle) θ according to the third embodiment.
Figure 15:
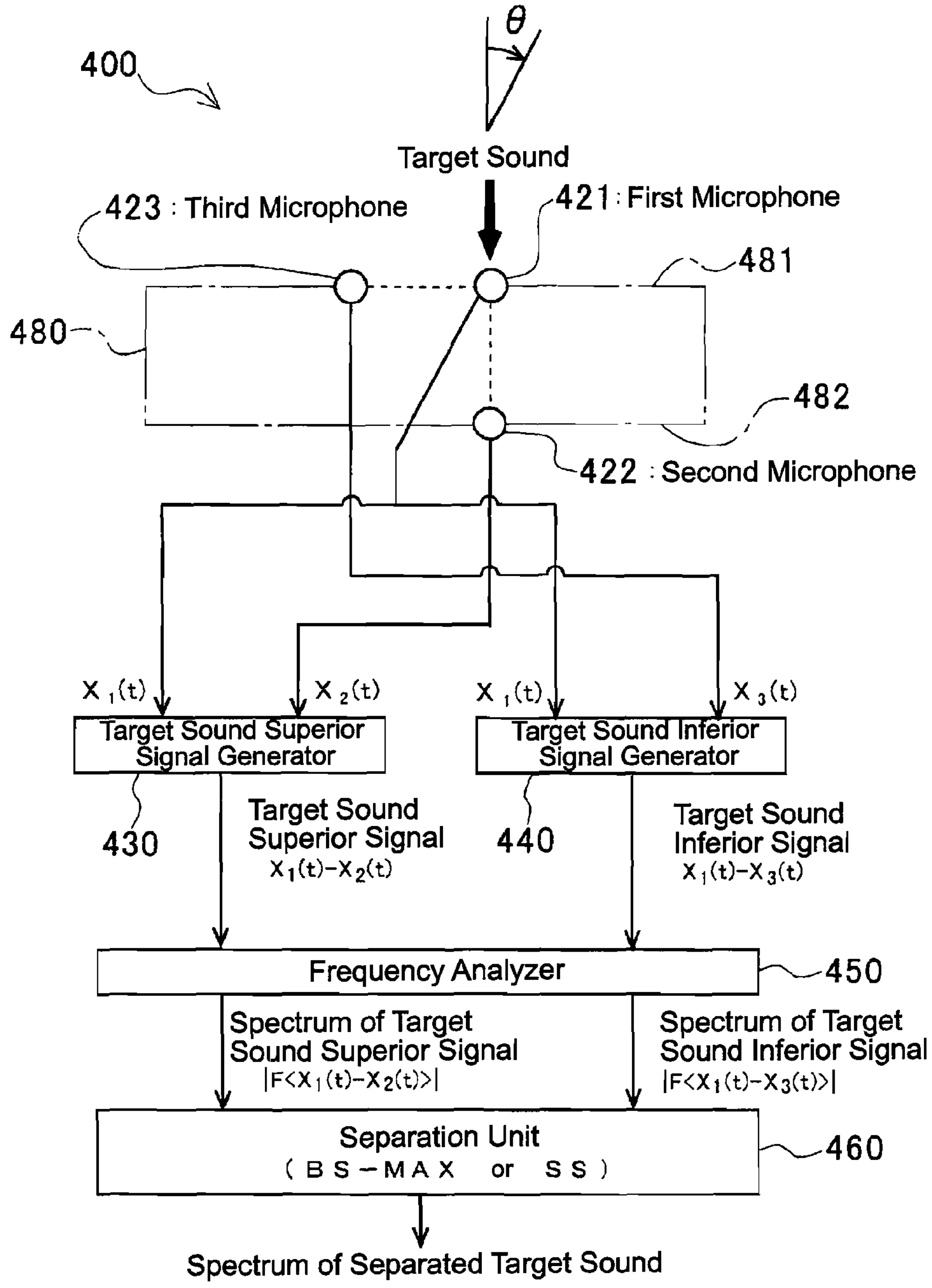
FIG. 15 is a diagram illustrating the general structure of a sound source separation system according to the fourth embodiment of the invention.
Figure 16:
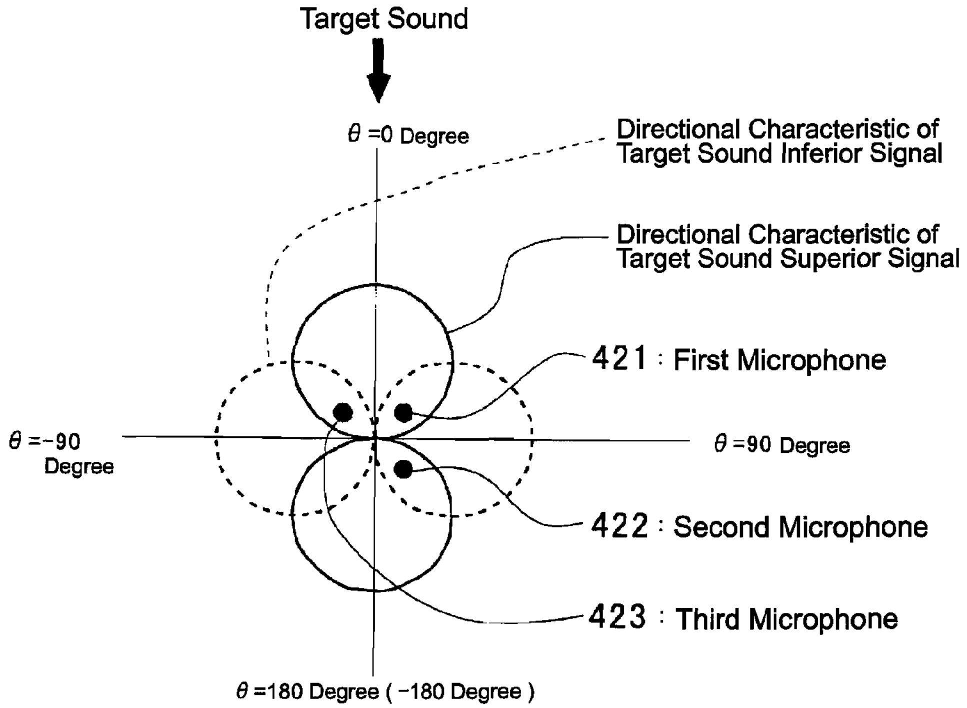
FIG. 16 is a diagram illustrating the directional characteristics of a target sound superior signal and target sound inferior signal according to the fourth embodiment.
Figure 17:
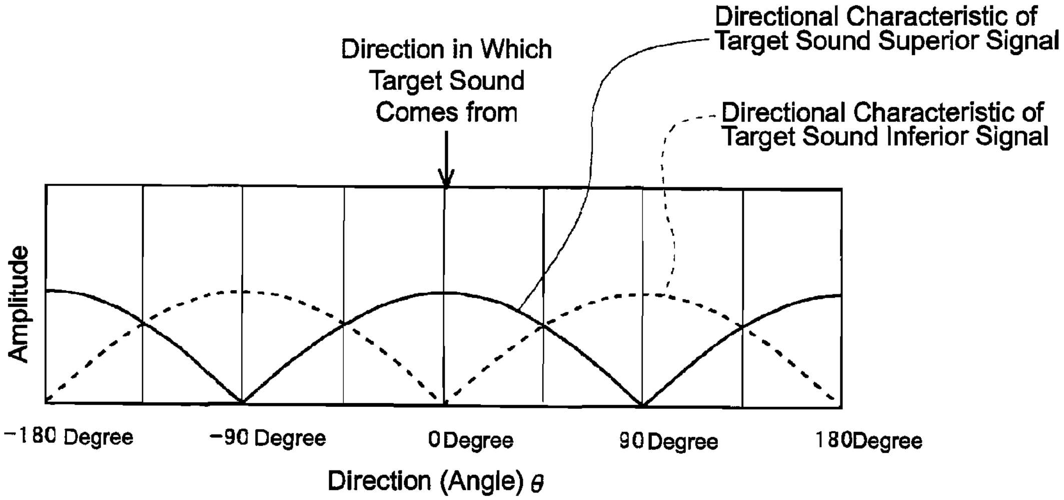
FIG. 17 is a diagram illustrating the directional characteristics with FIG. 16 spread out to take a horizontal axis as a direction (angle) θ according to the fourth embodiment.
Figure 18:
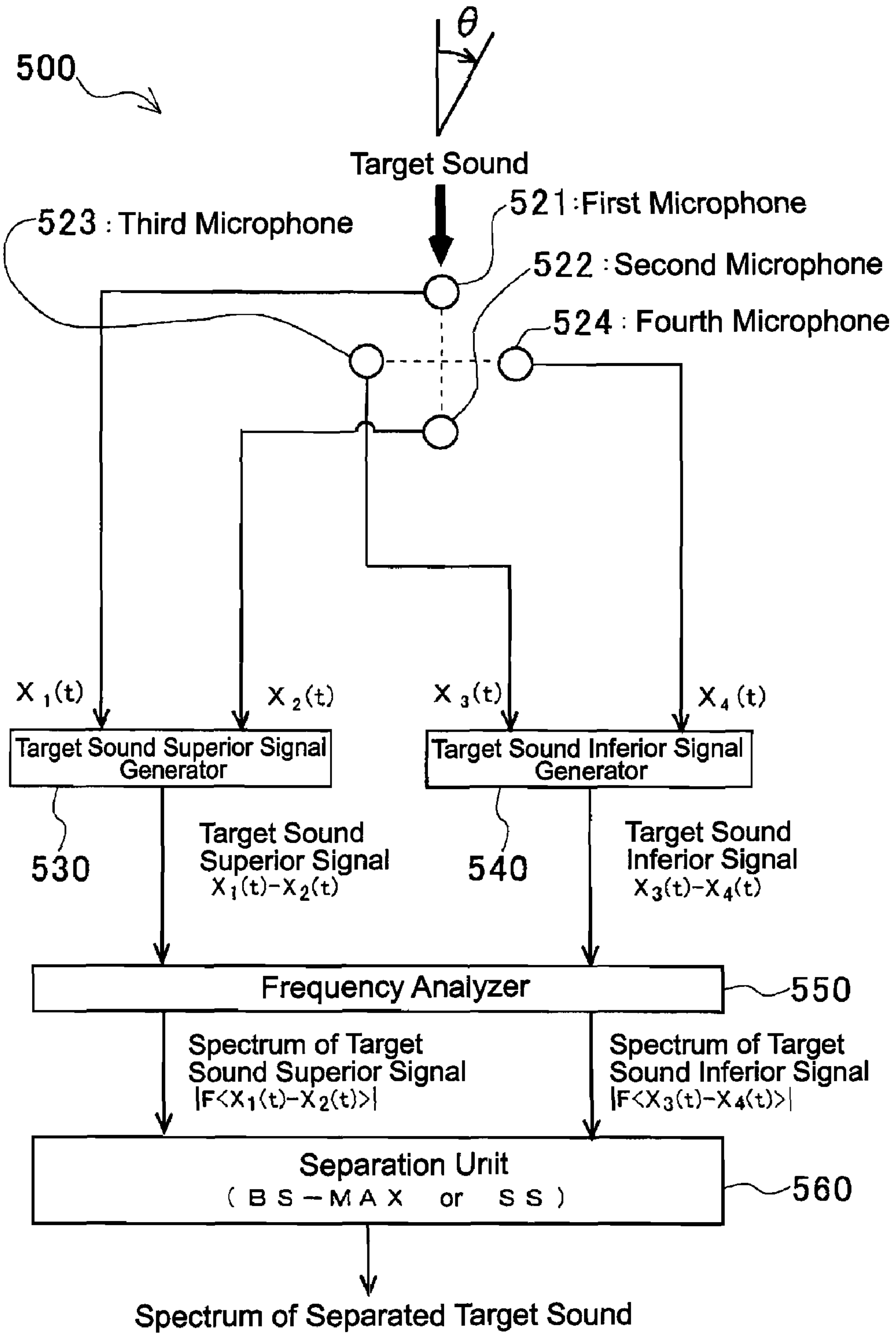
FIG. 18 is a diagram illustrating the general structure of a sound source separation system according to the fifth embodiment.
Figure 19:
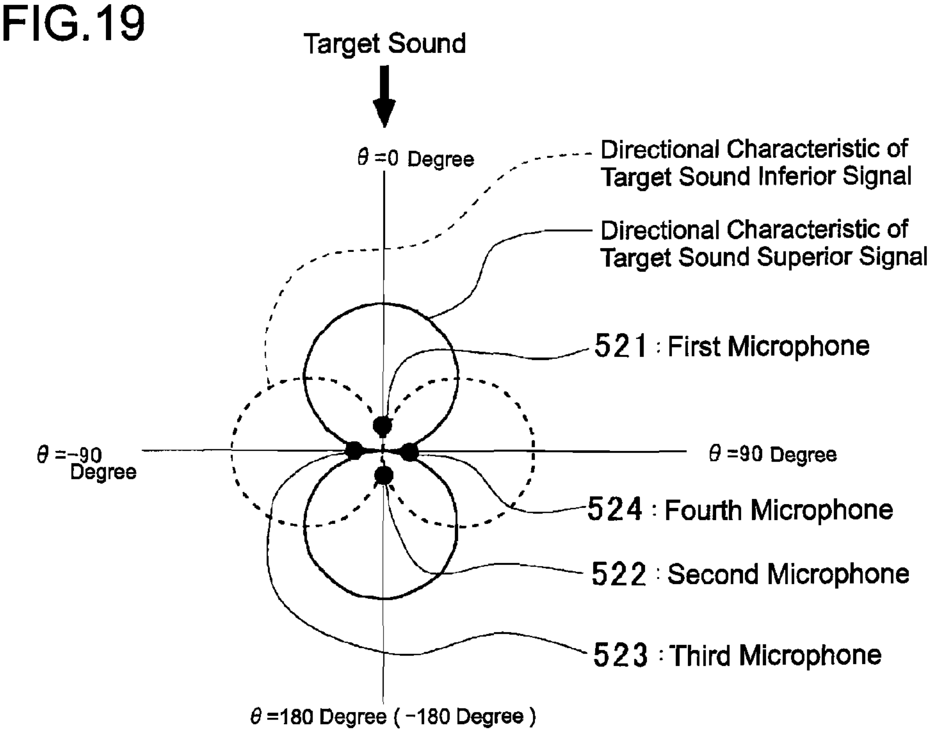
FIG. 19 is a diagram illustrating the directional characteristics of a target sound superior signal and target sound inferior signal according to the fifth embodiment.
Figure 20:
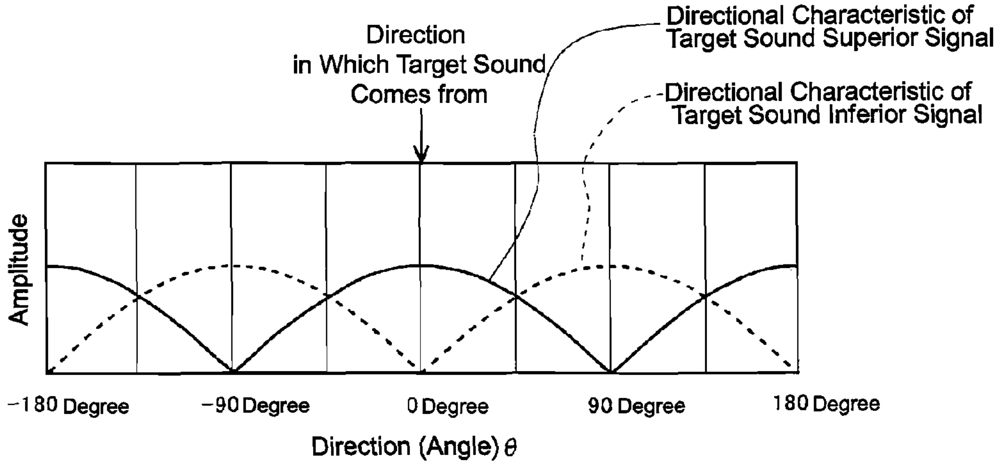
FIG. 20 is a diagram illustrating the directional characteristics with FIG. 19 spread out to take a horizontal axis as a direction (angle) θ.
Figure 21:
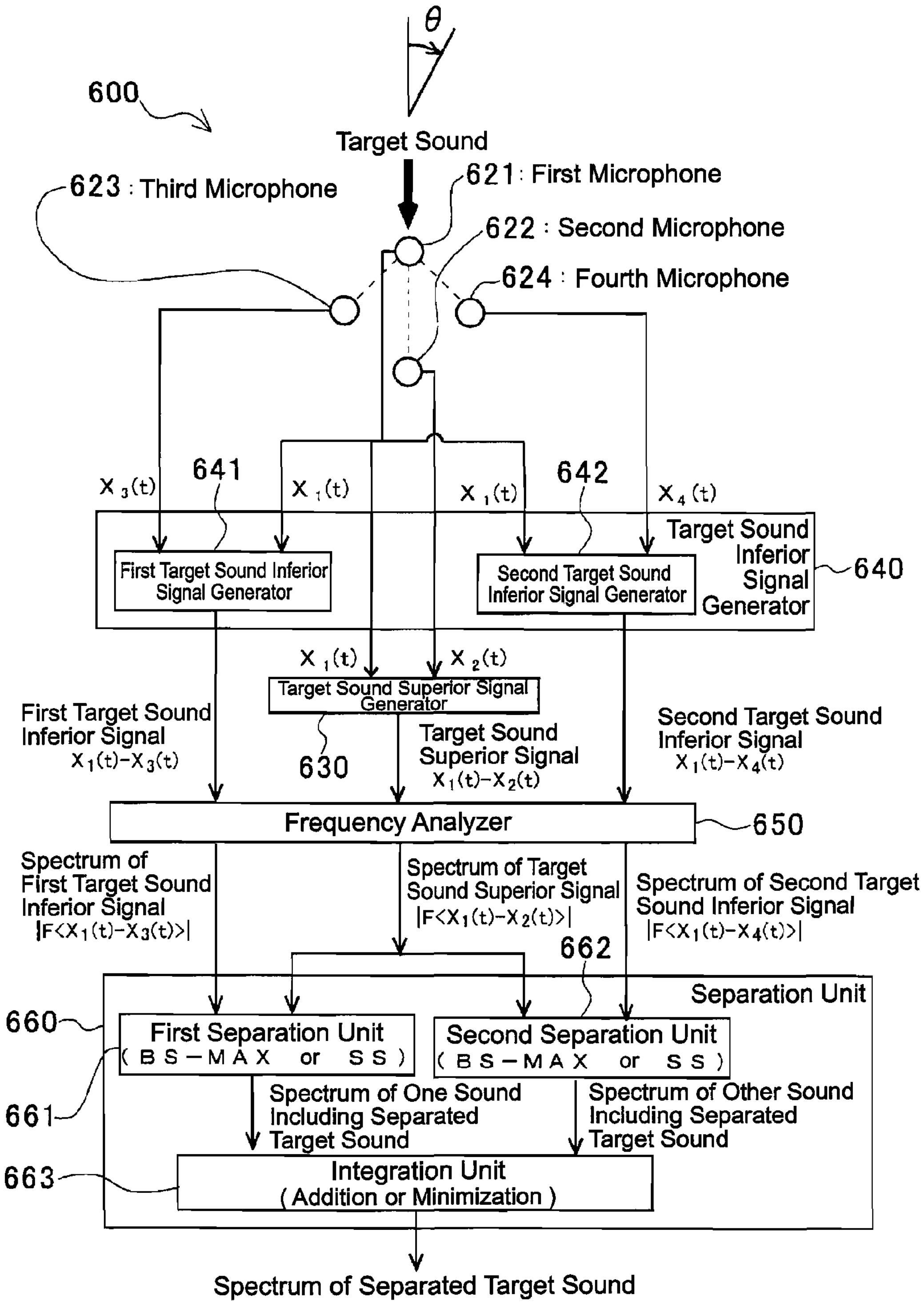
FIG. 21 is a diagram illustrating the general structure of a sound source separation system according to the sixth embodiment of the invention.
Figure 22:
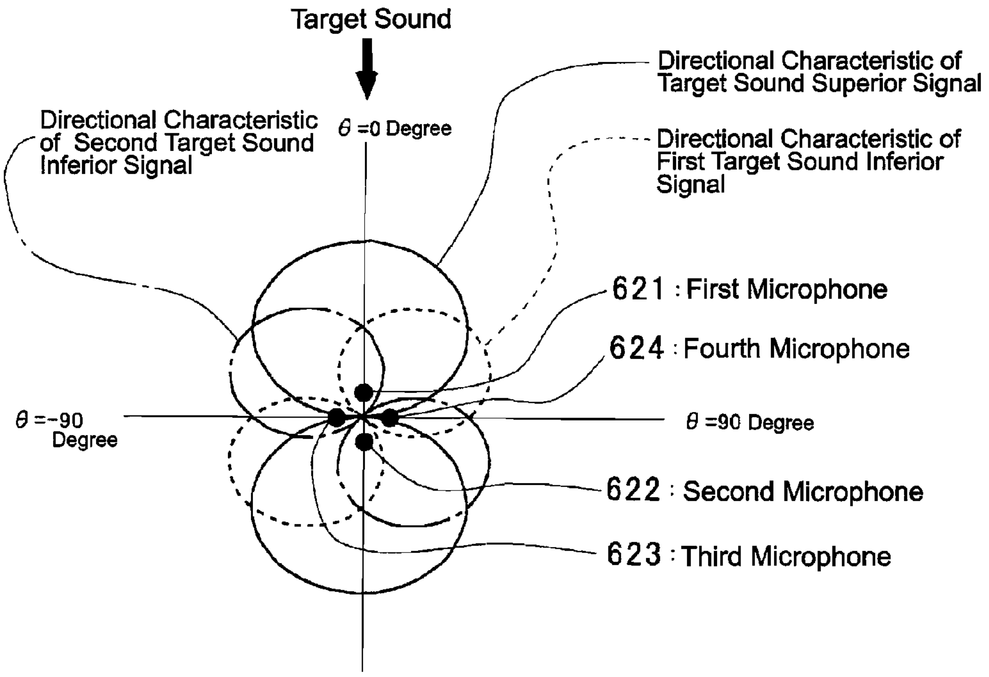
FIG. 22 is a diagram illustrating the directional characteristics of a target sound superior signal, and first and second target sound inferior signals according to the sixth embodiment.
Figure 23:
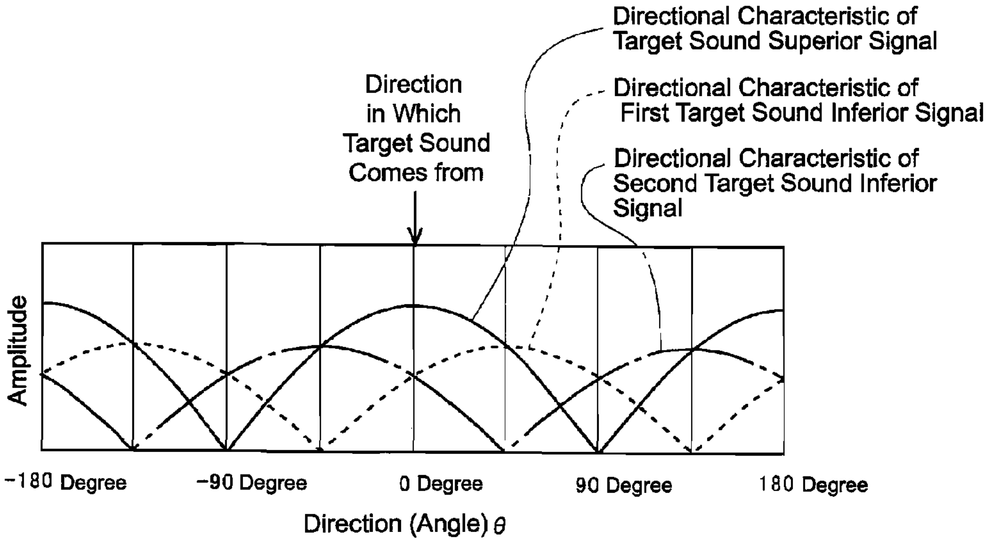
FIG. 23 is a diagram illustrating the directional characteristics with FIG. 22 spread out to take a horizontal axis as a direction (angle) θ according to the sixth embodiment.
Figure 24:
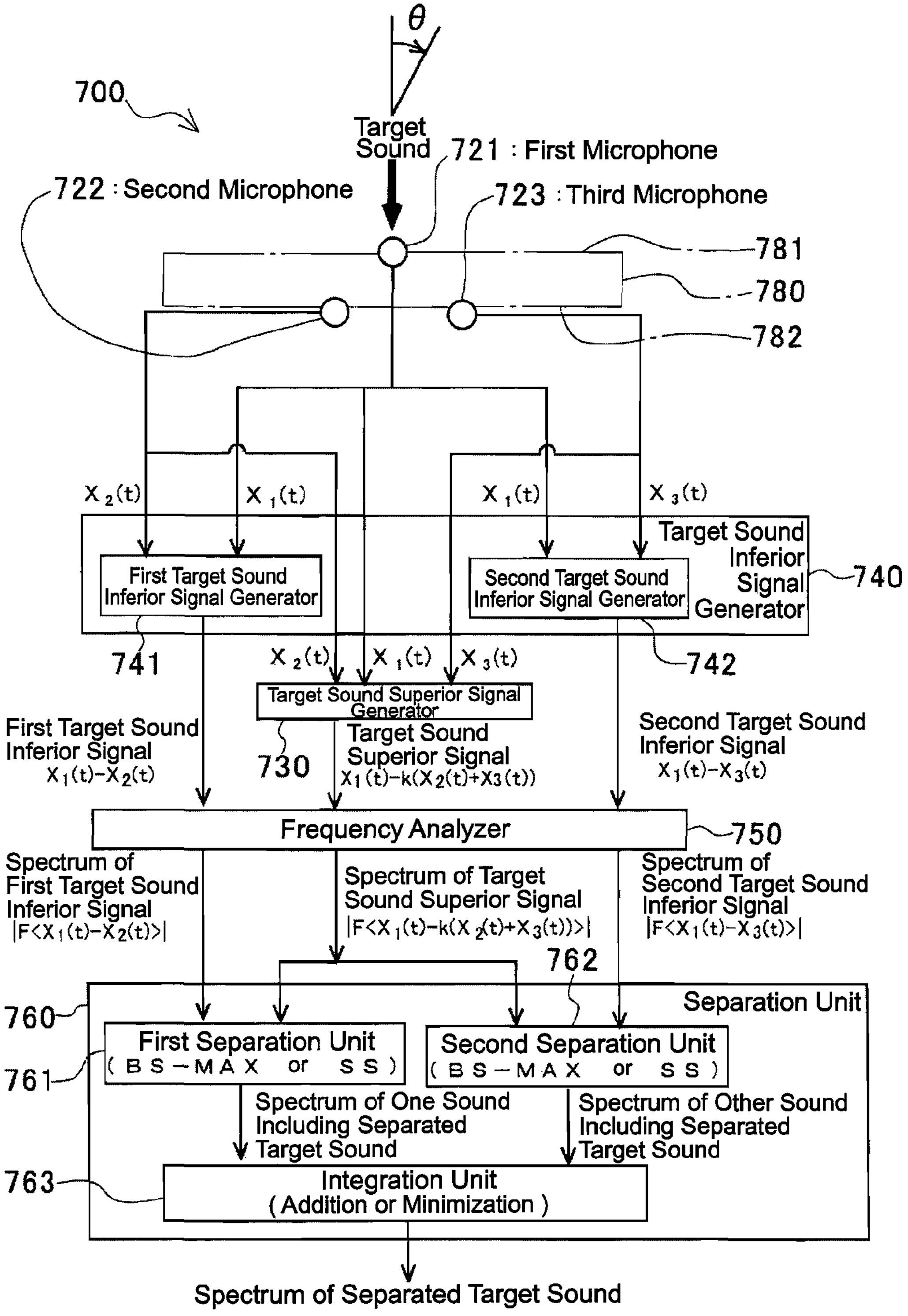
FIG. 24 is a diagram illustrating the general structure of a sound source separation system according to the seventh embodiment of the invention.
Figure 25:
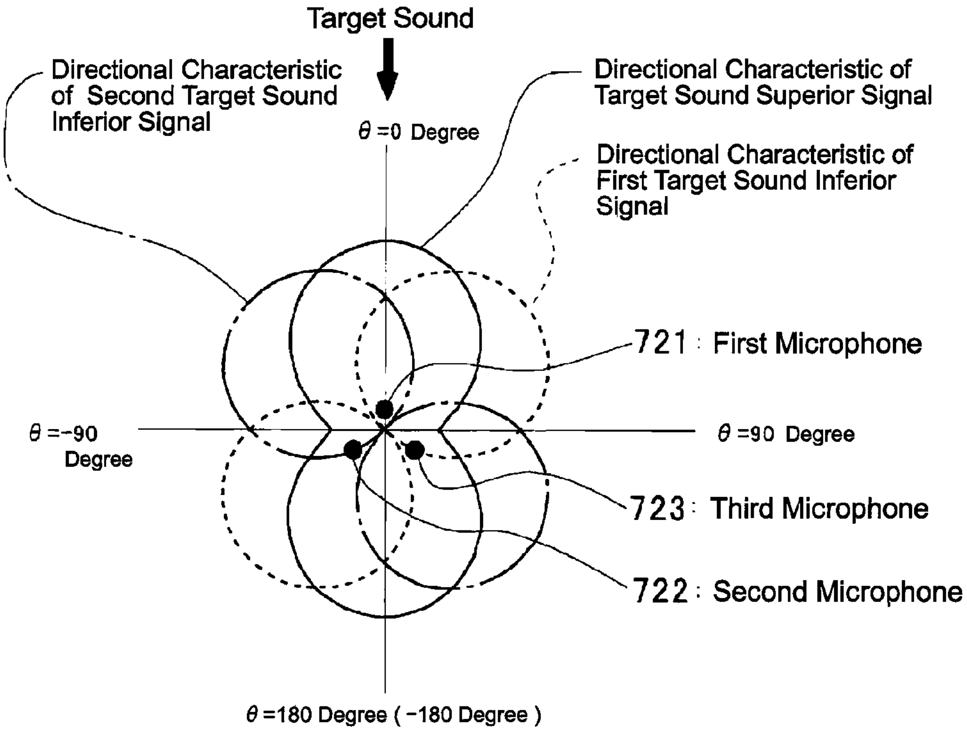
FIG. 25 is a diagram illustrating the directional characteristics of a target sound superior signal, and first and second target sound inferior signals according to the seventh embodiment.
Figure 26:
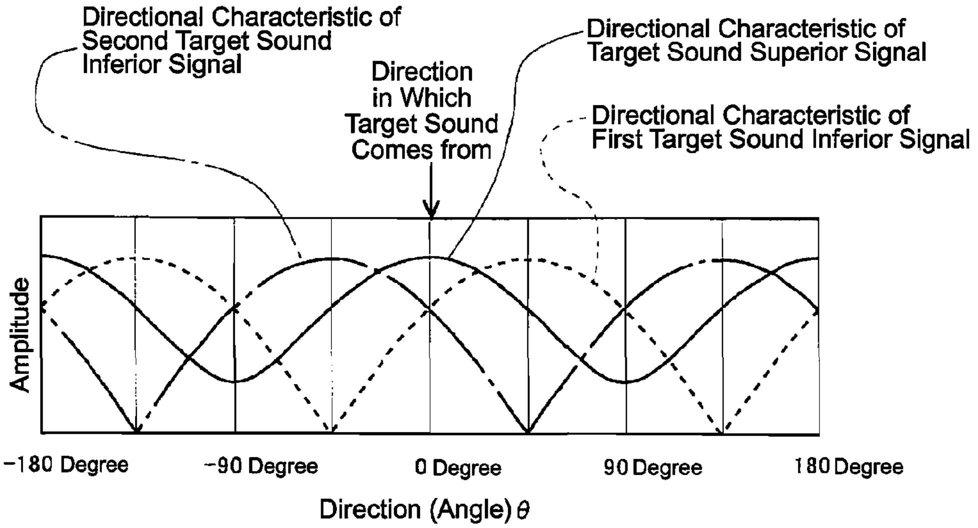
FIG. 26 is a diagram illustrating the directional characteristics with FIG. 25 spread out to take a horizontal axis as a direction (angle) θ according to the seventh embodiment.
Figure 27:
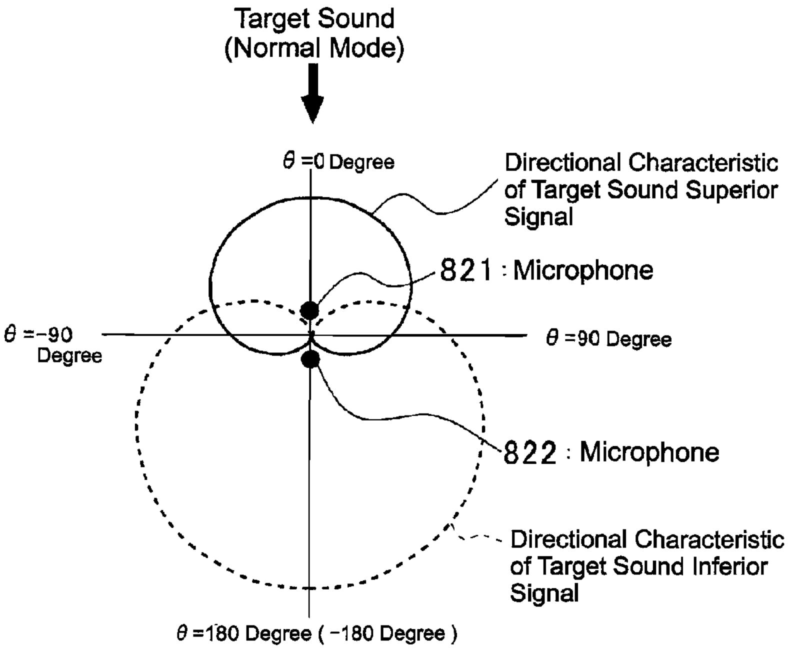
FIG. 27 is a diagram for a first modified embodiment of the invention.
Figure 28:
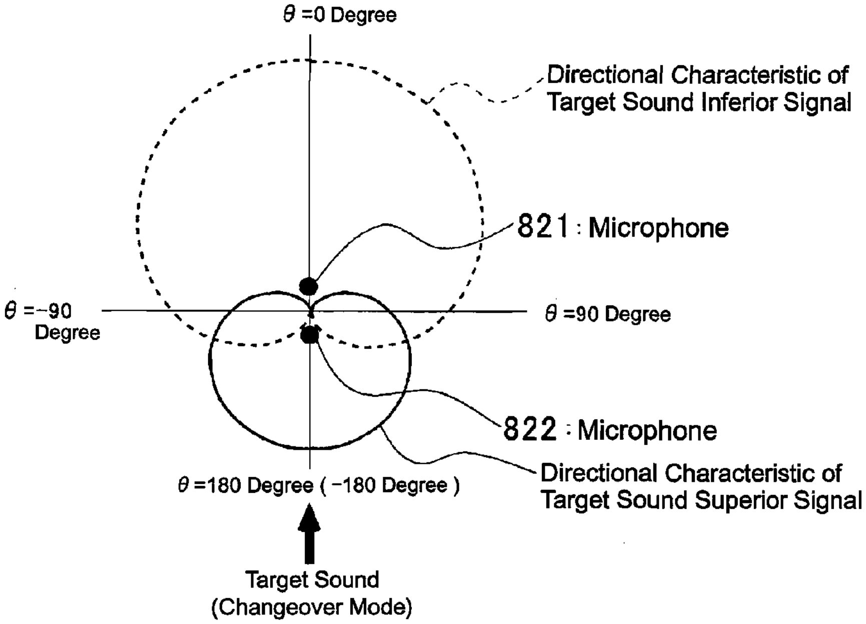
FIG. 28 is a diagram for a second modified embodiment of the invention.
Figure 29:
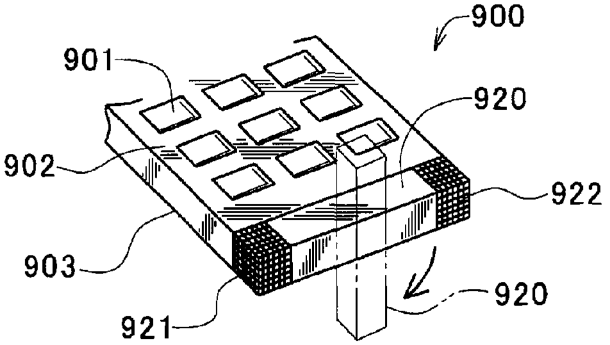
FIG. 29 is a diagram for a third modified embodiment of the invention.
Figure 30:
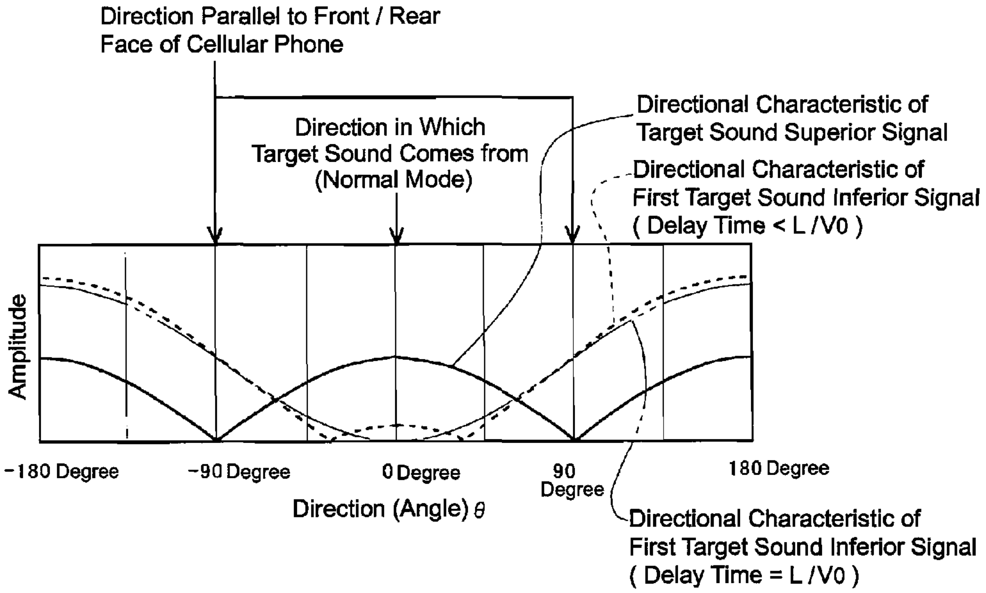
FIG. 30 is a diagram for a fourth modified embodiment of the invention.
Figure 31:
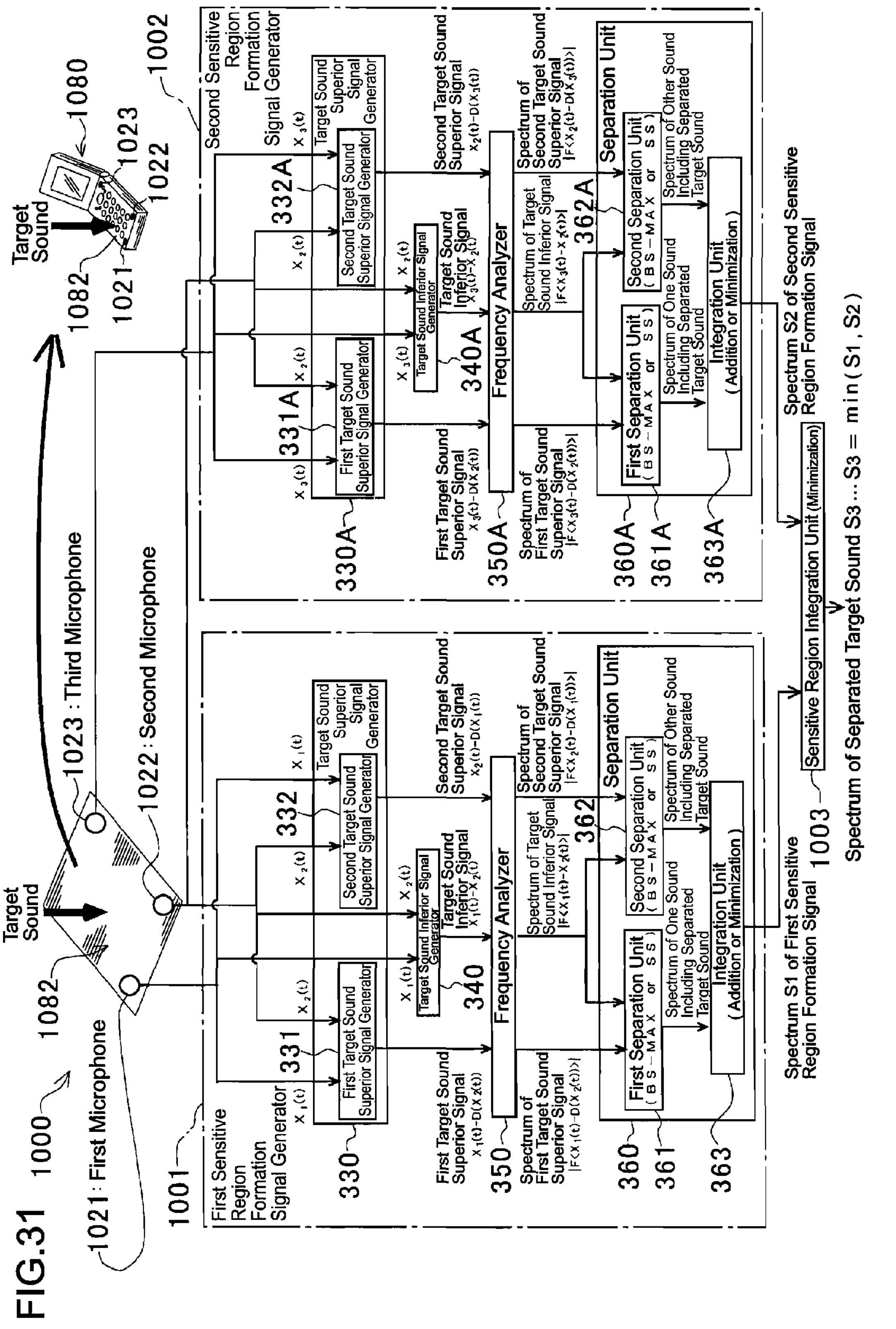
FIG. 31 is a diagram illustrating the general structure of a sound source separation system according to the eighth embodiment of the invention.
Figure 32:
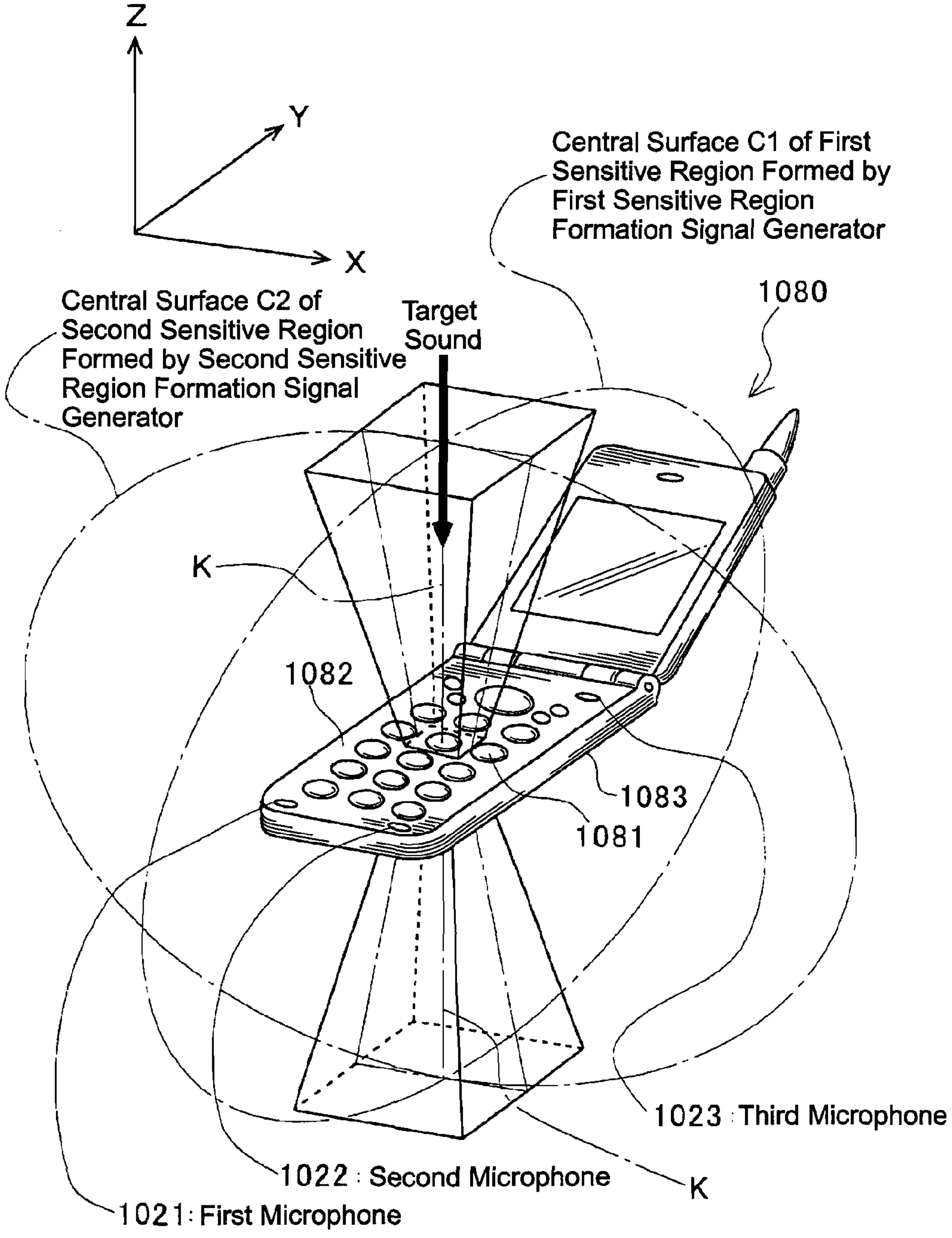
FIG. 32 is a diagram illustrating a sensitive region formed by the sound source separation system of the eighth embodiment.
Figure 33:
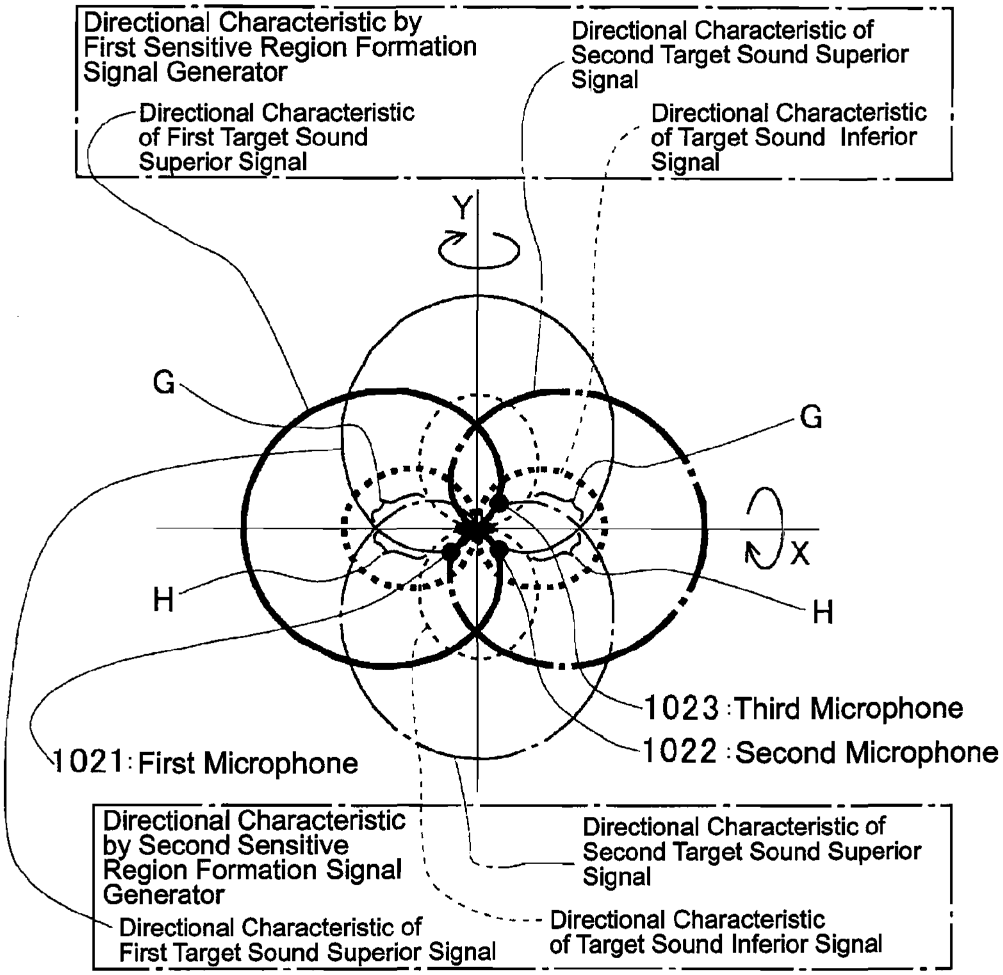
FIG. 33 is a diagram illustrating the directional characteristics of first and second target sound superior signals generated by a first sensitive region formation signal generator and target sound inferior signal, and directional characteristics of first and second target sound superior signals generated by a second sensitive region formation signal generator and target sound inferior signal according to the eighth embodiment.
Figure 34:
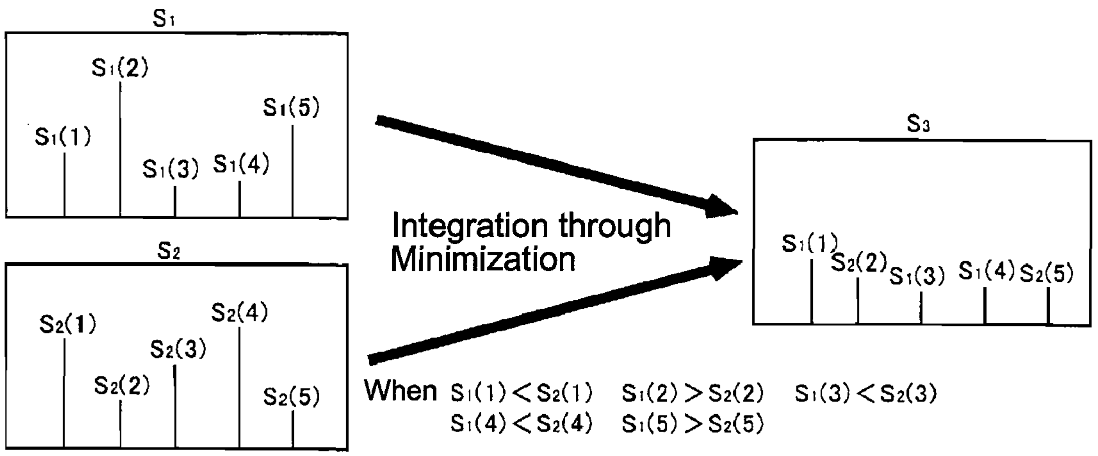
FIG. 34 is an explanatory diagram for a spectrum integration process through minimization according to the eighth embodiment.
Figure 35:
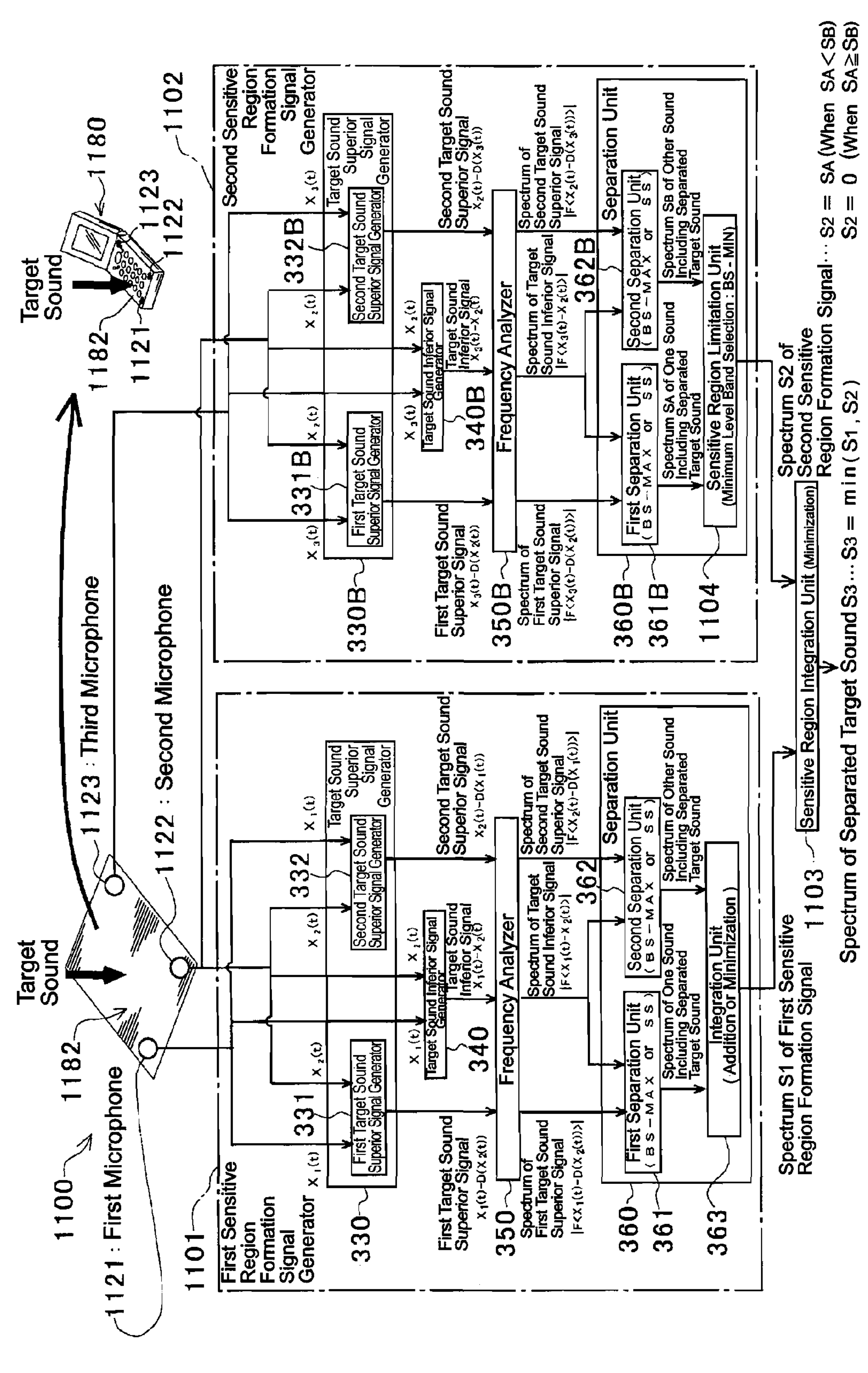
FIG. 35 is a diagram illustrating the general structure of a sound source separation system according to the ninth embodiment of the invention.
Figure 36:
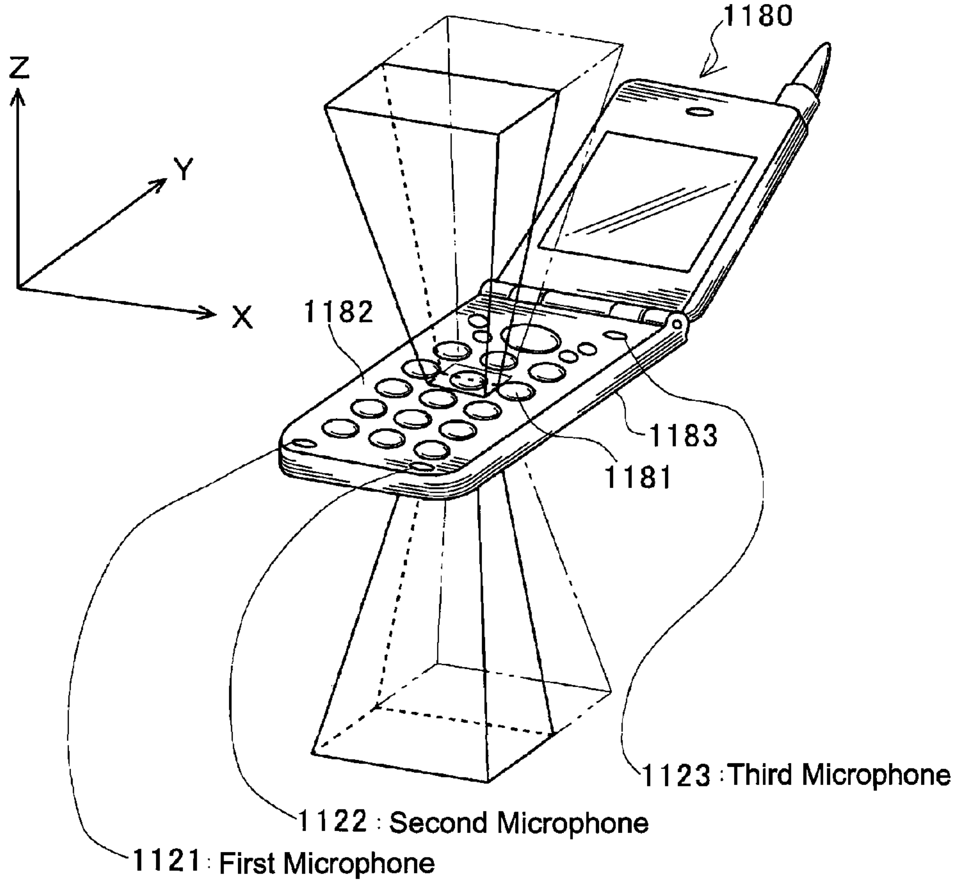
FIG. 36 is a diagram illustrating a sensitive region formed by the sound source separation system of the ninth embodiment.
Figure 37:
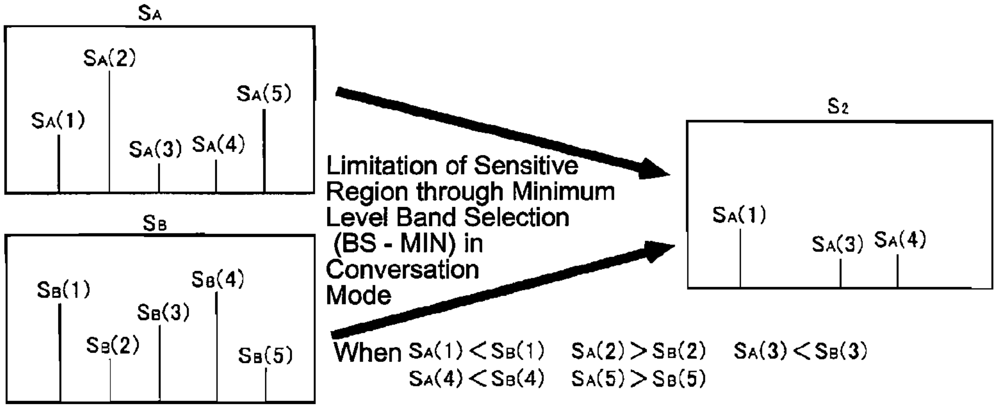
FIG. 37 is an explanatory diagram for a sensitive region limitation process through minimum level band selection in a conversation mode according to the ninth embodiment.
Figure 38:
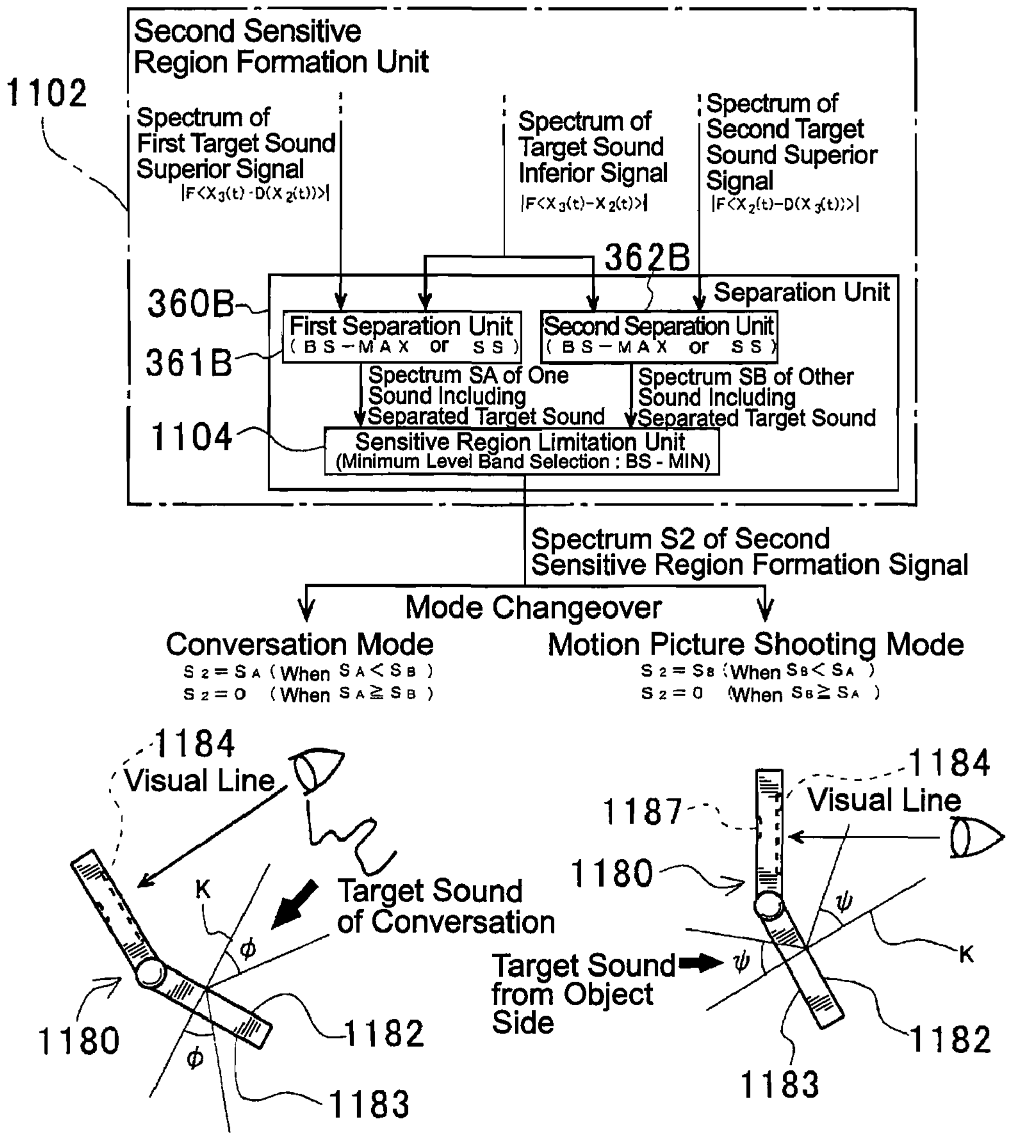
FIG. 38 is an explanatory diagram for mode change by a sensitive region limitation unit according to the ninth embodiment.
Figure 39:
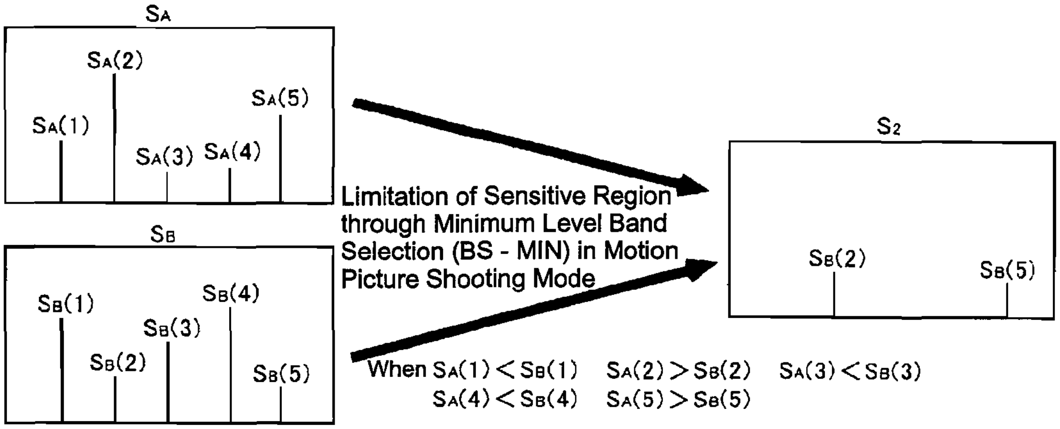
FIG. 39 is an explanatory diagram illustrating a sensitive region limitation process through minimum level band selection in a motion picture shooting mode according to the ninth embodiment.
Figure 40:
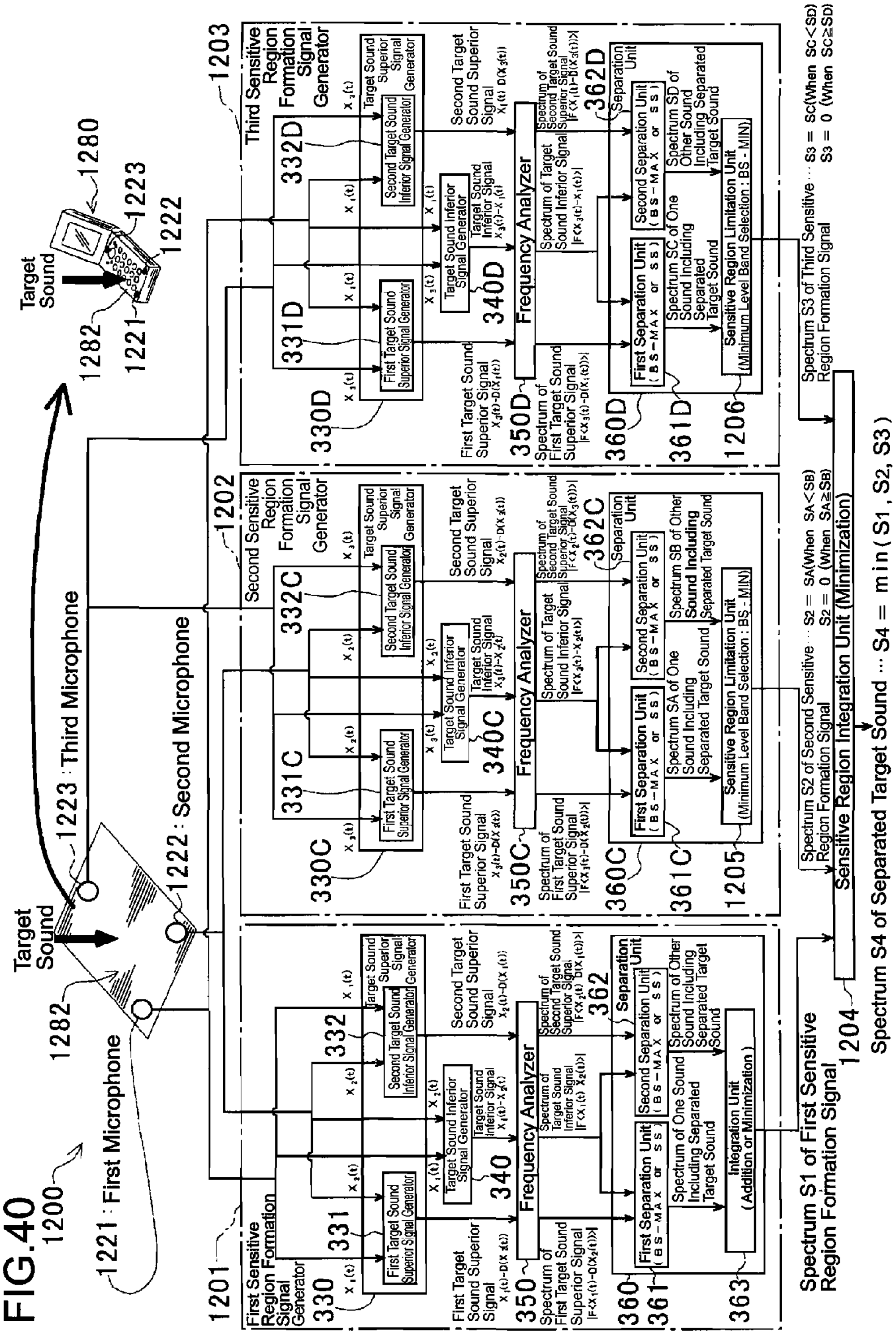
FIG. 40 is a diagram illustrating the general structure of a sound source separation system according to the tenth embodiment of the invention.
Figure 41:
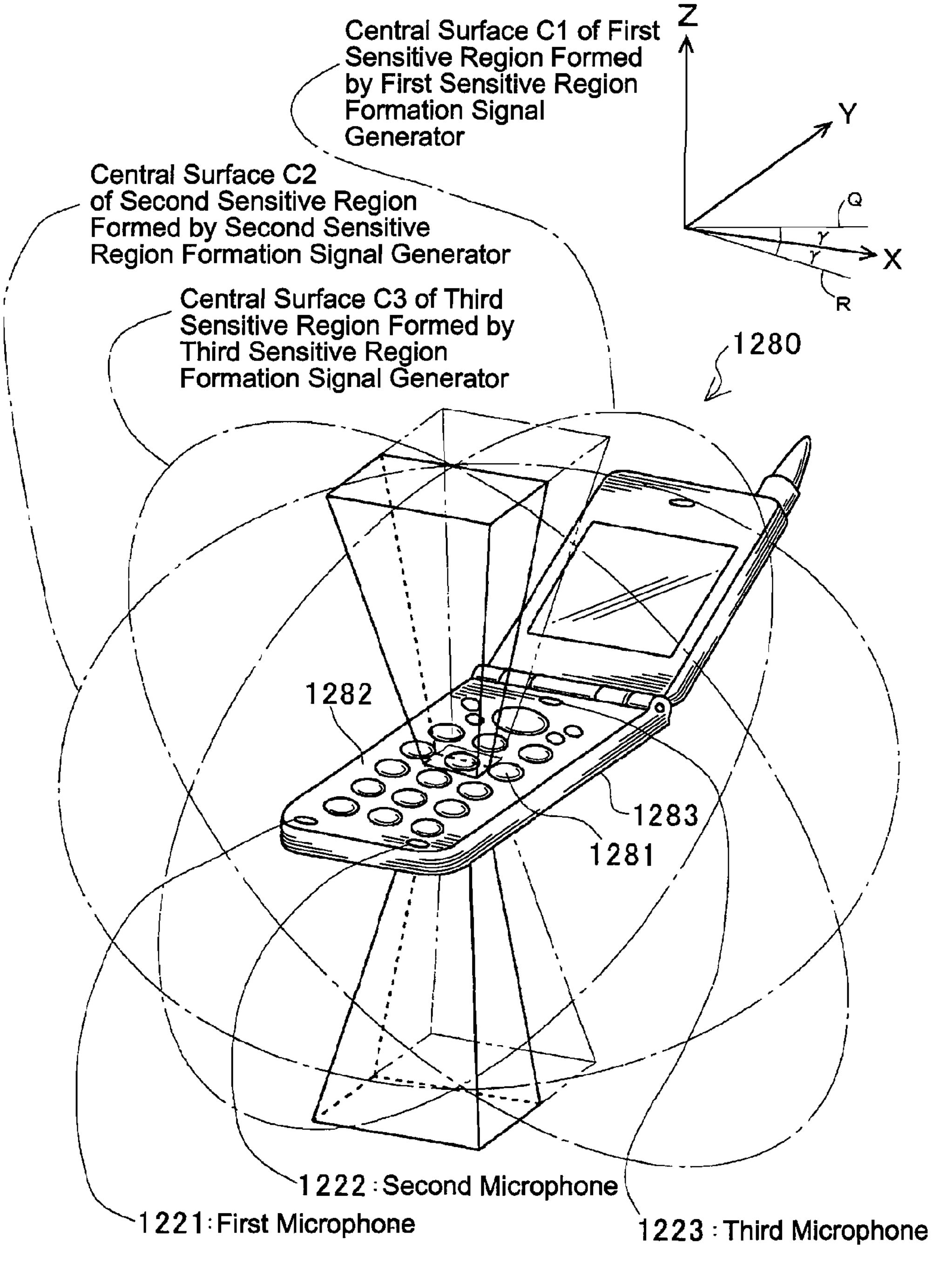
FIG. 41 is a diagram illustrating a sensitive region formed by the sound source separation system of the tenth embodiment.
Figure 42:
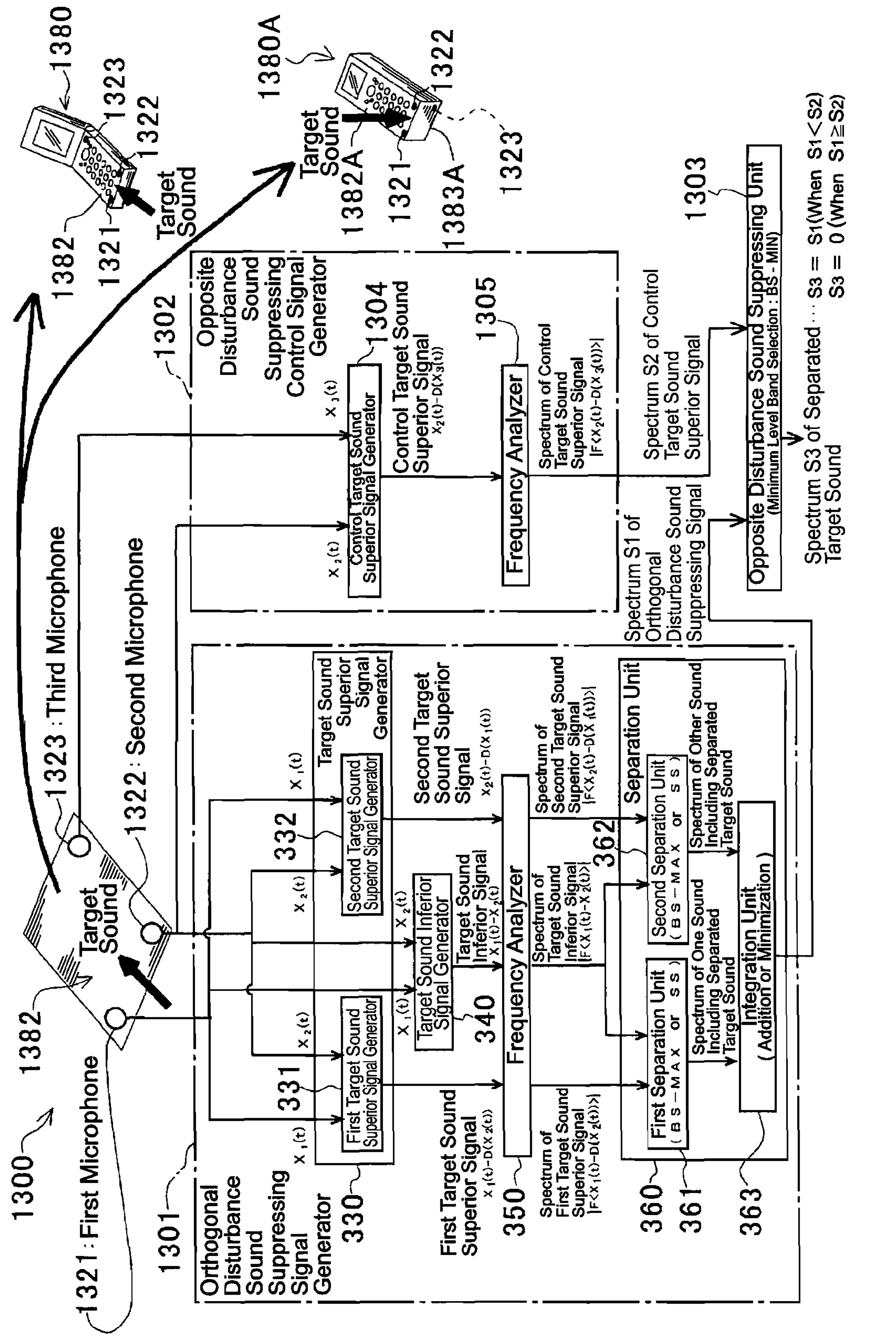
FIG. 42 is a diagram illustrating the general structure of a sound source separation system according to the eleventh embodiment of the invention.
Figure 43:
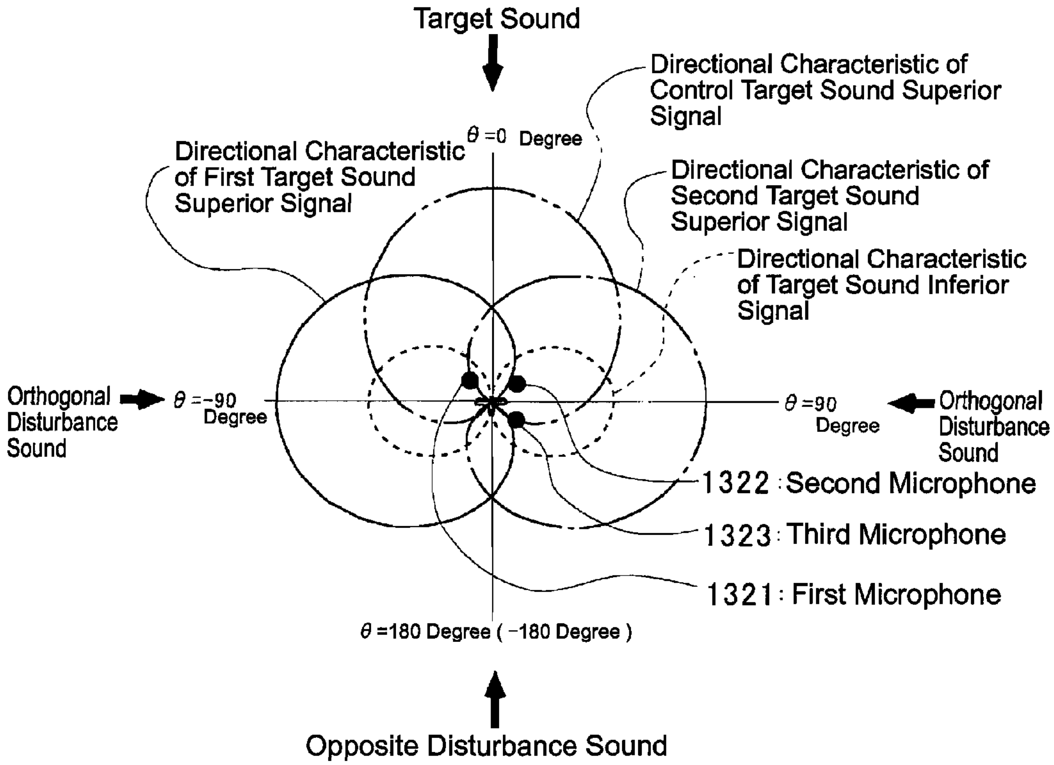
FIG. 43 is a diagram illustrating the directional characteristics of first and second target sound superior signals, target sound inferior signal, and control target sound superior signal generated by the sound source separation system of the eleventh embodiment.
Figure 44:
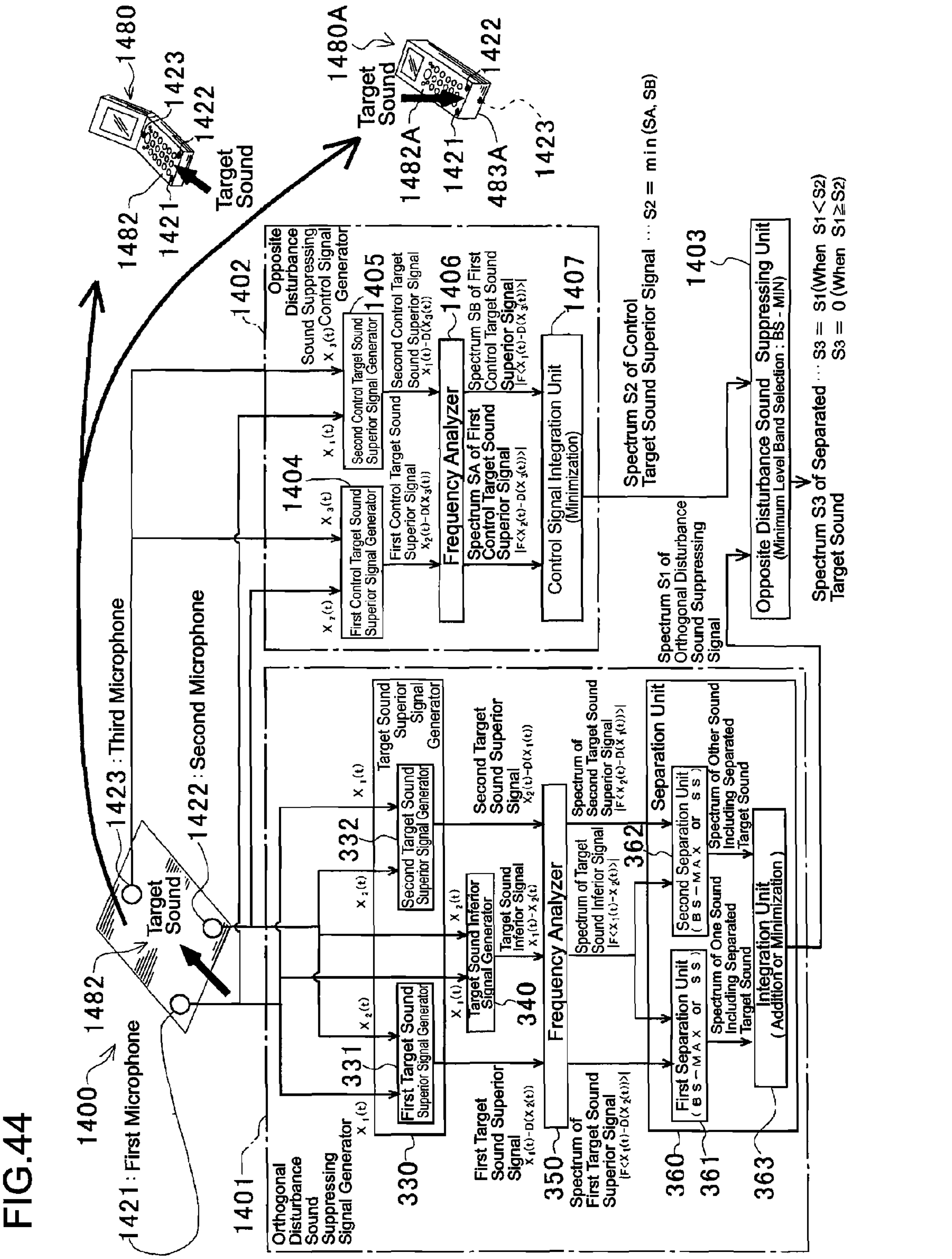
FIG. 44 is a diagram illustrating the general structure of a sound source separation system according to the twelfth embodiment of the invention.
Figure 45:
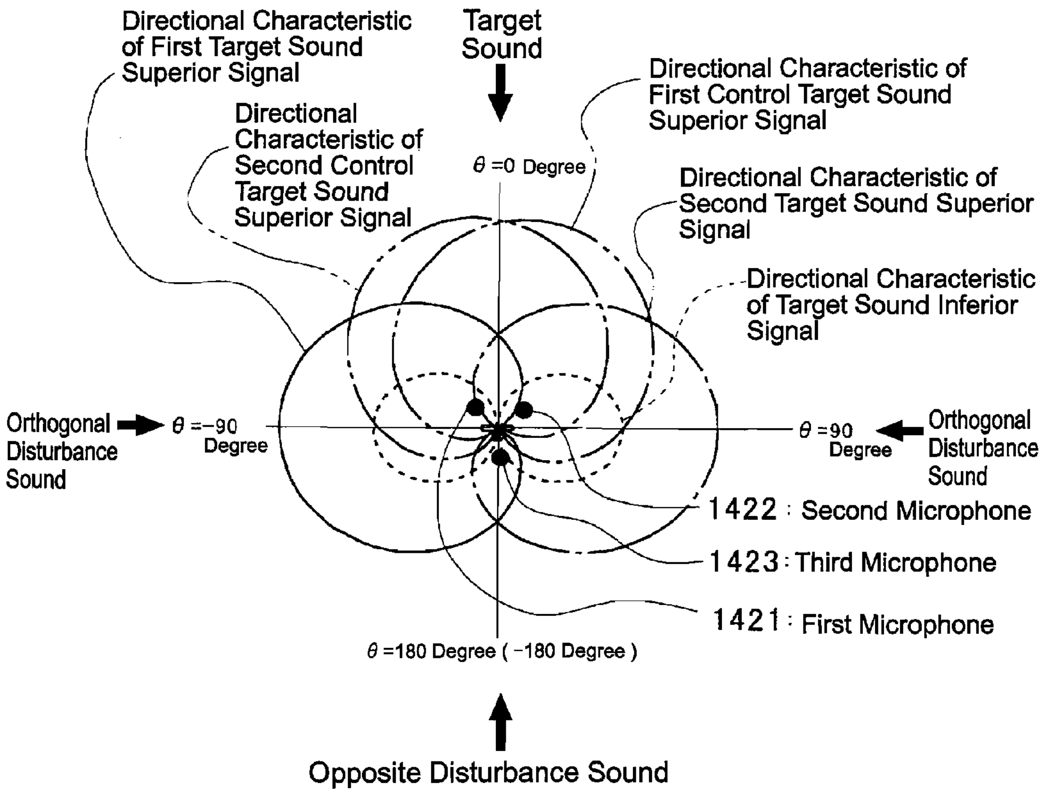
FIG. 45 is a diagram illustrating the directional characteristics of first and second target sound superior signals, target sound inferior signal, and first and second control target sound superior signals generated by the sound source separation system of the twelfth embodiment.
Figure 46:
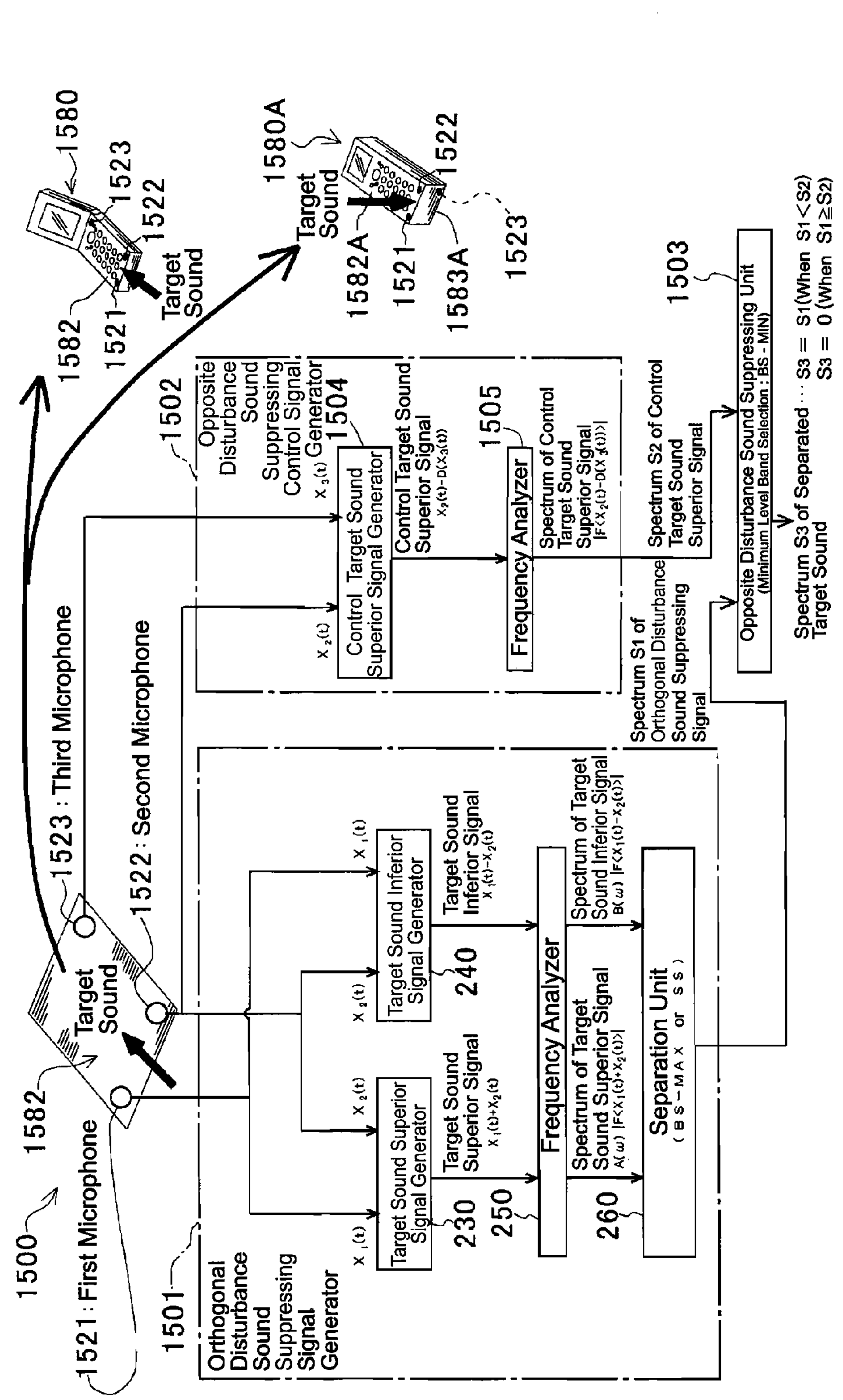
FIG. 46 is a diagram illustrating the general structure of a sound source separation system according to the thirteenth embodiment of the invention.
Figure 47:
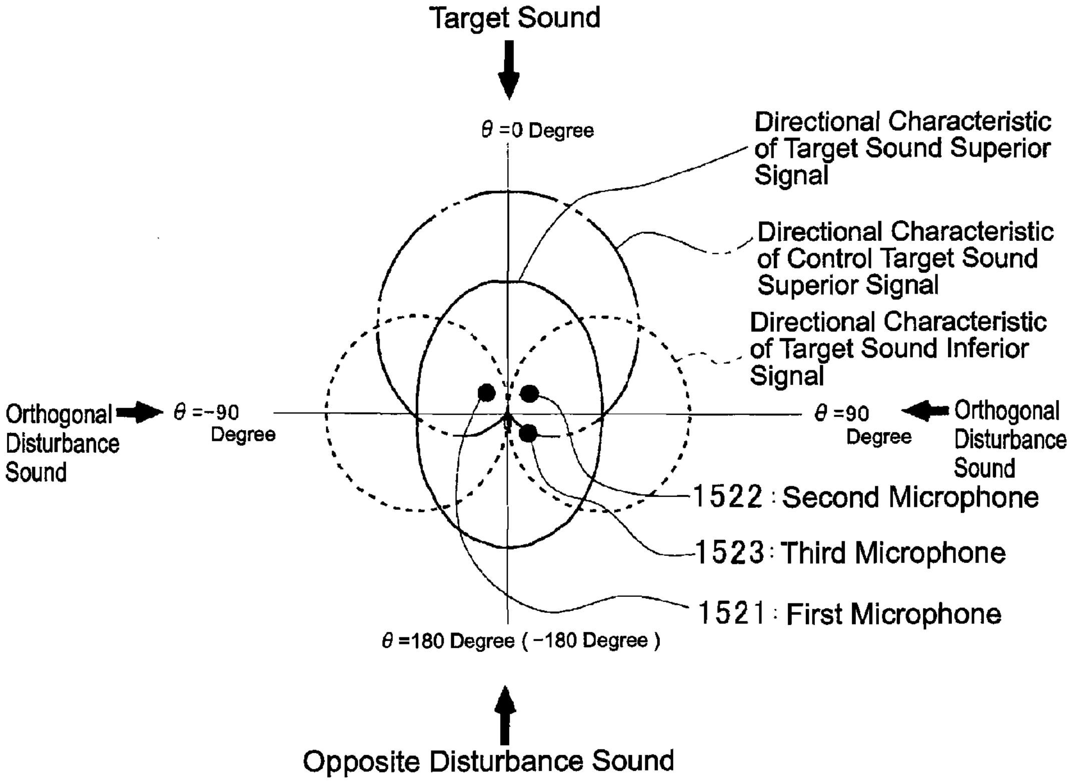
FIG. 47 is a diagram illustrating the directional characteristics of a target sound superior signal, target sound inferior signal, and control target sound superior signal generated by the sound source separation system of the thirteenth embodiment.
Figure 48:
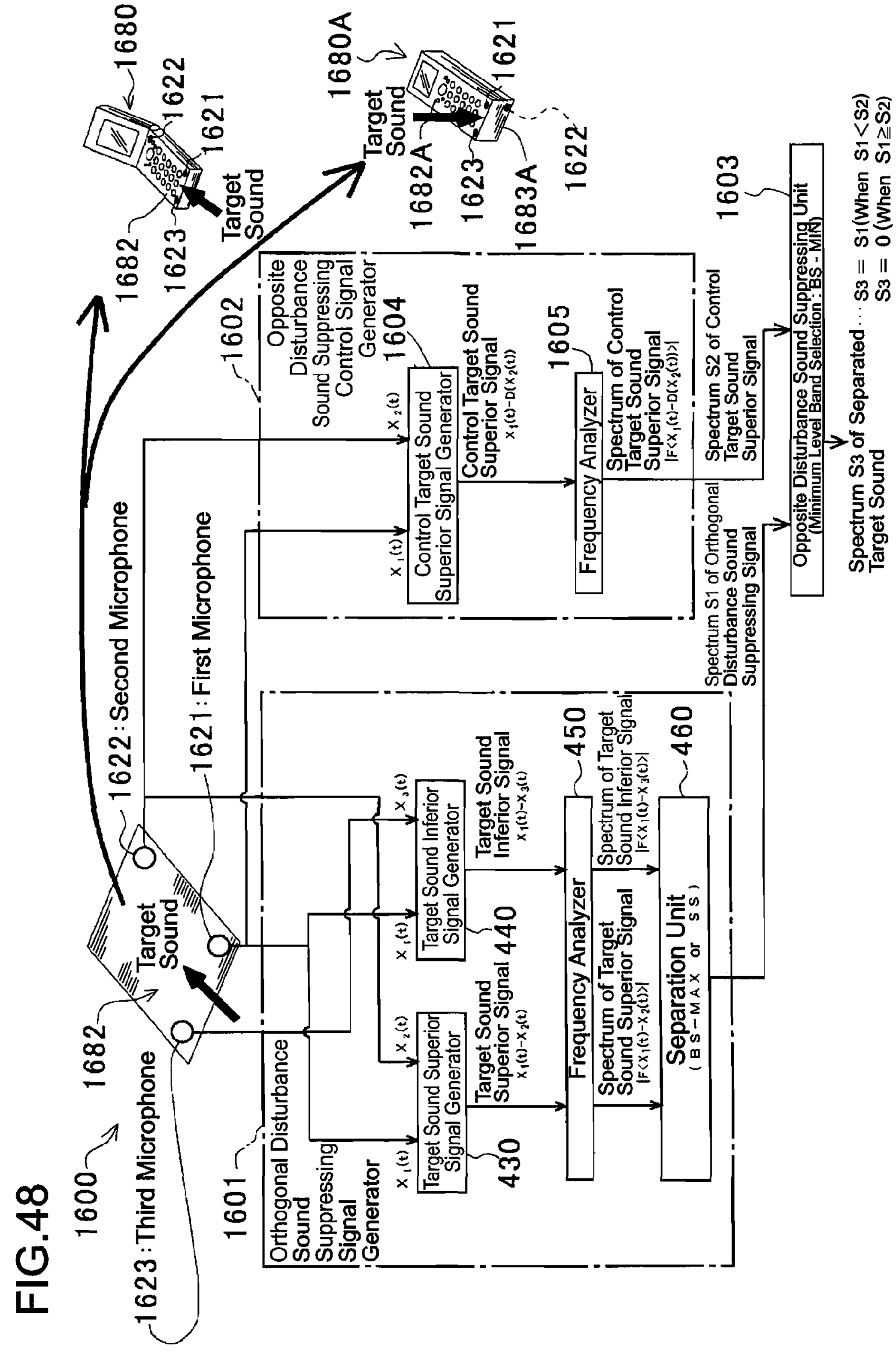
FIG. 48 is a diagram illustrating the general structure of a sound source separation system according to the fourteenth embodiment of the invention.
Figure 49:
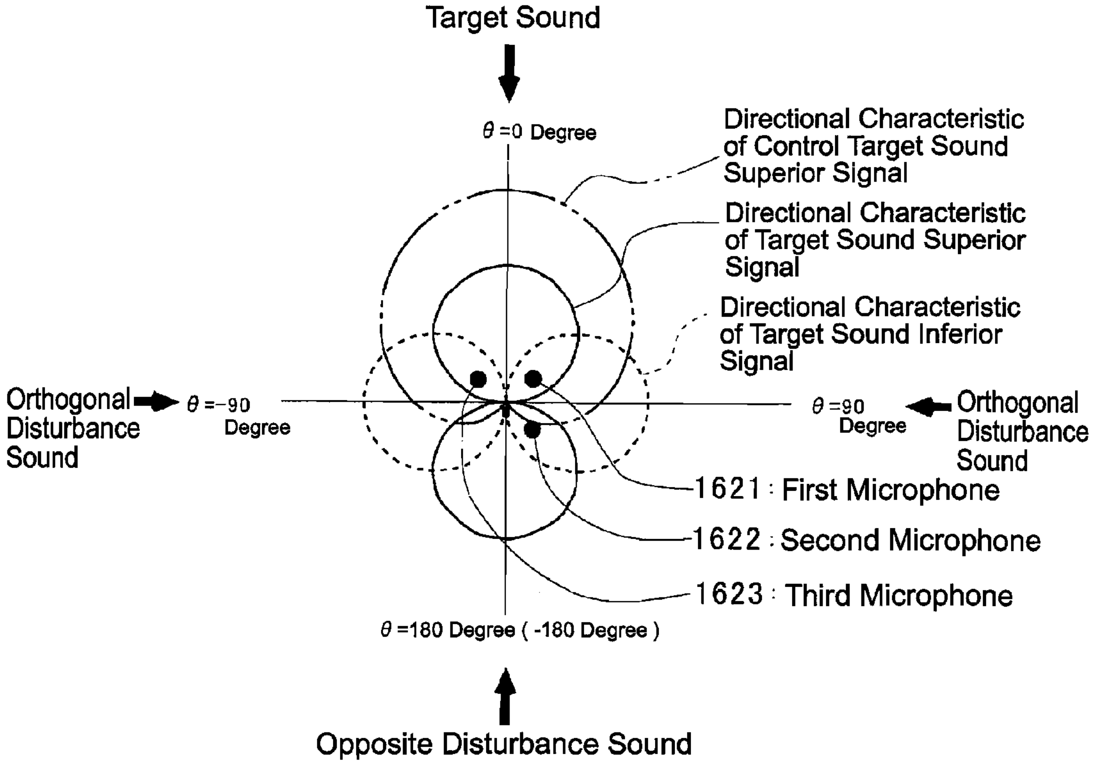
FIG. 49 is a diagram illustrating the directional characteristics of a target sound superior signal, target sound inferior signal, and control target sound superior signal generated by the sound source separation system of the fourteenth embodiment.
Figure 50:
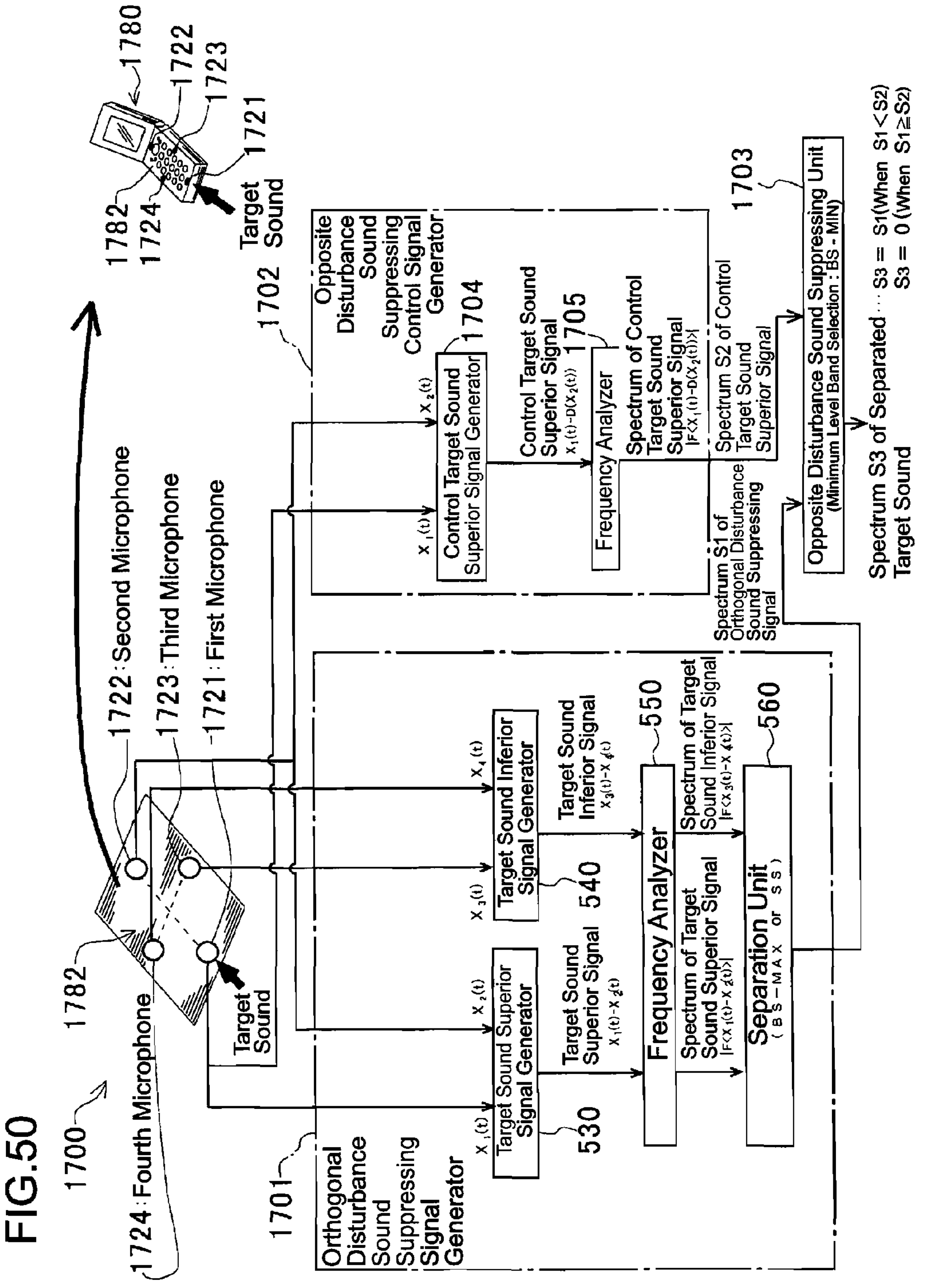
FIG. 50 is a diagram illustrating the general structure of a sound source separation system according to the fifteenth embodiment of the invention.
Figure 51:
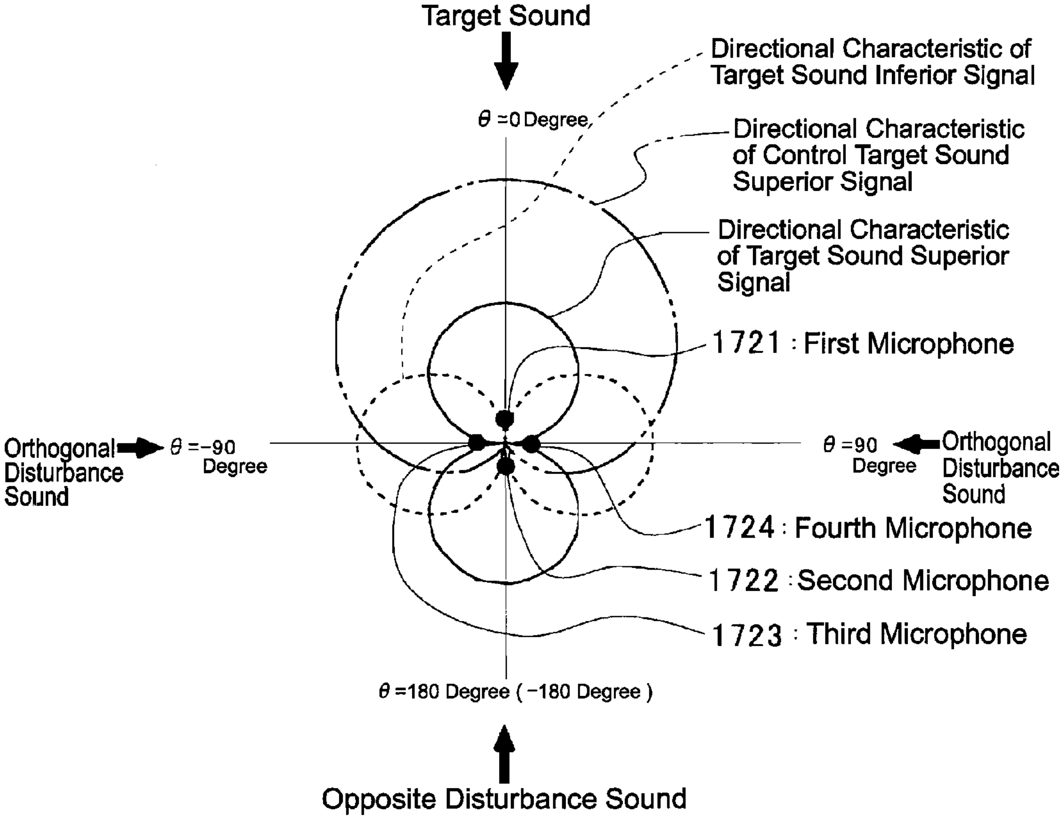
FIG. 51 is a diagram illustrating the directional characteristics of a target sound superior signal, target sound inferior signal, and control target sound superior signal generated by the sound source separation system of the fifteenth embodiment.
Figure 52:
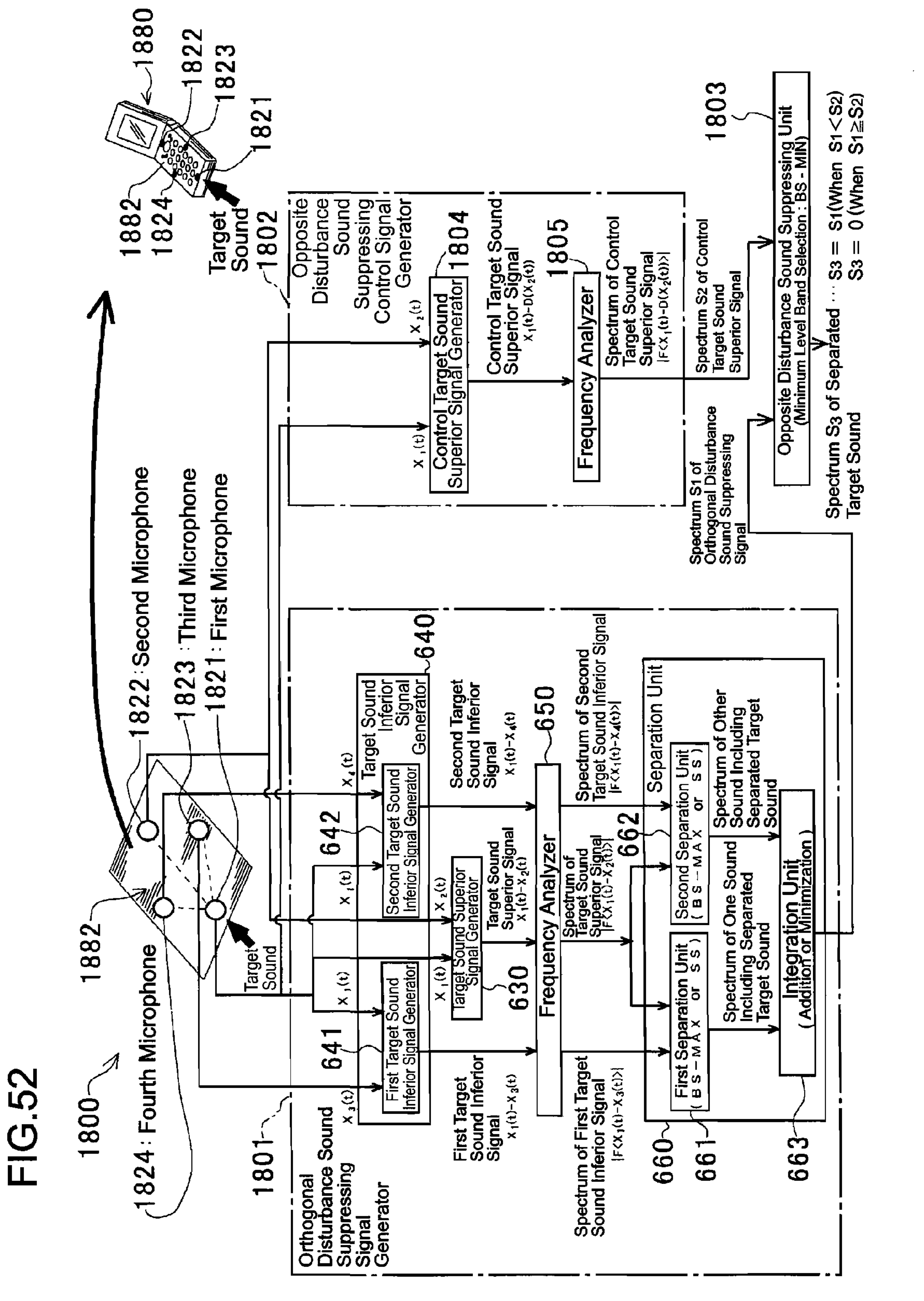
FIG. 52 is a diagram illustrating the general structure of a sound source separation system according to the sixteenth embodiment of the invention.
Figure 53:
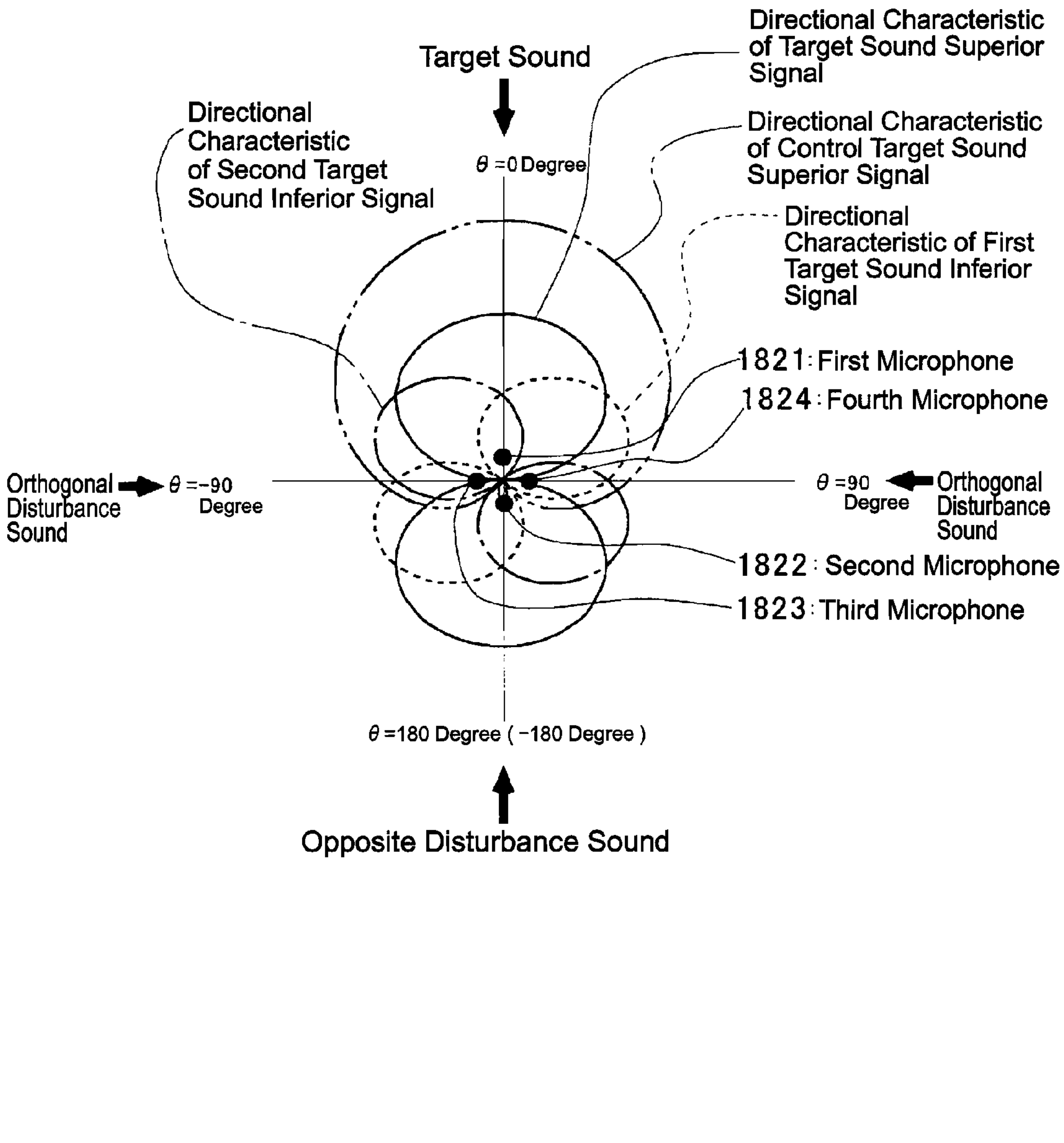
FIG. 53 is a diagram illustrating the directional characteristics of a target sound superior signal, first and second target sound inferior signals, and control target sound superior signal generated by the sound source separation system of the sixteenth embodiment.
Figure 54:
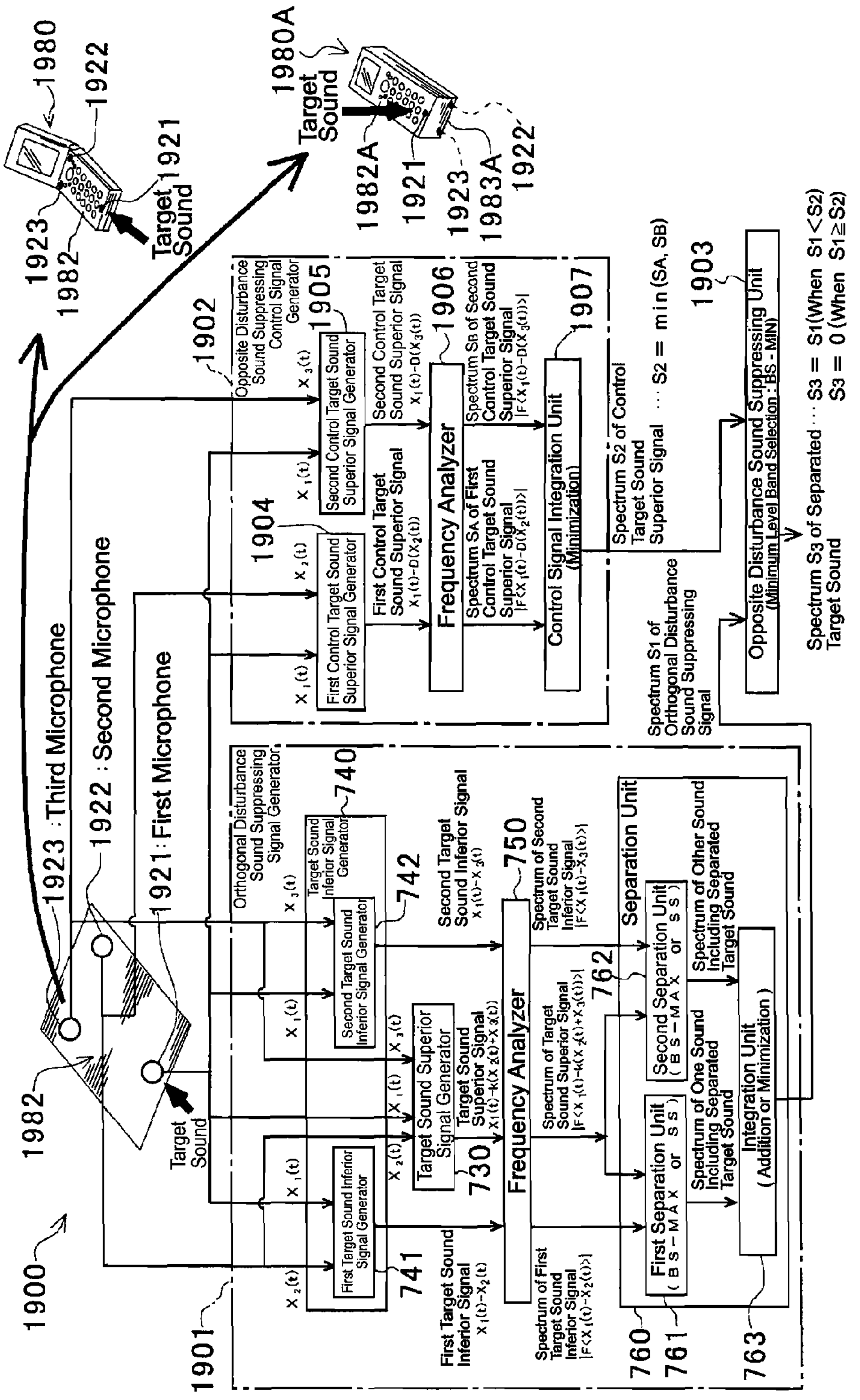
FIG. 54 is a diagram illustrating the general structure of a sound source separation system according to the seventeenth embodiment of the invention.
Figure 55:
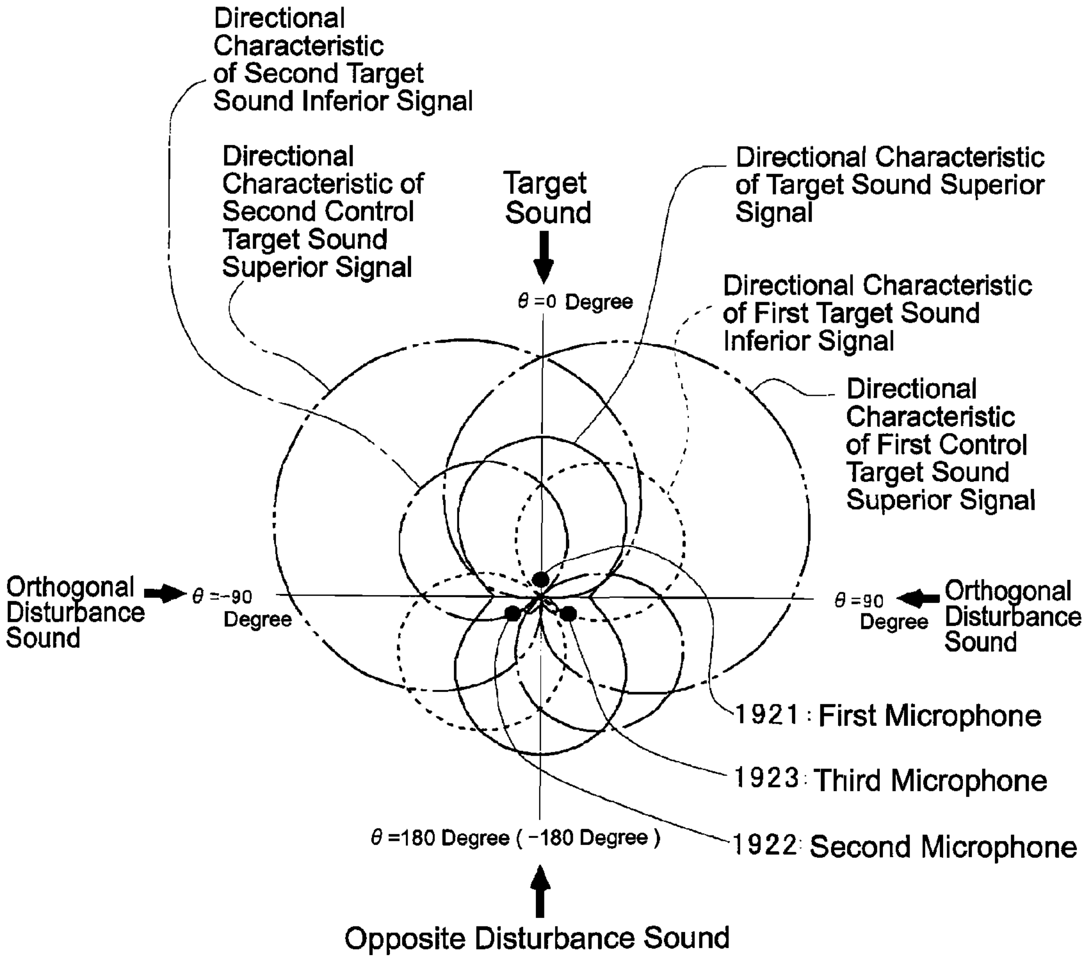
FIG. 55 is a diagram illustrating the directional characteristics of a target sound superior signal, first and second target sound inferior signals, and first and second control target sound superior signals generated by the sound source separation system of the seventeenth embodiment.
Figure 56:
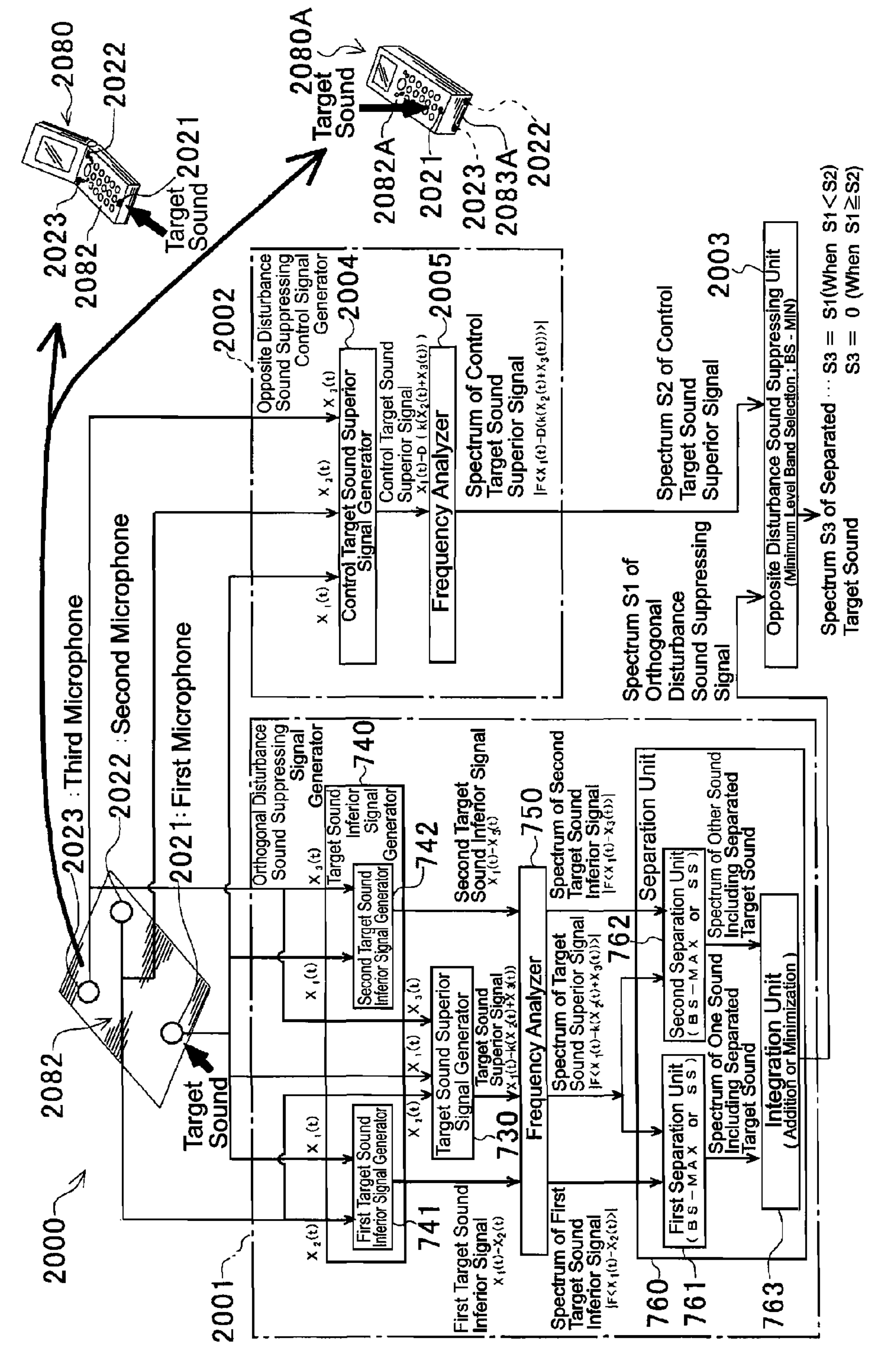
FIG. 56 is a diagram illustrating the general structure of a sound source separation system according to the eighteenth embodiment of the invention.
Figure 57:
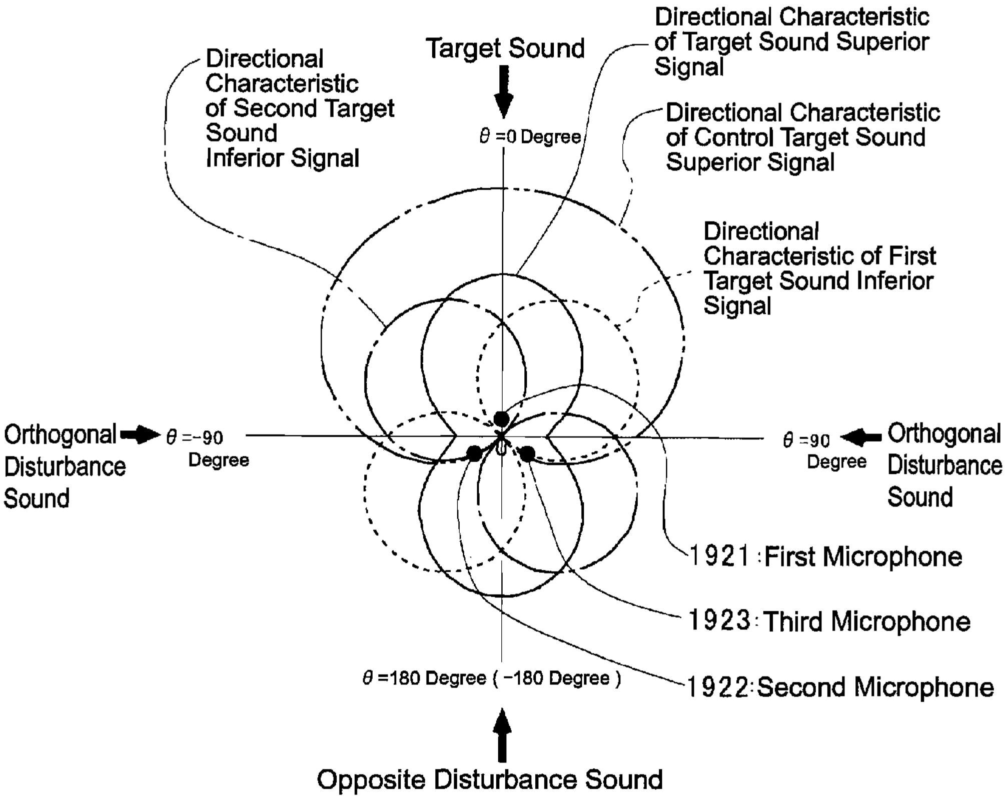
FIG. 57 is a diagram illustrating the directional characteristics of a target sound superior signal, first and second target sound inferior signals, and control target sound superior signal generated by the sound source separation system of the eighteenth embodiment.
Figure 58:
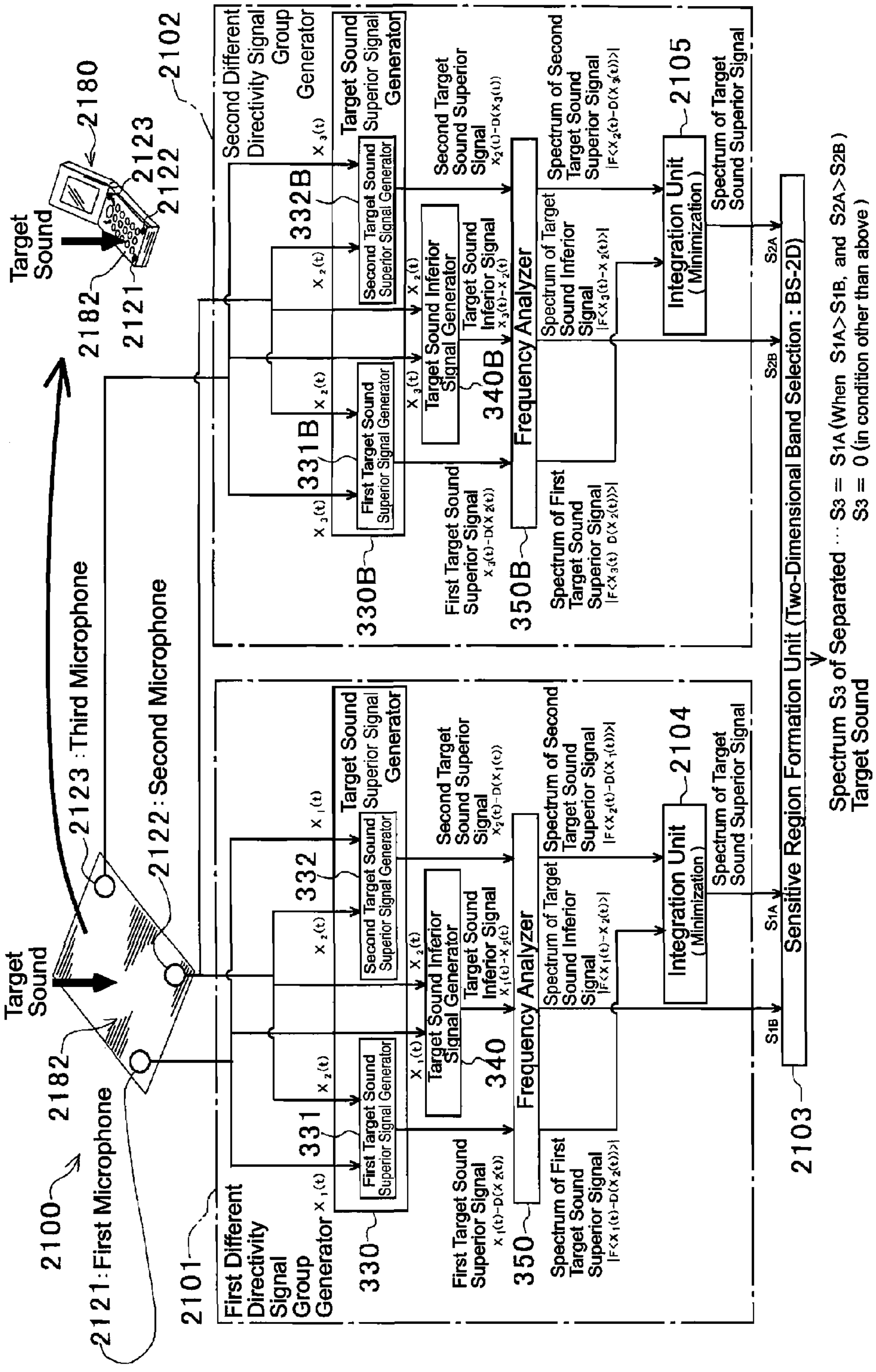
FIG. 58 is a diagram illustrating the general structure of a sound source separation system according to the nineteenth embodiment of the invention.
Figure 59:
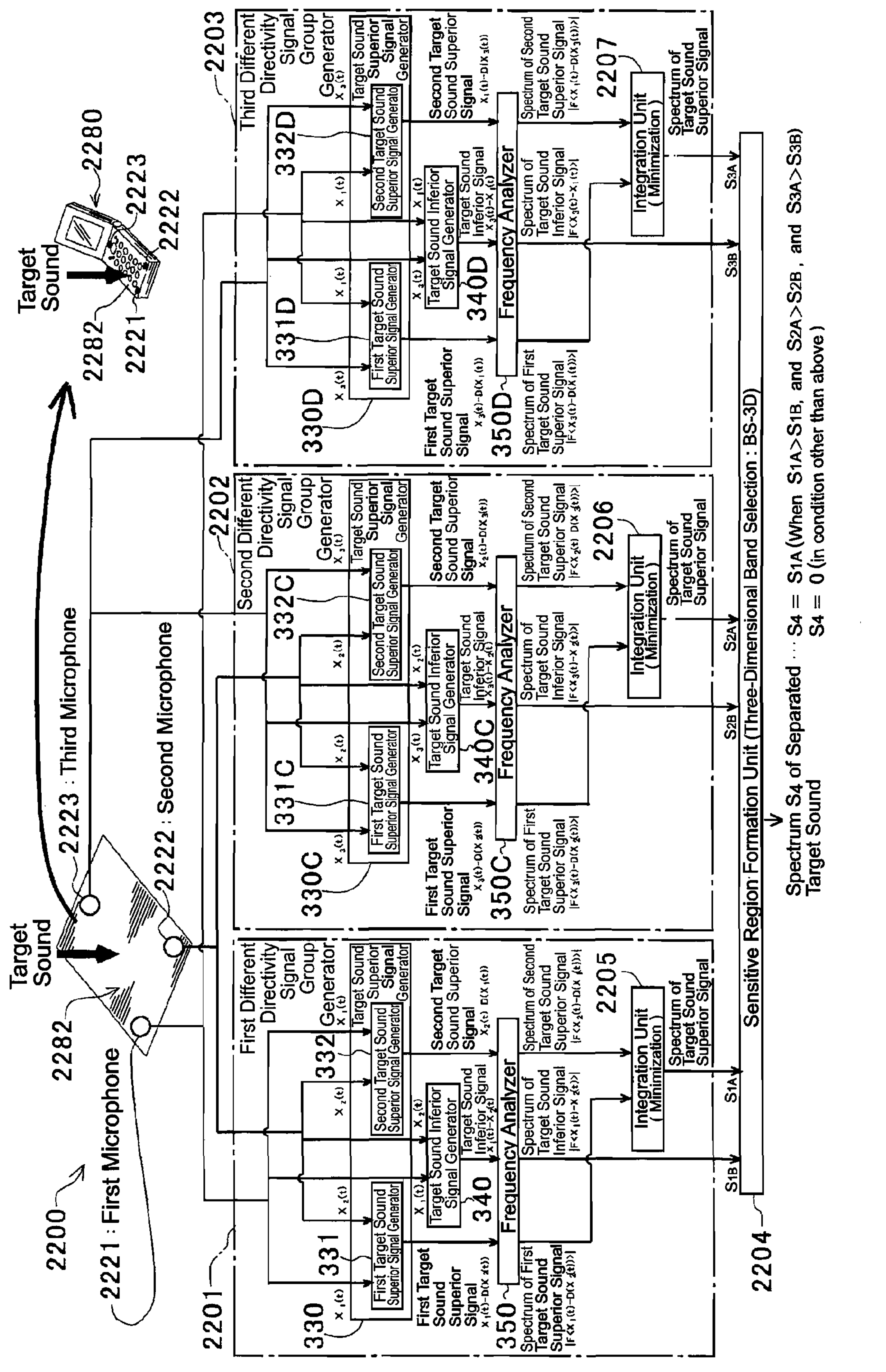
FIG. 59 is a diagram illustrating the general structure of a sound source separation system according to the twentieth embodiment of the invention.
Figure 60:
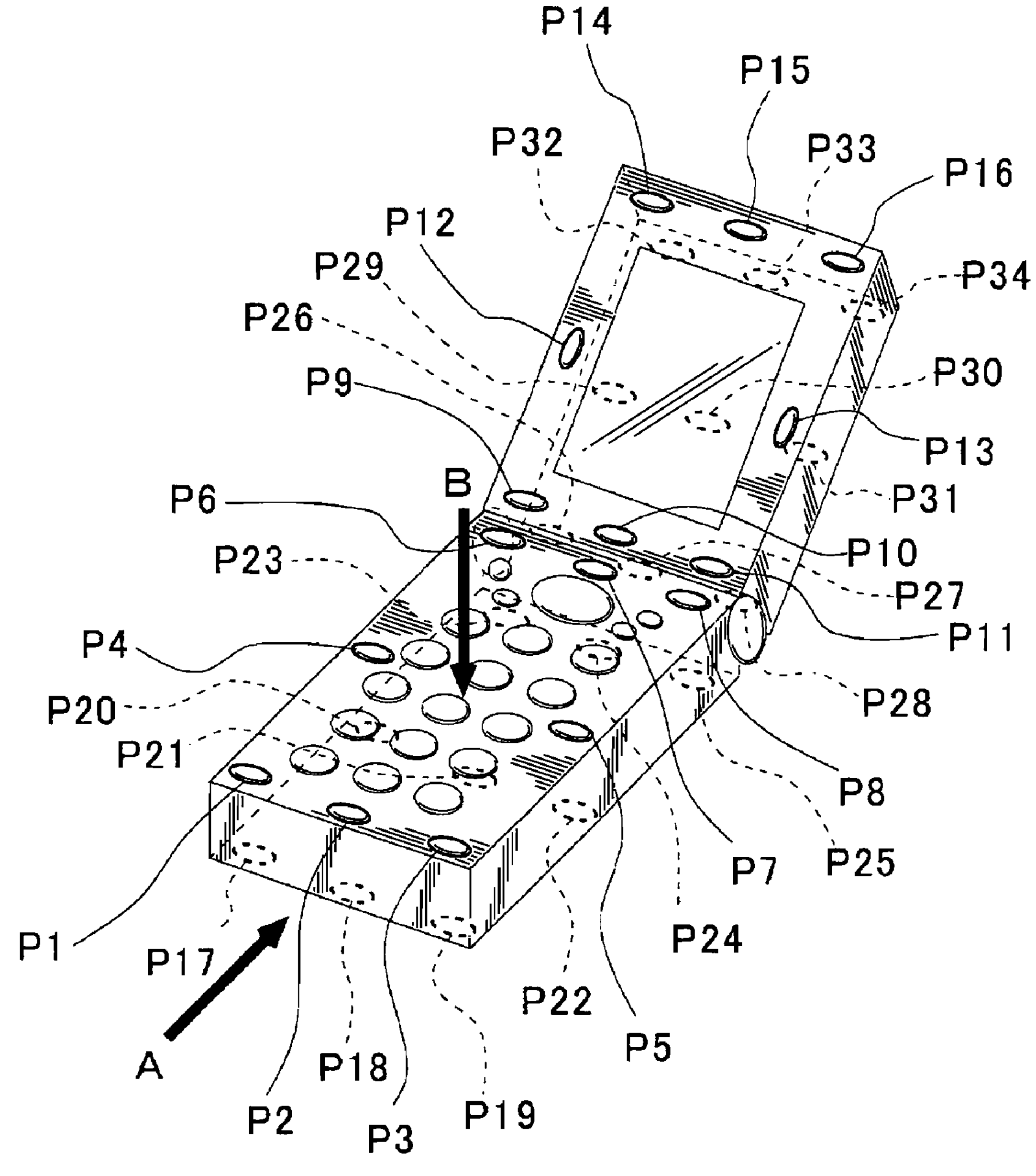
FIG. 60 is a diagram illustrating variations of a position where a microphone is disposed with respect to a cellular phone.

10, 200, 300, 400, 500, 600, 700, 1000, 110, 1200, 1300, 1400, 1500, 1600, 1700, 1800, 1900, 2000, 2100, 2200 Sound source separation system

21, 22, 221, 222, 321, 322, 421 to 423, 521 to 524, 621 to 624, 721 to 723, 821, 822, 921, 922, 1021 to 1023, 1121 to 1123, 1221 to 1223, 1321 to 1323, 1421 to 1423, 1521 to 1523, 1621 to 1623, 1721 to 1724, 1821 to 1824, 1921 to 1923, 2021 to 2023, 2121 to 2123, 2221 to 2223 Microphone

30, 230, 330, 430, 530, 630, 730 Target sound superior signal generator

40, 240, 340, 440, 540, 640, 740 Target sound inferior signal generator

41, 641, 741 First target sound inferior signal generator

42, 642, 742 Second target sound inferior signal generator

43 Changeover unit

60, 260, 360, 460, 560, 660, 760 Separation unit

80, 280, 380, 480, 780, 900, 1080, 1180, 1280, 1380, 1380A, 1480, 1480A, 1580, 1580A, 1680, 1680A, 1780, 1880, 1980, 1980A, 2080, 2080A, 2180, 2280 Cellular phone as portable device

81 Operation unit

82, 85, 281, 381, 481, 781, 1082, 1182, 1282, 1382, 1382A, 1482, 1482A, 1582, 1582A, 1682, 1682A, 1782, 1882, 1982, 1982A, 2082, 2082A, 2182, 2282 Front face

83, 86, 282, 382, 482, 782, 1083, 1183, 1283, 1283A, 1483A, 1583A, 1683A, 1983A, 2083A Rear face

84, 1184 Screen display unit

331, 331A, 331B, 331C, 331D First target sound superior signal generator

332, 332A, 332B, 332C, 332D Second target sound superior signal generator

361, 361A, 361B, 361C, 361D, 661, 761 First separation unit

362, 362A, 362B, 362C, 362D, 662, 762 Second separation unit

363, 363A, 663, 763, 2104, 2205, 2206, 2207 Integration unit

920 Rotation support member

1001, 1101, 1201 First sensitive region formation signal generator

1002, 1102, 202 Second sensitive region formation signal generator

1203 Third sensitive region formation signal generator

1003, 1103, 204 Sensitive region integration unit

1104, 205, 1206 Sensitive region limitation unit

1301, 1401, 1501, 1601, 1701, 1801, 1901, 2001 Orthogonal-disturbance-sound suppressing signal generator

1302, 1402, 1502, 1602, 1702, 1802, 1902, 2002 Opposite-disturbance-sound suppressing control signal generator

1303, 1403, 1503, 1603, 1703, 1803, 1903, 2003 Opposite-disturbance-sound suppressing unit

1304, 1504, 1604, 1704, 1804, 2004 Control target sound superior signal generator

1404, 1904 First control target sound superior signal generator

1405, 1905 Second control target sound superior signal generator

1407, 1907 Control signal integration unit

2101, 2102, 2201, 2202, 2203 Different-directional-signal-group generator

2103, 2204 Sensitive region formation unit

The invention claimed is:

1. A sound source separation system that separates a target sound and a disturbance sound coming from an arbitrary direction other than a direction from which the target sound comes, comprising:

a plurality of different-directional-signal-group generators each generating more than or equal to two combinations of spectrums of a plurality of signals each of which has a different directivity, using received sound signals of a plurality of microphones; and a sensitive region formation unit which determines whether or not a relationship between powers of the spectrums in a combination simultaneously satisfies a plurality of conditions each defined for a combination, for each frequency band, using more than or equal to two combinations of the spectrums of the plurality of signals generated by the respective different-directional-signal-group generators, and performs multidimensional band selection of assigning power of a spectrum selected beforehand to a spectrum of the target sound to be separated, for a frequency band where the plurality of conditions are simultaneously satisfied, wherein each different-directional-signal-group generator generates a spectrum of a target sound superior signal and a spectrum of a target sound inferior signal using the received sound signals of the plurality of microphones, the sensitive region formation unit sets a condition for each combination as a condition that power of the spectrum of the target sound superior signal is larger than power of the spectrum of the target sound inferior signal, and determines whether or not those conditions are simultaneously satisfied for each frequency band, the sound source separation system has a total of three first, second and third microphones disposed at respective vertices of a triangle, a first different-directional-signal-group generator including a first target sound superior signal generator which acquires a difference between a received sound signal of the first microphone and a received sound signal of the second microphone undergone a delayed process on a time domain or a frequency domain and generates a first target sound superior signal, a second target sound superior signal generator which acquires a difference between a received sound signal of the second microphone and a received sound signal of the first microphone undergone a delayed process on a time domain or a frequency domain, and generates a second target sound superior signal, a target sound inferior signal generator which acquires a difference between received sound signals of the first and second microphones on a time domain or a frequency domain, and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, a second different-directional-signal-group generator including a first target sound superior signal generator which acquires a difference between a received sound signal of the third microphone and a received sound signal of the second microphone undergone a delayed process on a time domain or a frequency domain and generates a first target sound superior signal, a second target sound superior signal generator which acquires a difference between a received sound signal of the second microphone and a received sound signal of the third microphone undergone a delayed process on a time domain or a frequency domain, and generates a second target sound superior signal, a target sound inferior signal generator which acquires a difference between received sound signals of the second and third microphones on a time domain or a frequency domain, and an integration unit which compares powers for each frequency band using a spectrum of the first target sound superior signal generated by the first target sound superior signal generator or obtained by a subsequent frequency analysis and a spectrum of the second target sound superior signal generated by the second target sound superior signal generator or obtained by a subsequent frequency analysis, and performs a spectrum integration process of assigning inferior power to a spectrum of a target sound superior signal, and the sensitive region formation unit performs two-dimensional-band selection of assigning power of a spectrum of a target sound superior signal generated by either one of the first and second different-directional-signal-group generators to a spectrum of the target sound to be separated.

* * * * *